(12) United States Patent
Welch et al.

(10) Patent No.: US 12,401,424 B2
(45) Date of Patent: Aug. 26, 2025

(54) FIBER-COUPLED TERAHERTZ TRANSCEIVER SYSTEM

(71) Applicant: Attotude, Inc., Menlo Park, CA (US)

(72) Inventors: David F. Welch, Atherton, CA (US);
Joy Laskar, Mountain View, CA (US);
Philip Kness, Boise, ID (US); Richard Chan, Menlo Park, CA (US); Rene Schmogrow, Menlo Park, CA (US);
Sudipto Chakraborty, Plano, TX (US);
Eric Juntunen, San Diego, CA (US);
Kuang-Tsan Wu, Ottawa (CA)

(73) Assignee: Attotude, Inc., Menlo Park, CA (US)

( * ) Notice: Subject to any disclaimer, the term of this patent is extended or adjusted under 35 U.S.C. 154(b) by 0 days.

(21) Appl. No.: 18/952,796

(22) Filed: Nov. 19, 2024

(65) Prior Publication Data
US 2025/0141558 A1   May 1, 2025

Related U.S. Application Data

(63) Continuation of application No. 18/927,535, filed on Oct. 25, 2024.
(Continued)

(51) Int. Cl.
*H04B 10/40* (2013.01)
*H04B 10/25* (2013.01)
*H04B 10/27* (2013.01)

(52) U.S. Cl.
CPC ............. *H04B 10/40* (2013.01); *H04B 10/25* (2013.01); *H04B 10/27* (2013.01)

(58) Field of Classification Search
CPC .... H04B 10/25; H04B 10/2575; H04B 10/27; H04B 10/40
(Continued)

(56) References Cited

U.S. PATENT DOCUMENTS

| 4,315,667 A | 2/1982 | Nakagome |
| 4,652,083 A | 3/1987 | Laakmann |

(Continued)

FOREIGN PATENT DOCUMENTS

| CN | 102664684 A | 9/2012 |
| CN | 111492533 A | 8/2020 |

(Continued)

OTHER PUBLICATIONS

Opatic, D., Radio over Fiber Technology for Wireless Access, GSDC Croatia, Ericsson Nikola Tesla d.d.
(Continued)

*Primary Examiner* — Dalzid E Singh
(74) *Attorney, Agent, or Firm* — DUNLAP CODDING, P.C.

(57) ABSTRACT

Transport networks, network elements, and methods of use are described herein, including a transmitter comprising a client-side input, transmitter circuitry, and antennas. The client-side input is configured to receive baseband signals having client data encoded therein. The transmitter circuitry is configured to receive the baseband signals from the client-side input and generate antenna feed signals based on the baseband signals. The antennas are configured to receive the antenna feed signals from the transmitter circuitry, generate radiated signals based on the antenna feed signals, and couple the radiated signals into a hollow waveguide. Each of the radiated signals is a radiated electromagnetic wave configured for coherent detection and has a frequency in a range between 300 Gigahertz (GHz) and 10 Terahertz (THz).

80 Claims, 53 Drawing Sheets

Related U.S. Application Data

(60) Provisional application No. 63/683,007, filed on Aug. 14, 2024, provisional application No. 63/666,886, filed on Jul. 2, 2024, provisional application No. 63/661,437, filed on Jun. 18, 2024, provisional application No. 63/658,162, filed on Jun. 10, 2024, provisional application No. 63/658,176, filed on Jun. 10, 2024, provisional application No. 63/655,823, filed on Jun. 4, 2024, provisional application No. 63/575,162, filed on Apr. 5, 2024, provisional application No. 63/593,874, filed on Oct. 27, 2023.

(58) Field of Classification Search
USPC .......................................................... 398/115
See application file for complete search history.

(56) References Cited

U.S. PATENT DOCUMENTS

| | | | |
|---|---|---|---|
| 4,688,892 | A | 8/1987 | Laakmann |
| 5,440,664 | A | 8/1995 | Harrington et al. |
| 5,815,627 | A * | 9/1998 | Harrington ............ G02B 6/032 |
| | | | 385/125 |
| 6,128,430 | A | 10/2000 | Chu et al. |
| 6,141,476 | A | 10/2000 | Matsuura et al. |
| 6,698,246 | B1 | 3/2004 | Beall et al. |
| 6,735,369 | B2 | 5/2004 | Komachi et al. |
| 6,919,784 | B2 | 7/2005 | Feng et al. |
| 6,998,946 | B2 | 2/2006 | Feng et al. |
| 7,142,076 | B2 | 11/2006 | Feng et al. |
| 7,286,583 | B2 | 10/2007 | Feng et al. |
| 7,354,780 | B2 | 4/2008 | Feng et al. |
| 7,477,809 | B1 | 1/2009 | Tan et al. |
| 7,535,034 | B2 | 5/2009 | Walter et al. |
| 7,693,195 | B2 | 4/2010 | Feng et al. |
| 7,888,199 | B2 | 2/2011 | Walter et al. |
| 8,121,452 | B2 | 2/2012 | Hongo et al. |
| 8,232,831 | B2 | 7/2012 | Feng et al. |
| 8,720,040 | B2 | 5/2014 | Hongo et al. |
| 8,742,453 | B2 | 6/2014 | Chan |
| 8,823,011 | B2 | 9/2014 | Chan |
| 8,934,748 | B2 | 1/2015 | Rice et al. |
| 9,069,117 | B1 | 6/2015 | Ballato ET AL. |
| 9,077,577 | B1 * | 7/2015 | Ashrafi ................ H04B 10/532 |
| 9,093,732 | B2 | 7/2015 | Bae et al. |
| 9,188,742 | B2 | 11/2015 | Fujita et al. |
| 9,479,232 | B1 | 10/2016 | Loui et al. |
| 9,496,622 | B2 | 11/2016 | Fujita et al. |
| 9,632,247 | B2 | 4/2017 | Fujita et al. |
| 9,822,470 | B2 | 11/2017 | Manipatruni et al. |
| 10,128,886 | B1 | 11/2018 | Barnard et al. |
| 10,416,376 | B2 | 9/2019 | Byren et al. |
| 10,686,241 | B2 | 6/2020 | Bae et al. |
| 10,763,966 | B1 * | 9/2020 | Deb ................ H04B 10/25759 |
| 10,770,774 | B2 | 9/2020 | Bae et al. |
| 10,777,865 | B2 | 9/2020 | Bae et al. |
| 10,777,868 | B2 | 9/2020 | Bae et al. |
| 11,038,667 | B2 | 6/2021 | Lee et al. |
| 11,289,788 | B2 | 3/2022 | Bae et al. |
| 11,394,098 | B2 | 7/2022 | Bae et al. |
| 11,394,099 | B2 | 7/2022 | Bae et al. |
| 11,431,377 | B1 | 8/2022 | O'Hara et al. |
| 2003/0205065 | A1 | 11/2003 | Matsuura et al. |
| 2005/0053345 | A1 | 3/2005 | Bayindir et al. |
| 2008/0160931 | A1 | 7/2008 | Rofougaran |
| 2009/0274470 | A1 | 11/2009 | Yoshino et al. |
| 2012/0306587 | A1 | 12/2012 | Strid et al. |
| 2014/0050484 | A1 | 2/2014 | Sun |
| 2014/0184351 | A1 | 7/2014 | Bae et al. |
| 2014/0233666 | A1 | 8/2014 | Campos et al. |
| 2014/0248020 | A1 | 9/2014 | Fujita et al. |
| 2014/0255040 | A1 | 9/2014 | Fujita et al. |
| 2015/0241630 | A1 | 8/2015 | Fujita et al. |
| 2016/0363726 | A1 | 12/2016 | Alisafaee et al. |
| 2017/0033885 | A1 | 2/2017 | Cavaliere et al. |
| 2017/0170903 | A1 | 6/2017 | Jain et al. |
| 2017/0198568 | A1 | 7/2017 | Nitsche et al. |
| 2018/0040937 | A1 | 2/2018 | Bae et al. |
| 2018/0183561 | A1 | 6/2018 | Dogiamis et al. |
| 2018/0316434 | A1 | 11/2018 | Dogiamis et al. |
| 2019/0067775 | A1 | 2/2019 | Bae et al. |
| 2019/0115951 | A1 | 4/2019 | Braunisch et al. |
| 2019/0162987 | A1 | 5/2019 | Huang et al. |
| 2019/0393612 | A1 * | 12/2019 | Henry ..................... H01Q 1/50 |
| 2020/0091608 | A1 | 3/2020 | Alpman et al. |
| 2020/0274222 | A1 | 8/2020 | Bae et al. |
| 2020/0389286 | A1 | 12/2020 | Lee et al. |
| 2021/0013575 | A1 | 1/2021 | Bae et al. |
| 2021/0013577 | A1 | 1/2021 | Bae et al. |
| 2021/0234585 | A1 | 7/2021 | Rahman et al. |
| 2021/0271099 | A1 | 9/2021 | Kukutsu et al. |
| 2021/0336346 | A1 | 10/2021 | Globisch et al. |
| 2022/0060214 | A1 | 2/2022 | Belot et al. |
| 2022/0190917 | A1 | 6/2022 | Ashrafi |
| 2022/0216887 | A1 * | 7/2022 | Zhu ..................... H04B 1/0458 |
| 2022/0291567 | A1 | 9/2022 | Sugiyama |
| 2022/0384956 | A1 | 12/2022 | Alpman et al. |
| 2023/0070232 | A1 * | 3/2023 | Suzuki .................. H04B 10/40 |
| 2023/0084190 | A1 | 3/2023 | Ito et al. |
| 2023/0178898 | A1 | 6/2023 | Fujita et al. |
| 2024/0031125 | A1 | 1/2024 | Bae et al. |

FOREIGN PATENT DOCUMENTS

| | | |
|---|---|---|
| CN | 115515216 A | 12/2022 |
| CN | 117121384 A | 11/2024 |
| EP | 1199286 A1 | 4/2002 |
| EP | 3764457 A1 | 10/2019 |
| EP | 3731338 A1 | 10/2020 |
| EP | 3764460 A1 | 1/2021 |
| GB | 2020057 A | 11/1979 |
| JP | 2014197837 A | 10/2014 |
| JP | 2014197838 A | 10/2014 |
| JP | 2015162787 A | 9/2015 |
| JP | 2015187716 A | 10/2015 |
| JP | 2018017684 A | 2/2018 |
| JP | 2021506204 A | 2/2021 |
| JP | 2021135188 A | 9/2021 |
| JP | 2021136693 A | 9/2021 |
| JP | 7037840 B2 | 3/2022 |
| JP | 2024120724 A | 9/2024 |
| KR | 100759271 B1 | 9/2007 |
| KR | 101869887 B1 | 6/2018 |
| KR | 20180078542 A | 7/2018 |
| KR | 20190073238 A | 6/2019 |
| KR | 20190119419 A | 10/2019 |
| KR | 20220095708 A | 7/2022 |
| KR | 20220095713 A | 7/2022 |
| KR | 20230067164 A | 5/2023 |
| KR | 20230041642 A | 3/2024 |
| RU | 2789005 C1 | 1/2021 |
| RU | 225033 U1 | 4/2024 |
| TW | 201929474 A | 7/2019 |
| TW | 1672034 B | 9/2019 |
| WO | 2000010932 A1 | 3/2000 |
| WO | WO 2010036245 A1 | 4/2010 |
| WO | WO 2010127676 A1 | 11/2010 |
| WO | WO 2018090434 A1 | 5/2018 |
| WO | WO 2019124721 A1 | 6/2019 |
| WO | WO 2023043295 A1 | 3/2023 |
| WO | WO 2023080285 A1 | 5/2023 |

OTHER PUBLICATIONS

The World's-First Compact Transceiver For Terahertz Wireless Communication Using the 300-GHz Band—With Transmission Rate of Several-Dozen Gigabits per Second—Was Developed and Experimentally Demonstrated High-Speed Data Transmission; RF Globalnet, May 26, 2016.

European Patent Office, Supplementary European Search Report for EP3764460, Nov. 11, 2021.

(56) References Cited

OTHER PUBLICATIONS

United States Patent and Trademark Office, International Search Report and Written Opinion for PCT/US2024/053093, Jan. 22, 2025.

Furniss, D., Shephard, J. D., & Seddon, A. B. (1997). A novel approach for drawing optical fibers from disparate core/clad. glasses. Journal of Non-Crystalline Solids, 213 & 214, 141-146.

* cited by examiner

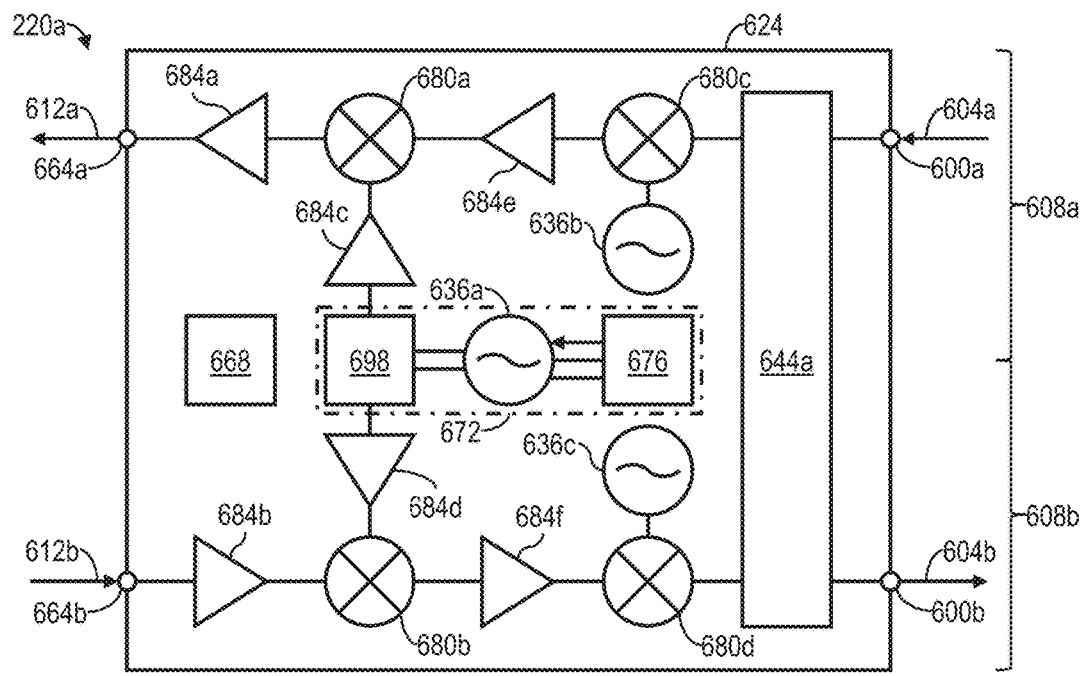
FIG. 6B
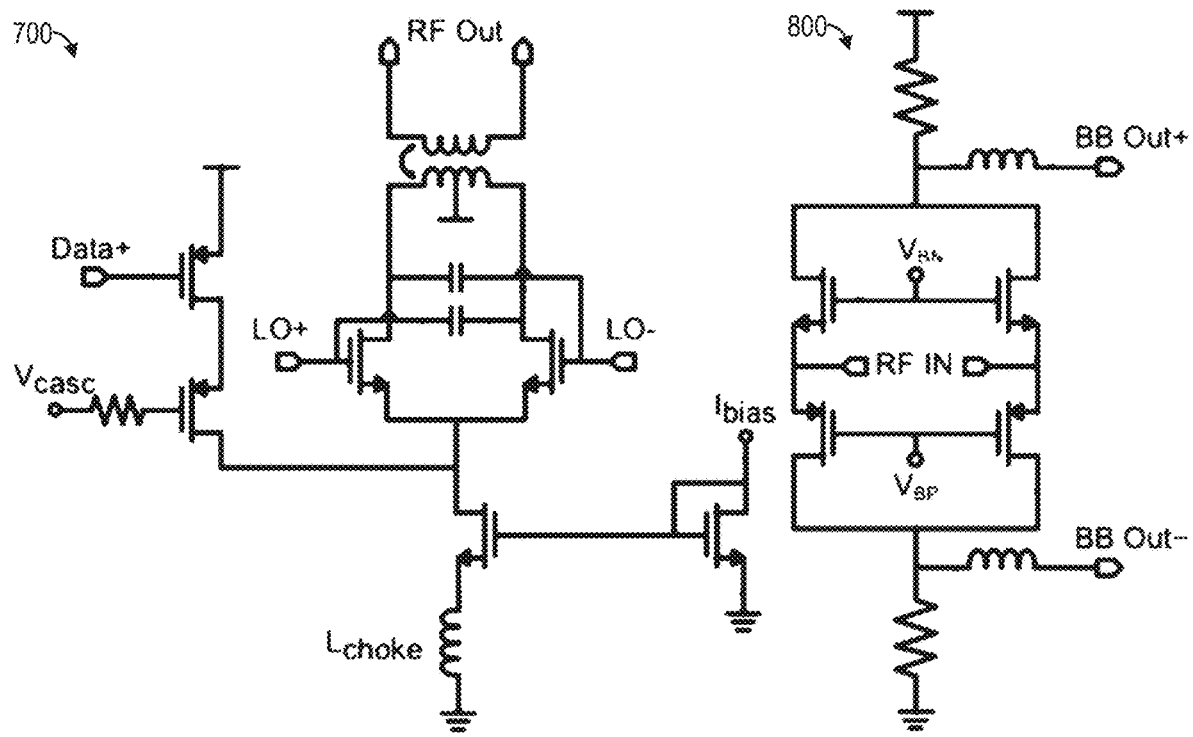
FIG. 7
FIG. 8

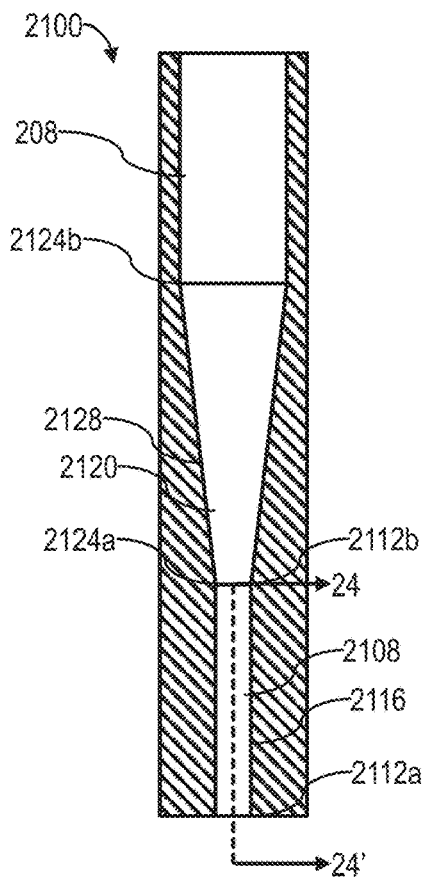
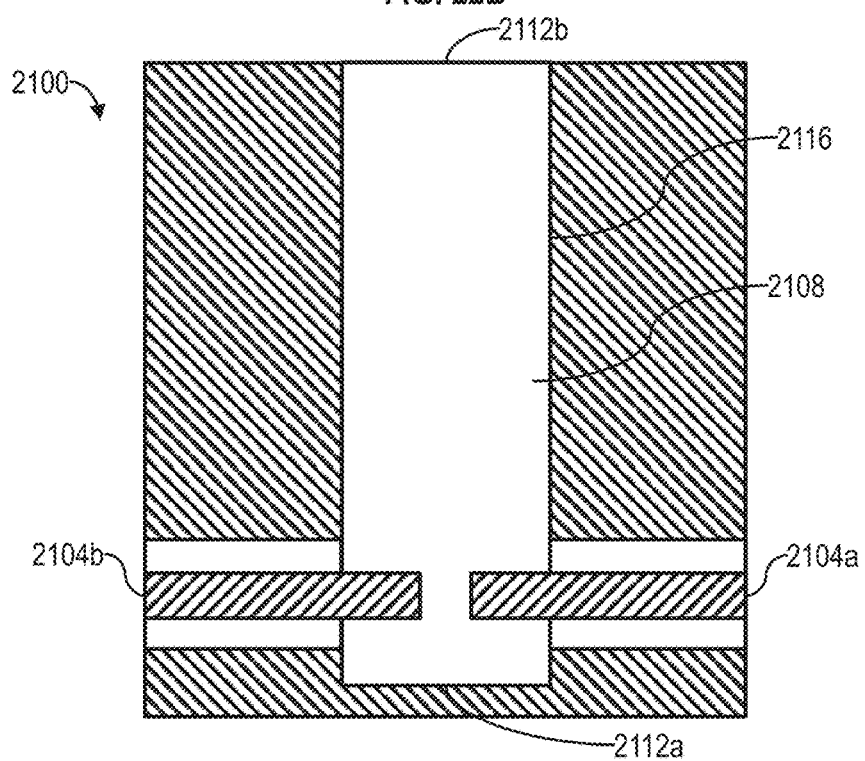
FIG. 22B
FIG. 22C

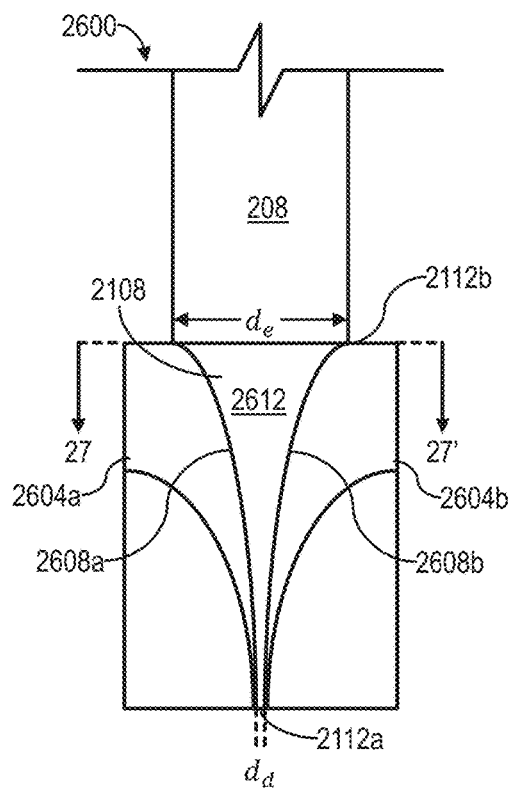
FIG. 23
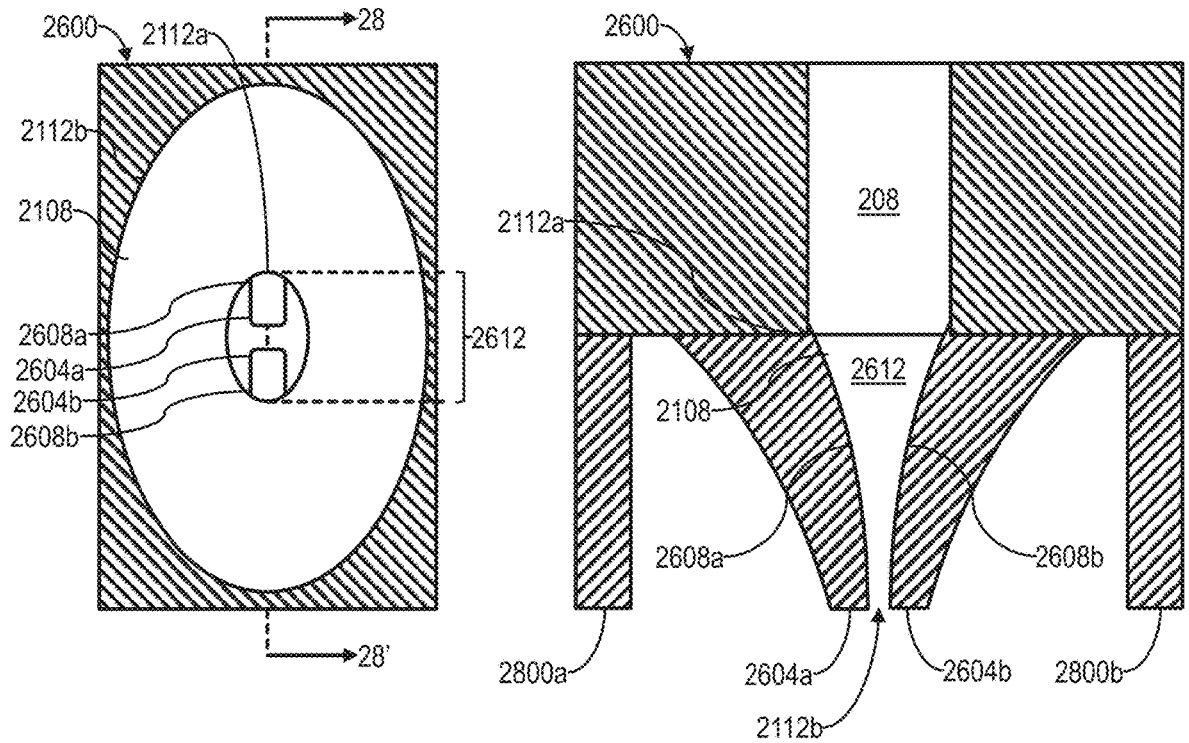
FIG. 24A
FIG. 24B

FIBER-COUPLED TERAHERTZ TRANSCEIVER SYSTEM

CROSS-REFERENCE TO RELATED APPLICATIONS

The present application is a continuation of the patent application filed on Oct. 25, 2024, and identified by U.S. Ser. No. 18/927,535, which claims priority under 35 U.S.C. 119(e) to the provisional application identified by U.S. Ser. No. 63/655,823, filed on Jun. 4, 2024; to the provisional application identified by U.S. Ser. No. 63/658,162, filed on Jun. 10, 2024; to the provisional application identified by U.S. Ser. No. 63/658,176, filed on Jun. 10, 2024; to the provisional application identified by U.S. Ser. No. 63/661,437, filed on Jun. 18, 2024; to the provisional application identified by U.S. Ser. No. 63/666,886, filed on Jul. 2, 2024; to the provisional application identified by U.S. Ser. No. 63/575,162, filed on Apr. 5, 2024; to the provisional application identified by U.S. Ser. No. 63/683,007, filed on Aug. 14, 2024; and to the provisional application identified by U.S. Ser. No. 63/593,874, filed on Oct. 27, 2023; the entire contents of all of which are hereby incorporated by reference herein.

BACKGROUND ART

Optical networking is a means of communication that uses signals encoded in light to transmit information in various types of telecommunications networks, including limited range local-area networks (LANs) or wide-area networks (WANs). It is a form of optical communication that relies on optical amplifiers, lasers, or LEDs and wavelength-division multiplexing (WDM) to transmit large quantities of data, generally across fiber-optic cables. Because it is capable of achieving extremely high bandwidth, it is an enabling technology for the Internet and telecommunication networks that transmit the vast majority of all human and machine-to-machine information. However, further development and optimization of optical networking systems face certain limiting factors, namely, power dissipation, thermal requirements, and mechanical tolerances.

Optical components generate photons by exciting electrons in a gain medium, and the electrons emit photons as they return to lower energy levels. Despite efforts to improve efficiency, optical components generate some amount of heat during the electron excitation process, and such heat is referred to as power dissipation. Excessive power dissipation may lead to thermal management problems and may affect the performance and longevity of the optical components.

Optical components are sensitive to temperature fluctuations and often require lower operating temperatures than purely electronic components to maintain optimal performance. Elevated temperatures may result in increased signal noise, diminished signal quality, and reduced service life for optical components. Accordingly, optical components often require cooling systems (e.g., heat sinks, fans, or thermoelectric devices) to dissipate excess heat and maintain the optical components within a safe temperature range.

Optical networking systems typically operate in micrometer wavelengths, demanding extreme precision in component fabrication, assembly, and alignment. Even slight deviations from the required mechanical tolerances may lead to signal degradation, loss, or the introduction of optical crosstalk, negatively impacting network performance. Achieving and maintaining the necessary mechanical tolerances necessitates advanced manufacturing techniques and stringent quality control measures.

SUMMARY OF THE INVENTION

Transport networks, network elements, and methods of use are disclosed herein. The problems of power dissipation, thermal requirements, and mechanical tolerances are addressed through a Terahertz (THz) radio frequency (RF) transmission system in which RF signals are coupled into hollow waveguides for transmission.

In terms of power dissipation, RF transceivers lack optical components, thereby eliminating power requirements associated with activating optical components and generating photons. Further, transmission of RF signals in the THz frequency band involves longer wavelengths than transmission of optical signals in higher frequency bands, meaning that less energy is required to create and modulate the signals. Finally, no optical-electrical conversion is required, as RF transceivers operate entirely in the electrical domain. Thus, power dissipation is reduced in the fiber-coupled THz RF transceiver system. RF transceivers also entail relaxed thermal requirements, as the RF transceivers lack optical components that are sensitive to temperature fluctuations. As a result, no temperature control is required, and no direct current (DC) bias controls are required. Further, because of the relaxed thermal requirements, RF transceivers may be more easily integrated into existing processes or technologies. In terms of mechanical tolerances, antennas do not require the precise alignment that optics do (i.e., coupling RF signals into hollow waveguides requires less precision than coupling optical signals into hollow waveguides). Further, operating in the THz frequency band means that wavelengths of signals being transmitted are much longer, which also contributes to relaxed mechanical tolerances. Finally, in terms of spectral efficiency, RF systems are generally more spectrally efficient than optical systems, thus allowing for an increased throughput.

In one aspect, the present disclosure includes a transmitter, comprising: a client-side input configured to receive one or more baseband signals having client data encoded therein; transmitter circuitry configured to receive the one or more baseband signals from the client-side input and generate one or more antenna feed signals based on the one or more baseband signals; and one or more antennas configured to receive the one or more antenna feed signals from the transmitter circuitry, generate one or more radiated signals based on the one or more antenna feed signals, and couple the one or more radiated signals into a hollow waveguide, each of the one or more radiated signals being radiated electromagnetic waves configured for coherent detection and having a frequency in a range between 300 Gigahertz (GHz) and 10 Terahertz (THz).

In another aspect, the present disclosure includes a receiver, comprising: one or more antennas configured to detect one or more radiated signals received from a hollow waveguide and generate one or more antenna output signals based on the one or more radiated signals, each of the one or more radiated signals being radiated electromagnetic waves configured for coherent detection, having a frequency in a range between 300 Gigahertz (GHz) and 10 Terahertz (THz), and having client data encoded therein; receiver circuitry configured to receive the one or more antenna output signals from the one or more antennas and generate one or more baseband signals based on the one or more antenna output signals; and a client-side output configured to receive the one or more baseband signals from the receiver circuitry and transmit the one or more baseband signals.

In another aspect, the present disclosure includes a transport network, comprising: one or more hollow waveguides; a transmitter, comprising: a client-side input configured to receive one or more first baseband signals having client data encoded therein; transmitter circuitry configured to receive the one or more first baseband signals from the client-side input and generate one or more antenna feed signals based on the one or more first baseband signals; and one or more first antennas configured to receive the one or more antenna feed signals from the transmitter circuitry, generate one or more radiated signals based on the one or more antenna feed signals, and couple the one or more radiated signals into at least one of the one or more hollow waveguides, each of the one or more radiated signals being radiated electromagnetic waves configured for coherent detection and having a frequency in a range between 300 Gigahertz (GHz) and 10 Terahertz (THz); and a receiver, comprising: one or more second antennas configured to detect the one or more radiated signals received from the at least one of the one or more hollow waveguides and generate one or more antenna output signals based on the one or more radiated signals; receiver circuitry configured to receive the one or more antenna output signals from the one or more second antennas and generate one or more second baseband signals based on the one or more antenna output signals, the one or more second baseband signals having the client data; and a client-side output configured to receive the one or more second baseband signals from the receiver circuitry and transmit the one or more second baseband signals.

In another aspect, the present disclosure includes a transceiver, comprising: a transmitter, comprising: a client-side input configured to receive one or more first baseband signals having first client data; transmitter circuitry configured to receive the one or more first baseband signals from the client-side input and generate one or more antenna feed signals based on the one or more first baseband signals; and one or more first antennas configured to receive the one or more antenna feed signals from the transmitter circuitry, generate one or more first radiated signals based on the one or more antenna feed signals, and couple the one or more first radiated signals into a first hollow waveguide, each of the one or more first radiated signals being radiated electromagnetic waves configured for coherent detection and having a first frequency in a range between 300 Gigahertz (GHz) and 10 Terahertz (THz); and a receiver, comprising: one or more second antennas configured to detect one or more second radiated signals received from one of the first hollow waveguide and a second hollow waveguide and generate one or more antenna output signals based on the one or more second radiated signals, each of the one or more second radiated signals being radiated electromagnetic waves configured for coherent detection, having a second frequency in a range between 300 GHz and 10 THz, and having second client data; receiver circuitry configured to receive the one or more antenna output signals from the one or more second antennas and generate one or more second baseband signals based on the one or more antenna output signals; and a client-side output configured to receive the one or more second baseband signals from the receiver circuitry and transmit the one or more second baseband signals.

BRIEF DESCRIPTION OF THE DRAWINGS

The accompanying drawings, which are incorporated in and constitute a part of this specification, illustrate one or more implementation described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 6B is a block diagram of another exemplary implementation of the transceiver shown in FIG. 2;

FIG. 7 is a schematic diagram of a folded modulator constructed in accordance with the present disclosure;

FIG. 8 is a schematic diagram of a rectifying detector constructed in accordance with the present disclosure;

FIG. 22B is another partial cross-sectional view of the differential waveguide probe antenna shown in FIG. 22A, taken from the line 23-23' and in the direction of the arrows;

FIG. 22C is another partial cross-sectional view of the differential waveguide probe antenna shown in FIG. 22B, taken from the line 24-24' and in the direction of the arrows;

FIG. 23 a diagrammatic view of an exemplary implementation of a differential tapered antenna constructed in accordance with the present disclosure;

FIG. 24A is a partial cross-sectional view of the differential tapered antenna shown in FIG. 23, taken from the line 27-27' and in the direction of the arrows;

FIG. 24B is another partial cross-sectional view of the differential tapered antenna shown in FIG. 24A, taken from the line 28-28' and in the direction of the arrows;

FIG. 67 is a cross-section view of another exemplary implementation of an electromagnetic absorber constructed in accordance with the present disclosure;

FIG. 68 is a cross-section view of another exemplary implementation of an electromagnetic absorber constructed in accordance with the present disclosure;

FIG. 69 is a diagrammatic view of another exemplary implementation of an electromagnetic absorber constructed in accordance with the present disclosure;

FIG. 70 is a flow diagram of an exemplary implementation of a process in accordance with the present disclosure;

FIG. 71 is a flow diagram of another exemplary implementation of a process in accordance with the present disclosure; and FIG. 72 is a process flow diagram of an exemplary implementation of a construction process constructed in accordance with the present disclosure.

DETAILED DESCRIPTION

Figure 1:
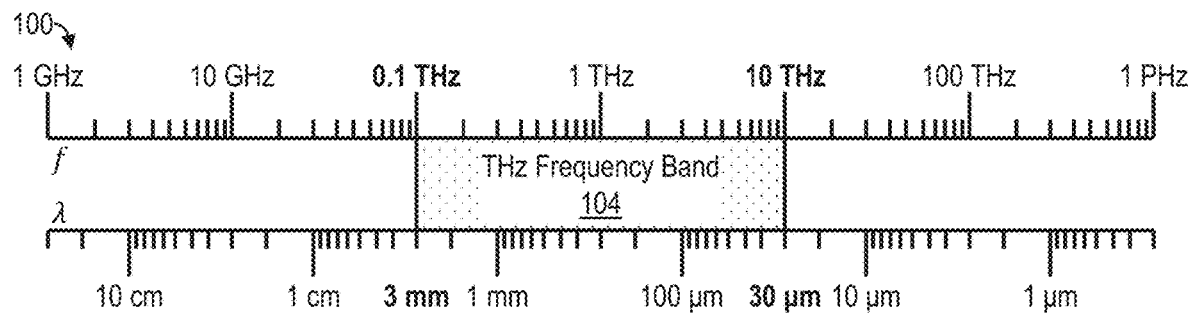
FIG. 1 is a diagrammatic view of an electromagnetic (EM) spectrum.

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the inventive concept. This description should be read to include one or more and the singular also includes the plural unless it is obvious that it is meant otherwise. The term "implementation" as used herein is synonymous with the term "embodiment".

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

As used herein, "circuitry" may refer to analog and/or digital components, or one or more suitably programmed processor (e.g., a microprocessor) and associated hardware and software, or hardwired logic. Also, "components" may perform one or more function. The term "component" may include hardware, such as a processor (e.g., microprocessor), a combination of hardware and software, and/or the like. Software may include one or more processor-executable instruction that when executed by one or more processor cause the one or more processor to perform a specified function. It should be understood that the algorithms described herein may be stored on one or more non-transitory memory. Exemplary non-transitory memory may include random access memory, read only memory, flash memory, and/or the like. Such non-transitory memory may be electrically based, optically based, and/or the like.

As used herein, a "mode" refers to a unique distribution of electric and magnetic fields which repeat along the length of a hollow waveguide by which electromagnetic energy may be transported through the hollow waveguide. "Single-mode" refers to a hollow waveguide designed to carry only one mode of electromagnetic wave. This is achieved by having a narrow core diameter, which allows only one mode of light to propagate at a time. On the other hand, "multi-mode" refers to a hollow waveguide designed to carry multiple modes of electromagnetic waves simultaneously. This is possible due to its larger core diameter, which enables multiple modes to be propagated.

As used herein, "Amplitude Modulation" (AM) refers to a form of signal modulation in which data is encoded in an amplitude of a carrier signal.

As used herein, "Amplitude-Shift Keying" (ASK) refers to a form of AM in which digital data is encoded in an amplitude of a carrier signal, and each symbol (i.e., representing one or more data bit) is sent by transmitting a fixed-amplitude carrier wave at a fixed frequency for a specific time period.

As used herein, "Phase-Shift Keying" (PSK) is a form of signal modulation in which signal data is encoded in a phase of a carrier signal having a constant frequency. "Quadrature PSK" (PSK) Is a form of PSK in which two data bits (i.e., 00, 01, 10, or 11) are modulated at once, selecting one of four possible carrier phase shifts (i.e., 0°, 90°, 180°, or 270°).

As used herein, "Pulse-Amplitude Modulation" (PAM) refers to a form of AM in which a data signal is encoded in an amplitude of a series of carrier signal pulses. "PAM4" refers to a form of PAM in which a data signal is encoded in an amplitude of a series of carrier signal pulses, in which the amplitude of the carrier signal pulses may be one of four discrete values (i.e., 0, 1, 2, or 3) and each carrier signal pulse represents two data bits (i.e., 00, 01, 10, or 11).

As used herein, "Non-Return-to-Zero" (NRZ) refers to a form of signal modulation in which a binary data signal is encoded in a carrier signal such that ones are represented by a first significant condition (e.g., a positive voltage) and zeroes are represented by a second significant condition (e.g., a negative voltage). "Non-return-to-Zero, Inverted" (NRZI) refers to a form of signal modulation in which the data bits are represented by the presence or absence of a transition at a clock boundary.

As used herein, "Quadrature Amplitude Modulation" (QAM) refers to a form of AM in which two analog message signals or two digital bit streams are encoded in amplitudes of two carrier waves, using either ASK or AM, and the two carrier signals are out of phase with each other by 90°. "QAM16" refers to a form of QAM in which the carrier signals may exist in one of sixteen discrete states (i.e., symbols) having one of sixteen different amplitude and phase levels representing four data bits (i.e., from 0000 to 1111).

As used herein, "Trellis Coded Modulation" (TCM) refers to a form of signal modulation in which a binary data signal is encoded in a phase of a constant amplitude carrier signal. The transmitted signal is created by convolutionally encoding the binary data signal and mapping the result to a signal constellation.

As used herein, "Rayleigh range" refers to the distance along the propagation direction of a beam from the waist to the place where the area of the cross section is doubled.

As used herein, "hollow waveguide" refers to a structure that guides waves by restricting transmission of energy in a particular direction. In the context of the present disclosure, "hollow waveguide" may refer to an optical fiber having a waveguide core operable to propagate RF signals in the THz frequency band or a routed waveguide operable to propagate RF signals in the THz frequency band.

As used herein, "diameter" refers to a straight line passing from side to side through the center of a body or figure. In some implementations, the body or figure has a circular or elliptical shape.

As used herein, "data" refers to quantities, characters, or symbols on which operations are performed by a computer. Data can be recorded on a non-transitory computer readable medium, such as random-access memory and/or read only memory. The random-access memory and/or read only memory may be implemented on semiconductor, magnetic, optical, or mechanical recording media. An example of data is client data, e.g., data provided by a client in connection with a telecommunication service and/or a storage service.

Referring now to the drawings, and in particular to FIG. 1, shown therein is a diagrammatic view of an electromagnetic (EM) spectrum 100 in accordance with the present disclosure. The present disclosure is generally related to network elements that communicate using radiated signals comprising radiated electromagnetic waves coupled into hollow waveguides. The radiated signals described herein generally have a transmission frequency in what is referred to as a Terahertz (THz) frequency band 104 (i.e., frequencies between 0.1 THz and 10 THz corresponding to wavelengths between 3 millimeters (mm) and 30 micrometers (μm)). However, in some implementations described herein, the transmission frequency of the radiated signals is in a range between 300 Gigahertz (GHz) and 10 THz. The radiated signals described herein are generally configured for coherent detection and generally have a bandwidth in a range between 10% and 40% of the transmission frequency.

Figure 2:
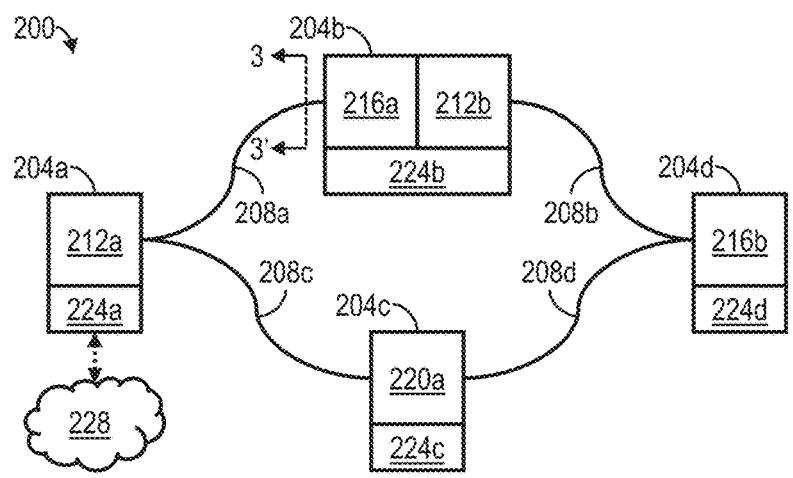
FIG. 2 is a block diagram of an exemplary implementation of a transport network constructed in accordance with the present disclosure.

Referring now to FIG. 2, shown therein is a block diagram of an exemplary implementation of a transport network 200 (hereinafter, the "transport network 200") constructed in accordance with the present disclosure. The transport network 200 is depicted as comprising a plurality of network elements 204a-n (hereinafter, the "network elements 204") (e.g., a first network element 204a, a second network element 204b, a third network element 204c, and a fourth network element 204d shown in FIG. 2). While only four of the network elements 204 are shown in FIG. 2 for exemplary purposes, it should be understood that the transport network 200 may comprise a number of the network elements 204 that may be greater or fewer than four.

The transport network 200 may further comprise one or more hollow waveguides 208a-n (hereinafter, the "hollow waveguides 208") (e.g., a first hollow waveguide 208a, a second hollow waveguide 208b, a third hollow waveguide 208c, and a fourth hollow waveguide 208d shown in FIG. 2). While only four of the hollow waveguides 208 are shown in FIG. 2 for exemplary purposes, it should be understood that the transport network 200 may comprise a number of the hollow waveguides 208 that may be greater or fewer than four.

Radiated signals transmitted within the transport network 200 from the first network element 204a to the fourth network element 204d or vice versa may travel along (1) a first path formed by the first hollow waveguide 208a, the second network element 204b, and the second hollow waveguide 208b or (2) a second path formed by the third hollow waveguide 208c, the third network element 204c, and the fourth hollow waveguide 208d.

In some implementations, each of the hollow waveguides 208 is configured to support propagation of radiated signals in only a single direction. However, in other implementations, one or more of the hollow waveguides 208 may be configured to support propagation of radiated signals in a plurality of directions (i.e., two opposing directions). In implementations where one or more of the hollow waveguides 208 are configured to support propagation of radiated signals in a plurality of directions, a first radiated signal being propagated through the hollow waveguide 208 in a first direction may be differentiated from a second radiated signal being propagated through the hollow waveguide 208 in a second direction opposite the first direction by being provided with a different polarization, frequency, etc. In some such implementations, one or more circulator may be included to achieve such differentiation.

Each of the network elements 204 may comprise one or more of a transmitter 212 (e.g., a first transmitter 212a and a second transmitter 212b shown in FIG. 2) operable to transmit radiated signals comprising radiated electromagnetic waves having client data encoded therein via the hollow waveguides 208, a receiver 216 (e.g., a first receiver 216a and a second receiver 216b shown in FIG. 2) operable to receive radiated signals comprising radiated electromagnetic waves having client data encoded therein via the hollow waveguides 208, and/or a transceiver 220 (e.g., a first transceiver 220a shown in FIG. 2 and a second transceiver 220b shown in FIG. 6B) operable to transmit first radiated signals comprising first radiated electromagnetic waves having first client data encoded therein via particular ones of the hollow waveguides 208 and/or receive second radiated signals comprising second radiated electromagnetic waves having second client data encoded therein via other ones of the hollow waveguides 208.

Each of the network elements 204 may further comprise a control module 224 (e.g., a first control module 224a, a second control module 224b, a third control module 224c, and a fourth control module 224d shown in FIG. 2) (collectively, the "control modules 224") operable to regulate one or more operating parameter of the network element 204 to which the control module 224 is coupled.

In some implementations, one or more of the network elements 204 may communicate with each other via a communication network 228. The communication network 228 may permit bidirectional communication of information and/or data between one or more of the network elements 204 of the transport network 200. The communication network 228 may interface with one or more of the network elements 204 in a variety of ways. For example, in some implementations, the communication network 228 may interface by optical and/or electronic interfaces, and/or may use a plurality of network topographies and/or protocols including, but not limited to, Ethernet, TCP/IP, circuit switched path, combinations thereof, and/or the like. The communication network 228 may utilize a variety of network protocols to permit bidirectional interface and/or communication of data and/or information between one or more of the network elements 204.

The communication network 228 may be almost any type of network. For example, in some implementations, the communication network 228 may be a version of an Internet network (e.g., exist in a TCP/IP-based network). In one implementation, the communication network 228 is the Internet. It should be noted, however, that the communication network 228 may be almost any type of network and may be implemented as the World Wide Web (i.e., the Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 228 is the Internet, a primary user interface of the transport network 200 may be delivered through a series of web pages or private internal web pages of a company or corporation, which may be written in hypertext markup language, JavaScript, or the like, and accessible by the user. It should be noted that the primary user interface of the transport network 200 may be another type of interface including, but not limited to, a Windows-based application, a tablet-based application, a mobile web interface, a VR-based application, an application running on a mobile device, and/or the like. In one implementation, the communication network 228 may be connected to one or more of the network elements 204.

The number of devices and/or networks illustrated in FIG. 2 is provided for exemplary purposes. In practice, there may be additional devices and/or networks, fewer devices and/or networks, different devices and/or networks, or differently arranged devices and/or networks than are shown in FIG. 2. Furthermore, two or more of the devices illustrated in FIG. 2 may be implemented within a single device, or a single device illustrated in FIG. 2 may be implemented as multiple, distributed devices. Additionally, or alternatively, one or more of the devices of the transport network 200 may perform one or more functions described as being performed by another one or more of the devices of the transport network 200.

The network elements 204 may take many different forms. For example, the network elements 204 may be integrated circuits (ICs). In this example, the network elements 204 (e.g., ICs) may communicate via signals comprising radiated electromagnetic waves having client data encoded therein via the hollow waveguides 208 without requiring electrical data busses. In other implementations, the network elements 204 may be incorporated into components in a data center, such as servers, routers, switches, firewalls, storage systems, application delivery controllers, and/or the like to establish communication between such components in the data center via signals comprising radiated electromagnetic waves having client data encoded therein propagated through the hollow waveguides 208. The hollow waveguides 208 may thus extend from one integrated circuit to another integrated circuit, or from one component to another component, and such may be implemented in a variety of ways, such as IC-to-IC communications, printed circuit board (PCB)-to-PCB communications, component-to-component communications, and/or combinations thereof. In the example of PCB-to-PCB communications, the network elements 204 may each include a PCB.

Referring now to FIGS. 3A-3H and 4A-4L, shown therein are cross-sectional views of various exemplary implementations of the first hollow waveguide 208a shown in FIG. 2, taken along the line 3-3' and in the direction of the arrows. However, it should be understood that the description referring to FIGS. 3A-3H and 4A-4L may be applicable to any of the hollow waveguides 208 described herein. In the implementations shown in FIGS. 3A-3H and 4A-4L, the first hollow waveguide 208a is a hollow fiber. However, it should be understood that in other implementations, the first hollow waveguide 208a may be another form of hollow waveguide, such as a substrate-integrated waveguide, for example.

The first hollow waveguide 208a (and, therefore, each of the hollow waveguides 208) generally comprises a hollow waveguide core 304 and a tubular sidewall 306 having an inner surface 312 in some implementations defining the hollow waveguide core 304 or in other implementations simply surrounding the hollow waveguide core 304.

Generally, the hollow waveguide core 304 may be composed of any material capable of propagating radiated electromagnetic waves within the THz frequency band 104 or, in some implementations, in the range between 300 GHz and 10 THz. More particularly, the hollow waveguide core 304 may be composed of any materials having a low absorption loss (i.e., an absorption loss in a range between 1 dB/km and 10,000 dB/km) within the THz frequency band 104, or in some implementations, in the range between 300 GHz and 10 THz.

In some implementations, the hollow waveguide core 304 may be composed of a polymer (e.g., cyclo olefin polymer (COP), cyclic olefin co-polymer (COC), polytetrafluoroethylene (PTFE), high-density polyethylene (HDPE), polymethylpentene (PMP), polypropylene (PP), polystyrene, polycarbonate, poly(methyl methacrylate) (PMMA), Picarin, or ultraviolet (UV) resin) or glass (e.g., silica glass, crown glass, or borosilicate glass).

In other implementations, the hollow waveguide core 304 may be composed of a gas, a vacuum, or a porous material (i.e., a material having a porosity in a range between 25% and 99%). In such implementations, the hollow waveguide core 304 may have a refractive index in a range between 1.0 and 1.4, for example. As discussed in more detail below, the hollow waveguide core 304 may have a refractive index $n_1$.

In some implementations, the hollow waveguide core 304 may have a cross-section configured to support propagation of radiated signals having only a single polarization at a given time. However, in other implementations, the hollow waveguide core 304 may have a cross-section configured to support propagation of radiated signals having a plurality of polarizations at a given time. In either case, the hollow waveguide core 304 may have a cross-section configured to support propagation of radiated signals having one or more linear polarizations or one or more circular polarizations.

In some implementations, the hollow waveguide core 304 may have a cross-section configured to support propagation of radiated signals having only a single mode at a given time. However, in other implementations, the hollow waveguide core 304 may have a cross-section configured to support propagation of radiated signals having a plurality of modes at a given time.

The tubular sidewall 306 of the first hollow waveguide 208a (and, therefore, each of the hollow waveguides 208) may comprise a conductive layer 316 (shown in FIGS. 3A-3I) surrounding the hollow waveguide core 304, a dielectric layer 308 (shown in FIGS. 3A, 3C, and 3F-3I) optionally disposed between the hollow waveguide core 304 and the conductive layer 316, and a support layer 320 (shown in FIGS. 3A, 3B, and 3E-3I) optionally surrounding the conductive layer 316.

In some implementations, the tubular sidewall 306 of the first hollow waveguide 208a (and, therefore, each of the hollow waveguides 208) may comprise a plurality of the conductive layer 316 interleaved with a plurality of the dielectric layer 308.

In some implementations, the tubular sidewall 306 of the first hollow waveguide 208a (and, therefore, each of the hollow waveguides 208) may further comprise one or more strength members (not shown) (hereinafter, the "strength members") surrounding the conductive layer 316 configured to enhance resilience of the first hollow waveguide 208a. In such implementations, the support layer 320 may surround the strength members.

Generally, the conductive layer 316 may be composed of any material having a refractive index $n_3$ greater than the refractive index of the hollow waveguide core 304 (i.e., $n_1$). More particularly, the conductive layer 316 may be composed of a non-oxidizing metallic material (e.g., silver, gold, or indium tin oxide (ITO)). Providing the conductive layer 316 with a refractive index greater than the refractive index of the hollow waveguide core 304 may cause an effective index $\Delta n$ of the first hollow waveguide 208a to increase, thereby causing more radiated signals to be confined and propagated within the hollow waveguide core 304.

Generally, in implementations in which the dielectric layer 308 is disposed between the conductive layer 316 and the hollow waveguide core 304, the dielectric layer 308 may be composed of any material having a refractive index $n_2$ greater than the refractive index of the hollow waveguide core 304 (i.e., $n_1$). More particularly, the dielectric layer 308 may be composed of a polymer (e.g., cyclo olefin polymer (COP), cyclic olefin co-polymer (COC), polytetrafluoroethylene (PTFE), high-density polyethylene (HDPE), polymethylpentene (PMP), polypropylene (PP), polystyrene, polycarbonate, poly(methyl methacrylate) (PMMA), Picarin, or ultraviolet (UV) resin) or glass (e.g., silica glass, crown glass, or borosilicate glass), but particularly a material having a refractive index $n_2$ greater than the refractive index of the hollow waveguide core 304 (i.e., $n_1$) in that implementation. Providing the dielectric layer 308 with a refractive index greater than the refractive index of the hollow waveguide core 304 may cause an effective index Δn of the first hollow waveguide 208a to increase, thereby causing more radiated signals to be confined and propagated within the hollow waveguide core 304.

The support layer 320 may be configured to shield the inner layers of the first hollow waveguide 208a (and, therefore, any of the hollow waveguides 208) from external environmental factors, provide flexibility to the first hollow waveguide 208a, and/or enhance a tensile strength of the first hollow waveguide 208a. In some implementations, the support layer 320 may be composed of polymer materials, such as acrylate polymer or polyimide, for example.

In some implementations, the cross-section of the hollow waveguide core 304 may have a circular shape (i.e., having a diameter $d_1$ that is equal along both the x-axis and the y-axis) (shown in FIGS. 3A-3D). In some such implementations, the diameter $d_1$ of the hollow waveguide core 304 may be between 30 μm and 6 mm. In some such implementations, the diameter $d_1$ of the hollow waveguide core 304 may be between 30 μm and 3 mm. In at least one such implementation, the diameter $d_1$ of the hollow waveguide core 304 may be 1 mm.

Figure 3A:
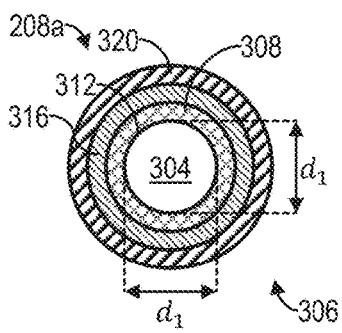
FIG. 3A is a cross-sectional view of an exemplary implementation of a first hollow waveguide shown in FIG. 2, taken along the line 3-3' and in the direction of the arrows.
Figure 3B:
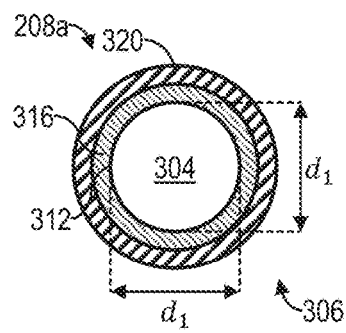
FIG. 3B is a cross-sectional view of another exemplary implementation of the first hollow waveguide shown in FIG. 2, taken along the line 3-3' and in the direction of the arrows, wherein the first hollow waveguide lacks an optional dielectric layer.
Figure 3C:
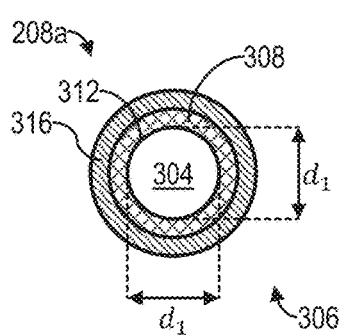
FIG. 3C is a cross-sectional view of another exemplary implementation of the first hollow waveguide shown in FIG. 2, taken along the line 3-3' and in the direction of the arrows, wherein the first hollow waveguide lacks an optional support layer.
Figure 3D:
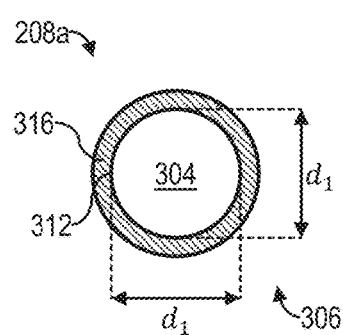
FIG. 3D is a cross-sectional view of another exemplary implementation of the first hollow waveguide shown in FIG. 2, taken along the line 3-3' and in the direction of the arrows, wherein the first hollow waveguide lacks the optional dielectric layer and the optional support layer.
Figure 3E:
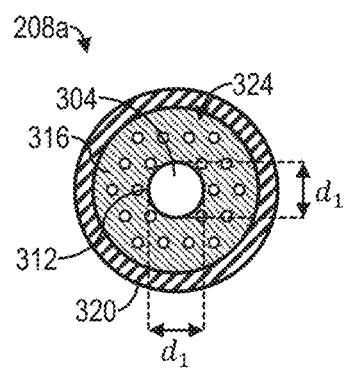
FIG. 3E is a cross-sectional view of another exemplary implementation of the first hollow waveguide shown in FIG. 2, taken along the line 3-3' and in the direction of the arrows, wherein the first hollow waveguide is a photonic-bandgap fiber.
Figure 3F:
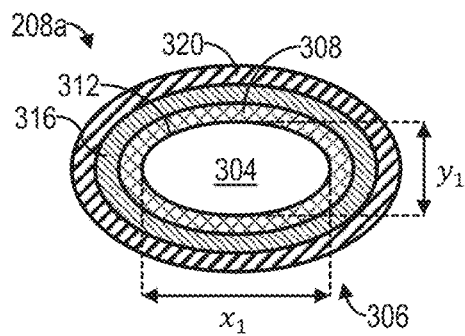
FIG. 3F is a cross-sectional view of another exemplary implementation of the first hollow waveguide shown in FIG. 2, taken along the line 3-3' and in the direction of the arrows, wherein the first hollow waveguide has a hollow waveguide core with an elliptical cross-section.
Figure 3G:
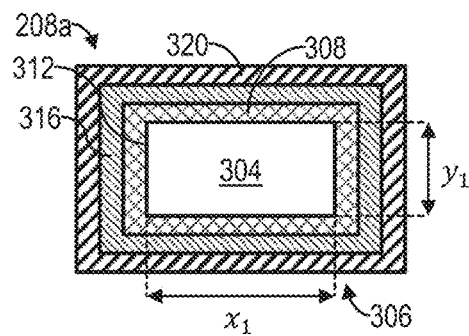
FIG. 3G is a cross-sectional view of another exemplary implementation of the first hollow waveguide shown in FIG. 2, taken along the line 3-3' and in the direction of the arrows, wherein the hollow waveguide core of the first hollow waveguide has a rectangular cross-section.
Figure 3H:
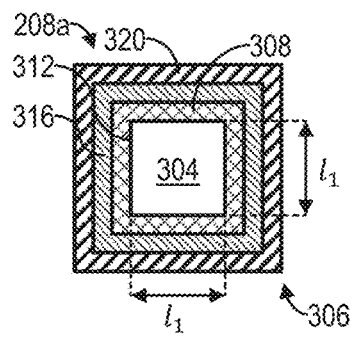
FIG. 3H is a cross-sectional view of another exemplary implementation of the first hollow waveguide shown in FIG. 2, taken along the line 3-3' and in the direction of the arrows, wherein the hollow waveguide core of the first hollow waveguide has a square cross-section.
Figure 3I:
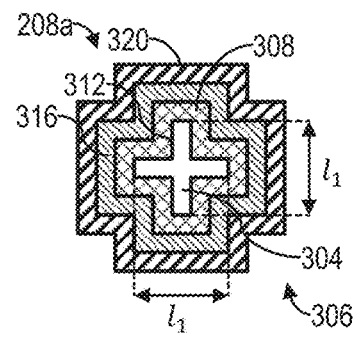
FIG. 3I is a cross-sectional view of another exemplary implementation of the first hollow waveguide shown in FIG. 2, taken along the line 3-3' and in the direction of the arrows, wherein the hollow waveguide core of the first hollow waveguide has a cross-shaped cross-section.

In some implementations, as shown in FIG. 3E, the first hollow waveguide 208a may be a photonic-bandgap fiber comprising a plurality of air channels 324 (hereinafter the "air channels 324") periodically spaced throughout the conductive layer 316.

In other implementations, the cross-section of the hollow waveguide core 304 may have an elliptical shape (i.e., having a first diameter $x_1$ along the x-axis and a second diameter $y_1$ along the y-axis, wherein the first diameter is not equal to the second diameter) (shown in FIG. 3F), a rectangular shape (shown in FIG. 3G) (i.e., having a first length $x_1$ along the x-axis and a second length $y_1$ along the y-axis, wherein the first length is not equal to the second length), a square shape (i.e., having a length 11 that is equal along both the x-axis and the y-axis) (shown in FIG. 3H), or a cross shape (i.e., having a length 11 that is equal along both the x-axis and the y-axis) (shown in FIG. 3I), for example.

Figure 3J:
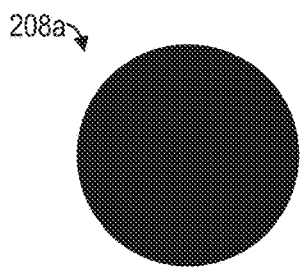
FIG. 3J is a cross-sectional view of another exemplary implementation of the first hollow waveguide shown in FIG. 2, taken along the line 3-3' and in the direction of the arrows, wherein the first hollow waveguide is a solid rod fiber.
Figure 3K:
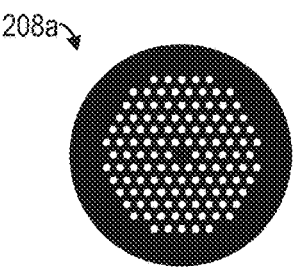
FIG. 3K is a cross-sectional view of another exemplary implementation of the first hollow waveguide shown in FIG. 2, taken along the line 3-3' and in the direction of the arrows, wherein the first hollow waveguide is a microstructured optical fiber.
Figure 3L:
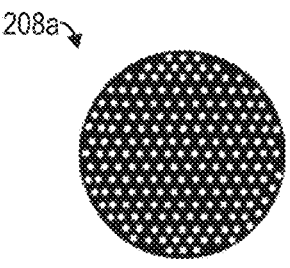
FIG. 3L is a cross-sectional view of another exemplary implementation of the first hollow waveguide shown in FIG. 2, taken along the line 3-3' and in the direction of the arrows, wherein the first hollow waveguide is a porous fiber.
Figure 3M:
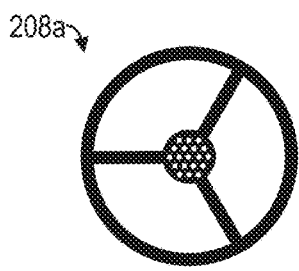
FIG. 3M is a cross-sectional view of another exemplary implementation of the first hollow waveguide shown in FIG. 2, taken along the line 3-3' and in the direction of the arrows, wherein the first hollow waveguide is a suspended porous-core fiber.
Figure 3N:
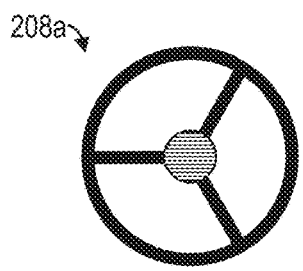
FIG. 3N is a cross-sectional view of another exemplary implementation of the first hollow waveguide shown in FIG. 2, taken along the line 3-3' and in the direction of the arrows, wherein the first hollow waveguide is a suspended slotted core fiber.
Figure 3O:
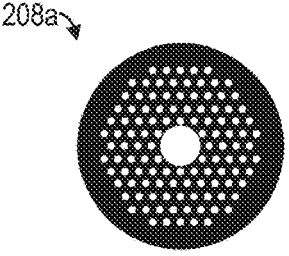
FIG. 3O is a cross-sectional view of another exemplary implementation of the first hollow waveguide shown in FIG. 2, taken along the line 3-3' and in the direction of the arrows, wherein the first hollow waveguide is a hollow-core bandgap fiber.
Figure 3P:
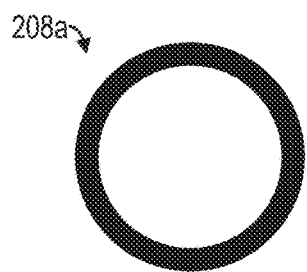
FIG. 3P is a cross-sectional view of another exemplary implementation of the first hollow waveguide shown in FIG. 2, taken along the line 3-3' and in the direction of the arrows, wherein the first hollow waveguide is a hollow-core tube fiber.
Figure 3Q:
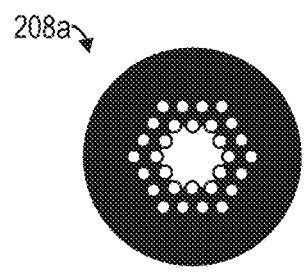
FIG. 3Q is a cross-sectional view of another exemplary implementation of the first hollow waveguide shown in FIG. 2, taken along the line 3-3' and in the direction of the arrows, wherein the first hollow waveguide is a hollow-core fiber with negative curvature.
Figure 3R:
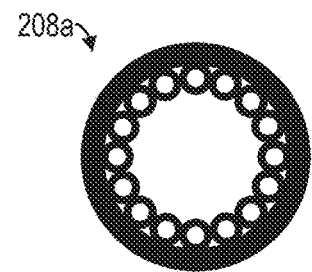
FIG. 3R is a cross-sectional view of another exemplary implementation of the first hollow waveguide shown in FIG. 2, taken along the line 3-3' and in the direction of the arrows, wherein the first hollow waveguide is a hollow-core fiber based on anti-resonances and inhibited coupling.
Figure 3S:
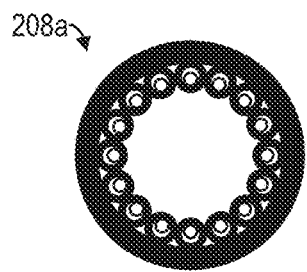
FIG. 3S is a cross-sectional view of another exemplary implementation of the first hollow waveguide shown in FIG. 2, taken along the line 3-3' and in the direction of the arrows, wherein the first hollow waveguide is a hollow-core nested anti-resonant nodeless fiber.
Figure 3T:
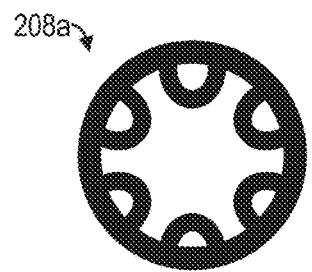
FIG. 3T is a cross-sectional view of another exemplary implementation of the first hollow waveguide shown in FIG. 2, taken along the line 3-3' and in the direction of the arrows, wherein the first hollow waveguide is a 3D-printed hollow-core fiber based on anti-resonances and inhibited coupling.
Figure 3U:
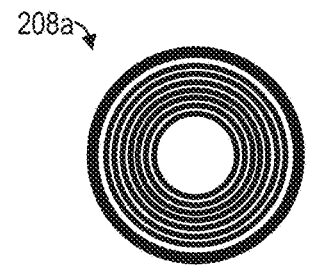
FIG. 3U is a cross-sectional view of another exemplary implementation of the first hollow waveguide shown in FIG. 2, taken along the line 3-3' and in the direction of the arrows, wherein the first hollow waveguide is a Bragg fiber.

In other implementations, the first hollow waveguide 208a (and, therefore, any of the hollow waveguides 208) may be implemented as a solid rod fiber (shown in FIG. 3J), a microstructured optical fiber (shown in FIG. 3K), a porous fiber (shown in FIG. 3L), a suspended porous-core fiber (shown in FIG. 3M), a suspended slotted core fiber (shown in FIG. 3N), a hollow-core bandgap fiber (shown in FIG. 3O), a hollow-core tube fiber (shown in FIG. 3P), a hollow-core fiber with negative curvature (shown in FIG. 3Q), a hollow-core fiber based on anti-resonances and inhibited coupling (shown in FIG. 3R), a hollow-core nested anti-resonant nodeless fiber (shown in FIG. 3S), a 3D-printed hollow-core fiber based on anti-resonances and inhibited coupling (shown in FIG. 3T), or a Bragg fiber (shown in FIG. 3U), for example.

Figure 4A:
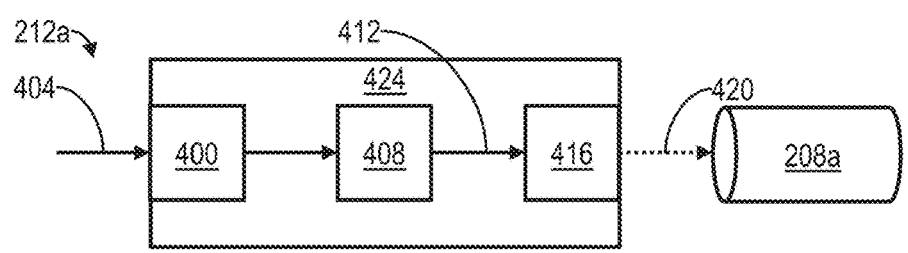
FIG. 4A is a block diagram of an exemplary implementation of a first transmitter shown in FIG. 2.

Referring now to FIG. 4A, shown therein is a block diagram of an exemplary implementation of the first transmitter 212a shown in FIG. 2. However, it should be understood that the description of any particular one of the transmitter 212 may be applicable to any of the transmitters 212 described herein. The first transmitter 212a (and, therefore, each of the transmitters 212) generally comprises a client-side input 400 configured to receive one or more baseband signals 404 (hereinafter, the "baseband signals 404") having client data encoded therein from one or more external component (e.g., a control module 224), transmitter circuitry 408 configured to receive the baseband signals 404 from the client-side input 400 and generate one or more antenna feed signals 412 (hereinafter, the "antenna feed signals 412") based on the baseband signals 404, and one or more first antennas 416 configured to receive the antenna feed signals 412 from the transmitter circuitry 408, generate one or more radiated signals 420 (hereinafter, the "radiated signals 420") based on the antenna feed signals 412, and couple the radiated signals 420 into the first hollow waveguide 208a.

In some implementations, the client-side input 400 is a pair of inputs configured to receive a differential signal. In some such implementations, the client-side input 400 may be a low voltage differential signaling (LVDS) link configured to receive LVDS signals, and the baseband signals 404 may be LVDS signals indicative of client data.

In some implementations, the antenna feed signals 412 are provided to the first antennas 416 on one or more transmission lines (not shown) (hereinafter, the "transmission lines"), wherein each of the transmission lines has two or more conductors (not shown) (hereinafter, the "conductors"). In some implementations, the transmission lines have a first transmission loss and the first hollow waveguide 208a has a second transmission loss that is less than the first transmission loss. In some implementations, the second transmission loss is in a range between 0.001 and 20.00 decibels (dB) per meter (m) per Terabit (Tb) per second (s).

In some implementations, as shown in FIG. 4A, each of the client-side input 400, the transmitter circuitry 408, and the first antennas 416 may be disposed on a substrate 424. However, in other implementations, one or more of the client-side input 400, the transmitter circuitry 408, and the first antennas 416 may be disposed on a first substrate (not shown), and one or more of the client-side input 400, the transmitter circuitry 408, and the first antennas 416 may not be disposed on the first substrate. For example, the one or more of the client-side input 400, the transmitter circuitry 408, and the first antennas 416 may be disposed on a second substrate (not shown). In such implementations, the first substrate and the second substrate may be in a stacked arrangement.

In some implementations, the substrate 424 may have a plurality of layers (not shown). In such implementations, one or more of the client-side input 400, the transmitter circuitry 408, and the first antennas 416 may be disposed on a first layer (not shown), and one or more of the client-side input 400, the transmitter circuitry 408, and the first antennas 416 may be disposed on a second layer (not shown).

In some implementations, one or more of the client-side input 400, the transmitter circuitry 408, and the first antennas 416 may be integrated into a monolithic semiconductor die (not shown). In some implementations, one or more of the client-side input 400, the transmitter circuitry 408, and the first antennas 416 may implemented using one or more of complementary metal-oxide semiconductor (CMOS) technology, silicon-germanium (SiGe) semiconductor technology, and Ill-V compound semiconductor technology.

In some implementations, the baseband signals 404 are digital bitstreams. In some implementations, the client data may be encoded in the baseband signals 404 using an encoding protocol conforming to requirements of one or more of return-to-zero (RZ) code, non-return-to-zero (NRZ) code, pulse-amplitude modulation (PAM), and quadrature-amplitude modulation (QAM). In some implementations, the client data may be encoded in the radiated signals 420 using an encoding protocol conforming to requirements of one or more of RZ, NRZ, quadrature phase-shift keying (QPSK), QAM, trellis coded modulation (TCM), and Bose-Chaudhuri-Hocquenghem (BCH) code.

In some implementations, the radiated signals 420 include a first complementary radiated signal (not shown) having a first polarization and a second complementary radiated signal (not shown) having a second polarization different from the first polarization. In such implementations, the first antennas 416 may be configured to generate the radiated signals 420 including the first complementary radiated signal and the second complementary radiated signal based on the antenna feed signals 412. The first polarization and the second polarization may be orthogonal to each other.

In some implementations, each of the first polarization and the second polarization may be a linear polarization. In such implementations, the first antennas 416 may include one or more of a differential waveguide probe antenna, a differential tapered antenna, and a differential patch antenna. In other implementations, each of the first polarization and the second polarization may be a circular polarization. In such implementations, the first antennas 416 may include one or more of a helix antenna and a spiral antenna. It should be understood that any of the signals described herein may be single-ended signals or differential signals.

In some implementations, the radiated signals 420 include a first complementary radiated signal (not shown) having a first polarization and a second complementary radiated signal (not shown) having a second polarization different from the first polarization, and the first antennas 416 are further configured to couple the first complementary radiated signal and the second complementary radiated signal into the first hollow waveguide 208a such that the first complementary radiated signal and the second complementary radiated signal interact in the first hollow waveguide 208a to form the combined radiated signal (not shown) having a third polarization different from the first polarization and the second polarization. In such implementations, the first antennas 416 may include an antenna array.

Figure 4B:
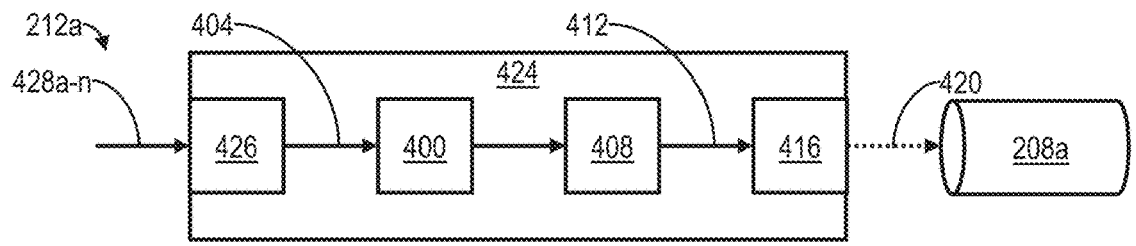
FIG. 4B is a block diagram of another exemplary implementation of the first transmitter shown in FIG. 2, wherein the first transmitter comprises a serializer.

Referring now to FIG. 4B, in some implementations, the first transmitter 212a (and, therefore, any of the transmitters 212) further comprises a first serializer 426 configured to receive a plurality of parallel baseband signals 428a-n (hereinafter, the "parallel baseband signals 428") and combine the parallel baseband signals 428 into a serial baseband signal (i.e., the baseband signals 404). In such implementations, the client-side input 400 may be configured to receive the baseband signals 404 from the first serializer 426. In some such implementations, combining the parallel baseband signals 428 into the baseband signals 404 utilizes at least one of polarization division multiplexing (PDM), time division multiplexing (TDM), and wavelength division multiplexing (WDM).

Figure 4C:
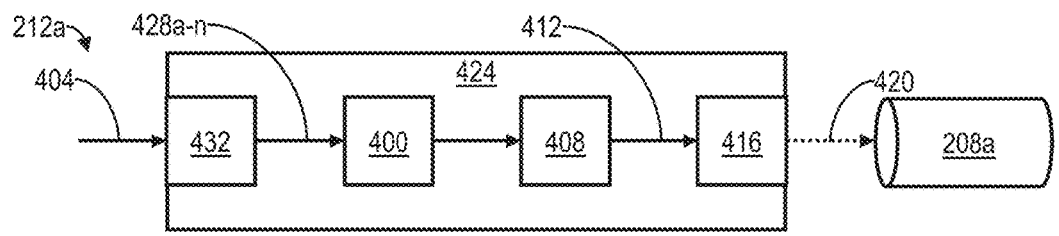
FIG. 4C is a block diagram of another exemplary implementation of the first transmitter shown in FIG. 2, wherein the first transmitter comprises a deserializer.

Referring now to FIG. 4C, in some implementations, the first transmitter 212a (and, therefore, any of the transmitters 212) further comprises a first deserializer 432 configured to receive a serial baseband signal (i.e., the baseband signals 404) and split the baseband signals 404 into parallel baseband signals 428. In such implementations, the client-side input 400 may be configured to receive the parallel baseband signals 428 from the first deserializer 432. In some such implementations, splitting the baseband signals 404 into the parallel baseband signals 428 utilizes at least one of PDM, TDM, and WDM.

Figures 4D, 4E:
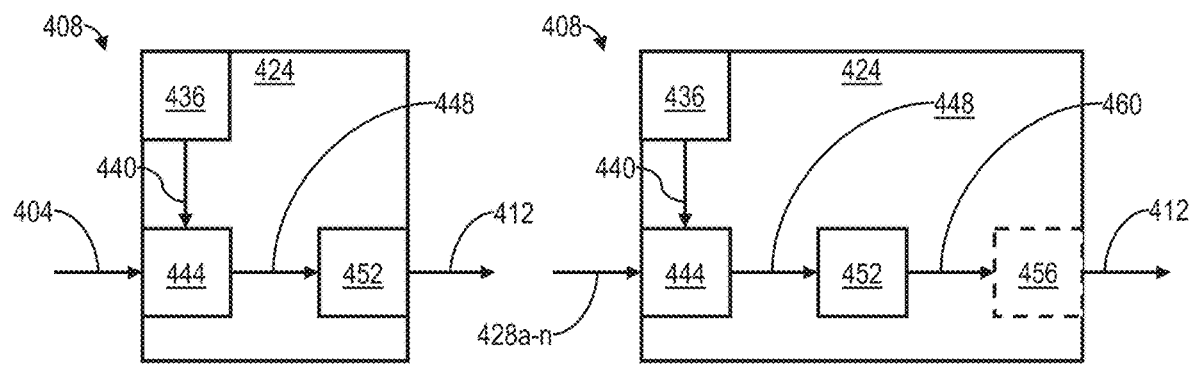
FIG. 4D is a block diagram of an exemplary implementation of transmitter circuitry shown in FIG. 4A.
FIG. 4E is a block diagram of another exemplary implementation of the transmitter circuitry shown in FIG. 4A, wherein the transmitter circuitry comprises a combiner.

Referring now to FIG. 4D, shown therein is an exemplary implementation of the transmitter circuitry 408 shown in FIGS. 4A-4C. In some implementations, the transmitter circuitry 408 comprises one or more local oscillators 436a-n (hereinafter, the "LO 436") configured to generate one or more carrier signals 440 (hereinafter, the "carrier signals 440") having a baseband frequency less than the transmission frequency, one or more modulation circuits 444 (hereinafter, the "modulator 444") configured to receive the baseband signals 404 from the client-side input 400 and the carrier signals 440 from the LO 436 and modulate the baseband signals 404 onto the carrier signals 440 to generate one or more modulated signals 448 (hereinafter, the "modulated signals 448"), and one or more up-conversion circuits 452 (hereinafter, the "up-convertor 452") configured to receive the modulated signals 448 from the modulator 444 and up-convert the modulated signals 448 (i.e., raise a frequency of the modulated signals 448 from the baseband frequency to the transmission frequency) to generate the antenna feed signals 412.

Referring now to FIG. 4E, in implementations in which the client-side input 400 is configured to receive the parallel baseband signals 428, the transmitter circuitry 408 may be configured to receive the parallel baseband signals 428 from the client-side input 400. In such implementations, the modulator 444 may be configured to receive the parallel baseband signals 428 from the client-side input 400 and the carrier signals 440 from first LO 436 and modulate the parallel baseband signals 428 onto the carrier signals 440 to generate the modulated signals 448. In such implementations, the up-converter 452 may be configured to receive the modulated signals 448 from the modulator 444 and up-convert the modulated signals 448 to generate one or more up-converted signals 460 (hereinafter, the "up-converted signals 460").

In some implementations, the transmitter circuitry 408 may further comprise a combiner 456 configured to receive the up-converted signals 460 from the up-converter 452 and combine the up-converted signals 460 into the antenna feed signals 412. However, in other implementations, the first antennas 416 may be configured to receive the antenna feed signals 412 from the up-converter 452, generate the radiated signals 420 based on the antenna feed signals 412, and couple the radiated signals 420 into the first hollow waveguide 208a such that the radiated signals 420 interact in the first hollow waveguide 208a to form a combined radiated signal (not shown).

In some implementations, coupling the radiated signals 420 into the first hollow waveguide 208a such that the radiated signals 420 interact in the first hollow waveguide 208a to form the combined radiated signal utilizes at least one of PDM, TDM, and WDM.

Figure 4F:
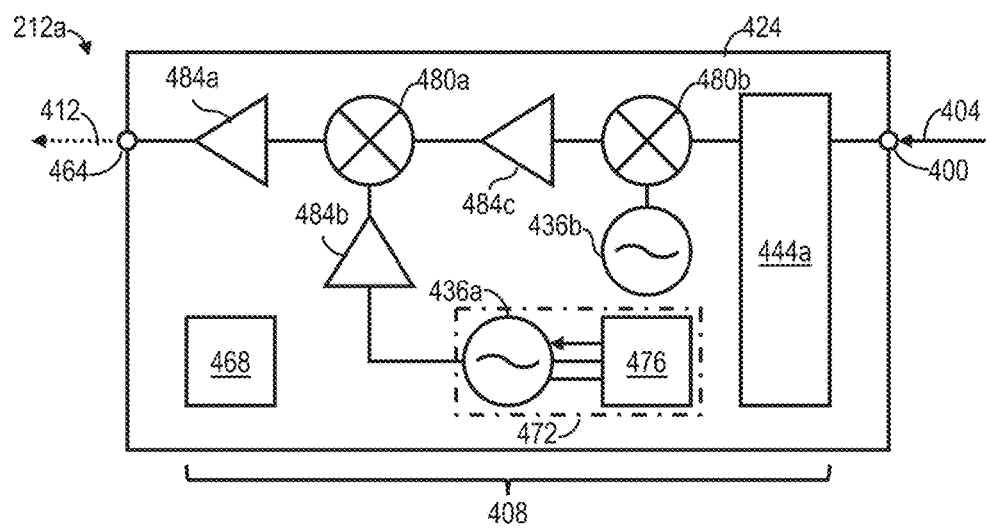
FIG. 4F is a block diagram of another exemplary implementation of the first transmitter shown in FIG. 2.

Referring now to FIG. 4F, shown therein is a block diagram of another exemplary implementation of the first transmitter 212a shown in FIG. 2. However, it should be understood that the description of any particular one of the transmitters 212 may be applicable to any of the transmitters 212 described herein.

In the implementation shown in FIG. 4F, the first transmitter 212a comprises the client-side input 400 configured to receive the baseband signals 404 from one or more external component (e.g., a control module 224) and send the baseband signals 404 to the transmitter circuitry 408, the transmitter circuitry 408 configured to receive the baseband signals 404 from the client-side input 400, generate the antenna feed signals 412 based on the baseband signals 404, and send the antenna feed signals 412 to an RF interface 464 configured to receive the antenna feed signals 412 from the transmitter circuitry 408 and transmit the antenna feed signals 412, and a digital enhancement and control unit 468 configured to provide digital control and/or processing capabilities for one or more of the components of the first transmitter 212a.

In the implementation shown in FIG. 4F, the transmitter circuitry 408 comprises one or more modulation block 444a (hereinafter, the "modulation block 444a"), a frequency synthesizer 472 comprising a phase-locked loop (PLL) 476 and a first LO 436a, a second LO 436b, a first frequency mixer 480a, a second frequency mixer 480b, a first amplifier 484a, and a second amplifier 484b.

The modulation block 444a may be configured to receive the baseband signals 404 from the client-side input 400 and encode the baseband signals 404 in a format suitable for modulation onto a carrier signal. In some implementations, the modulation block 444a may include one or more digital-to-analog converter (DAC), one or more Serializer/Deserializer (SerDes), one or more folded modulator 700 (shown in FIG. 7), and/or circuitry operable to encode the baseband signals 404 in a modulation format, such as AM, ASK, PSK, QAM, QAM16, or variations thereof, for example. In some implementations, the modulation block 444a may include circuitry operable to perform forward error correction (FEC). The modulation block 444a may be further configured to send the encoded input signals having the data encoded therein to the second frequency mixer 480b.

In some implementations, the modulation block 444a is configured to simply receive the baseband signals 404 (i.e., the baseband signals 404 having been previously encoded in a modulation format) from the client-side input 400 and send the baseband signals 404 to the second frequency mixer 480b.

The second LO 436b may be configured to generate second carrier signals having a continuous waveform (e.g., a sinusoidal waveform) having a predetermined frequency (i.e., a baseband (BB) frequency). In some implementations, the predetermined frequency of the second carrier signals (i.e., the BB frequency) is in an RF band (i.e., in a range between 30 Hertz (Hz) and 300 GHz). In some implementations, the predetermined frequency of the second carrier signals (i.e., the BB frequency) is in a range between 1 Megahertz (MHz) and 300 GHz. In some implementations, the predetermined frequency of the second carrier signals (i.e., the BB frequency) is in a range between 5 GHz and 30 GHz. The second LO 436b may be further configured to send the second carrier signals to the second frequency mixer 480b.

The second frequency mixer 480b may be configured to receive the encoded baseband signals from the modulation block 444a, receive the second carrier signals from the second LO 436b, up-convert the encoded baseband signals with the second carrier signals to produce first modulated signals having client data encoded therein and having the predetermined frequency of the second carrier signals (i.e., the BB frequency), and send the first modulated signals to the third amplifier 484c.

The third amplifier 484c may be configured to receive the first modulated signals from the second frequency mixer 480b, adjust an amplitude of the first modulated signals such that the amplified first modulated signals can drive the first frequency mixer 480a, and send the amplified first modulated signals to the first frequency mixer 480a.

The frequency synthesizer 472 (i.e., the first LO 436a and the PLL 476) may be configured to generate first carrier signals having a continuous waveform (e.g., a sinusoidal waveform) having a predetermined frequency (e.g., within the THz frequency band 104 or, in some implementations, in a range between 300 GHz and 10 THz). In some implementations, the predetermined frequency of the first carrier signals is in a range between 30 GHz and 300 GHz. In some such implementations, the predetermined frequency of the first carrier signals is 240 GHz. In other implementations, the predetermined frequency of the first carrier signals is in a range between 300 GHz and 3 THz. The frequency synthesizer 472 may be further configured to send the first carrier signals to the second amplifier 484b.

The second amplifier 484b may be configured to receive the first carrier signals from the first LO 436a, adjust an amplitude of the first carrier signals to generate amplified carrier signals that can drive the first frequency mixer 480a, and send the amplified carrier signals to the first frequency mixer 480a.

The first frequency mixer 480a may be configured to receive the amplified carrier signals from the second amplifier 484b, receive the amplified first modulated signals from the third amplifier 484c, up-convert the amplified first modulated signals with the amplified carrier signals to produce second modulated signals having the client data encoded therein and having the predetermined frequency of the amplified carrier signals (i.e., within the THz frequency band 104 or, in some implementations, in a range between 300 GHz and 10 THz), and send the second modulated signals to the first amplifier 484a.

The first amplifier 484a may be configured to receive the second modulated signals from the first frequency mixer 480a, adjust an amplitude of the second modulated signals such that the amplified second modulated signals can be transmitted by the RF interface 464, and send the amplified second modulated signals to the RF interface 464. The first amplifier 484a may be configured to generate the amplified second modulated signals to have a power in a range between 0.05 watts (W) and 0.4 W, for example.

The RF interface 464 may be configured to receive the amplified second modulated signals with the client data encoded therein from the first amplifier 484a and send the amplified second modulated signals as the antenna feed signals 412 (i.e., having the client data encoded therein) within a predetermined frequency range (e.g., the THz frequency band 104 or, in some implementations, in a range between 300 GHz and 10 THz). In some implementations, the RF interface 464 may be electrically connected to one of the first antennas 416 and configured to send the antenna feed signals 412 to the first antenna 416. In other implementations, however, the first antennas 416 may be included in place of the RF interface 464.

Figure 4G:
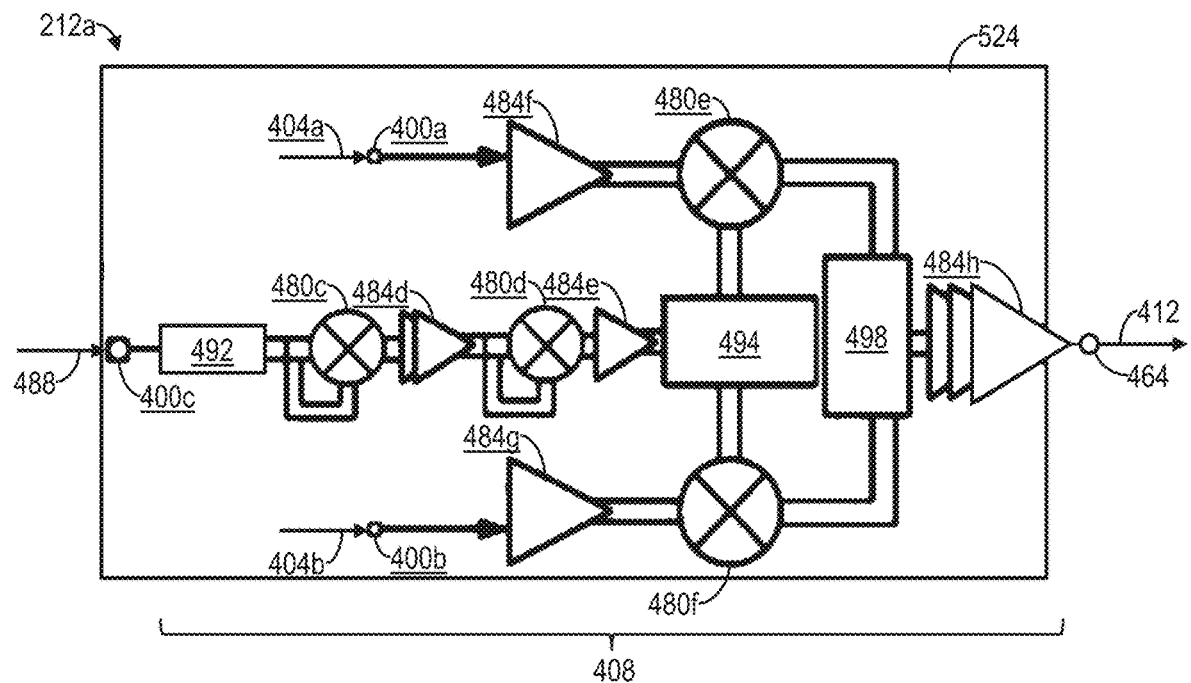
FIG. 4G is a block diagram of another exemplary implementation of the first transmitter shown in FIG. 2.

Referring now to FIG. 4G, shown therein is a block diagram of another exemplary implementation of the first transmitter 212a shown in FIG. 2. In the implementation shown in FIG. 5B, the first transmitter 212a comprises a plurality of inputs including an in-phase (I)-BB client-side input 400a and a quadrature (Q)-BB client-side input 400b configured to receive I-BB baseband signals 404a and Q-BB baseband signals 404b, respectively, from one or more external component (e.g., a control module 224) and an LO input 400c configured to receive one or more carrier signals 488 (hereinafter, the "carrier signals 488") from an external LO, the transmitter circuitry 408 configured to generate the antenna feed signals 412 based on the I-BB baseband signals 404a, the Q-BB baseband signals 404b, and the carrier signals 488, and the RF interface 464 configured to transmit the antenna feed signals 412.

In the implementation shown in FIG. 4G, the transmitter circuitry 408 comprises a balancing unit (Balun) 492, a third frequency mixer 480c, a fourth frequency mixer 480d, a fifth frequency mixer 480e, and a sixth frequency mixer 480f, a fourth amplifier 484*d*, a fifth amplifier 484*e*, a sixth amplifier 484*f*, a seventh amplifier 484*g*, and eighth amplifier 484*h*, a quadrature coupler (e.g., branchline coupler) 494, and a power combiner (e.g., Wilkinson power combiner) 498.

The I-BB baseband signals 404*a* and the Q-BB baseband signals 404*b* may be I and Q components of baseband signals 404 having client data encoded therein. The I-BB client-side input 400*a* may be configured to send the I-BB baseband signals 404*a* to the sixth amplifier 484*f*. The Q-BB client-side input 400*b* may be configured to send the Q-BB baseband signals 404*b* to the seventh amplifier 484*g*.

The LO input 400*c* may be configured to receive the carrier signals 488 from an external LO, the carrier signals 488 having a continuous waveform (e.g., a sinusoidal waveform) having a predetermined frequency. The LO input 400*c* may be further configured to send the carrier signals 488 to the Balun 492.

The Balun 492 may be configured to isolate and/or maintain impedance differences between balanced transmission lines and unbalanced transmission lines. The Balun 492 may be further configured to send the carrier signals 488 to the third frequency mixer 480*c*.

The third frequency mixer 480*c* may be configured to receive the carrier signals 488 from the Balun 492, multiply the carrier signals 488 (e.g., by a multiple of four), and send the multiplied carrier signals to the fourth amplifier 484*d*.

The fourth amplifier 484*d* may be configured to receive the multiplied carrier signals from the third frequency mixer 480*c*, adjust an amplitude of the multiplied carrier signals such that the amplified carrier signals can drive the fourth frequency mixer 480*d*, and send the amplified carrier signals to the fourth frequency mixer 480*d*.

The fourth frequency mixer 480*d* may be configured to receive the amplified carrier signals from the fourth amplifier 484*d*, multiply the amplified carrier signals (e.g., by a multiple of two), and send the remultiplied carrier signals to the fifth amplifier 484*e*.

The fifth amplifier 484*e* may be configured to receive the remultiplied carrier signals from the fourth frequency mixer 480*d*, adjust an amplitude of the remultiplied carrier signals such that the reamplified carrier signals can drive the quadrature coupler 494, and send the reamplified carrier signals to the quadrature coupler 494.

The sixth amplifier 484*f* may be configured to receive the I-BB baseband signals 404*a* from the I-BB client-side input 400*a*, adjust an amplitude of the I-BB baseband signals 404*a* such that the amplified I-BB input signals can drive the fifth frequency mixer 480*e*, and send the amplified I-BB signals to the fifth frequency mixer 480*e*.

The seventh amplifier 484*g* may be configured to receive the Q-BB baseband signals 404*b* from the Q-BB client-side input 400*b*, adjust an amplitude of the Q-BB baseband signals 404*b* such that the amplified Q-BB baseband signals 404*b* can drive the sixth frequency mixer 480*f*, and the amplified Q-BB signals to the sixth frequency mixer 480*f*.

The quadrature coupler 494 may be configured to receive the reamplified carrier signals from the fifth amplifier 484*e*, split the reamplified carrier signals into first carrier signals and second carrier signals, send the first carrier signals to the fifth frequency mixer 480*e*, and send the second carrier signals to the sixth frequency mixer 480*f*, wherein the first carrier signals and the second carrier signals are out of phase by 90°.

The fifth frequency mixer 480*e* may be configured to receive the amplified I-BB signals from the sixth amplifier 484*f*, receive the first carrier signals from the quadrature coupler 494, up-convert the amplified I-BB signals with the first carrier signals to produce I antenna feed signals having the I component of the client data encoded therein and having the predetermined frequency of the carrier signals 488, and send the I antenna feed signals to the power combiner 498.

The sixth frequency mixer 480*f* may be configured to receive the amplified Q-BB signals from the seventh amplifier 484*g*, receive the second carrier signals from the quadrature coupler 494, up-convert the amplified Q-BB signals with the second carrier signals to produce Q antenna feed signals signals having the Q component of the client data encoded therein and having the predetermined frequency of the carrier signals 488, and send the Q antenna feed signals to the power combiner 498.

The power combiner 498 may be configured to receive the I antenna feed signals from the fifth frequency mixer 480*e*, receive the Q antenna feed signals from the sixth frequency mixer 480*f*, combine the I antenna feed signals and the Q antenna feed signals to produce the antenna feed signals 412, and send the antenna feed signals 412 to the RF interface 464. In some implementations, the RF interface 464 may be electrically connected to one of the first antennas 416 and configured to send the antenna feed signals 412 to the first antenna 416. In other implementations, however, one of the first antennas 416 may be included in place of the RF interface 464.

Figure 5A:
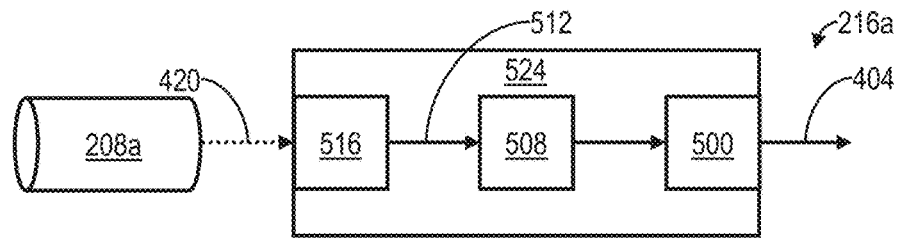
FIG. 5A is a block diagram of an exemplary implementation of a first receiver shown in FIG. 2.

Referring now to FIG. 5A, shown therein is a block diagram of an exemplary implementation of the first receiver 216*a* (hereinafter, the "first receiver 216*a*") shown in FIG. 2. However, it should be understood that the description of any particular one of the receivers 216 may be applicable to any of the receivers 216 described herein. The first receiver 216*a* (and, therefore, each of the receiver 216) generally comprises one or more second antennas 516 configured to detect the radiated signals 420 received from the first hollow waveguide 208*a* and generate one or more antenna output signals 512 (hereinafter, the "antenna output signals 512") based on the radiated signals 420, receiver circuitry 508 configured to receive the antenna output signals 512 from the second antennas 516 and generate the baseband signals 404 based on the antenna output signals 512, and a client-side output 500 configured to receive the baseband signals 404 from the receiver circuitry 508 and transmit the baseband signals 404 to one or more external component (e.g., a control module 224).

In some implementations, the antenna output signals 512 are received from the second antennas 516 on one or more transmission lines (not shown) (hereinafter, the "transmission lines"), wherein each of the transmission lines has two or more conductors (not shown) (hereinafter, the "conductors"). In some implementations, the transmission lines have a first transmission loss and the first hollow waveguide 208*a* has a second transmission loss that is less than the first transmission loss. In some implementations, the second transmission loss is in a range between 0.001 and 20.00 dB/m/Tb/s.

In some implementations, as shown in FIG. 5A, each of the second antennas 516, the receiver circuitry 508, and the client-side output 500 may be disposed on a substrate 524. However, in other implementations, one or more of the second antennas 516, the receiver circuitry 508, and the client-side output 500 may be disposed on a first substrate (not shown), and one or more of the second antennas 516, the receiver circuitry 508, and the client-side output 500 may not be disposed on the first substrate. For example, the one or more of the second antennas 516, the receiver circuitry 508, and the client-side output 500 may be disposed on a second substrate (not shown). In such implementations, the first substrate and the second substrate may be in a stacked arrangement.

In some implementations, the substrate 524 may have a plurality of layers (not shown). In such implementations, one or more of the second antennas 516, the receiver circuitry 508, and the client-side output 500 may be disposed on a first layer (not shown), and one or more of the second antennas 516, the receiver circuitry 508, and the client-side output 500 may be disposed on a second layer (not shown).

In some implementations, one or more of the second antennas 516, the receiver circuitry 508, and the client-side output 500 may be integrated into a monolithic semiconductor die (not shown). In some implementations, one or more of the second antennas 516, the receiver circuitry 508, and the client-side output 500 may implemented using one or more of CMOS technology, SiGe semiconductor technology, and III-V compound semiconductor technology.

In some implementations, the radiated signals 420 include a first complementary radiated signal (not shown) having a first polarization and a second complementary radiated signal (not shown) having a second polarization different from the first polarization. In such implementations, the second antennas 516 may be configured to generate the antenna output signals 512 based on the radiated signals 420 including the first complementary radiated signal and the second complementary radiated signal. The first polarization and the second polarization may be orthogonal to each other.

In some implementations, the radiated signals 420 may be formed by a first complementary radiated signal (not shown) having a first polarization and a second complementary radiated signal (not shown) having a second polarization different from the first polarization interacting in the first hollow waveguide 208a. In such implementations, the radiated signals 420 may have a third polarization different from the first polarization and the second polarization. In such implementations, the second antennas 516 may be configured generate the antenna output signals 512 based on the radiated signals 420 formed by the first complementary radiated signal and the second complementary radiated signal.

Figure 5B:
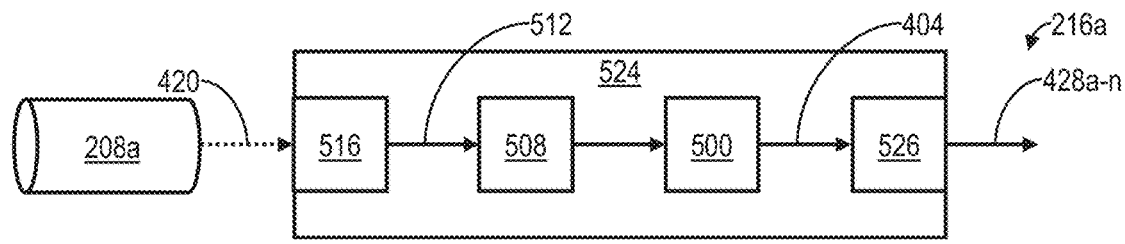
FIG. 5B is a block diagram of another exemplary implementation of the first receiver shown in FIG. 2, wherein the first receiver comprises a deserializer.

Referring now to FIG. 5B, in some implementations, the client-side output 500 is configured to receive a serial baseband signal (i.e., the baseband signals 404) from the receiver circuitry 508. In such implementations, the first receiver 216a (and, therefore, any of the receivers 216) may further comprise a second deserializer 526 configured to receive the baseband signals 404 from the client-side output 500, split the serial baseband signal into the parallel baseband signals 428, and transmit the parallel baseband signals 428 to one or more external component (e.g., a control module 224). In some such implementations, splitting the serial baseband signal into the parallel baseband signals 428 utilizes at least one of PDM, TDM, and WDM.

Figure 5C:
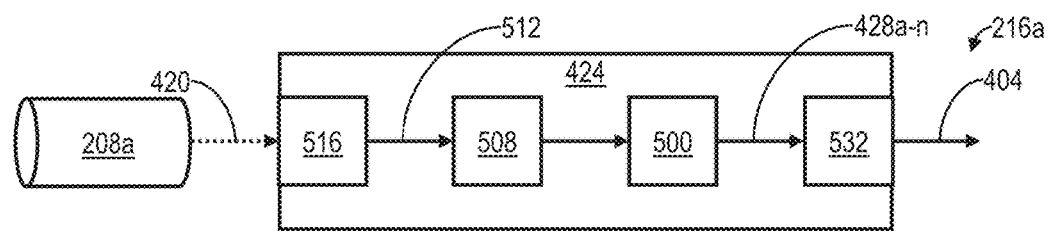
FIG. 5C is a block diagram of another exemplary implementation of the first receiver shown in FIG. 2, wherein the first receiver comprises a serializer.

Referring now to FIG. 5C, in some implementations, the client-side output 500 is configured to receive the parallel baseband signals 428 from the receiver circuitry 508. In such implementations, the first receiver 216a (and, therefore, any of the receivers 216) may further comprise a second serializer 532 configured to receive the parallel baseband signals 428 from the client-side output 500 and combine the parallel baseband signals 428 into the serial baseband signal (i.e., the baseband signals 404). In some such implementations, combining the parallel baseband signals 428 into the baseband signals 404 utilizes at least one of PDM, TDM, and WDM.

Figures 5D, 5E:
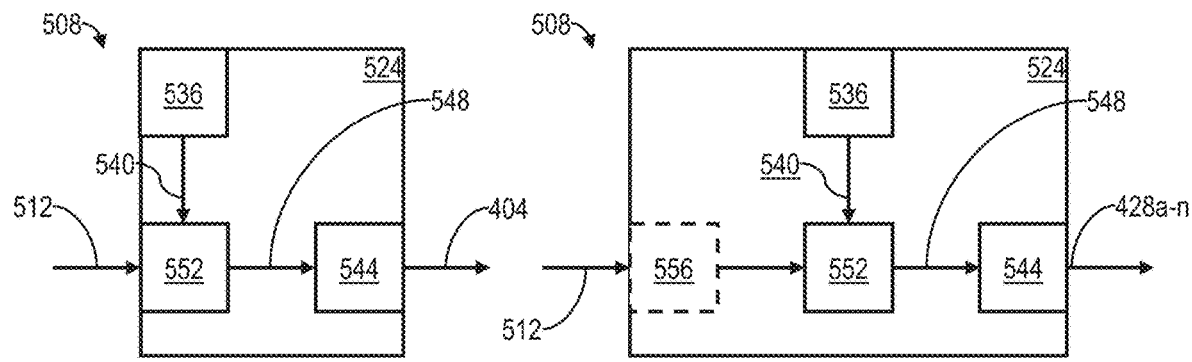
FIG. 5D is a block diagram of an exemplary implementation of receiver circuitry shown in FIG. 5A.
FIG. 5E is a block diagram of another exemplary implementation of the receiver circuitry shown in FIG. 5A, wherein the receiver circuitry comprises a splitter.

Referring now to FIG. 5D, shown therein is an exemplary implementation of the receiver circuitry 508 shown in FIGS. 5A-5C. In some implementations, the receiver circuitry 508 comprises one or more LOs 536 (hereinafter, the "LO 536") configured to generate one or more reference signals 540 (hereinafter, the "reference signals 540") having a baseband frequency less than the transmission frequency, one or more down-conversion circuits 552 (hereinafter, the "down-converter 552") configured to receive the antenna output signals 512 from the second antennas 516 and the reference signals 540 from the LO 536 and down-convert the antenna output signals 512 (i.e., lower a frequency of the antenna output signals 512 from the transmission frequency to the baseband frequency) using the reference signals 540 to generate one or more modulated signals 548 (hereinafter, the "modulated signals 548"), and one or more demodulation circuits 544 (hereinafter, the "demodulator 544") configured to receive the modulated signals 548 from the down-converter 552 and demodulate the modulated signals 548 to generate the baseband signals 404.

Referring now to FIG. 5E, in implementations in which the second antennas 516 are configured to receive the radiated signals 420 formed by a first complementary radiated signal (not shown) having a first polarization and a second complementary radiated signal (not shown) having a second polarization different from the first polarization interacting in the first hollow waveguide 208a, the receiver circuitry 508 may be configured to receive the antenna output signals 512 from the second antennas 516. In such implementations, the demodulator 544 may be configured to receive the modulated signals 548 from the down-converter 552 and demodulate the modulated signals 548 to generate the parallel baseband signals 428.

In some implementations, the receiver circuitry 508 may further comprise a splitter 556 configured to receive the antenna output signals 512 from the second antennas 516 and split the antenna output signals 512 into a plurality of parallel antenna output signals 560 (hereinafter, the "parallel antenna output signals 560"). However, in other implementations, the second antennas 516 may be configured to detect the first complementary radiated signal and the second complementary radiated signal based on the radiated signals 420 received from the first hollow waveguide 208a and generate the antenna output signals 512 based on the first complementary radiated signal and the second complementary radiated signal.

In some implementations, detecting the first complementary radiated signal and the second complementary radiated signal based on the radiated signals 520 received from the first hollow waveguide 208a utilizes at least one of PDM, TDM, and WDM.

Figure 5F:
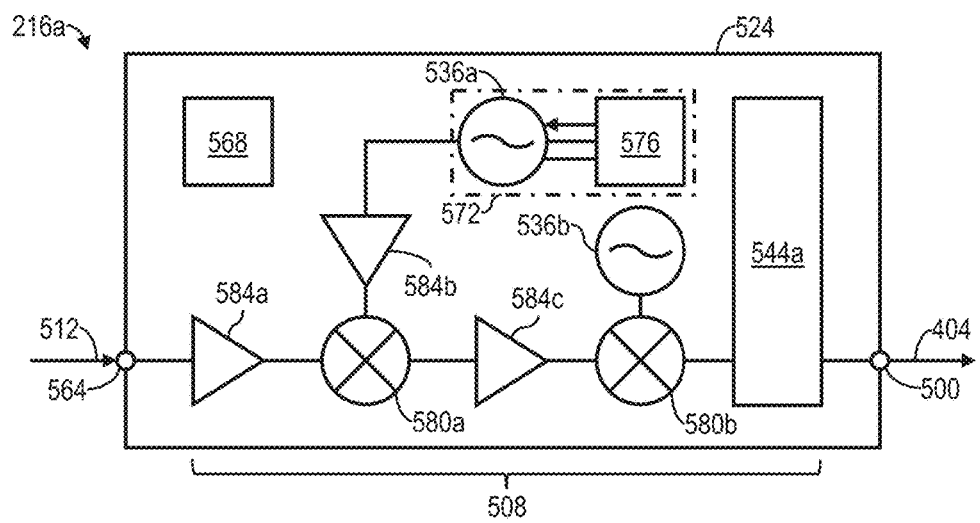
FIG. 5F is a block diagram of another exemplary implementation of the first receiver shown in FIG. 2.

Referring now to FIG. 5F, shown therein is a block diagram of another exemplary implementation of the first receiver 216a shown in FIG. 2. In the implementation shown in FIG. 5F, the first receiver 216a comprises an RF interface 564 configured to receive the antenna output signals 512, the receiver circuitry 508 configured to generate the baseband signals 404 based on the antenna output signals 512, the client-side output 500 configured to transmit the baseband signals 404 to one or more external component (e.g., a control module 224), and a digital enhancement and control unit 568 configured to provide digital control and/or processing capabilities for one or more of the components of the first receiver 216a.

In the implementation shown, the receiver circuitry 508 comprises one or more demodulation block 544a (hereinafter, the "demodulation block 544a"), a frequency synthesizer 572 comprising a PLL 576 and a first LO 536a, a second LO 536b, a first frequency mixer 580a, a second frequency mixer 580b, a first amplifier 584a, a second amplifier 584b, and a third amplifier 584c.

The RF interface 564 may be configured to send the antenna output signals 512 to the first amplifier 584a. In some implementations, the RF interface 564 may be configured to receive the antenna output signals 512 from one of the second antennas 516. In other implementations, one of the second antennas 516 may be included in place of the RF interface 564.

The first amplifier 584a may be configured to receive the antenna output signals 512 from the RF interface 564, adjust an amplitude of the antenna output signals 512 such that the amplified transmission signals can drive the first frequency mixer 580a, and send the amplified transmission signals to the first frequency mixer 580a.

The frequency synthesizer 572 (i.e., the first LO 536a and the PLL 576) may be configured to generate first carrier signals having a continuous waveform (e.g., a sinusoidal waveform) having a predetermined frequency (e.g., within the THz frequency band 104 or, in some implementations, in a range between 300 GHz and 10 THz). In some implementations, the predetermined frequency of the first carrier signals is in a range between 30 GHz and 300 GHz. In some such implementations, the predetermined frequency of the first carrier signals is 240 GHz. In other implementations, the predetermined frequency of the first carrier signals is in a range between 300 GHz and 3 THz. The first LO 536a may be further configured to send the first carrier signals to the second amplifier 584b.

The second amplifier 584b may be configured to receive the first carrier signals from the first LO 536a, adjust an amplitude of the first carrier signals to generate amplified carrier signals that can drive the first frequency mixer 580a, and send the amplified carrier signals to the first frequency mixer 580a.

The first frequency mixer 580a may be configured to receive the antenna output signals 512 from the first amplifier 584a, receive the amplified carrier signals from the second amplifier 584b, down-convert the antenna output signals 512 with the amplified carrier signals to produce modulated signals having the client data encoded therein and having the BB frequency, and send the modulated signals to the third amplifier 584c.

The third amplifier 584c may be configured to receive the modulated signals from the first frequency mixer 580a, adjust an amplitude of the modulated signals such that the amplified modulated signals can drive the second frequency mixer 580b, and send the amplified modulated signals to the second frequency mixer 580b.

The second LO 536b may be configured to generate second carrier signals having a continuous waveform (e.g., a sinusoidal waveform) having a predetermined frequency (i.e., the BB frequency). In some implementations, the predetermined frequency of the second carrier signals (i.e., the BB frequency) is in a range between 8 GHz and 10 GHz. The second LO 536b may be further configured to send the second carrier signals to the second frequency mixer 580b.

The second frequency mixer 580b may be configured to receive the amplified modulated signals from the third amplifier 584c, receive the second carrier signals from the second LO 536b, down-convert the amplified modulated signals with the second carrier signals to produce encoded signals having the client data encoded therein and having the predetermined frequency of the second carrier signals (i.e., the BB frequency), and send the encoded signals to the demodulation block 544a.

The demodulation block 544a may be configured to receive the encoded signals from the second frequency mixer 580b and decode the encoded signals in a format suitable for transmission to one or more external component (e.g., a control module 224) to generate the baseband signals 404.

In some implementations, the demodulation block 544a may include one or more analog-to-digital converter (ADC), one or more Serializer/Deserializer (SerDes), one or more rectifying detector 800 (shown in FIG. 8), and/or circuitry operable to decode the encoded output signals from a modulation format, such as AM, ASK, PSK, QAM, or QAM16, or variations thereof, for example, to produce the baseband signals 404 with the client data encoded therein. In some implementations, the demodulation block 544a may include circuitry operable to perform forward error correction (FEC). The demodulation block 544a may be further configured to send the baseband signals 404 to the client-side output 500. In some implementations, the demodulation block 544a is configured to simply receive the encoded signals from the second frequency mixer 580b and send the encoded signals as the baseband signals 404 to the client-side output 500.

In some implementations, the client-side output 500 is a pair of output interfaces. In some such implementations, the client-side output 500 is an LVDS link configured to transmit LVDS signals, and the baseband signals 404 are LVDS signals with the client data encoded therein.

Figure 5G:
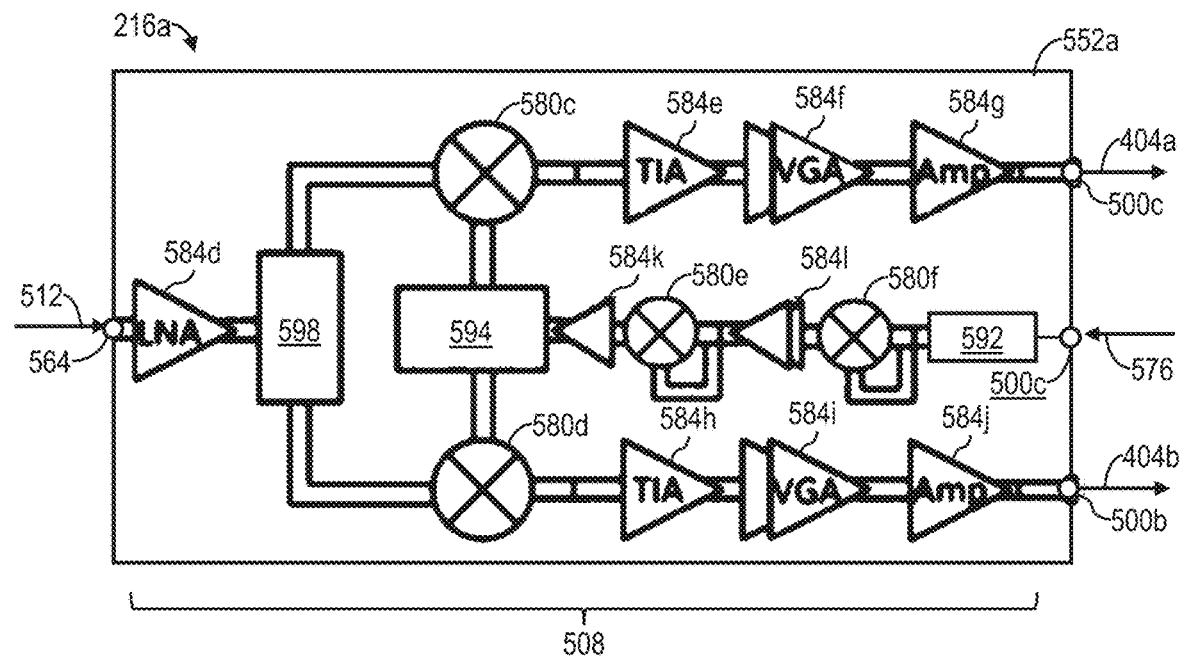
FIG. 5G is a block diagram of another exemplary implementation of the first receiver shown in FIG. 2.

Referring now to FIG. 5G, shown therein is a block diagram of another exemplary implementation of the first receiver 216a shown in FIG. 2. In the implementation shown in FIG. 5G, the first receiver 216a comprises the RF interface 564 configured to receive the antenna output signals 512, an LO input 500c configured to receive carrier signals 588 from an external LO, the receiver circuitry 508 configured to generate Q-BB baseband signals 404b and I-BB baseband signals 404a based on the antenna output signals 512 and the carrier signals 588, and a Q-BB client-side output 500a and an I-BB client-side output 500b configured to transmit the Q-BB baseband signals 404b and the I-BB baseband signals 404a, respectively.

In the implementation shown, the receiver circuitry 508a comprises a third frequency mixer 580c, a fourth frequency mixer 580d, a fifth frequency mixer 580e, a sixth frequency mixer 580f, a fourth amplifier 584d, a fifth amplifier 584e, a sixth amplifier 584f, a seventh amplifier 584g, an eighth amplifier 584h, a ninth amplifier 584i, a tenth amplifier 584j, an eleventh amplifier 584k, a twelfth amplifier 584l, a Balun 592, a quadrature coupler (e.g., branchline coupler) 594, and a power divider (e.g., Wilkinson power divider) 598.

The fourth amplifier 584d may be configured to receive the antenna output signals 512 from the RF interface 564, adjust an amplitude of the antenna output signals 512 such that the amplified transmission signals can drive the power divider 598, and send the amplified transmission signals to the power divider 598. In some implementations, the fourth amplifier 584d is a low-noise amplifier (LNA).

The power divider 598 may be configured to receive the amplified transmission signals from the fourth amplifier 584d, split the amplified transmission signals into I antenna output signals having the I component of the client data encoded therein and Q antenna output signals having the Q component of the client data encoded therein, send the Q antenna output signals to the third frequency mixer 580c, and send the I antenna output signals to the fourth frequency mixer 580d.

The LO input 500c may be configured to receive carrier signals 588 from an external LO, the carrier signals 588 having a continuous waveform (e.g., a sinusoidal waveform) having a predetermined frequency. The LO input 500c may be further configured to send the carrier signals 588 to the Balun 592.

The Balun 592 may be configured to isolate and/or maintain impedance differences between balanced transmission lines and unbalanced transmission lines. The Balun 492 may be further configured to send the carrier signals 588 to the sixth frequency mixer 580f.

The sixth frequency mixer 580f may be configured to receive the carrier signals 588 from the Balun 592, multiply the carrier signals 588 (e.g., by a multiple of four), and send the multiplied carrier signals to the twelfth amplifier 584l.

The twelfth amplifier 584l may be configured receive the multiplied carrier signals from the sixth frequency mixer 580f, adjust an amplitude of the multiplied carrier signals to generate amplified carrier signals that can drive the fifth frequency mixer 580e, and send the amplified carrier signals to the fifth frequency mixer 580e.

The fifth frequency mixer 580e may be configured to receive the amplified carrier signals from the twelfth amplifier 584l, multiply the amplified carrier signals (e.g., by a multiple of two), and send the remultiplied carrier signals to the eleventh amplifier 584k.

The eleventh amplifier 584k may be configured to receive the remultiplied carrier signals from the fifth frequency mixer 580e, adjust an amplitude of the remultiplied carrier signals to generate reamplified carrier signals that can drive the quadrature coupler 594, and send the reamplified carrier signals to the quadrature coupler 594.

The quadrature coupler 594 may be configured to receive the reamplified carrier signals from the eleventh amplifier 584k, split the reamplified carrier signals into first carrier signals and second carrier signals, send the first carrier signals to the third frequency mixer 580c, and send the second carrier signals to the fourth frequency mixer 580d, wherein the first carrier signals and the second carrier signals are out of phase by 90°.

The third frequency mixer 580c may be configured to receive the Q antenna output signals from the power divider 598, receive the first carrier signals from the quadrature coupler (e.g., branchline coupler) 566, down-convert the Q antenna output signals with the first carrier signals to generate Q-BB intermediate signals having the Q component of the client data encoded therein and having the BB frequency, and send the Q-BB intermediate signals to the fifth amplifier 584e.

The fifth amplifier 584e, the sixth amplifier 584f, and the seventh amplifier 584g may be configured to receive the Q-BB intermediate signals from the third frequency mixer 580c, down-convert the Q-BB intermediate signals to generate the Q-BB baseband signals 404b, and send the Q-BB baseband signals 404b to the Q-BB client-side output 500a. In some implementations, the fifth amplifier 584e is a transimpedance amplifier (TIA), and the sixth amplifier 584f is a variable-gain amplifier (VGA).

The fourth frequency mixer 580d may be configured to receive the I antenna output signals from the power divider 598, receive the second carrier signals from the quadrature coupler 594, down-convert the I antenna output signals with the second carrier signals to produce I-BB intermediate signals having the I component of the client data encoded therein and having the BB frequency, and send the I-BB intermediate signals to the eighth amplifier 584h.

The eighth amplifier 584h, the ninth amplifier 584i, and the tenth amplifier 584j may be configured to receive the I-BB intermediate signals from the fourth frequency mixer 580d, down-convert the I-BB intermediate signals to generate the I-BB baseband signals 404a, and send the I-BB baseband signals 404a to the I-BB client-side output 500b. In some implementations, the eighth amplifier 584h is a TIA, and the ninth amplifier 584i is VGA.

Figure 6A:
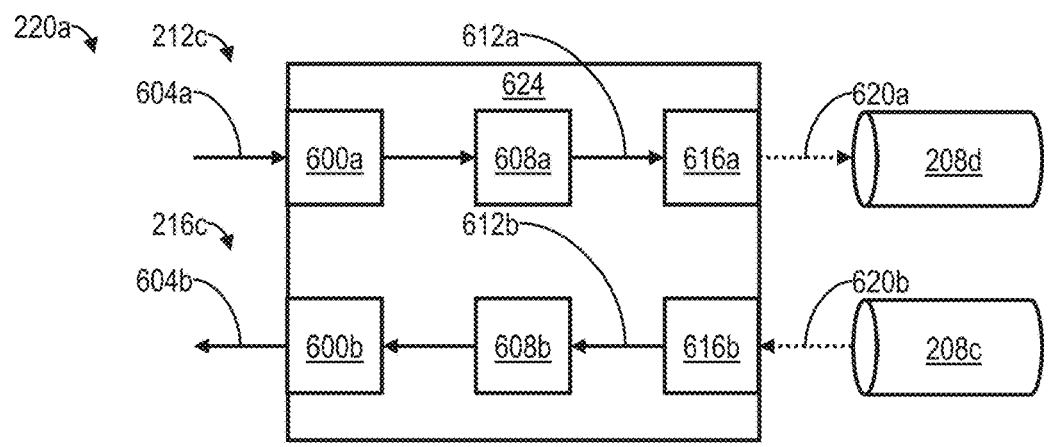
FIG. 6A is a block diagram of an exemplary implementation of a transceiver shown in FIG. 2.

Referring now to FIG. 6A, shown therein is a block diagram of an exemplary implementation of the first transceiver 220a (hereinafter, the "first transceiver 220a") shown in FIG. 2. However, it should be understood that the description of any particular one of the transceivers 220 may be applicable to any of the transceivers 220 described herein. The first transceiver 220a (and, therefore, each of the transceivers 220) generally comprises a third transmitter 212c and a third receiver 216c.

The third transmitter 212c generally comprises a client-side input 600a configured to receive one or more first baseband signals 604a (hereinafter, the "first baseband signals 604a") having first client data encoded therein from one or more external component (e.g., a control module 224), transmitter circuitry 608a configured to receive the first baseband signals 604a from the client-side input 600a and generate one or more antenna feed signals 612a (hereinafter, the "antenna feed signals 612") based on the first baseband signals 604a, and one or more first antennas 616a (hereinafter, the "first antennas 616") configured to receive the antenna feed signals 612a from the transmitter circuitry 608a, generate one or more first radiated signals 420a (hereinafter, the "first radiated signals 420a") based on the antenna feed signals 612a, and couple the first radiated signals 420a into the fourth hollow waveguide 208d.

The third receiver 216c generally comprises one or more second antennas 616b (hereinafter, the "antennas 616b") configured to detect one or more second radiated signals 620b (hereinafter, the "second radiated signals 620b") received from the third hollow waveguide 208c and generate one or more antenna output signals 612b (hereinafter, the "antenna output signals 612b") based on the second radiated signals 620b, receiver circuitry 608b configured to receive the antenna output signals 612b from the second antennas 616b and generate the second baseband signals 604b based on the antenna output signals 612b, and a client-side output 600b configured to receive the second baseband signals 604b from the receiver circuitry 608b and transmit the second baseband signals 604b to one or more external component (e.g., a control module 224).

Each of the components of the first transceiver 220a (and, therefore, each of the transceivers 220) may be the same or similar to one or more of the components of the first transmitter 212a and the first receiver 216a as described herein.

Referring now to FIG. 6B, shown therein is a block diagram of another exemplary implementation of the first transceiver 220a shown in FIG. 2. In the implementation shown in FIG. 6B, the first transceiver 220a comprises the client-side input 600a configured to receive the first baseband signals 604a from one or more external component (e.g., a control module 224), the transmitter circuitry 608a configured to generate the antenna feed signals 612a based on the input signals 640a, a first RF interface 664a configured to transmit the antenna feed signals 612a, a second RF interface 664b configured to receive the antenna output signals 612b, the receiver circuitry 608b configured to generate the second baseband signals 604*b* based on the antenna output signals 612*b*, the client-side output 600*b* configured to transmit the second baseband signals 604*b* to one or more external component, and a digital enhancement and control unit 668 configured to provide digital control and/or processing capabilities for one or more of the components of the first transceiver 220*a*.

In some implementations, the first transceiver 220*a* comprises the first RF interface 664*a*, but lacks the second RF interface 664*b*. In such implementations, the first RF interface 664*a* may be configured to transmit antenna feed signals 612*a* and receive antenna output signals 612*b*. In some implementations, the first transceiver 220*a* may have a number of RF interfaces that is greater than two.

In the implementation shown, the transmitter circuitry 608*a* comprises a frequency synthesizer 672 comprising a PLL 676, a first LO 636*a*, and a signal distribution block (e.g., splitter) 698, one or more modulation block 644*a* (hereinafter, the "modulation block 644*a*"), a second LO 636*b*, a first frequency mixer 680*a*, a third frequency mixer 680*c*, a first amplifier 684*a*, a third amplifier 684*c*, and a fifth amplifier 684*e*.

In the implementation shown, the receiver circuitry 608*b* comprises the frequency synthesizer 672 comprising the PLL 676, the first LO 636*a*, and the signal distribution 698, the modulation block 644*a*, a third LO 636*c*, a second frequency mixer 680*b*, a fourth frequency mixer 680*d*, a second amplifier 684*b*, a fourth amplifier 684*d*, and a sixth amplifier 684*f*.

In some implementation shown in FIG. 6B, each of the components of the first transceiver 220*a* are disposed on a single substrate 624, which may be a portion of a semiconductor wafer.

The modulation block 644*a* may be configured to: (1) receive the first baseband signals 604*a* from the client-side input 600*a*, encode the first baseband signals 604*a* in a format suitable for modulation onto a carrier signal, and send the encoded input signals the third frequency mixer 680*c*; and (2) receive the encoded output signals from the fourth frequency mixer 680*d*, decode the encoded output signals in a format suitable for transmission to one or more external component (e.g., a control module 224), and send the second baseband signals 604*b* to the client-side output 600*b*.

In some implementations, the modulation block 644*a* may include one or more DAC, one or more ADC, one or more Serializer/Deserializer (SerDes), one or more folded modulator 700 (shown in FIG. 7), one or more rectifying detector 800 (shown in FIG. 8) and/or circuitry operable to encode the first baseband signals 604*a* in a modulation format, such as AM, ASK, PSK, QAM, or QAM16, or variations thereof, for example, and decode encoded output signals from the modulation format to produce second baseband signals 604*b* having the client data encoded therein. In some implementations, the modulation block 644*a* may include circuitry operable to perform forward error correction (FEC).

The frequency synthesizer 672 may be configured to generate first carrier signals having a continuous waveform (e.g., a sinusoidal waveform) having a predetermined frequency (e.g., within the THz frequency band 104 or in some implementations, a range between 300 GHz and 10 THz). In some implementations, the predetermined frequency of the first carrier signals is in a range between 30 GHz and 300 GHz. In some such implementations, the predetermined frequency of the first carrier signals is 240 GHz. In other implementations, the predetermined frequency of the first carrier signals is in a range between 300 GHz and 3 THz.

The frequency synthesizer 672 may be further configured to send the first carrier signals to the signal distribution block 698.

The signal distribution block 698 may be configured to receive the first carrier signals from the first LO 636*a* and distribute the first carrier signals to the third amplifier 684*c* and the fourth amplifier 684*d*.

Referring now to the transmitter circuitry 608*a*, in some implementations, the client-side input 600*a* is a pair of input interfaces. In some such implementations, the client-side input 600*a* is an LVDS link configured to receive LVDS signals, and the first baseband signals 604*a* are LVDS signals having the client data encoded therein. The client-side input 600*a* may be further configured to send the first baseband signals 604*a* to the modulation block 644*a*.

The second LO 636*b* may be configured to generate second carrier signals having a continuous waveform (e.g., a sinusoidal waveform) having a predetermined frequency (i.e., the BB frequency). In some implementations, the predetermined frequency of the second carrier signals (i.e., the BB frequency) is in a range between 8 GHz and 10 GHz. The second LO 636*b* may be further configured to send the second carrier signals to the third frequency mixer 680*c*.

The third frequency mixer 680*c* may be configured to receive the encoded input signals from the modulation block 644*a*, receive the second carrier signals from the second LO 636*b*, up-convert the encoded input signals with the second carrier signals to produce first modulated signals having the client data encoded therein and having the predetermined frequency of the second carrier signals (i.e., the BB frequency), and send the first modulated signals to the fifth amplifier 684*e*.

The fifth amplifier 684*e* may be configured to receive the first modulated signals from the third frequency mixer 680*c*, adjust an amplitude of the first modulated signals such that the amplified first modulated signals can drive the first frequency mixer 680*a*, and send the amplified first modulated signals to the first frequency mixer 680*a*.

The third amplifier 684*c* may be configured to receive the first carrier signals from the signal distribution block 698, adjust an amplitude of the first carrier signals to generate amplified carrier signals that can drive the first frequency mixer 680*a*, and send the amplified carrier signals to the first frequency mixer 680*a*.

The first frequency mixer 680*a* may be configured to receive the amplified carrier signals from the third amplifier 684*c*, receive the amplified first modulated signals from the fifth amplifier 684*e*, up-convert the amplified first modulated signals with the amplified carrier signals to produce second modulated signals having the data encoded therein and having the predetermined frequency of the amplified carrier signals (i.e., within the THz frequency band 104 or, in some implementations, in a range between 300 GHz and 10 THz), and send the second modulated signals to the first amplifier 684*a*.

The first amplifier 684*a* may be configured to receive the second modulated signals from the first frequency mixer 680*a*, adjust an amplitude of the second modulated signals such that the amplified second modulated signals can be transmitted by the first RF interface 664*a*, and send the amplified second modulated signals to the first RF interface 664*a*.

The first RF interface 664*a* may be configured to receive the amplified second modulated signals from the first amplifier 684*a* and send the amplified second modulated signals as antenna feed signals 612*a* (i.e., having the data encoded therein) having a frequency within a predetermined frequency range (e.g., the THz frequency band 104 or, in some implementations, in a range between 300 GHz and 10 THz). In some implementations, the first RF interface 664*a* may be connected to one of the antennas 616 and configured to send the antenna feed signals 612*a* to the antenna 616. In other implementations, however, one of the antennas 616 may be included in place of the first RF interface 664*a*.

Referring now to the receiver circuitry 608*b*, the second RF interface 664*b* may be configured to receive the antenna output signals 612*b* (i.e., having client data encoded therein) within a predetermined frequency range (e.g., the THz frequency band 104 or, in some implementations, in a range between 300 GHz and 10 THz) and send the antenna output signals 612*b* to the second amplifier 684*b*. As described in further detail below, the second RF interface 664*b* may be configured to receive the antenna output signals 612*b* from one of the antennas 616. In other implementations, however, one of the antennas 616 may be included in place of the second RF interface 664*b*.

The second amplifier 684*b* may be configured to receive the antenna output signals 612*b* from the second RF interface 664*b*, adjust an amplitude of the antenna output signals 612*b* to generate amplified second transmission signals that can drive the second frequency mixer 680*b*, and send the amplified second transmission signals to the second frequency mixer 680*b*.

The fourth amplifier 684*d* may be configured to receive the first carrier signals from the signal distribution block 698, adjust an amplitude of the first carrier signals to generate amplified carrier signals that can drive the second frequency mixer 680*b*, and send the amplified carrier signals to the second frequency mixer 680*b*.

The second frequency mixer 680*b* may be configured to receive the amplified second transmission signals from the second amplifier 684*b*, receive the amplified carrier signals from the fourth amplifier 684*d*, down-convert the amplified second transmission signals with the amplified carrier signals to produce third modulated signals having the data encoded therein and having the IF or the BB frequency, and send the third modulated signals to the sixth amplifier 684*f*.

The sixth amplifier 684*f* may be configured to receive the third modulated signals from the second frequency mixer 680*b*, adjust an amplitude of the third modulated signals such that the amplified third modulated signals can drive the fourth frequency mixer 680*d*, and send the amplified third modulated signals to the fourth frequency mixer 680*d*.

The third LO 636*c* may be configured to generate reference signals having a continuous waveform (e.g., a sinusoidal waveform) having a predetermined frequency (i.e., a BB frequency). In some implementations, the predetermined frequency of the reference signals (i.e., the BB frequency) is in a range between 8 GHz and 10 GHz. The third LO 636*c* may be further configured to send the reference signals to the fourth frequency mixer 680*d*.

The fourth frequency mixer 680*d* may be configured to receive the amplified third modulated signals from the sixth amplifier 684*f*, receive the reference signals from the third LO 636*c*, down-convert the amplified third modulated signals with the reference signals to produce encoded output signals having the client data encoded therein and having the predetermined frequency of the reference signals (i.e., the BB frequency), and send the encoded output signals to the modulation block 644*a*.

The client-side output 600*b* may be configured to transmit the second baseband signals 604*b* having the client data encoded therein to one or more external component (e.g., a control module 224). In some implementations, the client-side output 600*b* is a pair of output interfaces. In some such implementations, the client-side output 600*b* is an LVDS link configured to transmit LVDS signals, and the second baseband signals 604*b* are LVDS signals having the client data encoded therein.

Referring now to FIG. 7, shown therein is a schematic diagram of an exemplary implementation of a folded modulator 700 constructed in accordance the present disclosure. The folded modulator 700 may be configured to perform broadband direct modulation to generate the encoded signals and to minimize distortion while doing so. The folded modulator 700 may employ a cascade architecture (e.g., a cascaded circuit drive that is "stacked" or "folded") in order to produce a linear or near-linear modulated output (i.e., the encoded signals). In implementations in which the folded modulator 700 employs a cascade architecture, the size of the stack may be directly proportional to the bandwidth.

Referring now to FIG. 8, shown therein is a schematic diagram of an exemplary implementation of a rectifying detector 800 constructed in accordance the present disclosure. The rectifying detector 800 may be configured to perform direct detection of incoming signals (i.e., the encoded signals). The rectifying detector 800 may be further configured to detect an envelope of the encoded signals or one or more amplitude transition of the encoded signals to generate the output signals.

Figure 9A:
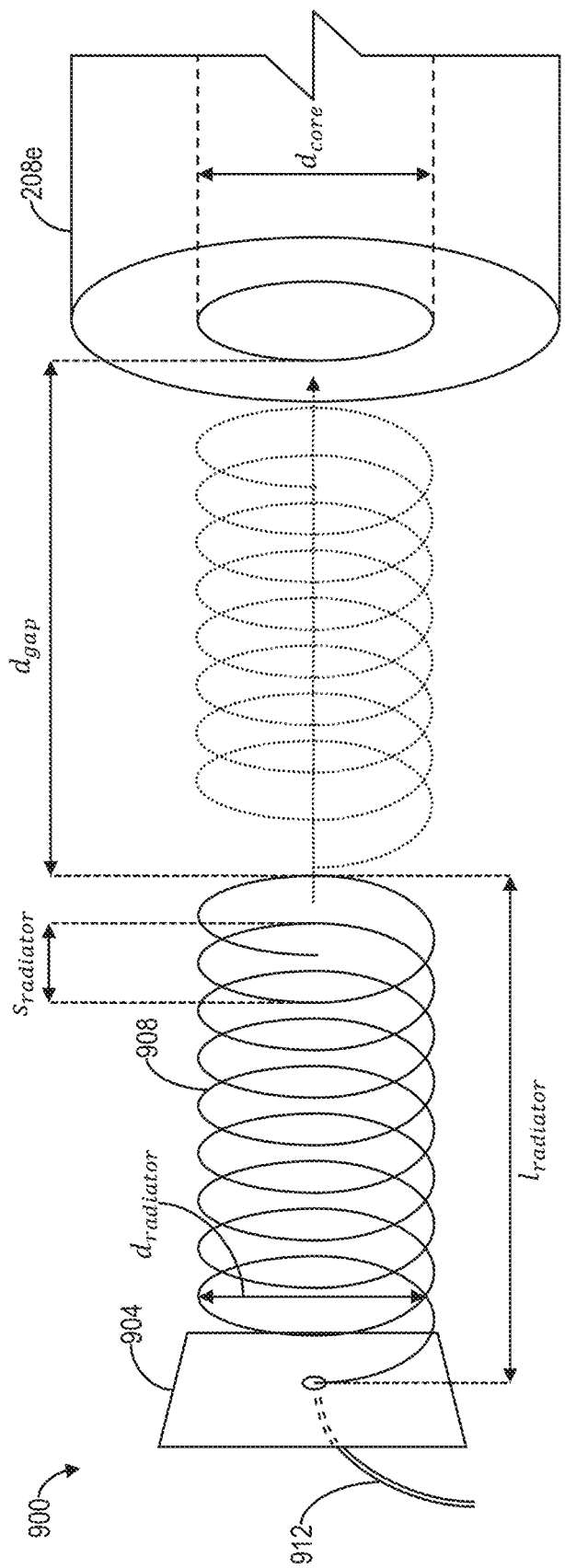
FIG. 9A is a side view of an exemplary implementation of an antenna constructed in accordance with the present disclosure for generating circularly polarized signals.

Referring now to FIG. 9A, shown therein is a side view of an exemplary implementation of an antenna 900 coupled with a fifth hollow waveguide 208*e* constructed in accordance with the present disclosure. However, it should be understood that the description referring to any particular one of the antennas 416, 516, 616, 900 may refer to any of the antennas 416, 516, 616, 900 described herein. As shown in FIG. 8A, the antenna 900 generally comprises a ground plane 904, a radiator 908 mounted on the ground plane 904, and a coaxial feedline 912 electrically connected to the radiator 908. In some implementations, the antenna 900 may lack the ground plane 904. In some implementations, the antenna 900 further comprises a casing (not shown) enclosing the radiator 908. The antenna 900 may be a vertical antenna (i.e., an antenna extending orthogonally from a substrate) or a horizontal antenna (i.e., an antenna extending laterally from a substrate).

The radiator 908 may be configured to transmit and detect radiated signals configured for coherent detection. In the implementation shown, the radiator 908 is a helical radiator configured to transmit and detect radiated signals having a circular polarization. In this implementation, the radiator 908 has a length $l_{radiator}$, a diameter $d_{radiator}$, and a spacing $s_{radiator}$ between adjacent turns of the radiator 908. The radiator 908 is preferably disposed at a distance $d_{gap}$ from the fifth hollow waveguide 208*e*.

The radiator 908 may be wound in a predetermined direction, such as clockwise (i.e., a left-hand wind) or counter-clockwise (i.e., a right-hand wind). While the radiator 908 of the antenna 900 is depicted in FIG. 9A as having a right-hand wind or a counter-clockwise rotational direction, it should be understood that the radiator 908 of the antenna 900 may be provided with a left-hand wind or a clockwise rotational direction.

In some implementations, signals for transmission may be sent to the antenna 900 via the coaxial feedline 912. In other implementations, received RF signals may be sent from the antenna 900 via the coaxial feedline 912.

In some implementations, the length $l_{radiator}$ of the radiator 908 may be proportional to the wavelength of the signals being transmitted and/or received. In some implementations, the length $l_{radiator}$ of the radiator 908 is in a range between 10 microns and 10 mm. In some implementations, the diameter $d_{radiator}$ of the radiator 908 may be proportional to the wavelength of the signals being transmitted and/or received. In some implementations, the diameter $d_{radiator}$ of the radiator 908 is in a range between 10 microns and 10 mm. In some implementations, the spacing $S_{radiator}$ between adjacent turns of the radiator 908 may be in a range between 1 micron and 1 mm.

The predetermined distance $d_{gap}$ at which the antenna 900 is spaced from the hollow waveguide 208 may vary depending upon the carrier frequency of the RF signal being transmitted by the antenna 900. In some implementations, the predetermined distance $d_{gap}$ at which the antenna 900 is spaced from the hollow waveguide 208 is in a range between 3 μm and 3 mm. In one implementation, the predetermined distance $d_{gap}$ at which the antenna 900 is spaced from the hollow waveguide 208 is 1 mm. In some implementations, the antenna 900 may be directly connected to the fifth hollow waveguide 208e.

Figure 9B:
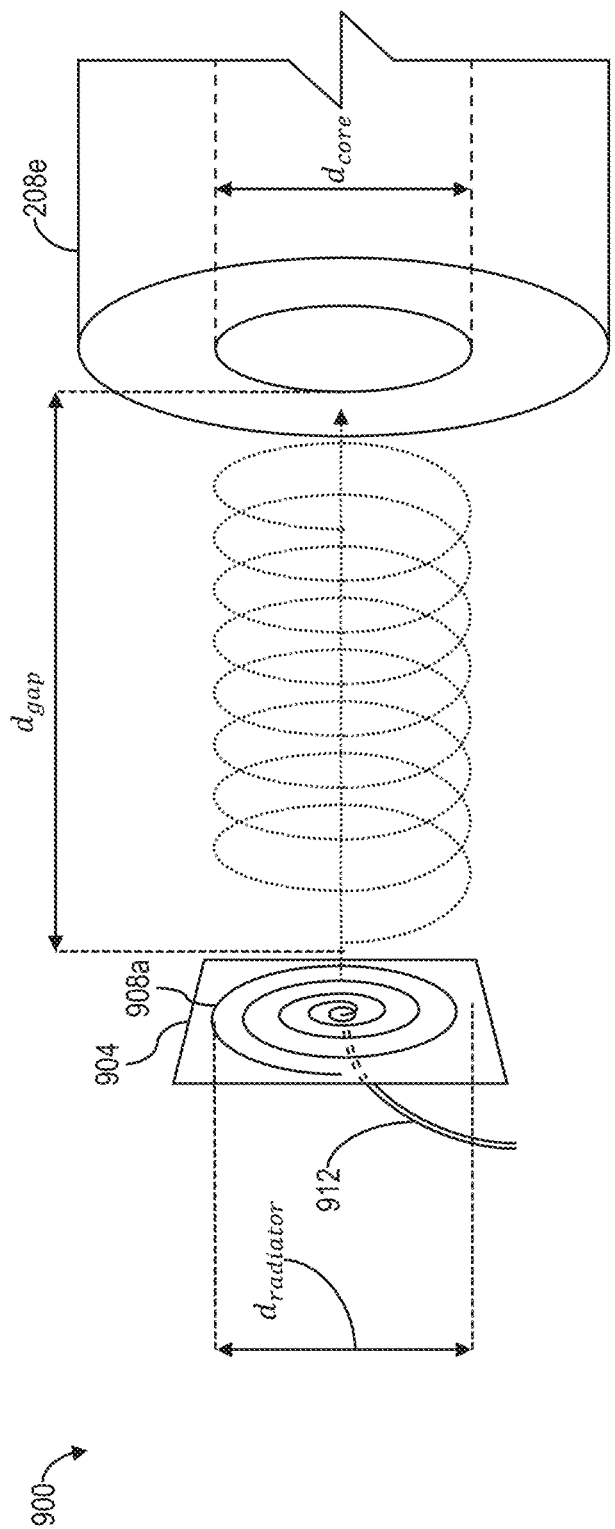
FIG. 9B is a side view of another exemplary implementation of the antenna shown in FIG. 9A.

Referring now to FIG. 9B, shown therein is a top plan view of another exemplary implementation of the antenna 900 coupled with the fifth hollow waveguide 208e constructed in accordance with the present disclosure. The antenna 900 is similar in construction and function as the antenna 900, with the exception that the antenna 900 includes a first radiator 908a formed of a conductive material having a plurality of coplanar windings. In one implementation, the first radiator 908a is in the form of a spiral. The first radiator 908a may be wound in a predetermined direction, such as clockwise (i.e., a left-hand wind) or counter-clockwise (i.e., a right-hand wind). While the first radiator 908a of the antenna 900 is depicted in FIG. 9B as having a right-hand wind or a counter-clockwise rotational direction, it should be understood that the first radiator 908a of the antenna 900 may be provided with a left-hand wind or a clockwise rotational direction.

Other implementations of the antenna 900 include implementation as a gain horn antenna, a Cassegrain antenna, an omnidirectional antenna, a horn lens antenna, a spot focus antenna, a waveguide probe antenna, a scalar feed horn antenna, a wide-angle scalar feed horn antenna, a trihedral antenna, and a conical horn antenna.

Figure 10:
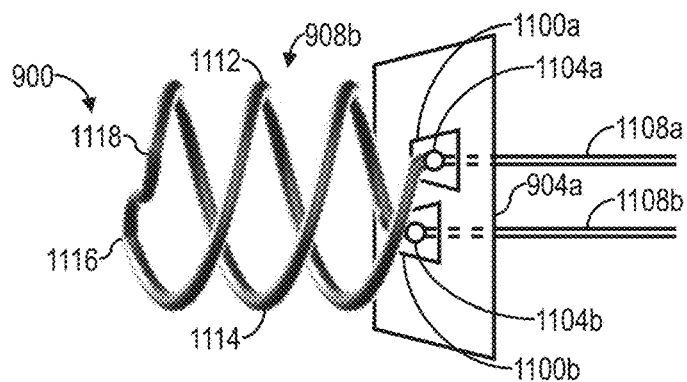
FIG. 10 is a perspective view of another exemplary implementation of the antenna shown in FIG. 9A, wherein the antenna is a bifilar helix antenna.

Referring now to FIG. 10, shown therein is another exemplary implementation of the antenna 900. As shown in FIG. 10, the antenna 900 may be implemented as a bifilar helix antenna. The bifilar helix antenna 900 generally comprises a ground plane 904a having a first differential pad 1100a and a second differential pad 1100b and a second radiator 908b mounted on the ground plane 904a. In some implementations, the bifilar helix antenna 900 may lack the ground plane 904a. The second radiator 908b is generally in the shape of a double helix and may have a first feed point 1104a electrically connected to the first differential pad 1100a and a second feed point 1104b electrically connected to the second differential pad 1100b. A first coaxial feedline 1108a and a second coaxial feedline 1108b may be electrically connected to the first differential pad 1100a and the second differential pad 1100b, respectively.

In some implementations, the second radiator 908b may be configured to transmit and detect differential radiated signals. That is, in the transmit direction, the second radiator 908b may receive a first complementary antenna feed signal from the first feed point 1104a and a second complementary antenna feed signal from the second feed point 1104b and transmit the radiated signals based on the first complementary antenna feed signal and the second complementary antenna feed signal. Further, in the receive direction, the second radiator 908b may receive the radiated signals and provide the first complementary antenna output signal to the first feed point 1104a and the second complementary antenna output signal to the second feed point 1104b. In such implementations, the first complementary antenna output signal and the second complementary antenna output signal may be equal in magnitude but opposite in phase (i.e., out of phase by 180°).

The second radiator 908b may be wound in a predetermined direction, such as clockwise or counter-clockwise. While the second radiator 908b of the bifilar helix antenna 900 is depicted in FIG. 9 as having a left-hand wind or a clockwise rotational direction, it should be understood that the second radiator 908b of the bifilar helix antenna 900 may be provided with a right-hand wind or a counter-clockwise rotational direction.

The second radiator 908b may comprise a first radiator portion 1112 and a second radiator portion 1114. The first radiator portion 1112 has a first end formed by the first feed point 1104a and a second end 1116 spaced a distance from the first feed point 1104a. The first radiator portion 1112 is in the form of a spiral (i.e., a helix shape). The second radiator portion 1114 has a third end formed by the second feed point 1104b and a fourth end 1118 spaced a distance from the second feed point 1104b. The second radiator portion 1114 is in the form of a spiral (i.e., a helix shape). The second end 1116 of the first radiator portion 1112 is connected to the fourth end 1118 of the second radiator portion 1114.

Figure 11:
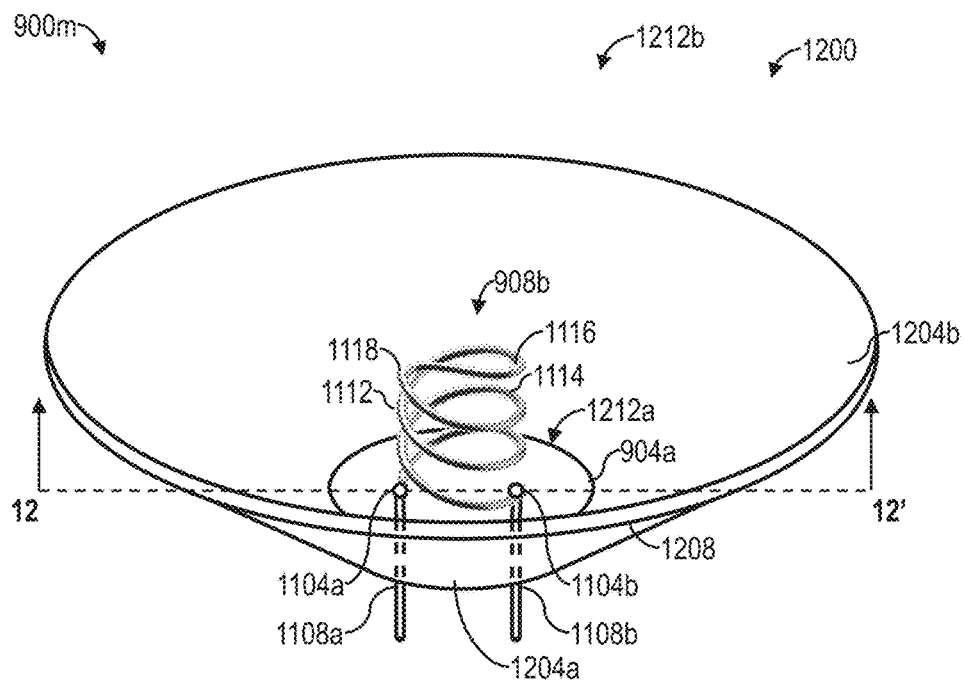
FIG. 11 is a perspective view of another exemplary implementation of the bifilar helix antenna shown in FIG. 10, wherein the bifilar helix antenna is enclosed within a conductive cone.
Figure 12:
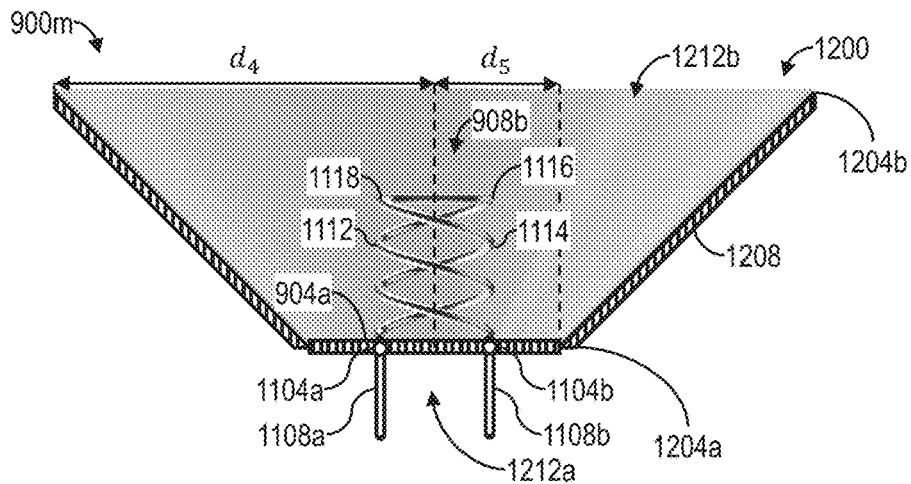
FIG. 12 is a partial cross-sectional view of the bifilar helix antenna shown in FIG. 11, taken from the line 12-12' and in the direction of the arrows.

Referring now to FIGS. 11 and 12, shown therein is another exemplary implementation of the bifilar helix antenna 900 shown in FIG. 10. As shown in FIGS. 11 and 12, in some implementations, a conductive cone 1200 may be provided surrounding the bifilar helix antenna 900 (i.e., such that the bifilar helix antenna 900 is enclosed within the conductive cone 1200). The second radiator 908b may be wound in a predetermined direction, such as clockwise or counter-clockwise. While the second radiator 908b of the bifilar helix antenna 900 enclosed within the conductive cone 1200 is depicted in FIGS. 11 and 12 as having a left-hand wind or a clockwise rotational direction, it should be understood that the second radiator 908b of the bifilar helix antenna 900 enclosed within the conductive cone 1200 may be provided with a right-hand wind or a counter-clockwise rotational direction.

The conductive cone 1200 may have a first end 1204a, a second end 1204b opposite the first end 1204a, and a sidewall 1208 extending between the first end 1204a and the second end 1204b. The sidewall 1208 may define a first opening 1212a at the first end 1204a and a second opening 1212b at the second end 1204b. As shown in FIGS. 11 and 12, the first end 1204a of the conductive cone 1200 is generally provided with a diameter $d_4$ shorter than a diameter $d_5$ of the second end 1204b of the conductive cone 1200.

The bifilar helix antenna 900 enclosed within the conductive cone 1200 may be configured to transmit circularly polarized signals with a relatively high gain (e.g., more than 6 decibels relative to isotropic (dBi), such as 10 dBi, 12 dBi, 14 dBi, 15 dBi, 16 dBi, 18 dBi, or 20 dBi, for example). In the implementation shown in FIGS. 11 and 12, the bifilar helix antenna 900 enclosed within the conductive cone 1200 may function as an efficient, wide-bandwidth polarizer. That is, the bifilar helix antenna 900 enclosed within the conductive cone 1200 may be configured to transmit circularly polarized RF signals with a high radiation efficiency (e.g., greater than 50%, such as 60%, 70%, 75%, 80%, 85%, 90%, or 95%, for example). Losses in radiation efficiency are generally due to losses in conductors or substrates. Further, the bifilar helix antenna 900 enclosed within the conductive cone 1200 may be configured to transmit circularly polarized signals with a wide bandwidth (e.g., greater than 10% of center frequency, such as 12%, 14%, 15%, 16%, 18%, 20%, 22%, 24%, or 25%, for example).

The diameter of the bifilar helix antenna 900 may be less than the wavelength of the signals transmitted by the bifilar helix antenna 900. In some implementations, the conductive cone 1200 may be constructed of a conductive material, such as aluminum, copper, silver, gold, other conductive metals, combinations thereof, and/or the like.

It will be understood by persons having ordinary skill in the art that circularly polarized signals transmitted by a radiator 908 of a first particular one of the antennas 900 may be received only by a radiator 908 of a second particular one of the antennas 900 having the same rotational direction. That is, for example, the radiator 908 shown in FIG. 8A and the first radiator 908a shown in FIG. 8B are depicted as having a right-hand wind or a counter-clockwise rotational direction. As a result, circularly polarized RF signals transmitted by the radiator 908 shown in FIG. 9A or the first radiator 908a shown in FIG. 9B would have a right-hand circular polarization (RHCP). On the other hand, the second radiator 908b shown in FIGS. 10-12 is depicted as having a left-hand wind or a clockwise rotational direction. As a result, circularly polarized RF signals transmitted by the second radiator 908b shown in FIGS. 10-12 would have a left-hand circular polarization (LHCP).

Because circularly polarized signals transmitted by a radiator 908 of a first particular one of the antennas 900 may be received only by a radiator 908 of a second particular one of the antennas 900 having the same rotational direction, circularly polarized RF signals transmitted by the radiator 908 as depicted in FIG. 9A or the first radiator 908a as depicted in FIG. 9B (i.e., RHCP RF signals) could not be received by the second radiator 908b as depicted in FIGS. 10-12. Similarly, circularly polarized signals transmitted by the second radiator 908b as depicted in FIGS. 10-12 (i.e., LHCP RF signals) could not be received by the radiator 908 as depicted in FIG. 9A or the first radiator 908a as depicted in FIG. 9B. However, circularly polarized signals transmitted by the radiator 908 as depicted in FIG. 8A (i.e., RHCP RF signals) could be received by the first radiator 908a as depicted in FIG. 9B, and circularly polarized signals transmitted by the second radiator 908b as depicted in FIG. 10 (i.e., LHCP RF signals) could be received by the second radiator 908b as depicted in FIGS. 11 and 12.

Figure 13:
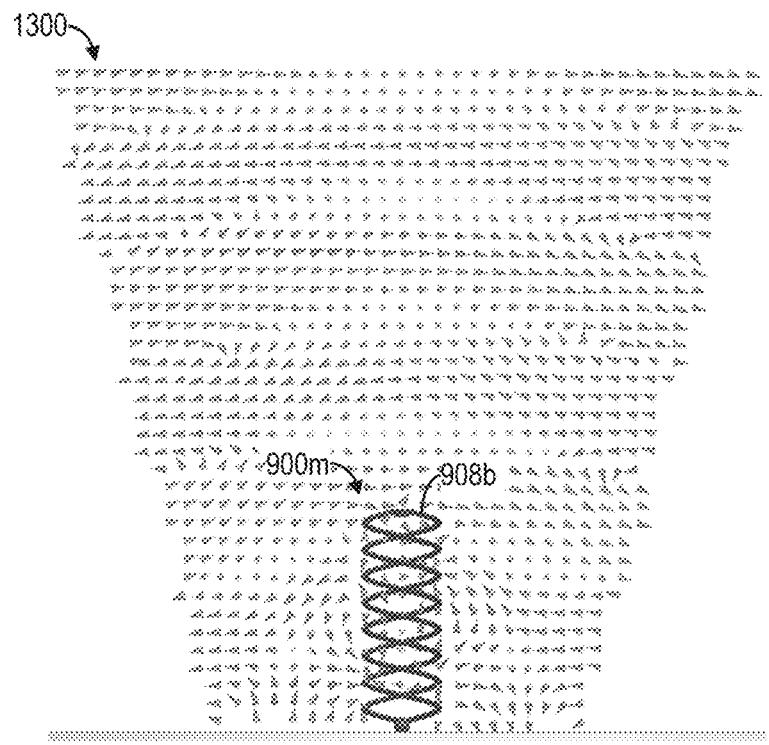
FIG. 13 is a diagrammatic view of an electric field produced by the bifilar helix antenna enclosed within the conductive cone shown in FIG. 12.

Referring now to FIG. 13, shown therein is a diagrammatic view of an electric field 1300 produced by the bifilar helix antenna 900 enclosed within the conductive cone 1200 shown in FIGS. 11 and 12. As illustrated in FIG. 13, the bifilar helix antenna 900 enclosed within the conductive cone 1200 may be operable to produce the electric field 1300 such that a near-field region of the electric field 1300 and a far-field region of the electric field 1300 are established with a greater directivity than would be provided by conventional antennas. Further, the bifilar helix antenna 900 enclosed within the conductive cone 1200 may be operable to produce the electric field 1300 in a manner that does not interfere with the circular polarization of the circularly polarized radiated signals transmitted by the second radiator 908b.

Figure 14:
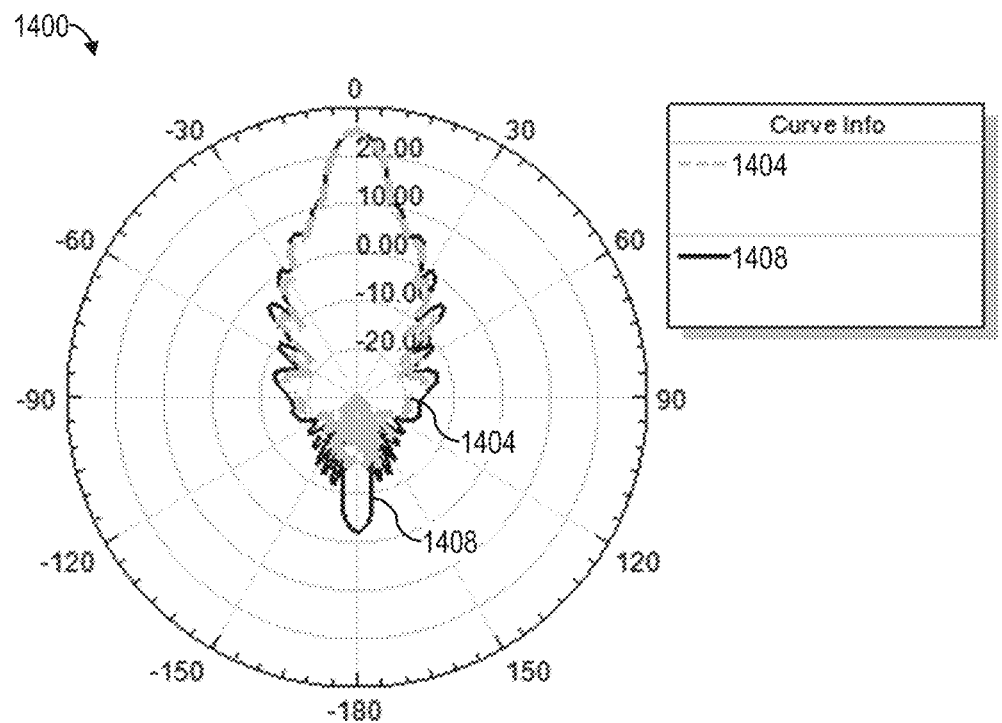
FIG. 14 is a diagrammatic view of a radiation pattern of the bifilar helix antenna enclosed within the conductive cone shown in FIG. 12.

Referring now to FIG. 14, shown therein is a diagrammatic view of a radiation pattern 1400 of the bifilar helix antenna 900 enclosed within the conductive cone 1200 shown in FIGS. 11 and 12. The radiation pattern 1400 may correspond to a transmission signal having a frequency of 2,000 GHz and a phase of 0°. As shown in FIG. 14, a first curve 1404 demonstrates an LHCP gain of the bifilar helix antenna 900 enclosed within the conductive cone 1200, while a second curve 1408 demonstrates a total directivity of the bifilar helix antenna 900 enclosed within the conductive cone 1200. A difference between the first curve 1404 and the second curve 1408 may indicate metal and polarization losses. As illustrated in FIG. 14 and as described above in relation to FIG. 13, the bifilar helix antenna 900 enclosed within the conductive cone 1200 may be operable to produce the electric field 1300 such that a near-field region 1304 of the electric field 1300 and a far-field region 1308 of the electric field 1300 are established with a greater directivity than would be provided by conventional antennas.

Figure 15:
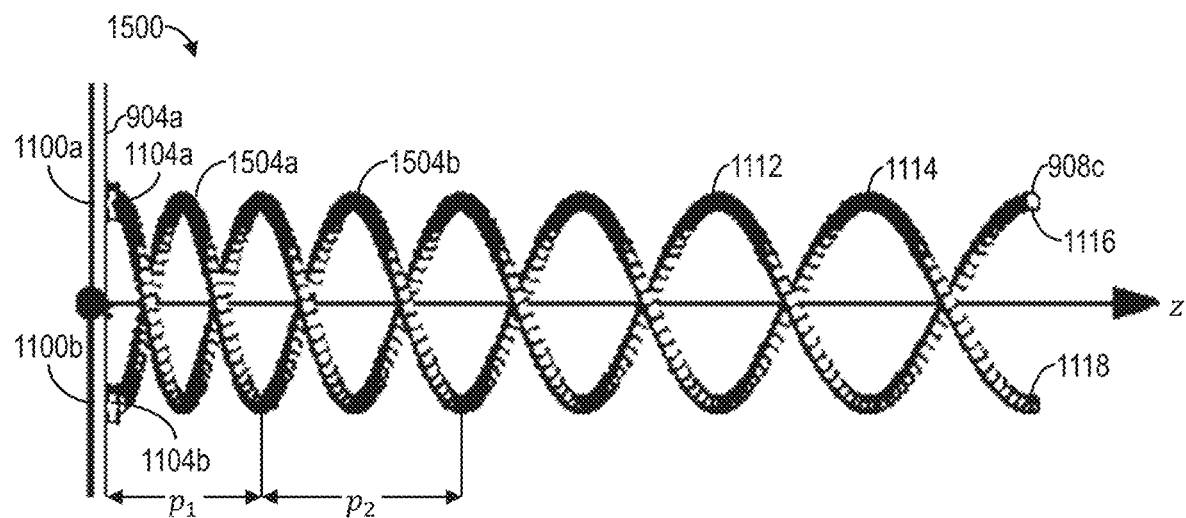
FIG. 15 is a side view of an exemplary implementation of a non-uniform bifilar helix antenna constructed in accordance with the present disclosure.
Figure 16:
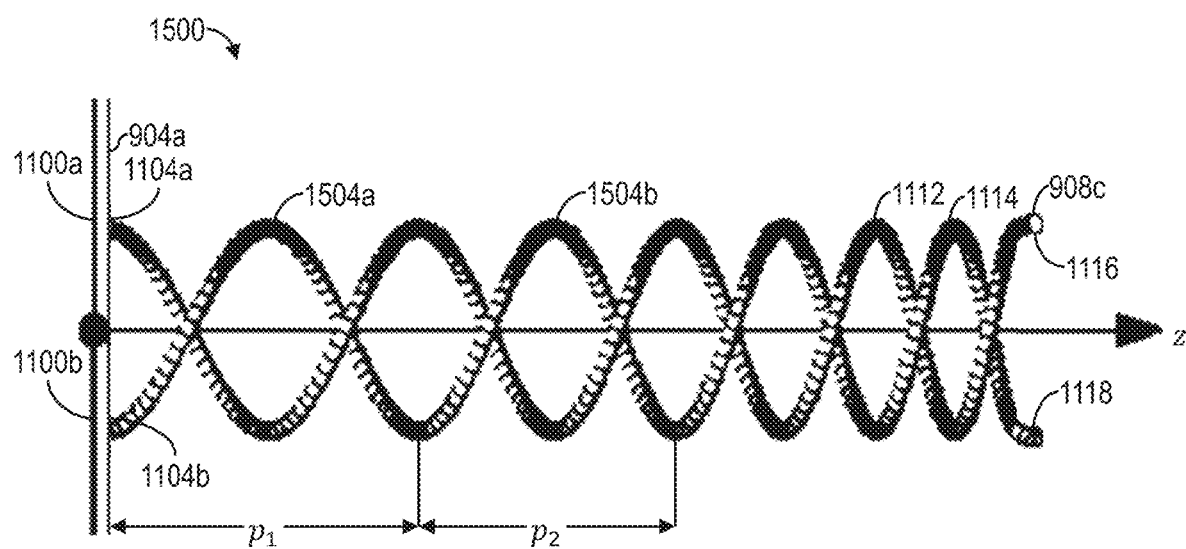
FIG. 16 is a side view of another exemplary implementation of the non-uniform bifilar helix antenna.

Referring now to FIGS. 15 and 16, shown therein are side views of exemplary implementations of a non-uniform bifilar helix antenna 1500 (hereinafter, the "non-uniform antenna 1500") constructed in accordance with the present disclosure. Providing the antenna with a non-uniform design is effective because the size of the helix determines the frequency of operation. By varying characteristic dimensions of the helix, a wider band of frequencies may be effectively radiated.

Similar to the bifilar helix antenna 900 described above, the non-uniform antenna 1500 may comprise the ground plane 904a having the first differential pad 1100a and the second differential pad 1100b and a non-uniform third radiator 908c mounted on the ground plane 904a. The third radiator 908c may have a plurality of turns 1504a-n including at least a first turn 1504a and a second turn 1504b. For purposes of clarity, only the first turn 1504a and the second turn 1504b are labeled with a reference character. The first turn 1504a may have a first characteristic dimension, while the second turn 1504b may have a second characteristic dimension different from the first characteristic dimension. The first turn 1504a may be adjacent to the second turn 1504b or non-adjacent to (i.e., spaced from) the second turn 1504b.

In the implementation shown in FIG. 15, the first turn 1504a has a first pitch $p_1$, the second turn 1504b has a second pitch $p_2$, and the first pitch $p_1$ is less than the second pitch $p_2$, the implementation shown in FIG. 15, the first turn 1504a has the first pitch $p_1$, the second turn 1504b has the second pitch $p_2$, and the first pitch $p_1$ is greater than the second pitch $p_2$.

In some implementations, the non-uniform antenna 1500 may lack the ground plane 904a. The third radiator 908c is generally in the shape of a double helix and may have the first feed point 1104a electrically connected to the first differential pad 1100a and the second feed point 1104b electrically connected to the second differential pad 1100b. The first coaxial feedline 1108a and the second coaxial feedline 1108b may be electrically connected to the first differential pad 1100a and the second differential pad 1100b, respectively.

In some implementations, the third radiator 908c may be configured to emit and receive differential signals. That is, in the transmit direction, the third radiator 908c may receive a first complementary signal from the first feed point 1104a and a second complementary signal from the second feed point 1104b and transmit the transmission signal. Further, in the receive direction, the third radiator 908c may receive the transmission signal and provide the first complementary signal to the first feed point 1104a and the second complementary signal to the second feed point 1104b. In such implementations, the first complementary signal and the second complementary signal may be equal in magnitude but opposite in phase (i.e., out of phase by 180°).

The third radiator 908c may be wound in a predetermined direction, such as clockwise or counter-clockwise. While the third radiator 908c of the non-uniform antenna 1500 is depicted in FIGS. 15 and 16 as having a right-hand wind or a counter-clockwise rotational direction, it should be understood that the third radiator 908c of the non-uniform antenna 1500 may be provided with a left-hand wind or a clockwise rotational direction.

The third radiator 908c may comprise the first radiator portion 1112 and the second radiator portion 1114. The first radiator portion 1112 has the first end formed by the first feed point 1104a and the second end 1116 spaced a distance from the first feed point 1104a. The first radiator portion 1112 is in the form of a spiral (i.e., a helix shape). The second radiator portion 1114 has the third end formed by the second feed point 1104b and the fourth end 1118 spaced a distance from the second feed point 1104b. The second radiator portion 1114 is in the form of a spiral (i.e., a helix shape). While the second end 1116 and the fourth end 1118 are shown as being disconnected from each other, it should be understood that, in some implementations, the second end 1116 of the first radiator portion 1112 is connected to the fourth end 1118 of the second radiator portion 1114.

Figure 17:
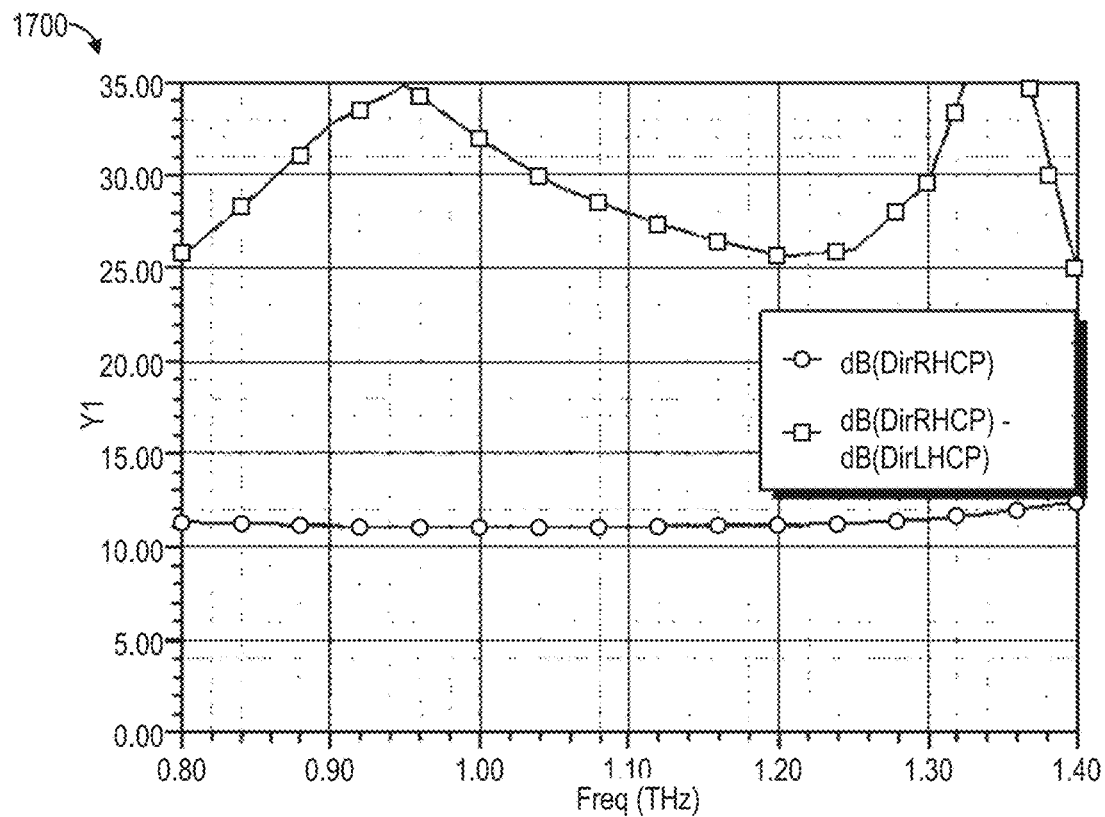
FIG. 17 is a graphical view of a polarization discrimination of the non-uniform bifilar helix antenna shown in FIG. 15.
Figure 18:
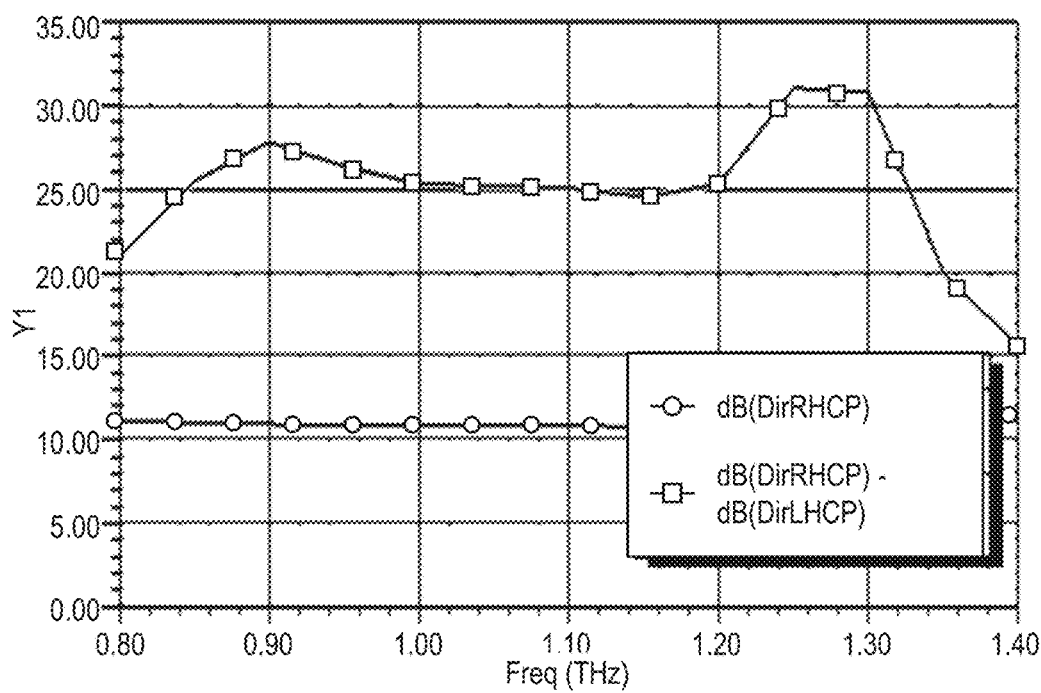
FIG. 18 is a graphical view of a polarization discrimination of the non-uniform bifilar helix antenna shown in FIG. 16.

The non-uniform antenna 1500 provides a wider frequency response in comparison to uniform antennas existing in the prior art and the uniform bifilar helix antennas discussed herein. A mathematical equation for the helical shape of the non-uniform radiator 908c of the non-uniform antenna 1500 in three-dimensional space is shown in Table 1 below and in a graph 1700 shown in FIG. 17, while the polarization discrimination of a uniform antenna across the frequency range between 0.80 THz and 1.40 THz is shown in a graph 1800 shown in FIG. 18. As shown in FIGS. 17 and 18, the polarization discrimination may be determined by subtracting the left-hand circular polarization directivity (i.e., DirLHCP) from the right-hand circular polarization directivity (i.e., DirRHCP). As shown in Table 1 and FIG. 16, the right-hand circular polarization directivity (i.e., DirRHCP) of the non-uniform antenna 1500 may be relatively constant (i.e., 11.5 dBi±1 dBi) in the frequency range between 0.80 THz and 1.40 THz. Furthermore, as shown in FIG. 17, the polarization discrimination (i.e., DirRHCP-DirLHCP) of the non-uniform antenna 1500 remains above 25 dB across the frequency range between 0.80 THz and 1.40 THz. Conversely, as shown in FIG. 18, the polarization discrimination (i.e., DirRHCP-DirLHCP) of a uniform antenna dips below 25 dB at the band edges and slightly below 25 dB in the midband range.

TABLE 1

Mathematical Equation for a Helical Shape of the Non-Uniform Radiator 908c of the Non-Uniform Antenna 1500 in Three-Dimensional Space

| | |
|---|---|
| X(t) | 41 * cos(t) [μm] |
| Y(t) | 41 * sin(t) [μm] |
| Z(t) | 0.293 * t * (t + 25) [μm] |
| start(t) | 0 |
| end(t) | 25.13 |

Figure 19:
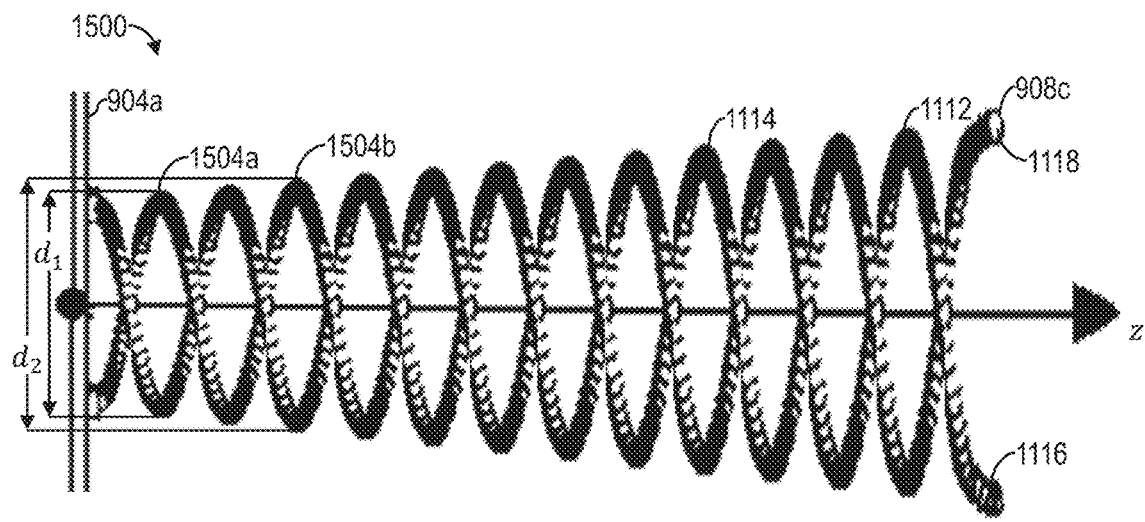
FIG. 19 is a side view of another exemplary implementation of the non-uniform bifilar helix antenna.
Figure 20:
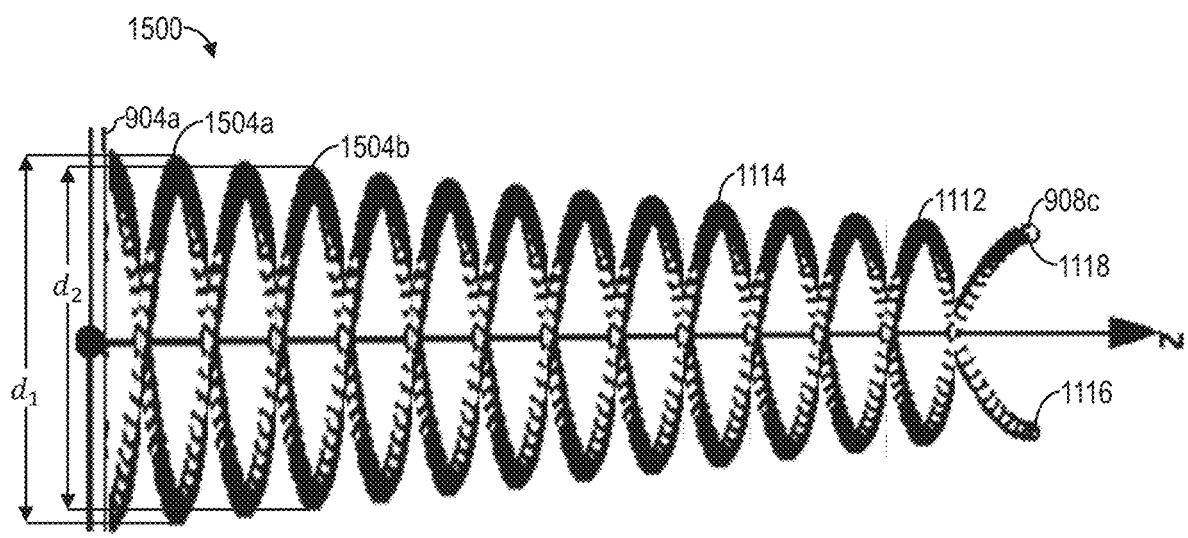
FIG. 20 is a side view of another exemplary implementation of the non-uniform bifilar helix antenna.
Figure 21:
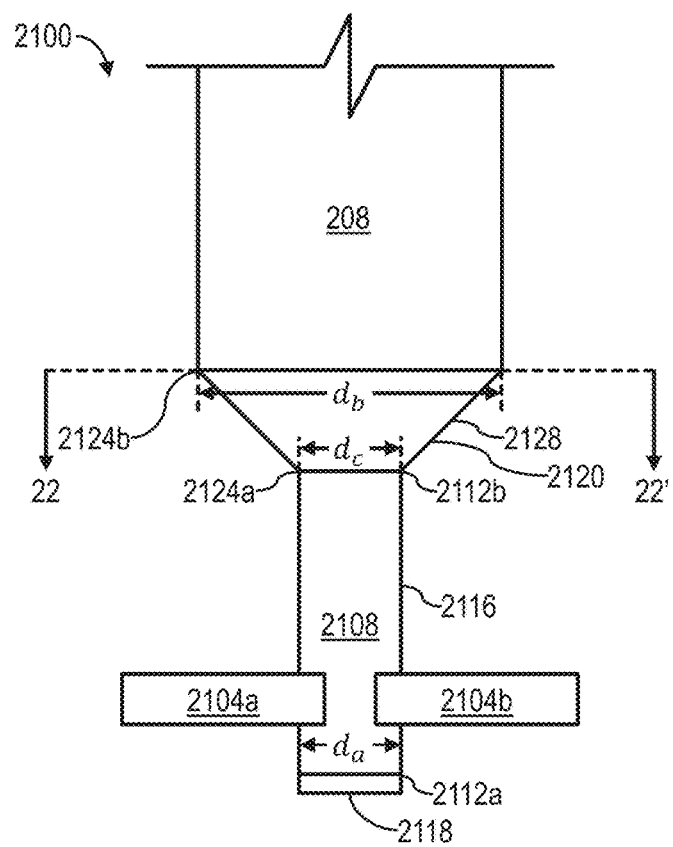
FIG. 21 is a diagrammatic view of an exemplary implementation of a differential waveguide probe antenna constructed in accordance with the present disclosure.

Referring now to FIGS. 18 and 20, shown therein are side views of more exemplary implementations of the non-uniform antenna 1500 shown in FIGS. 15 and 16. For purposes of clarity, the differential pads 1100 and the feed points 1104 are not labeled with a reference character in FIGS. 18 and 19. In the implementations shown in FIGS. 19 and 20, the first characteristic dimension and the second characteristic dimension are not pitches, but diameters. In the implementation shown in FIG. 19, the first turn 1504a has a first diameter $d_1$, the second turn 1504b has a second diameter $d_2$, and the first diameter $d_1$ is less than the second diameter $d_2$. In the implementation shown in FIG. 20, the first turn 1504a has the first diameter $d_1$, the second turn 1504b has the second diameter $d_2$, and the first diameter $d_1$ is greater than the second diameter $d_2$.

Varying the diameters $d_{a-n}$ of the turns 1504 of the third radiator 908c rather than the pitches $p_{a-n}$ of the turns 1504 of the third radiator 908c may be advantageous in different bands or with different ground plane dimensions, wire dimensions, etc.

It should be understood that the third radiator 908c and/or the non-uniform antenna 1500 may be included in place of any of the respective radiators 908 and/or antennas 900 described herein. Further, it should be understood that, while the second turn 1504b is shown as being directly adjacent to the first turn 1504a, there may be one or more turns in between the first turn 1504a and the second turn 1504b. Finally, it should be understood that, while the first turn 1504a is shown as being directly adjacent to the ground plane 904a, there may be one or more turns in between the ground plane 904a and the first turn 1504a.

Referring now to FIGS. 21 and 22A-22C, shown therein is a differential waveguide probe antenna 2100 constructed in accordance with the present disclosure. The differential waveguide probe antenna 2100 is configured to generate and transmit the transmission signal. Conversely, the differential waveguide probe antenna 2100 is further configured to receive the transmission signal. The differential waveguide probe antenna 2100 comprises a pair of waveguide probes 2104 including a first waveguide probe 2104a and a second waveguide probe 2104b.

In some implementations, the differential waveguide probe antenna 2100 may further comprise an intermediary waveguide 2108 configured to propagate the transmission signal. In such implementations, the differential waveguide probe antenna 2100 may be further configured to generate and transmit the transmission signal into the intermediary waveguide 2108. Conversely, in such implementations, the differential waveguide probe antenna 2100 may be further configured to receive the transmission signal from the intermediary waveguide 2108.

The intermediary waveguide 2108 may have a first end 2112a, a second end 2112b (the first end 2112a and the second end 2112b, collectively, the "ends 2112") opposite the first end 2112a, and a surface 2116 extending between the ends 2112. In some implementations, a back reflector 2118 may abut the first end 2112a. The surface 2116 may be constructed of a metal and may have a diameter $d_a$ less than two wavelengths of the transmission signal at 10 THz (or a maximum frequency in the frequency band occupied by the transport network 200) (i.e., 60 μm) and greater than one-half wavelength at 300 GHz (or a minimum frequency in the frequency band occupied by the transport network 200) (i.e., 0.5 mm). The intermediary waveguide 2108 may be constructed as such in order to ensure that one or more intended waveguide modes are established. That is, were the intermediary waveguide 2108 to be constructed at a smaller size, the one or more intended waveguide modes may not be able to propagate, and were the intermediary waveguide 2108 to be constructed at a larger size, one or more unintended waveguide modes may be excited. In some implementations, the one or more intended waveguide modes of the intermediary waveguide 2108 sufficiently matches the one or more intended waveguide modes of the hollow waveguide 208 such that a coupling loss between the intermediary waveguide 2108 and the hollow waveguide 208 is minimized (e.g., the coupling loss is in a range between 0.1 dB and 5.0 dB).

The waveguide probes 2104 may be positioned on opposite sides of the surface 2116 of the intermediary waveguide 2108 and may extend into the intermediary waveguide 2108 toward each other, but may be spaced a distance from each other. The waveguide probes 2104 may thus establish a strong electrical field in line with the one or more intended waveguide mode. Each of the waveguide probes 2104 may be excited with the transmission signal. In some implementations, each of the waveguide probes 2104 may be excited with the transmission signal at an equal strength and/or an opposite phase. That is, the waveguide probes 2104 may be configured to receive the transmission signal as a differential signal having a first complementary signal and a second complementary signal and generate and transmit the transmission signal in the electromagnetic wave form. Conversely, the waveguide probes 2104 may be further configured to receive the transmission signal and provide the transmission signal as a differential signal having a first complementary signal and a second complementary signal.

Figure 22A:
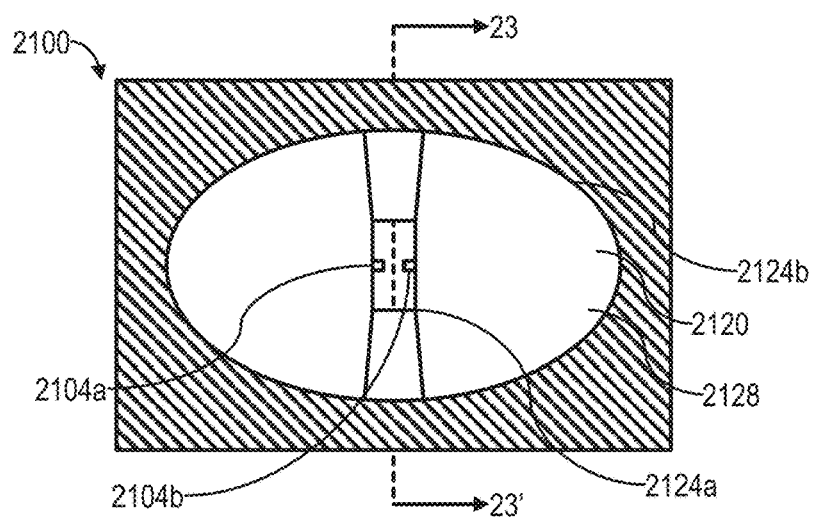
FIG. 22A is a partial cross-sectional view of the differential waveguide probe antenna shown in FIG. 21, taken from the line 22-22' and in the direction of the arrows.
Figure 22D:
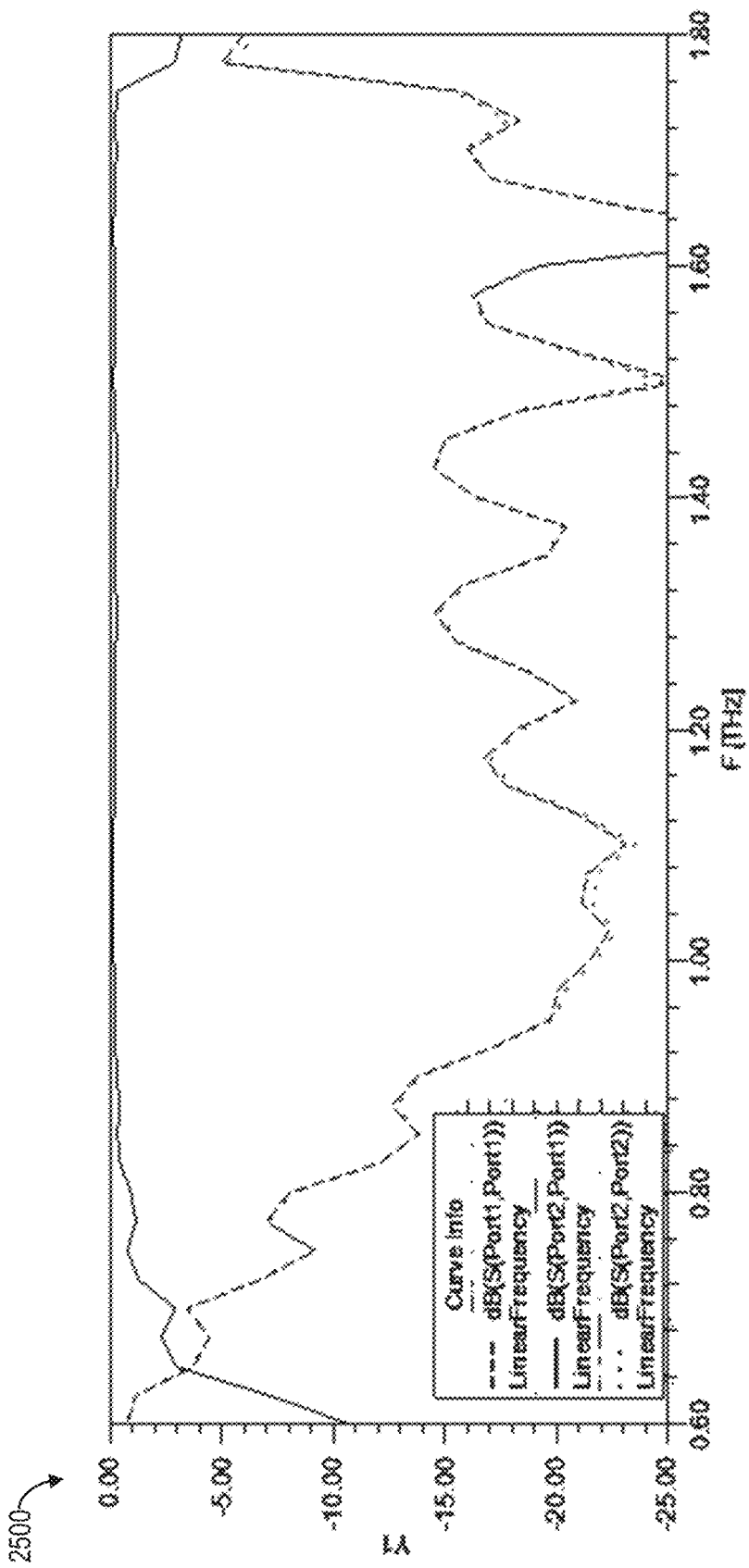
FIG. 22D is a graphical view of a polarization discrimination of the differential waveguide probe antenna shown in FIG. 21.

In some implementations, the intermediary waveguide 2108 may have a flared end at the second end 2112b configured to facilitate a mode transition between the intermediary waveguide 2108 and the hollow waveguide 208. In such implementations, the surface 2116 at the flared end may have a diameter $d_b$ greater than the diameter $d_a$. In some such implementations, the flared end may be formed integrally with the intermediary waveguide 2108. However, in other such implementations, the flared end may be constructed as a horn 2120 separate from but coupled to the intermediary waveguide 2108. The horn 2120 may have a first end 2124a abutting the second end 2112b of the intermediary waveguide 2108, a second end 2124b (the first end 2124a and the second end 2124b, collectively, the "ends 2124") opposite the first end 2124a, and a curved surface 2128 extending between the ends 2124. The curved surface 2128 at the first end 2124a may have a diameter $d_c$ equal to the diameter $d_a$. The differential waveguide probe antenna 2100 may be configured to transmit the transmission signal with a wide (i.e., greater than 50%) bandwidth into the hollow waveguide 208 at least in part because an energy contribution from each of the waveguide probes 2104 effectively cancels out the higher-order, unintended waveguide modes of the other waveguide probe 2104. A polarization discrimination of the differential waveguide probe antenna 2100 across a frequency range between 0.60 THz and 1.80 THz is shown in a graph 2500 shown in FIG. 22D.

Referring now to FIGS. 23, 24A, and 24B, shown therein is an exemplary implementation of a differential tapered antenna 2600 constructed in accordance with the present disclosure. The differential tapered antenna 2600 is configured to generate and transmit the transmission signal in the electromagnetic wave form—and, conversely, receive the transmission signal in the electromagnetic wave form—and comprises a pair of conductors including a first conductor 2604a and a second conductor 2604b (collectively, the "conductors 2604") spaced a distance $d_d$ from the first conductor 2604a.

The differential tapered antenna 2600 may be similar in some respects to a tapered slot antenna and in some respects to a ridged horn antenna. However, the differential tapered antenna 2600 differs from such antennas due to the differential tapered antenna 2600 having a differential launch and being coupled into the hollow waveguide 208 such that the transmission signal has multiple waveguide modes.

In the implementation shown in FIGS. 23, 24A, and 24B, the intermediary waveguide 2108 has a first planar, yet longitudinally directed curved surface 2608a and a second planar, yet longitudinally directed curved surface 2608b (collectively, the "curved surfaces 2608") bordering a space 2612. In the implementation shown in FIGS. 23, 24A, and 24B, the conductors 2604 collectively define the curved surfaces 2608 of the intermediary waveguide 2108 and form the space 2612 between the conductors 2604. As described above, the intermediary waveguide 2108 is configured to propagate the transmission signal in the electromagnetic wave form. In such implementations, the differential tapered antenna 2600 may be further configured to generate and transmit the transmission signal into the intermediary waveguide 2108 and receive the transmission signal from the intermediary waveguide 2108.

In some implementations, the distance $d_d$ between the first conductor 2604a and the second conductor 2604b at the first end 2112a of the intermediary waveguide 2108 is less than two wavelengths of the transmission signal at 10 THz (or the maximum frequency in the frequency band occupied by the transport network 200) and greater than one-half wavelength at 300 GHz (or the minimum frequency in the frequency band occupied by the transport network 200). The distance $d_d$ may be selected to establish a single waveguide mode for the frequency of the transmission signal. In some implementations, a distance $d_e$ between the conductors 2604 at the second end 2112b of the intermediary waveguide 2108 is greater than the distance $d_d$. This tapered shape may establish a continuously scaled geometry which enables an ultra-wide (i.e., greater than 50%) bandwidth. As energy launches down the conductors 2604, the one or more intended waveguide mode is established between the conductors 2604 and subsequently launches into the intermediary waveguide 2108.

In some implementations, each of the conductors 2604 may be fed with the transmission signal at an equal strength and/or an opposite phase. That is, the conductors 2604 may be configured to receive the transmission signal as a differential signal having a first complementary signal and a second complementary signal and generate and transmit the transmission signal in the electromagnetic wave form. Conversely, the conductors 2604 may be further configured to receive the transmission signal and provide the transmission signal as a differential signal having a first complementary signal and a second complementary signal.

Figure 24C:
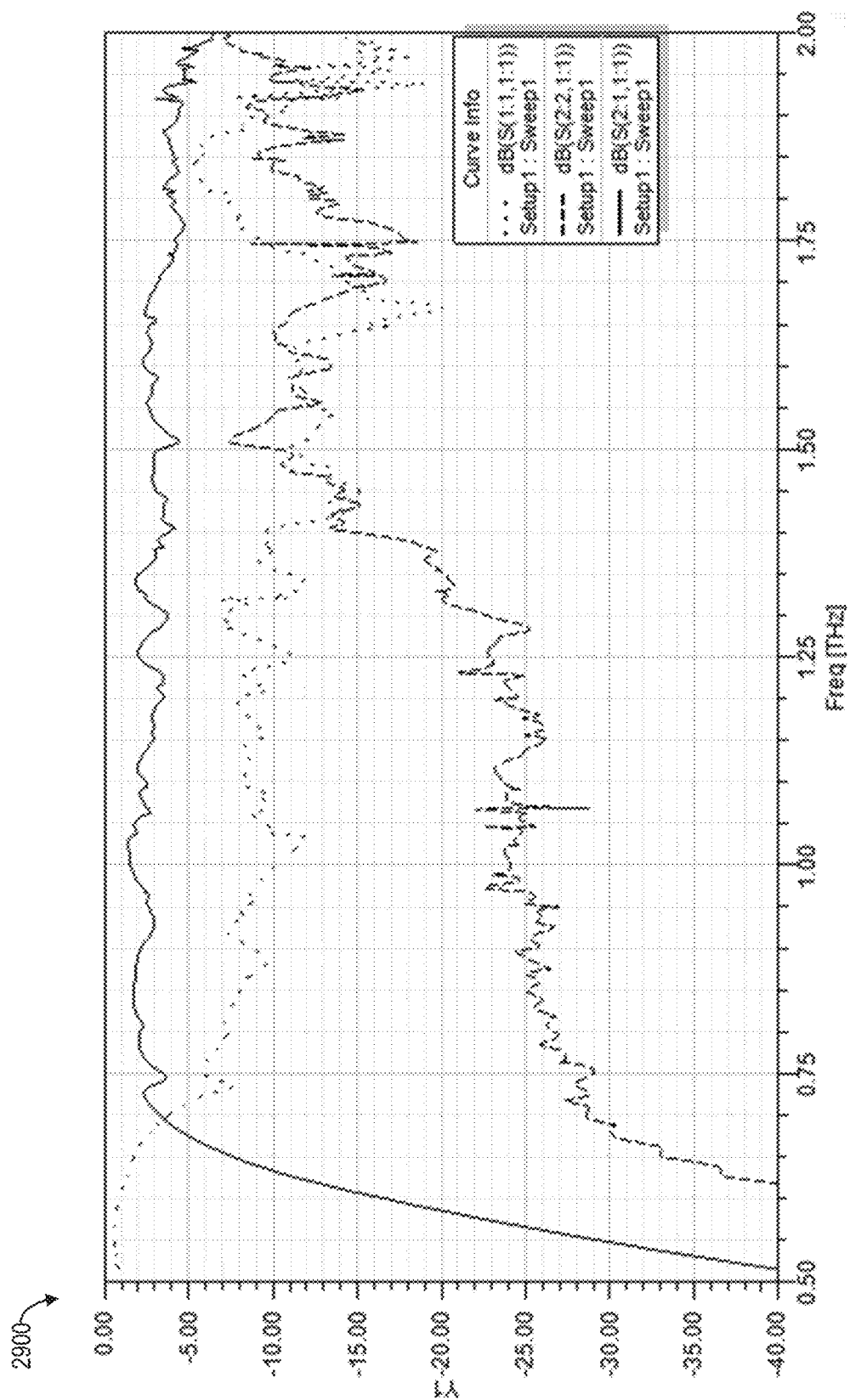
FIG. 24C is a graphical view of a polarization discrimination of the differential tapered antenna shown in FIG. 23.

A thickness and a width of the transmission lines at the feed point may be selected to establish a characteristic impedance matched to the receiver and/or driver. Persons having ordinary skill in the art will understand how to perform such calculations. As shown in FIG. 24B, the differential tapered antenna 2600 may further comprise one or more ground connection, such as a first ground connection 2800a and a second ground connection 2800b. A polarization discrimination of the differential tapered antenna 2600 across a frequency range between 0.50 THz and 2.00 THz is shown in a graph 2900 shown in FIG. 24C.

Figure 25:
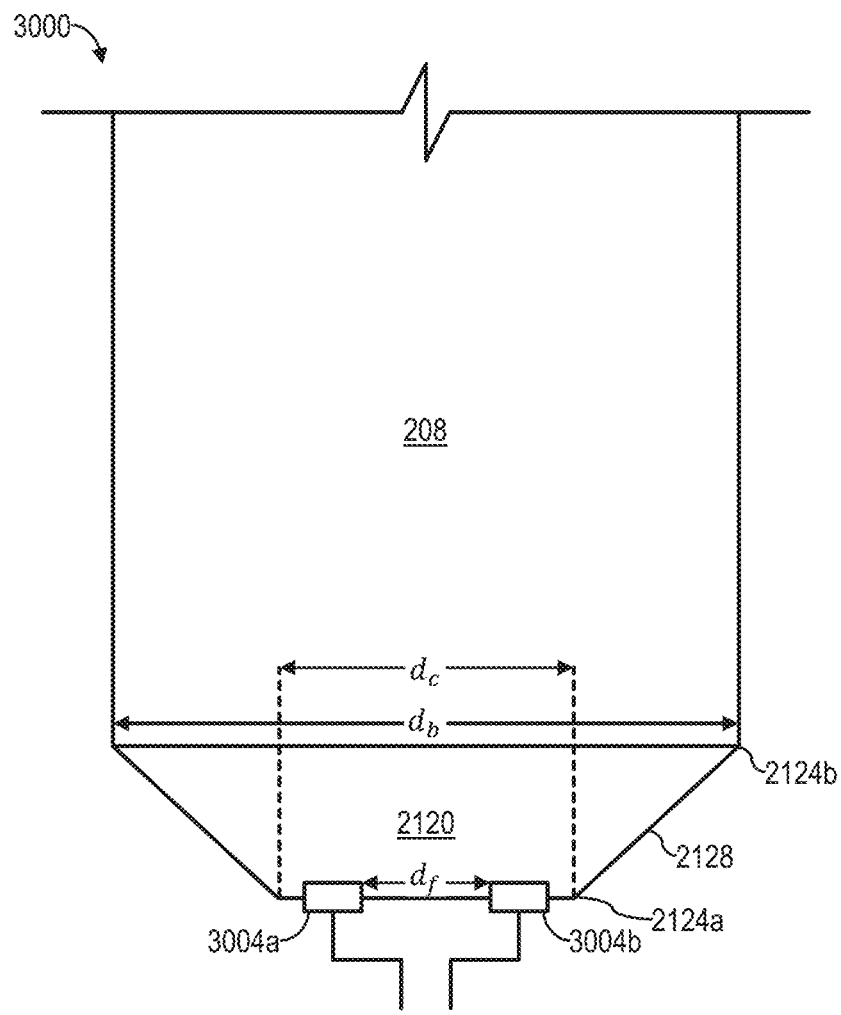
FIG. 25 is a diagrammatic view of an exemplary implementation of a differential microstrip patch antenna constructed in accordance with the present disclosure.
Figure 26:
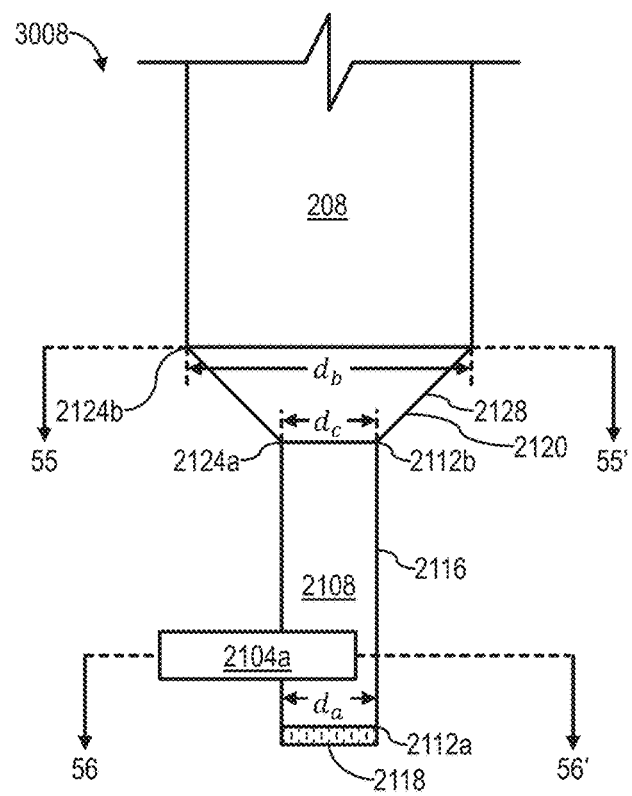
FIG. 26 is a diagrammatic view of an exemplary implementation of a single-ended waveguide probe antenna constructed in accordance with the present disclosure.
Figure 27A:
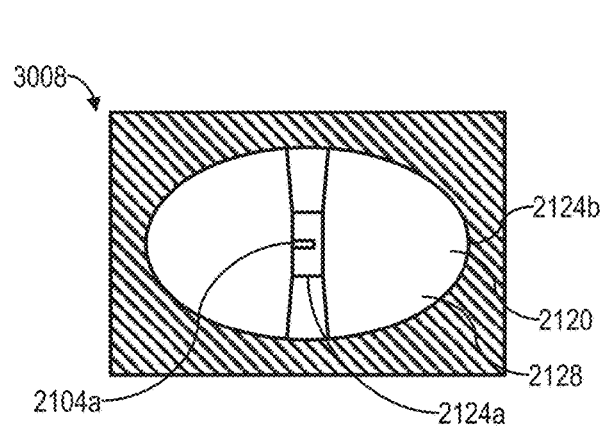
FIG. 27A is a cross-sectional view of the single-ended waveguide probe antenna shown in FIG. 26, taken along the line 55-55' and in the direction of the arrows.
Figure 27B:
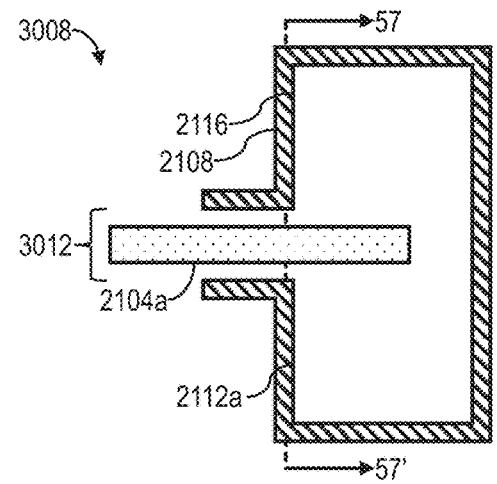
FIG. 27B is another cross-sectional view of the single-ended waveguide probe antenna shown in FIG. 26, taken along the line 56-56' and in the direction of the arrows.
Figure 27C:
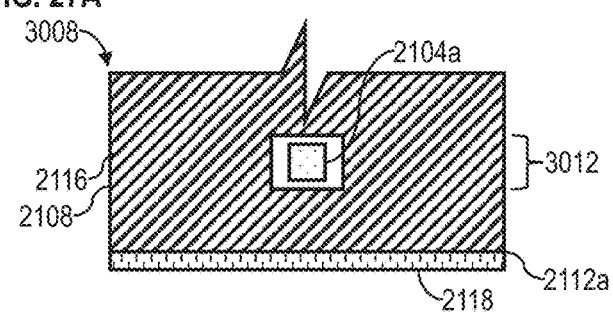
FIG. 27C is a partial cross-sectional view of the single-ended waveguide probe antenna shown in FIG. 27B, taken along the line 57-57' and in the direction of the arrows.
Figure 28:
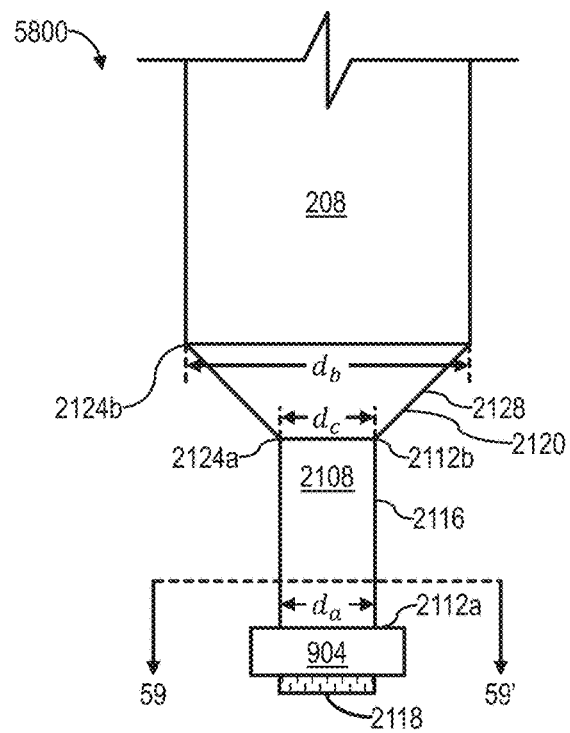
FIG. 28 is a diagrammatic view of an exemplary implementation of a slot antenna constructed in accordance with the present disclosure.
Figure 29A:
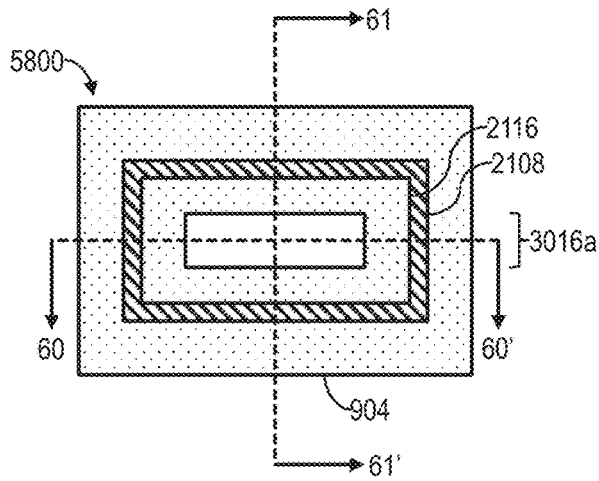
FIG. 29A is a cross-sectional view of the slot antenna shown in FIG. 28, taken along the line 59-59' and in the direction of the arrows.
Figure 29B:
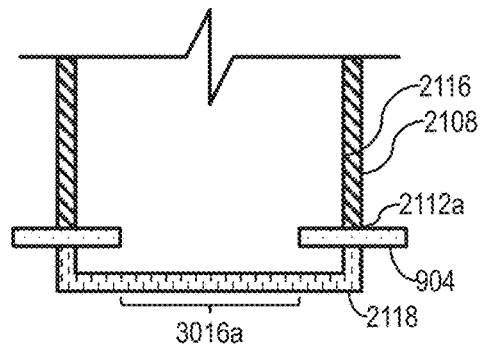
FIG. 29B is a partial cross-sectional view of the slot antenna shown in FIG. 29A, taken along the line 60-60' and in the direction of the arrows.
Figure 29C:
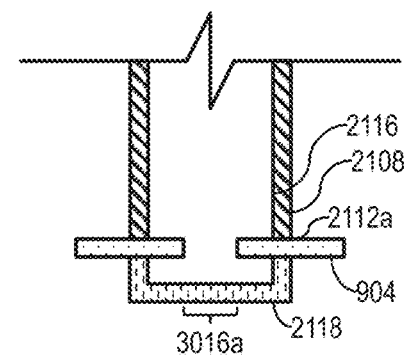
FIG. 29C is another partial cross-sectional view of the slot antenna shown in FIG. 29A, taken along the line 61-61' and in the direction of the arrows.
Figure 30A:
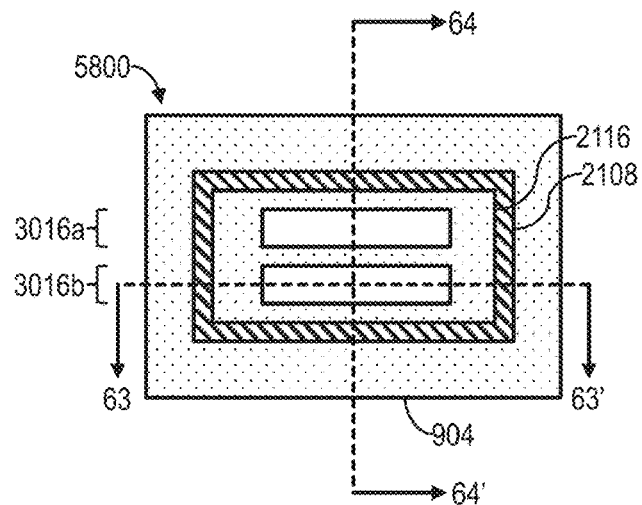
FIG. 30A is a cross-sectional view of another implementation of the slot antenna shown in FIG. 28, taken along the line 59-59' and in the direction of the arrows, wherein the slot antenna is a double slot antenna.
Figure 30B:
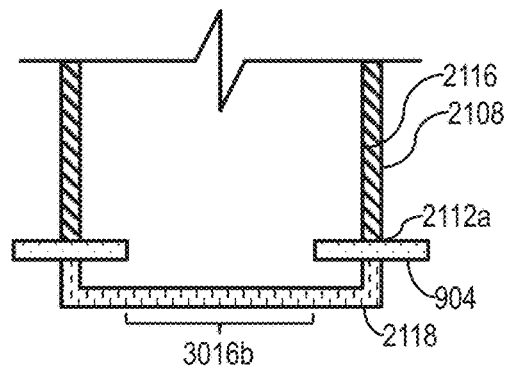
FIG. 30B is a partial cross-sectional view of the slot antenna shown in FIG. 30A, taken along the line 63-63' and in the direction of the arrows.
Figure 30C:
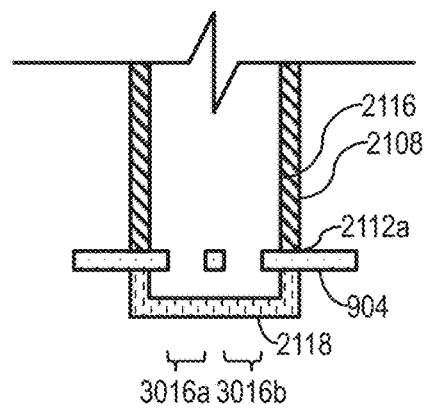
FIG. 30C is another partial cross-sectional view of the slot antenna shown in FIG. 30A, taken along the line 64-64' and in the direction of the arrows.

Referring now to FIG. 25, shown therein is an exemplary implementation of a differential microstrip patch antenna 3000 constructed in accordance with the present disclosure. The differential microstrip patch antenna 3000 is configured to generate and transmit the transmission signal in the electromagnetic wave form—and, conversely, receive the transmission signal in the electromagnetic wave form—and comprises a pair of microstrip patch antennas including a first microstrip patch antenna 3004a and a second microstrip patch antenna 3004b (collectively, the "microstrip patch antennas 3004") spaced a distance $d_f$ from the first microstrip patch antenna 3004a.

In some implementations, the differential microstrip patch antenna 3000 may further comprise the horn 2120 having the first end 2124a proximal to the microstrip patch antennas 3004, the second end 2124b distal to the microstrip patch antennas 3004, and the curved surface 2128 extending between the ends 2124. The curved surface 2028 at the first end 2124a may have the diameter $d_c$, and the curved surface 2028 at the second end 2124b may have the diameter $d_b$ greater than the diameter $d_c$.

In some implementations, each of the microstrip patch antennas 3004 may be fed with the transmission signal at an equal strength and/or an opposite phase. That is, the microstrip patch antennas 3004 may be configured to receive the transmission signal as a differential signal having a first complementary signal and a second complementary signal and generate and transmit the transmission signal in the electromagnetic wave form. Conversely, the microstrip patch antennas 3004 may be further configured to receive the transmission signal and provide the transmission signal as a differential signal having a first complementary signal and a second complementary signal.

The differential waveguide probe antenna 2100, the differential tapered antenna 2600, and the differential microstrip patch antenna 3000 are configured to generate the transmission signal in a linearly polarized form.

Referring now to FIGS. 26 and 27A-27C, shown therein is a diagrammatic view of an exemplary implementation of a single-ended waveguide probe antenna 3008 constructed in accordance with the present disclosure. In some implementations, the single-ended waveguide probe antenna 3008 may lack the second waveguide probe 2104b, thereby only comprising the first waveguide probe 2104a. Further, in some implementations, the surface 2116 of the intermediary waveguide 2108 may define an opening 3012 through which the first waveguide probe 2104a extends. As referenced above, in some implementations, the first end 2112a of the intermediary waveguide 2108 may serve as a back reflector.

Referring now to FIGS. 28, 29A-29C, and 30A-30C, shown therein are diagrammatic views of exemplary implementations of a slot antenna 5800 constructed in accordance with the present disclosure. As shown in FIGS. 28, 29A-29C, and 30A-30C, the slot antenna 5800 may include the ground plane 904 disposed between the intermediary waveguide 2108 and the back reflectors 2118. In some implementations, the ground plane 904 may define one or more slots 3016 (e.g., a first slot 3016a shown in FIGS. 28 and 29A-C and a second slot 3016b shown in FIGS. 30A-30C) (hereinafter, the "slots 3016").

Figure 31:
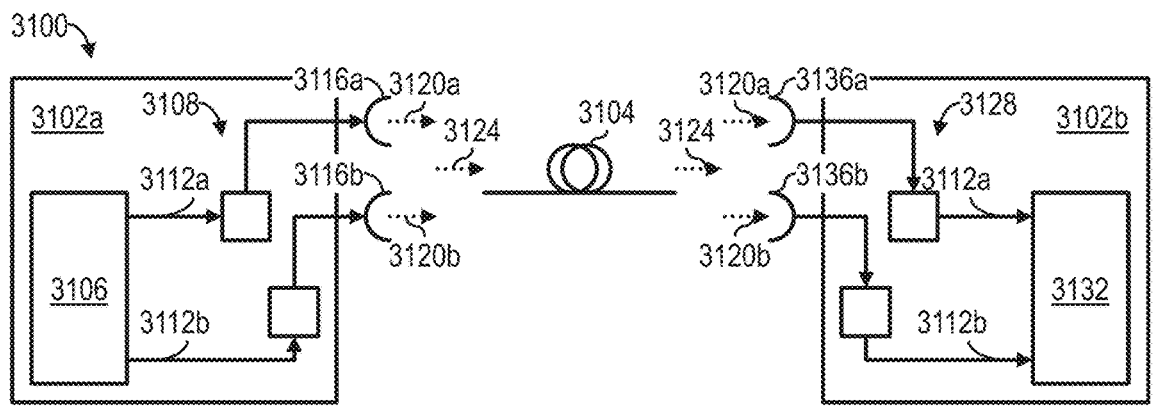
FIG. 31 is a diagrammatic view of another exemplary implementation of a transport network constructed in accordance with the present disclosure.

Referring now to FIG. 31, shown therein is a diagrammatic view of an exemplary implementation of a transport network 3100 (hereinafter, the "network 3100") constructed in accordance with the present disclosure. The network 3100 generally comprises a first network element 3102a, a second network element 3102b, and a hollow waveguide 3104 communicatively coupled to the first network element 3102a and the second network element 3102b.

While the network 3100 is described herein as comprising the first network element 3102a transmitting signals and the second network element 3102b receiving such signals, it should be understood that the network 3100 may be bidirectional; that is, the network 3100 may further comprise the second network element 3102b transmitting signals and the first network element 3102a receiving such signals. Accordingly, in some such implementations, the hollow waveguide 3104 may be bidirectional (i.e., configured to simultaneously propagate signals in both directions); however, in other such implementations, the hollow waveguide 3104 comprises a first hollow waveguide (not shown) configured to propagate signals in a first direction (e.g., from the first network element 3102a to the second network element 3102b), and a second hollow waveguide (not shown) configured to propagate signals in a second direction opposite the first direction (e.g., from the second network element 3102b to the first network element 3102a).

The first network element 3102a generally comprises one or more transmitter 3106 (hereinafter, the "transmitter 3106" or, collectively, the "transmitters 3106") and a transmitter antenna array 3108. The transmitter 3106 may include transmitter circuitry configured to generate a plurality of channel signals 3112, such as a first channel signal 3112a and a second channel signal 3112b shown in FIG. 30. The transmitter antenna array 3108 may comprise a plurality of transmitter antennas 3116, such as a first transmitter antenna 3116a and a second transmitter antenna 3116b shown in FIG. 30.

The channel signals 3112 may have input data encoded with a modulation format and a carrier frequency in a range between 300 GHz and 10 THz. That is, the first channel signal 3112a and the second channel signal 3112b may have first input data encoded with a first modulation format and a first carrier frequency in the range between 300 GHz and 10 THz. The first channel signal 3112a and the second channel signal 3112b are preferably identical signals carrying the same data with the same modulation format and at a same frequency, with the exception that the first channel signal 3112a and second channel signal 3112b may be phase shifted relative to one another to change a polarization angle of an electromagnetic wave generated by the transmitter antenna array 3108 as discussed below. The second channel signal 3112b may have second input data (e.g., the same as the first input data) encoded with a second modulation format and a second carrier frequency in the range between 300 GHz and 10 THz.

Each of the modulation formats described herein may be selected from a group consisting of: intensity-modulation (IM)/direct-detection (DD) (IM/DD); non-return-to-zero modulation (NRZ); pulse-amplitude-modulation-n (PAMn); IM-PAMn; m-quadrature-amplitude-modulation (mQAM); and single-sideband modulation (SSB). In implementations wherein one or more of the modulation formats is PAMn or IM-PAMn, n may be a power of 2 (e.g., 2, 4, 8, 16, 32, 64, etc.). Similarly, in implementations wherein one or more of the modulation formats is mQAM, m may be a power of 2 greater than or equal to 4 (e.g., 4, 8, 16, 32, 64, etc.).

In some implementations, the first modulation format and the second modulation format are the same modulation format. In some implementations, the first carrier frequency and the second carrier frequency have the same carrier frequency in the range between 300 GHz and 10 THz.

The first transmitter antenna 3116a and the second transmitter antenna 3116b of the transmitter antenna array 3108 may be configured to receive the channel signals 3112 and transmit a plurality of wireless signals 3120, such as a first wireless signal 3120a and a second wireless signal 3120b shown in FIG. 30. That is, the first transmitter antenna 3116a may be configured to receive the first channel signal 3112a having the first input data encoded with the first modulation format and the first carrier frequency and transmit the first wireless signal 3120a having the first input data encoded with the first modulation format and the first carrier frequency, while the second transmitter antenna 3116b may be configured to receive the second channel signal 3112b having the second input data encoded with the second modulation format and the second carrier frequency and transmit a second wireless signal 3120b having the second input data encoded with the second modulation format and the second carrier frequency.

The first transmitter antenna 3116a may be configured to induce a first circular polarization into the first wireless signal 3120a. In some implementations, the first circular polarization is a left-hand circular polarization (LHCP). However, in other implementations, the first circular polarization may be a right-hand circular polarization (RHCP). Similarly, the second transmitter antenna 3116b may be configured to induce a second circular polarization into the second wireless signal 3120b, wherein the second circular polarization is orthogonal to the first circular polarization. Thus, in implementations where the first circular polarization is an LHCP, the second circular polarization is an RHCP. However, in implementations in which the first circular polarization is an RHCP, the second circular polarization is an LHCP.

The first transmitter antenna 3116a and the second transmitter antenna 3116b are positioned adjacent to each other such that the first wireless signal 3120a and the second wireless signal 3120b interact to form a linearly polarized wireless signal 3124 having a linear polarization. In some implementations, the linear polarization is a horizontal linear polarization (HLP). In other implementations, the linear polarization is a vertical linear polarization (VLP). Persons having ordinary skill in the art will understand that an HLP or a VLP may have a polarization angle such that the polarization is not perfectly horizontal nor perfectly vertical.

It should be understood that a circular polarization is generally composed of linear polarizations with a 90° phase shift, as shown in Equations (1) and (2) below:

$$E_{LHCP} = \frac{1}{\sqrt{2}}(E_x - jE_y) \quad (1)$$

$$E_{RHCP} = \frac{1}{\sqrt{2}}(E_x + jE_y) \quad (2)$$

Combining the two orthogonal circular polarizations results in a first linear polarization—an HLP in this example—as shown in Equation (3) below:

$$E_{LHCP} + E_{RHCP} = \frac{1}{\sqrt{2}}(E_x - jE_y) + \frac{1}{\sqrt{2}}(E_x + jE_y) \quad (3)$$

$$E_{LHCP} + E_{RHCP} = \frac{1}{\sqrt{2}}E_x - \frac{1}{\sqrt{2}}jE_y + \frac{1}{\sqrt{2}}E_x + \frac{1}{\sqrt{2}}jE_y$$

$$E_{LHCP} + E_{RHCP} = \frac{2}{\sqrt{2}}E_x$$

$$E_{LHCP} + E_{RHCP} = \sqrt{2}E_x$$

Due to the law of conservation of energy, the canceled j terms (i.e., $-jE_y$ and $jE_y$) do not result in a loss of energy. Forming the linearly polarized wireless signal 3124 from multiple circularly polarized wireless signals provides high broadband polarization diversity, perhaps due to the polarization non-idealities of each individual antenna being canceled out during the operation.

Further, combining the two orthogonal circular polarizations after applying a phase shift of 180° to the one of the circular polarizations—the RHCP in this example—results in a second linear polarization orthogonal to the first linear polarization—a VLP in this example—as shown in Equation (4) below:

$$E_{LHCP} + E_{RHCP\angle 180°} = \frac{1}{\sqrt{2}}(E_x - jE_y) + \frac{1}{\sqrt{2}}(-E_x - jE_y) \quad (4)$$

$$E_{LHCP} + E_{RHCP} = \frac{1}{\sqrt{2}}E_x - \frac{1}{\sqrt{2}}jE_y - \frac{1}{\sqrt{2}}E_x - \frac{1}{\sqrt{2}}jE_y$$

$$E_{LHCP} + E_{RHCP} = -\frac{2}{\sqrt{2}}E_y$$

$$E_{LHCP} + E_{RHCP} = -\sqrt{2}E_y$$

However, applying a phase shift of 180° to the one of the circular polarizations as such may result in a decrease in the quality of the excited field.

Alternatively, combining the two orthogonal circular polarizations after applying a physical phase shift of 90° to each of the circular polarizations—such as by physically rotating the first transmitter antenna 3116a and the second transmitter antenna 3116b—results in a third linear polarization orthogonal to the first linear polarization—a VLP in this example—as shown in Equation (5) below:

$$E_{LHCP\angle 90°} + E_{RHCP\angle 90°} = \frac{1}{\sqrt{2}}(E_y + jE_x) + \frac{1}{\sqrt{2}}(E_y - jE_x) \quad (5)$$

$$E_{LHCP} + E_{RHCP} = \frac{1}{\sqrt{2}}E_y + \frac{1}{\sqrt{2}}jE_x + \frac{1}{\sqrt{2}}E_y - \frac{1}{\sqrt{2}}jE_x$$

$$E_{LHCP} + E_{RHCP} = \frac{2}{\sqrt{2}}E_y$$

$$E_{LHCP} + E_{RHCP} = \sqrt{2}E_y$$

Finally, it will be understood by persons having ordinary skill in the art that applying a phase shift to each of the circular polarizations in a range between 0° and 180° may result in the polarization having a polarization angle such that the polarization is not perfectly horizontal nor perfectly vertical.

The second network element 3102b generally comprises a receiver antenna array 3128 and one or more receiver 3132 (hereinafter, the "receiver 3132" or, collectively, the "receivers 3132"). The receiver antenna array 3128 may comprise a plurality of receiver antennas 3136, such as a first receiver antenna 3136a and a second receiver antenna 3136b shown in FIG. 30. The receiver 3132 may include receiver circuitry configured to extract the input data from the channel signals 3112. That is, the receiver circuitry may be configured to extract the first input data from the first channel signal 3112a and the second input data from the second channel signal 3112b, which as discussed above is preferably the same input data.

The first receiver antenna 3136a and the second receiver antenna 3136b of the receiver antenna array 3128 may be configured to receive the wireless signals 3120 and generate the channel signals 3112. That is, the first receiver antenna 3136a may be configured to receive the first wireless signal 3120a having the first input data encoded with the first modulation format and the first carrier frequency and generate the first channel signal 3112a having the first input data encoded with the first modulation format and the first carrier frequency, while the second receiver antenna 3136b may be configured to receive the second wireless signal 3120b having the second input data encoded with the second modulation format and the second carrier frequency and generate the second channel signal 3112b having the second input data encoded with the second modulation format and the second carrier frequency.

The first receiver antenna 3136a may be configured to receive wireless signals having the first circular polarization. Similarly, the second receiver antenna 3136b may be configured to receive wireless signals having the second circular polarization.

Figures 32A, 32B:
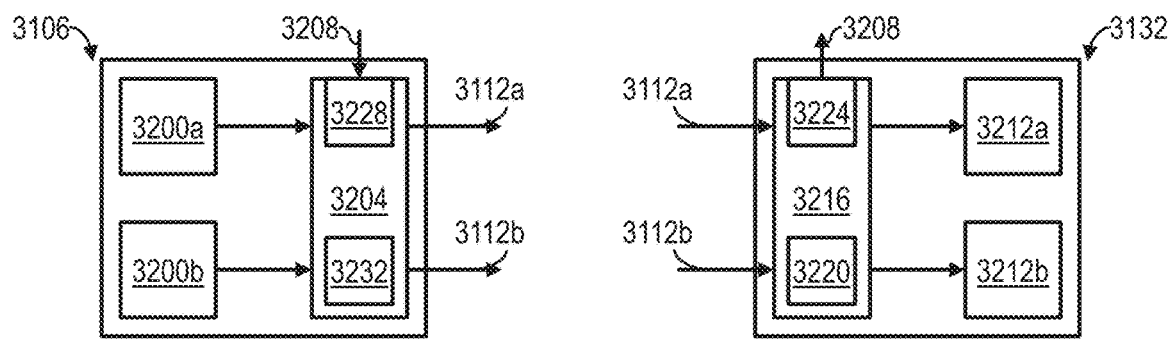
FIG. 32A is a diagrammatic view of an exemplary implementation of a transmitter shown in FIG. 31.
FIG. 32B is a diagrammatic view of an exemplary implementation of a receiver shown in FIG. 31.

Referring now to FIG. 32A, shown therein is a diagrammatic view of an exemplary implementation of the transmitter 3106 shown in FIG. 31. As described above, the transmitter 3106 may include transmitter circuitry configured to generate the channel signals 3112, such as the first channel signal 3112a and the second channel signal 3112b shown in FIG. 32A. Accordingly, the transmitter 3106 may comprise a plurality of channel signal generators 3200 configured to generate the channel signals 3112, such as a first channel signal generator 3200a configured to generate the first channel signal 3112a and a second channel signal generator 3200b configured to generate the second channel signal 3112b shown in FIG. 32A.

Misalignment of the transmitter antenna array 3108 with the receiver antenna array 3128 greater than a certain amount (e.g., 3.2°) may cause a decrease in power in the intended polarization by $\cos(\theta)^2$ and an increase in power in an unintended polarization by $\sin(\theta)^2$, where theta is the misalignment angle thereby causing a decrease in polarization diversity. To address this challenge, in some implementations, the transmitter 3106 may further comprise a phase-shift circuit 3204 configured to induce a phase shift in the first channel signal 3112a relative to the second channel signal 3112b to induce a polarization angle in the linearly polarized wireless signal 3124. As shown in FIG. 31, in such implementations, the phase-shift circuit 3204 may be further configured to receive a polarization signal 3208 and induce the phase shift in the first channel signal 3112a relative to the second channel signal 3112b based at least in part upon the polarization signal 3208. Inducing the phase shift in the first channel signal 3112a relative to the second channel signal 3112b based at least in part upon the polarization signal 3208 may have the effect of aligning the transmitter antenna array 3108 of the first network element 3102a with the receiver antenna array 3128 of the second network element 3102b so as to maximize received power at the receiver 3132.

Referring now to FIG. 32B, shown therein is a diagrammatic view of an exemplary implementation of the receiver 3132 shown in FIG. 31. As described above, the receiver circuitry may be configured to extract the first input data from the first channel signal 3112a and the second input data from the second channel signal 3112b. Accordingly, the receiver 3132 may comprise a plurality of channel signal generators 3212 configured to generate the channel signals 3112, such as a first channel signal generator 3212a configured to generate the first channel signal 3112a and a second channel signal generator 3212b configured to generate the second channel signal 3112b shown in FIG. 32B.

As described above, misalignment of the transmitter antenna array 3108 with the receiver antenna array 3128 greater than a certain amount (e.g., 3.2°) may cause a decrease in power in the intended polarization by $\cos(\theta)^2$ and an increase in power in an unintended polarization by $\sin(\theta)^2$, thereby causing a decrease in polarization diversity. To address this challenge, in some implementations, the receiver 3132 may further comprise aa polarization signal generator 3216 configured to generate the polarization signal 3208 based on a polarization angle between the first channel signal 3112a and the second channel signal 3112b. The polarization signal generator 3216 may include power measurement circuitry for measuring the power of the first channel signal 3112a and the second channel signal 3112b.

To calibrate the polarization angle induced by the phase-shift circuit 3204, a series of first channel signals 3112a and second channel signals 3112b having known phase shifts relative to one another can be supplied to the transmitter antenna array 3108 and subsequently received by the receiver antenna array 3128. The first channel signals 3112a and the second channel signals 3112b are received by the receiver 3132 and the power, for example, is analyzed by the polarization signal generator 3216 to generate the polarization signals 3208. The polarization signal generator 3216 may include a receiver processor 3220 executing logic operable to search for the strongest signal and use this information regarding the strongest signal to generate the polarization signals 3208 and a receiver communication unit 3224 that transmits the polarization signals 3208 to the phase-shift circuit 3204, which may include a transmitter communication unit 3228 that receives the polarization signals 3208 from the polarization signal generator 3216. The polarization signals 3208 are correlated with particular ones of the first channel signals 3112a and the second channel signals 3112b having the known phase shifts and may be indicative of the power received by receiver 3132. The phase-shift circuit 3204 may include a transmitter processor 3232 executing logic operable to analyze the polarization signals 3208 and select the phase shift for the first channel signal 3112a and the second channel signal 3112b that delivers the most power to the receiver 3132. Then, the selected phase shift is used by the phase-shift circuit 3204 thereafter for forming the first channel signal 3112a and the second channel signal 3112b. This calibration procedure can be accomplished on a periodic basis, such as hourly, daily, and/or the like.

Figure 33:
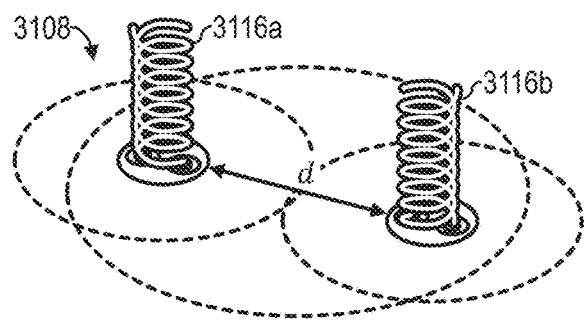
FIG. 33 is a diagrammatic view of an exemplary implementation of an antenna array shown in FIG. 31.

Referring now to FIG. 33, shown therein is a diagrammatic view of an exemplary implementation of the transmitter antenna array 3108 shown in FIG. 31. It should be understood that the receiver antenna array 3128 may be similar in construction and function to the transmitter antenna array 3108, except that the receiver antennas 3136 of the receiver antenna array 3128 may be wound in in an opposite direction to their respective counterparts (i.e., the transmitter antennas 3116) of the transmitter antenna array 3108.

As described above, the transmitter antenna array 3108 may comprise the transmitter antennas 3116, which may include the first transmitter antenna 3116a and the second transmitter antenna 3116b shown in FIG. 33. The transmitter antennas 3116 of the transmitter antenna array 3108 are shown in FIG. 33 as being arranged in a 1×2 grid pattern.

In some implementations, a distance d between the first transmitter antenna 3116a and the second transmitter antenna 3116b may be equal to 1.5 times the wavelength λ. However, in other implementations, the distance d between the first transmitter antenna 3116a and the second transmitter antenna 3116b may be a number greater than or less than 1.5 times the wavelength λ. For example, in some implementations, the distance d between the first transmitter antenna 3116a and the second transmitter antenna 3116b may be less than the wavelength λ. However, in other implementations, the distance d between the first transmitter antenna 3116a and the second transmitter antenna 3116b may be a multiple of the wavelength λ.

Figure 34:
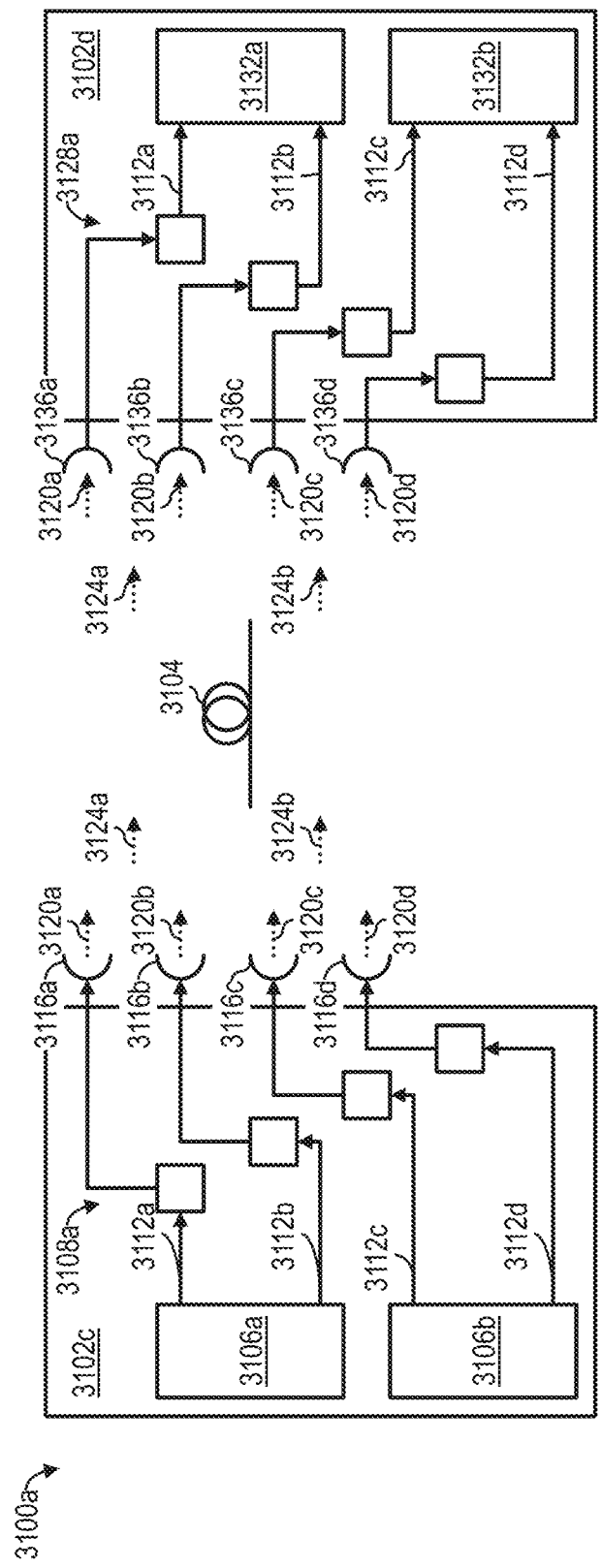
FIG. 34 is a diagrammatic view of another exemplary implementation of the transport network constructed in accordance with the present disclosure.

Referring now to FIG. 34, shown therein is a diagrammatic view of another exemplary implementation of a transport network 3100a (hereinafter, the "network 3100a") constructed in accordance with the present disclosure. The network 3100a generally comprises a third network element 3102c, a fourth network element 3102d, and the hollow waveguide 3104 communicatively coupled to the third network element 3102c and the fourth network element 3102d.

Unlike the first network element 3102a shown in FIG. 31, the third network element 3102c generally comprises a plurality of the transmitters 3106, such as a first transmitter 3106a and a second transmitter 3106b shown in FIG. 34, and a transmitter antenna array 3108a. Similarly, unlike the second network element 3102b shown in FIG. 31, the fourth network element 3102d generally comprises a receiver antenna array 3128a and a plurality of the receivers 3132, such as a first receiver 3132a and a second receiver 3132b shown in FIG. 34.

The transmitter antenna array 3108a may be similar to the transmitter antenna array 3108 shown in FIG. 31, except that the first transmitter antenna 3116a and the second transmitter antenna 3116b form a first transmitter antenna pair, and the transmitter antenna array 3108a further comprises a third transmitter antenna 3116c and a fourth transmitter antenna 3116d forming a second transmitter antenna pair. While the transmitter antenna array 3108a is described herein as comprising four of the transmitter antennas 3116, it should be understood that the transmitter antenna array 3108a may comprise a number of the transmitter antennas 3116 greater or less than four.

The first transmitter 3106a may be similar to the transmitter 3106 shown in FIG. 31, while the second transmitter 3106b may be similar to the transmitter 3106 shown in FIG. 30 except that the channel signals 3112 transmitted by the second transmitter 3106b may include the third channel signal 3112c and the fourth channel signal 3112d.

As described above, the channel signals 3112 may have the input data encoded with a particular modulation format and a particular carrier frequency in the range between 300 GHz and 10 THz. That is, as described above, the first channel signal 3112a may have the first input data encoded with the first modulation format and the first carrier frequency in the range between 300 GHz and 10 THz, and the second channel signal 3112b may have the second input data encoded with the second modulation format and the second carrier frequency in the range between 300 GHz and 10 THz. Similarly, the third channel signal 3112c may have third input data encoded with a third modulation format and a third carrier frequency in the range between 300 GHz and 10 THz, and the fourth channel signal 3112d may have fourth input data encoded with a fourth modulation format and a fourth carrier frequency in the range between 300 GHz and 10 THz.

In some implementations, two or more of the first modulation format, the second modulation format, the third modulation format, and the fourth modulation format are the same modulation format. For example, the first modulation format and the second modulation format can be the same modulation format. Further, the third modulation format and the fourth modulation format can be the same modulation format.

In some implementations, two or more of the first carrier frequency, the second carrier frequency, the third carrier frequency, and the fourth carrier frequency are the same carrier frequency in the range between 300 GHz and 10 THz. For example, the first carrier frequency and the second carrier frequency may be the same carrier frequency; and the third carrier frequency and the fourth carrier frequency may be the same carrier frequency. In some implementations, two or more of the first carrier frequency and the second carrier frequency may be different from the third carrier frequency, and the fourth carrier frequency.

As described above, the transmitter antennas 3116 of the transmitter antenna array 3108a may be configured to receive the channel signals 3112 and transmit the wireless signals 3120, such as the first wireless signal 3120a and the second wireless signal 3120b, as well as a third wireless signal 3120c and a fourth wireless signal 3120d, shown in FIG. 34. That is, the third transmitter antenna 3116c may be configured to receive the third channel signal 3112c having the third input data encoded with the third modulation format and the third carrier frequency and transmit the third wireless signal 3120c having the third input data encoded with the third modulation format and the third carrier frequency, and the fourth transmitter antenna 3116d may be configured to receive the fourth channel signal 3112d having the fourth input data encoded with the fourth modulation format and the fourth carrier frequency and transmit the fourth wireless signal 3120d having the fourth input data encoded with the fourth modulation format and the fourth carrier frequency.

As described above, the first transmitter antenna 3116a may be configured to induce the first circular polarization into the first wireless signal 3120a, and the second transmitter antenna 3116b may be configured to induce the second circular polarization into the second wireless signal 3120b, wherein the second circular polarization is orthogonal to the first circular polarization. Similarly, the third transmitter antenna 3116c may be configured to induce a third circular polarization into the third wireless signal 3120c, and the fourth transmitter antenna 3116d may be configured to induce a fourth circular polarization into the fourth wireless signal 3120d, wherein the fourth circular polarization is orthogonal to the third circular polarization.

The first wireless signal 3120a and the second wireless signal 3120b may interact to form a first linearly polarized wireless signal 3124a having the first linear polarization. Similarly, the third wireless signal 3120c and the fourth wireless signal 3120d may interact to form a second linearly polarized wireless signal 3124b having a second linear polarization, wherein the second linear polarization is orthogonal to the first linear polarization. The first linearly polarized wireless signal 3124a may be similar to the linearly polarized wireless signal 3124 shown in FIG. 30. Similarly, the second linearly polarized wireless signal 3124b may be similar to the linearly polarized wireless signal 3124 shown in FIG. 31.

In some implementations, the first linearly polarized wireless signal 3124a has a first polarization angle, and the second linearly polarized wireless signal 3124b has a second polarization angle, wherein the first polarization and angle and the second polarization angle are offset by a number of degrees within a range between 86.8° and 93.2°.

The receiver antenna array 3128a may be similar to the receiver antenna array 3128 shown in FIG. 31, except that the first receiver antenna 3136a and the second receiver antenna 3136b form a first receiver antenna pair, and the receiver antenna array 3128a further comprises a third receiver antenna 3136c and a fourth receiver antenna 3136d forming a second receiver antenna pair. While the receiver antenna array 3128a is described herein as comprising four of the receiver antennas 3136, it should be understood that the receiver antenna array 3128a may comprise an even number of the receiver antennas 3136 greater or less than four.

The first receiver 3132a may be similar to the receiver 3132 shown in FIG. 31, while the second receiver 3132b may be similar to the receiver 3132 shown in FIG. 30 except that the channel signals 3112 received by the second receiver 3132b may include the third channel signal 3112c and the fourth channel signal 3112d.

As described above, the receiver antennas 3136 of the receiver antenna array 3128a may be configured to receive the wireless signals 3120 and generate the channel signals 3112. That is, the third receiver antenna 3136c may be configured to receive the third wireless signal 3120c having the third input data encoded with the third modulation format and a third carrier frequency and generate the third channel signal 3112c having the third input data encoded with the third modulation format and the third carrier frequency, and the fourth receiver antenna 3136d may be configured to receive the fourth wireless signal 3120d having the fourth input data encoded with the fourth modulation format and the fourth carrier frequency and generate the fourth channel signal 3112d having the fourth input data encoded with the fourth modulation format and the fourth carrier frequency.

As described above, the first receiver antenna 3136a may be configured to receive the first wireless signal 3120a having the first input data encoded with the first modulation format and the first carrier frequency and generate the first channel signal 3112a having the first input data encoded with the first modulation format and the first carrier frequency, while the second receiver antenna 3136b may be configured to receive the second wireless signal 3120b having the second input data encoded with the second modulation format and the second carrier frequency and generate the second channel signal 3112b having the second input data encoded with the second modulation format and the second carrier frequency. Similarly, the third receiver antenna 3136c may be configured to receive the third wireless signal 3120c having the third input data encoded with the third modulation format and the third carrier frequency and generate the third channel signal 3112c having the third input data encoded with the third modulation format and the third carrier frequency, while the fourth receiver antenna 3136d may be configured to receive the fourth wireless signal 3120d having the fourth input data encoded with the fourth modulation format and the fourth carrier frequency and generate the fourth channel signal 3112d having the fourth input data encoded with the fourth modulation format and the fourth carrier frequency.

Figure 35A:
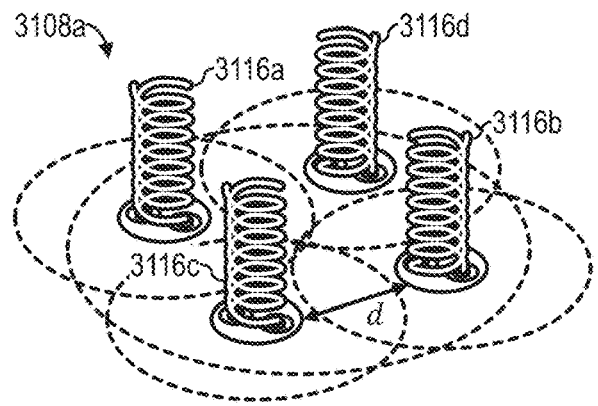
FIG. 35A is a diagrammatic view of an exemplary implementation of the antenna array shown in FIG. 34, wherein a first antenna, a second antenna, a third antenna, and a fourth antenna are arranged in an n×m grid pattern.

Referring now to FIG. 35A, shown therein is a diagrammatic view of an exemplary implementation of the transmitter antenna array 3108a shown in FIG. 34. It should be understood that the receiver antenna array 3128a may be similar to the transmitter antenna array 3108a including the receiver antennas 3136 being would in the same direction as the transmitter antennas 3116. In some implementations, the receiver antennas 3136 of the receiver antenna array 3128a may be wound in an opposite direction to their respective counterparts (i.e., the transmitter antennas 3116) of the transmitter antenna array 3108a.

As described above, the transmitter antenna array 3108a may comprise the transmitter antennas 3116, which may include the first transmitter antenna 3116a, the second transmitter antenna 3116b, the third transmitter antenna 3116c, and the fourth transmitter antenna 3116d shown in FIG. 35A. The transmitter antennas 3116 of the transmitter antenna array 3108a are shown in FIG. 35A as being arranged in an n×m grid pattern, where n and m are both equal to two. While the transmitter antennas 3116 of the transmitter antenna array 3108a shown in FIG. 35A are arranged in a 2×2 grid pattern, it should be understood that the transmitter antennas 3116 of the transmitter antenna array 3108a may be arranged in any n×m grid pattern wherein n and m are both a multiple of two. In some implementations, a distance d between each of the transmitter antennas 3116 and the nearest neighbor of such transmitter antenna 3116 may be equal to 1.5λ. However, in other implementations, the distance d between each of the transmitter antennas 3116 and the nearest neighbor of such transmitter antenna 3116 may be a number greater than or less than 1.5λ.

Figure 35B:
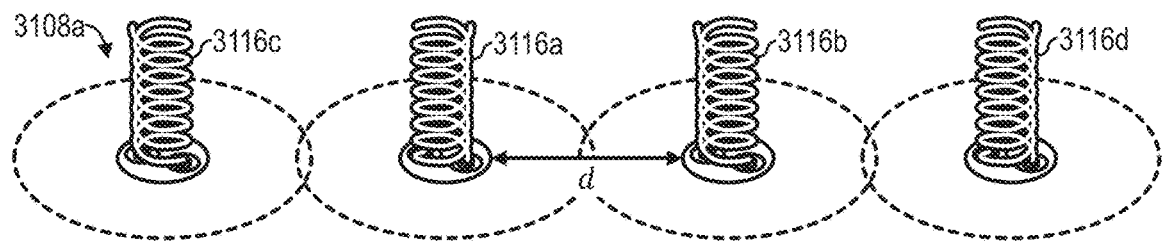
FIG. 35B is a diagrammatic view of another exemplary implementation of the antenna array shown in FIG. 34, wherein the first antenna, the second antenna, the third antenna, and the fourth antenna are arranged in a 1×m grid pattern.

Referring now to FIG. 35B, shown therein is a diagrammatic view of another exemplary implementation of the transmitter antenna array 3108a shown in FIG. 34. However, it should be understood that the receiver antenna array 3128a may be similar to the transmitter antenna array 3108a including the receiver antennas 3136 being would in the same direction as the transmitter antennas 3116. In some implementations, he receiver antennas 3136 of the receiver antenna array 3128a may be wound in in an opposite direction to their respective counterparts (i.e., the transmitter antennas 3116) of the transmitter antenna array 3108a.

As described above, the transmitter antenna array 3108a may comprise the transmitter antennas 3116, which may include the first transmitter antenna 3116a, the second transmitter antenna 3116b, the third transmitter antenna 3116c, and the fourth transmitter antenna 3116d shown in FIG. 35B. The transmitter antennas 3116 of the transmitter antenna array 3108a are shown in FIG. 35B as being arranged in 1×m grid pattern. While the transmitter antennas 3116 of the transmitter antenna array 3108a shown in FIG. 35B are arranged in a 1×4 grid pattern, it should be understood that the transmitter antennas 3116 of the transmitter antenna array 3108a may be arranged in any 1×m grid pattern wherein m is a multiple of four.

As described above, in some implementations, a distance d between each of the transmitter antennas 3116 and the nearest neighbor of such transmitter antenna 3116 may be equal to 1.5 times the wavelength λ. However, in other implementations, the distance d between each of the transmitter antennas 3116 and the nearest neighbor of such transmitter antenna 3116 may be a number greater than or less than 1.5 times the wavelength λ. For example, in some implementations, the distance d between each of the transmitter antennas 3116 and the nearest neighbor of such transmitter antenna 3116 may be less than the wavelength λ. However, in other implementations, the distance d between each of the transmitter antennas 3116 and the nearest neighbor of such transmitter antenna 3116 may be a multiple of the wavelength λ.

Figure 36:
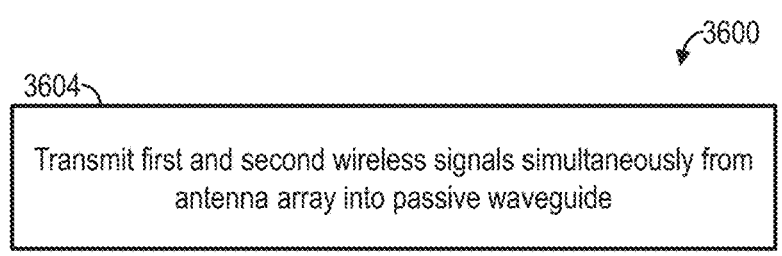
FIG. 36 is a diagrammatic view of a method of using the transport network shown in FIG. 31.

Referring now to FIG. 36, shown therein is a diagrammatic view of an exemplary implementation of a method 3600 of using the network 3100 in accordance with the present disclosure. As shown in FIG. 36, the method 3600 generally comprises the step of: transmitting the first wireless signal 3120a and the second wireless signal 3120b simultaneously from the transmitter antenna array 3108 into the hollow waveguide 3104, the first wireless signal 3120a and the second wireless signal 3120b having the input data (i.e., the first input data and the second input data, respectively) encoded with the modulation format (i.e., the first modulation format and the second modulation format, respectively) and having the carrier frequency (i.e., the first carrier frequency and the second carrier frequency, respectively) in the range between 300 GHz and 10 THz, the first wireless signal 3120a having an LHCP and the second wireless signal 3120b having an RHCP such that the first wireless signal 3120a interacts with the second wireless signal 3120b to form the linearly polarized wireless signal 3124 (step 3604).

In some implementations, the method 3600 further comprises, before the step of transmitting (step 3604): generating the first wireless signal 3120a by applying the first channel signal 3112a to the first transmitter antenna 3116a of the transmitter antenna array 3108; generating the second wireless signal 3120b by applying the second channel signal 3112b to the second transmitter antenna 3116b of the transmitter antenna array 3108; and inducing a phase shift in the first channel signal 3112a relative to the second channel signal 3112b to induce a polarization angle in the linearly polarized wireless signal 3124.

In some such implementations, the method 3600 further comprises receiving the polarization signal 3208, wherein inducing is defined further as inducing the phase shift in the first channel signal 3112a relative to the second channel signal 3112b based at least in part upon the polarization signal 3208.

In some implementations, the transmitter antenna array 3108 is the transmitter antenna array 3108a, the input data is the first input data, the modulation format is the first modulation format, the carrier frequency is the first carrier frequency, and the linearly polarized wireless signal 3124 is the first linearly polarized wireless signal 3124a. In such implementations, the method 3600 may further comprise: transmitting the third wireless signal 3120c and the fourth wireless signal 3120d simultaneously from the transmitter antenna array 3108a into the hollow waveguide 3104, the third wireless signal 3120c having the third input data encoded with the third modulation format and having the third carrier frequency in the range between 300 GHz and 10 THz, and the fourth wireless signal 3120d having the fourth input data encoded with the fourth modulation format and having the fourth carrier frequency in the range between 300 GHz and 10 THz, the third wireless signal 3120c having an LHCP and the fourth wireless signal 3120d having an RHCP such that the third wireless signal 3120c interacts with the fourth wireless signal 3120d to form a second linearly polarized wireless signal 3124b.

In some such implementations, the method 3600 further comprises, before the step of transmitting the third wireless signal 3120c: generating the third wireless signal 3120c by applying the third channel signal 3112c to the third transmitter antenna 3116c of the transmitter antenna array 3108a; generating the fourth wireless signal 3120d by applying the fourth channel signal 3112d to the fourth transmitter antenna 3116d of the transmitter antenna array 3108a; and inducing a phase shift in the third channel signal 3112c relative to the fourth channel signal 3112d to induce a polarization angle in the second linearly polarized wireless signal 3124b.

In some such implementations, the method 3600 further comprises receiving the polarization signal 3208, wherein inducing is defined further as inducing the phase shift in the third channel signal 3112c relative to the fourth channel signal 3112d based at least in part upon the polarization signal 3208.

In some implementations, the first linearly polarized wireless signal 3124a has a first polarization angle and the second linearly polarized wireless signal 3124b has a second polarization angle, and the first polarization angle and the second polarization angle are offset within a range between 86.8° and 93.2°.

In some implementations, the step of transmitting is defined further as: transmitting the first wireless signal 3120a by the first transmitter antenna 3116a; transmitting the second wireless signal 3120b by the second transmitter antenna 3116b; transmitting the third wireless signal 3120c by the third transmitter antenna 3116c; and transmitting the fourth wireless signal 3120d by the fourth transmitter antenna 3116d; wherein the first transmitter antenna 3116a, the second transmitter antenna 3116b, the third transmitter antenna 3116c, and the fourth transmitter antenna 3116d are arranged in an n×m grid pattern where n and m are at least two, as shown in FIG. 35A.

In other implementations, the step of transmitting is defined further as: transmitting the first wireless signal 3120a by the first transmitter antenna 3116a; transmitting the second wireless signal 3120b by the second transmitter antenna 3116b; transmitting the third wireless signal 3120c by the third transmitter antenna 3116c; and transmitting the fourth wireless signal 3120d by the fourth transmitter antenna 3116d; wherein the first transmitter antenna 3116a, the second transmitter antenna 3116b, the third transmitter antenna 3116c, and the fourth transmitter antenna 3116d are arranged in a 1×m grid pattern where m is at least four, as shown in FIG. 35B.

Figure 37A:
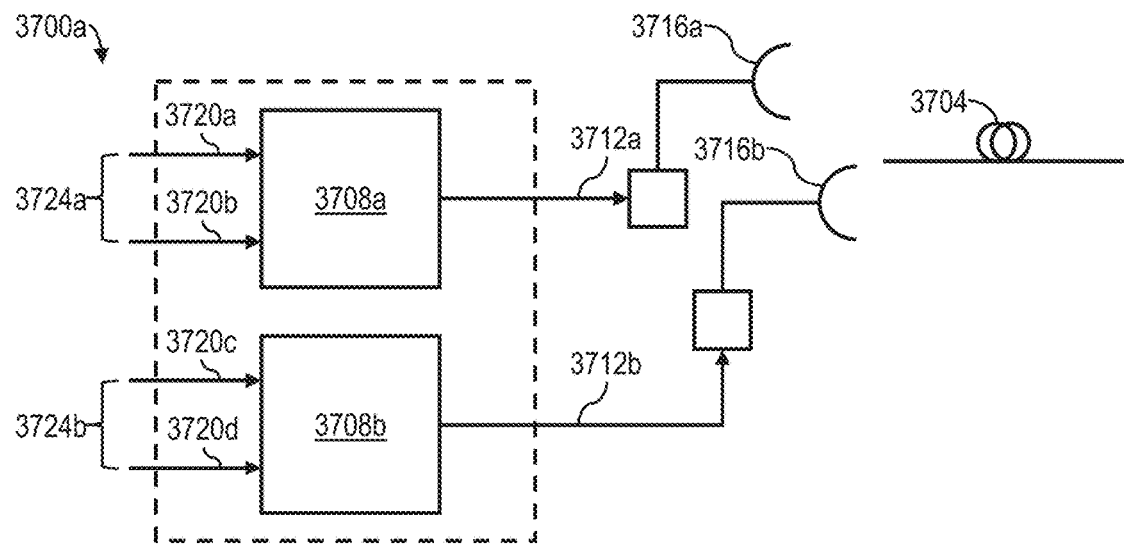
FIG. 37A is a diagrammatic view of an exemplary implementation of a dual-polarization (dual-pol) network element constructed in accordance with the present disclosure.

Referring now to FIG. 37A, shown therein is a diagrammatic view of an exemplary implementation of a dual-polarization (dual-pol) transmitter network element 3700a (hereinafter, the "transmitter network element 3700a") constructed in accordance with the present disclosure. As shown in FIG. 37A, the transmitter network element 3700a may comprise a dual-pol hollow waveguide referred to hereinafter by way of example as a dual-pol hollow waveguide 3704 configured to simultaneously propagate signals having a first polarization and a second polarization different from the first polarization, one or more modulator 3708a-n (e.g., a first modulator 3708a and a second modulator 3708b shown in FIG. 37A) (collectively, the "modulators 3708") configured to generate a first channel signal 3712a and a second channel signal 3712b (collectively, the "channel signals 3712"), and one or more antenna 3716a-n (e.g., a first antenna 3716a and a second antenna 3716b shown in FIG. 37A) (collectively, the "antennas 3716") configured to receive the first channel signal 3712a and the second channel signal 3712b and to couple the first channel signal 3712a into the dual-pol hollow waveguide 3704 with the first polarization and the second channel signal 3712b into the dual-pol hollow waveguide 3704 with the second polarization. The antennas 3716 may be similar to the antennas 900 described above.

Figure 37B:
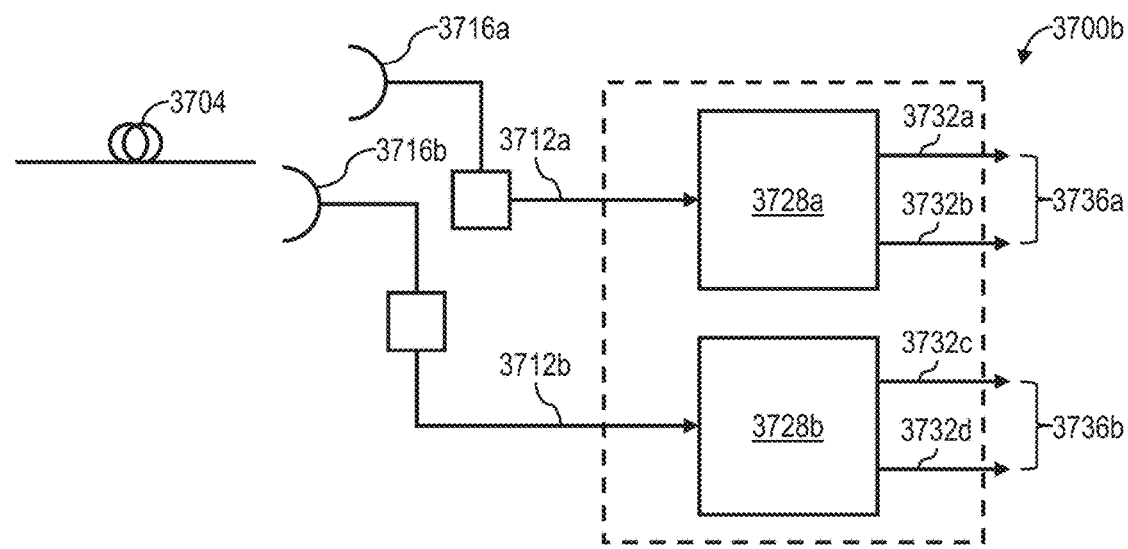
FIG. 37B is a diagrammatic view of another exemplary implementation of a dual-pol network element constructed in accordance with the present disclosure.

The channel signals 3712 are also referred to herein as the "transmitted channel signals 3712" (i.e., the "first transmitted channel signal 3712a" and the "second transmitted channel signal 3712b") when viewed from the perspective of the transmitter network element 3700a and the "received channel signals 3712" (i.e., the "first received channel signal 3712a" and the "second received channel signal 3712b") when viewed from the perspective of the receiver network element 3700b (shown in FIG. 37B). However, it should be understood that the received channel signals 3712 may have the same data and the same RF frequency as the transmitted channel signals 3712, though the received channel signals 3712 may exhibit linear distortions caused by the dual-pol hollow waveguide 3704 and/or the antennas 3716.

In implementations where the antennas 3716 include the first antenna 3716a and the second antenna 3716b, the first antenna 3716a may be configured to apply the first polarization to the first transmitted channel signal 3712a as the first antenna 3716a couples the first transmitted channel signal 3712a into the dual-pol hollow waveguide 3704, and the second antenna 3716b may be configured to apply the second polarization to the second transmitted channel signal 3712b as the second antenna 3716b couples the second transmitted channel signal 3712b into the dual-pol hollow waveguide 3704.

The first transmitted channel signal 3712a may have first data encoded in a first modulation format, and the second transmitted channel signal 3712b may have second data encoded in a second modulation format. In some implementations, the first modulator 3708a may be configured to generate the first transmitted channel signal 3712a and the second modulator 3708b may be configured to generate the second transmitted channel signal 3712b such that the first transmitted channel signal 3712a has a first channel frequency and the second transmitted channel signal 3712b has a second channel frequency, wherein the first channel frequency and the second channel frequency are in a range between 300 GHz and 10 THz. In such implementations, the first modulators 3708 may be described as performing "direct modulation". However, in other implementations, each of the first modulator 3708a and the second modulator 3708b may comprise an intermediate frequency (IF) modulator configured to generate the first transmitted channel signal 3712a and the second transmitted channel signal 3712b, respectively, such that the first transmitted channel signal 3712a has a first intermediate frequency less than the first channel frequency and the second transmitted channel signal 3712b has a second intermediate frequency less than the second channel frequency. In such implementations, each of the first modulator 3708a and the second modulator 3708b may further comprise one or more up-converter (not shown) configured to receive the first transmitted channel signal 3712a and the second transmitted channel signal 3712b, respectively, and up-convert the first transmitted channel signal 3712a and the second transmitted channel signal 3712b such that the first transmitted channel signal 3712a has the first channel frequency and the second transmitted channel signal 3712b has the second channel frequency, wherein the first channel frequency and the second channel frequency are in the range between 300 GHz and 10 THz. In such implementations, the modulators 3708 may be described as performing "IF modulation".

The first modulation format and the second modulation format may be selected from a group consisting of: intensity-modulation (IM)/direct-detection (DD) (IM/DD); non-return-to-zero modulation (NRZ); pulse-amplitude-modulation-n (PAMn); IM-PAMn; m-quadrature-amplitude-modulation (mQAM); single-sideband-modulation (SSB); quadrature-phase-shift-keying (QPSK); and differential-detection QPSK (DQPSK). In some implementations, the first modulation format is the same the second modulation format. However, in other implementations, the first modulation format is different from the second modulation format. In implementations wherein one or more of the first modulation format and the second modulation format is PAMn or IM-PAMn, n may be a power of 2 (e.g., 2, 4, 8, 16, 32, 64, etc.). Similarly, in implementations wherein one or more of the first modulation format and the second modulation format is mQAM, m may be a power of 2 greater than or equal to 4 (e.g., 4, 8, 16, 32, 64, etc.). It should be understood that 4QAM (i.e., mQAM in implementations where m is equal to 4) may be the same as QPSK.

In some implementations, the modulators 3708 may be further configured to receive one or more input signal 3720 (e.g., a first input signal 3720a, a second input signal 3720b, a third input signal 3720c, and a fourth input signal 3720d shown in FIG. 37A) (collectively, the "input signals 3720"). In some such implementations, as shown in FIG. 37A, the first input signal 3720a and the second input signal 3720b may form a first pair of input signals 3724a, and the third input signal 3720c and the fourth input signal 3720d may form a second pair of input signals 3724b. In such implementations, the first pair of input signals 3724a may have the first data encoded in the first modulation format, and the second pair of input signals 3724b may have the second data encoded in the second modulation format. Further, in such implementations, the first input signal 3720a and the third input signal 3720c may be I input signals, and the second input signal 3720b and the fourth input signal 3720d may be Q input signals.

The first polarization may be orthogonal to the second polarization. In some implementations, the first polarization is a left-hand circular polarization (LHCP). In such implementations, the second polarization is a right-hand circular polarization (RHCP). In other implementations, the first polarization is a horizontal linear polarization (HLP). In such implementations, the second polarization is a vertical linear polarization (VLP). Persons having ordinary skill in the art will understand that the HLP and the VLP may have a rotation such that the HLP is not perfectly horizontal and the VLP is not perfectly vertical.

Referring now to FIG. 37B, shown therein is a diagrammatic view of another exemplary implementation of a dual-pol receiver network element 3700b (hereinafter, the "receiver network element 3700b") constructed in accordance with the present disclosure. As shown in FIG. 37B, the receiver network element 3700b may comprise the dual-pol hollow waveguide 3704, the antennas 3716 (e.g., the first antenna 3716a and the second antenna 116b shown in FIG. 37B) configured to receive the first received channel signal 3712a and the second received channel signal 3712b from the dual-pol hollow waveguide 3704, and one or more demodulator 3728a-n (e.g., a first demodulator 3728a and a second demodulator 3728b shown in FIG. 37B) (collectively, the "demodulators 3728") configured to receive the first received channel signal 3712a and the second received channel signal 3712b.

In some implementations, the demodulators 3728 may be further configured to produce one or more output signal 3732 (e.g., a first output signal 3732a, a second output signal 3732b, a third output signal 3732c, and a fourth output signal 3732d shown in FIG. 37B) (collectively, the "output signals 3732") based on the first received channel signal 3712a and the second received channel signal 3712b (i.e., the first output signal 3732a and the second output signal 3732b being produced based on the first received channel signal 3712a, and the third output signal 3732c and the fourth output signal 3732d being produced based on the second received channel signal 3712b).

In some implementations, as shown in FIG. 37B, the first output signal 3732a and the second output signal 3732b may form a first pair of output signals 3736a. Similarly, the third output signal 3732c and the fourth output signal 3732d may form a second pair of output signals 3736b. In such implementations, the first output signal 3732a and/or the third output signal 3732c may have in-phase (I) data, and the second output signal 3732b and/or the fourth output signal 3732d may have quadrature (Q) data. The output signals 3732 may be configured for data detection (i.e., extraction of the first data and the second data).

In implementations where the antennas 3716 include the first antenna 3716a and the second antenna 3716b, the first antenna 3716a may be configured to receive RF signals having the first polarization, and the second antenna 3716b may be configured to receive RF signals having the second polarization.

In some implementations, the first demodulator 3728a and the second demodulator 3728b may be configured to demodulate the first received channel signal 3712a and the second received channel signal 3712b, respectively, to produce the first pair of output signals 3736a (i.e., the first output signal 3732a and the second output signal 3732b) based on the first received channel signal 3712a and the second pair of output signals 3736b (i.e., the third output signal 3732c and the fourth output signal 3732d) based on the second received channel signal 3712b such that the first output signal 3732a and the second output signal 3732b of the first pair of output signals 3736a have the first channel frequency and the third output signal 3732c and the fourth output signal 3732d of the second pair of output signals 3736b have the second channel frequency in the range between 300 GHz and 10 THz. In such implementations, the demodulators 3728 may be described as performing "direct demodulation". However, in other implementations, each of the first demodulator 3728a and the second demodulator 3728b may comprise one or more down-converter (not shown) configured to receive the first received channel signal 3712a and the second received channel signal 3712b, respectively, and down-convert the first received channel signal 3712a and the second received channel signal 3712b such that the first received channel signal 3712a has the first intermediate frequency less than the first channel frequency and the second received channel signal 3712b has the second intermediate frequency less than the second channel frequency. In such implementations, each of the first demodulator 3728a and the second demodulator 3728b may further comprise an IF demodulator configured to demodulate the first received channel signal 3712a and the second received channel signal 3712b, respectively, to produce the first pair of output signals 3736a (i.e., the first output signal 3732a and the second output signal 3732b) based on the first received channel signal 3712a and the second pair of output signal 3736b (i.e., the third output signal 3732c and the fourth output signal 3732d) based on the second received channels signal 3712b. In such implementations, the demodulators 3728 may be described as performing "IF demodulation".

Figure 38:
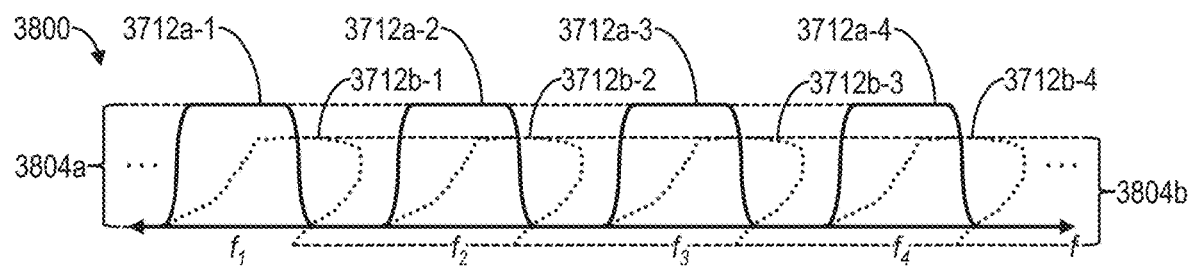
FIG. 38 is a diagrammatic view of a dual-pol signal in accordance with the present disclosure.

Referring now to FIG. 38, shown therein is a diagrammatic view of a dual-pol signal 3800 comprising a plurality of wavelength-division multiplexed (WDM) signals 3804 in accordance with the present disclosure. The dual-pol signal 3800 is also referred to herein as the "transmitted dual-pol signal 3800" when viewed from the perspective of the transmitter network element 3700a and the "received dual-pol signal 3800" when viewed from the perspective of the receiver network element 3700b (shown in FIG. 37B). However, it should be understood that the received dual-pol signal 3800 may have the same data and the same frequency as the transmitted dual-pol signal 3800, though the received dual-pol signal 3800 may exhibit linear distortions caused by the dual-pol hollow waveguide 3704 and/or the antennas 3716. Similarly, the WDM signals 3804 are also referred to herein as the "transmitted WDM signals 3804" when viewed from the perspective of the transmitter network element 3700a and the "received WDM signals 3804" when viewed from the perspective of the receiver network element 3700b (shown in FIG. 37B). However, it should be understood that the received WDM signals 3804 may have the same data and the same frequency as the transmitted WDM signals 3804, though the received WDM signals 3804 may exhibit linear distortions caused by the dual-pol hollow waveguide 3704 and/or the antennas 3716.

As will be discussed in greater detail below, in some implementations, the transmitter network element 3700a may be configured to transmit the transmitted dual-pol signal 3800 having the plurality of the transmitted WDM signals 3804 (e.g., a first transmitted WDM signal 3804a and a second transmitted WDM signal 3804b shown in FIG. 38), wherein each of the transmitted WDM signals 3804 comprises a plurality of the transmitted channel signals 3712, wherein each of the transmitted channel signals 3712 has a channel frequency in the range between 300 GHz and 10 THz. The transmitter network element 3700a may be configured to transmit a number of the transmitted WDM signals 3804 that is at least one (i.e., a single channel with a single polarization). Similarly, in some implementations, the receiver network element 3700b may be configured to receive the received dual-pol signal 3800 having the plurality of received WDM signals 3804, wherein each of the received WDM signals 3804 comprises a plurality of the received channel signals 3712, wherein each of the received channel signals 3712 has a channel frequency in the range between 300 GHz and 10 THz.

The first WDM signal 3804a is shown in FIG. 38 as having a plurality of first channel signals 3712a (e.g., a first $f_1$ channel signal 3712a-1, a first $f_2$ channel signal 3712a-2, a first $f_3$ channel signal 3712a-3, and a first $f_4$ channel signal 3712a-4 shown in FIG. 38) (collectively, the "first channel signals 3712a"). Similarly, the second WDM signal 3804b is shown in FIG. 38 as having a plurality of second channel signals 3712b (e.g., a second $f_1$ channel signal 3712b-1, a second $f_2$ channel signal 3712b-2, a second $f_3$ channel signal 3712b-3, and a second $f_4$ channel signal 3712b-4 shown in FIG. 38) (collectively, the "second channel signals 3712b").

As shown in FIG. 38, the first $f_1$ channel signal 3712a-1 and the second $f_1$ channel signal 3712b-1 may have a first channel frequency $f_1$, the first $f_2$ channel signal 3712a-2 and the second $f_2$ channel signal 3712b-2 may have a second channel frequency $f_2$, the first $f_3$ channel signal 3712a-3 and the second $f_3$ channel signal 3712b-3 may have a third channel frequency $f_3$, and the first $f_4$ channel signal 3712a-4 and the second $f_4$ channel signal 3712b-4 may have a fourth channel frequency $f_4$. Each of the WDM signals 3804 may have a number of the channel signals 3712 that is at least one (i.e., a single channel with a single polarization).

As shown in FIG. 38, in some such implementations, adjacent ones of the first channel signals 3712a may be spaced apart 200 GHz from each other, and adjacent ones of the second channel signals 3712b may be spaced apart 200 GHz from each other. However, in other implementations, adjacent ones of the first channel signals 3712a may be spaced apart from each other in a range between 50 GHz and 400 GHz, and adjacent ones of the second channel signals 3712b and may be spaced apart from each other in the range between 50 GHz and 400 GHz.

Figure 39:
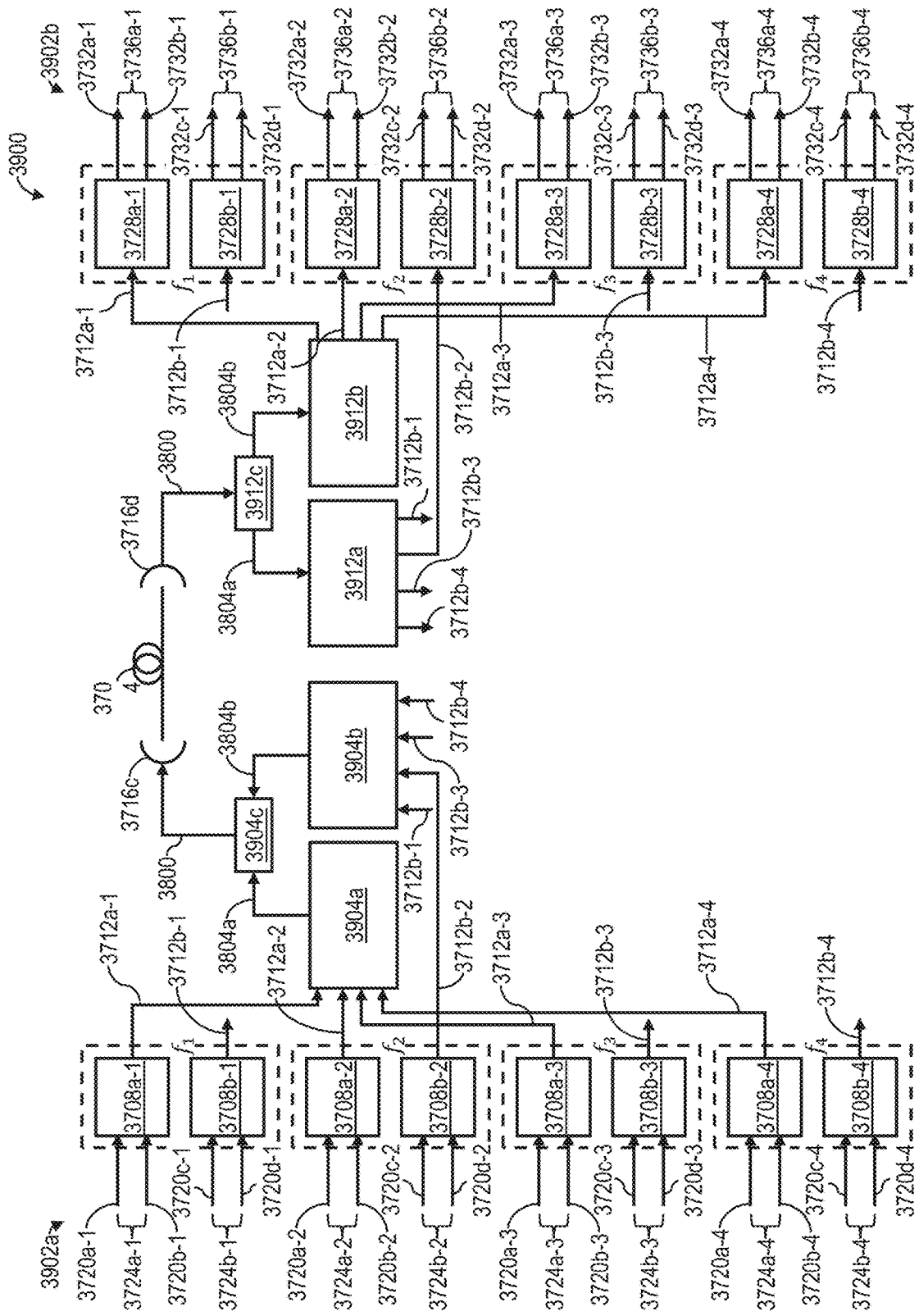
FIG. 39 is a diagrammatic view of an exemplary implementation of a dual-pol transport network constructed in accordance with the present disclosure, wherein the dual-pol transport network comprises a dual-pol RF antenna.

Referring now to FIG. 39, shown therein is a diagrammatic view of an exemplary implementation of a dual-pol transport network 3900 constructed in accordance with the present disclosure. As shown in FIG. 39, the dual-pol transport network 3900 may comprise a first dual-pol network element 3902a, a second dual-pol network element 3902b, and the dual-pol hollow waveguide 3704 extending between the first dual-pol network element 3902a and the second dual-pol network element 3902b configured to simultaneously propagate signals having the first polarization and the second polarization different from the first polarization.

While the transport network 3900 is described herein as comprising the first dual-pol network element 3902a transmitting signals and the second dual-pol network element 3902b receiving such signals, it should be understood that the transport network 3900 may be bidirectional; that is, the transport network 3900 may further comprise the second dual-pol network element 3902b transmitting signals and the first dual-pol network element 3902a receiving such signals. Accordingly, in some such implementations, the dual-pol hollow waveguide 3704 may be bidirectional (i.e., configured to simultaneously propagate signals in both directions); however, in other such implementations, the dual-pol hollow waveguide 3704 comprises a first dual-pol hollow waveguide (not shown) configured to propagate signals in a first direction (e.g., from the first dual-pol network element 3902a to the second dual-pol network element 3902b), and a second dual-pol hollow waveguide (not shown) configured to propagate signals in a second direction opposite the first direction (e.g., from the second dual-pol network element 3902b to the first dual-pol network element 3902a). Nevertheless, the first dual-pol network element 3902a is also referred to herein as the "transmitter network element 3902a" and the second dual-pol network element 3902b is also referred to herein as the "receiver network element 3902b".

The transmitter dual-pol network element 3902a may comprise the plurality of modulators 3708 (e.g., a first $f_1$ modulator 3708a-1, a second $f_1$ modulator 3708b-1, a first $f_2$ modulator 3708a-2, a second $f_2$ modulator 3708b-2, a first $f_3$ modulator 3708a-3, a second $f_3$ modulator 3708b-3, a first $f_4$ modulator 3708a-4, and a second $f_4$ modulator 3708b-4 shown in FIG. 39), a first combiner 3904a, a second combiner 3904b, a third combiner 3904c, and one or more first dual-pol antenna 3716c (hereinafter, the "first dual-pol antenna 3716c").

The first $f_1$ modulator 3708a-1, the first $f_2$ modulator 3708a-2, the first $f_3$ modulator 3708a-3, and the first $f_4$ modulator 3708a-4 may be collectively referred to as the "first modulators 3708a", and the second $f_1$ modulator 3708b-1, the second $f_2$ modulator 3708b-2, the second $f_3$ modulator 3708b-3, and the second $f_4$ modulator 3708b-4 may be collectively referred to as the "second modulators 3708b". While four of the modulators 3708 are shown in FIG. 39, it should be understood that the first modulators 3708a and the second modulators 3708b may include a number of the modulators 3708 that is greater or less than four.

Each of the first modulators 3708a may be configured to generate a particular one of the first transmitted channel signals 3712a having the first data encoded in the first modulation format. In some implementations, each of the first modulators 3708a may be configured to generate a particular one of the first transmitted channel signals 3712a such that each of the first transmitted channel signals 3712a has one of a plurality of distinct first channel frequencies in the range between 300 GHz and 10 THz. In such implementations, the first modulators 3708a may be described as performing "direct modulation". However, in other implementations, each of the first modulators 3708a may comprise an IF modulator configured to generate the particular one of the first transmitted channel signals 3712a such that each of the first transmitted channel signals 3712a has one of a plurality of distinct first intermediate frequencies less than the distinct first channel frequency of such first transmitted channel signal 3712a. In such implementations, each of the first modulators 3708a may further comprise one or more first up-converter (not shown) configured to receive the first transmitted channel signals 3712a and up-convert the first transmitted channel signals 3712a such that each of the first transmitted channel signals 3712a has the distinct first channel frequency of such first transmitted channel signal 3712a. In such implementations, the first modulators 3708a may be described as performing "IF modulation".

In some implementations, each of the first modulators 3708a may be further configured to receive the first pair of input signals 3724a, wherein each of the first pairs of input signals 3724a has the first input signal 3720a, the second input signal 3720b, and the first data encoded in the first modulation format.

Each of the second modulators 3708b may be configured to generate a particular one of the second transmitted channel signals 3712b having the second data encoded in the second modulation format. In some implementations, each of the second modulators 3708b may be configured to generate the particular one of the second transmitted channel signals 3712b such that each of the second transmitted channel signals 3712b has one of a plurality of distinct second channel frequencies in the range between 300 GHz and 10 THz. In such implementations, the second modulators 3708b may be described as performing "direct modulation". However, in other implementations, each of the second modulators 3708b may comprise an IF demodulator configured to generate the particular one of the second transmitted channel signals 3712b such that each of the second transmitted channel signals 3712b has one of a plurality of distinct second intermediate frequencies less than the distinct second channel frequency of such second transmitted channel signal 3712b. In such implementations, each of the second modulators 3708b may further comprise one or more second up-converter (not shown) configured to receive the second transmitted channel signals 3712b and up-convert the second transmitted channel signals 3712b such that each of the second transmitted channel signals 3712b has the distinct channel frequency of such second transmitted channel signal 3712b. In such implementations, the second modulators 3708b may be described as performing "IF modulation".

The first combiner 3904a may be configured to receive the first transmitted channel signals 3712a from the first modulators 3708a and combine the first transmitted channel signals 3712a into the first transmitted WDM signal 3804a, and the second combiner 3904b may be configured to receive the second transmitted channel signals 3712b from the second modulators 3708b and combine the second transmitted channel signals 3712b into the second transmitted WDM signal 3804b. The third combiner 3904c may be configured to receive the first transmitted WDM signal 3804a and the second transmitted WDM signal 3804b and combine the first transmitted WDM signal 3804a and the second transmitted WDM signal 3804b into the transmitted dual-pol signal 3800. One or more of the first combiner 3904a, the second combiner 3904b, and the third combiner 3904c may be multiplexers. In some implementations, one or more of the first combiner 3904a and the second combiner 3904b is a WDM combiner, and the third combiner 3904c is a polarization combiner.

The first dual-pol antenna 3716c may be configured to receive the transmitted dual-pol signal 3800 from the third combiner 3904c and couple the transmitted dual-pol signal 3800 into the dual-pol hollow waveguide 3704 (i.e., the first transmitted WDM signal 3804a having the first polarization and the second transmitted WDM signal 3804b having the second polarization).

The receiver dual-pol network element 3902b may comprise a plurality of demodulators 3728 (e.g., a first $f_1$ demodulator 3728a-1, a second $f_1$ demodulator 3728b-1, a first $f_2$ demodulator 3728a-2, a second $f_2$ demodulator 3728b-2, a first $f_3$ demodulator 3728a-3, a second $f_3$ demodulator 3728b-3, a first $f_4$ demodulator 3728a-4, and a second $f_4$ demodulator 3728b-4 shown in FIG. 39), a first splitter 3912a, a second splitter 3912b, a third splitter 3912c, and one or more second dual-pol antenna 3716d (hereinafter, the "second dual-pol antenna 3716d").

The second dual-pol antenna 3716d may be configured to receive the received dual-pol signal 3800 (i.e., the first received WDM signal 3804a having the first polarization and the second received WDM signal 3804b having the second polarization) from the dual-pol hollow waveguide 3704.

The third splitter 3912c may be configured to receive the received dual-pol signal 3800 from the second dual-pol antenna 3716d and split the received dual-pol signal 3800 into the first received WDM signal 3804a and the second received WDM signal 3804b. The first splitter 3912a may be configured to receive the first received WDM signal 3804a from the third splitter 3912c and split the first received WDM signal 3804a into the plurality of first received channel signals 3712a. The second splitter 3912b may be configured to receive the second received WDM signal 3804b from the third splitter 3912c and split the second received WDM signal 3804b into the plurality of second received channel signals 3712b. One or more of the first splitter 3912a, the second splitter 3912b, and the third splitter 3912c may be demultiplexers. In some implementations, one or more of the first splitter 3912a and the second splitter 3912b is a WDM splitter, and the third splitter 3912c is a polarization splitter.

The first $f_1$ demodulator 3728a-1, the first $f_2$ demodulator 3728a-2, the first $f_3$ demodulator 3728a-3, and the first $f_4$ demodulator 3728a-4 are collectively referred to as the "first demodulators 3728a", and the second $f_1$ demodulator 3728b-1, the second $f_2$ demodulator 3728b-2, the second $f_3$ demodulator 3728b-3, and the second $f_4$ demodulator 3728b-4 are collectively referred to as the "second demodulators 3728b". While four of the demodulators 3728 are shown in FIG. 39, it should be understood that the first demodulators 3728a and the second demodulators 3728b may include a number of the demodulators 3728 that is greater or less than four.

Each of the first demodulators 3728a may be configured to demodulate a particular one of the first received channel signals 3712a to produce the first pairs of output signals 3736a having the first data encoded in the first modulation format and configured for data detection. In some implementations, each of the first demodulators 3728a may be configured to demodulate the particular one of the first received channel signals 3712a having one of the plurality of distinct first channel frequencies in the range between 300 GHz and 10 THz. However, in other implementations, the receiver dual-pol network element 3902b may further comprise one or more first down-converter (not shown) configured to receive the first received channel signals 3712a and down-convert the first received channel signals 3712a such that each of the first received channel signals 3712a has one of the plurality of distinct first intermediate frequencies less than the distinct first channel frequency of such first received channel signal 3712a. In such implementations, each of the first demodulators 3728a may be configured to demodulate the particular one of the first received channel signals 3712a having one of the plurality of distinct first intermediate frequencies.

Each of the second demodulators 3728b may be configured to demodulate a particular one of the second received channel signals 3712b to produce the second pair of output signals 3736b having the second data encoded in the second modulation format and configured for data detection. In some implementations, each of the second demodulators 3728b may be configured to demodulate the particular one of the second received channel signals 3712b having one of the plurality of distinct second channel frequencies in the range between 300 GHz and 10 THz. However, in other implementations, the second dual-pol network element 3902b may further comprise one or more second down-converter (not shown) configured to receive the second received channel signals 3712b and down-convert the second received channel signals 3712b such that each of the second received channel signals 3712b has one of the plurality of distinct second intermediate frequencies less than the distinct second channel frequency of such second received channel signal 3712b. In such implementations, each of the second demodulators 3728b may be configured to demodulate the particular one of the second received channel signals 3712b having one of the plurality of distinct second intermediate frequencies.

Figure 40:
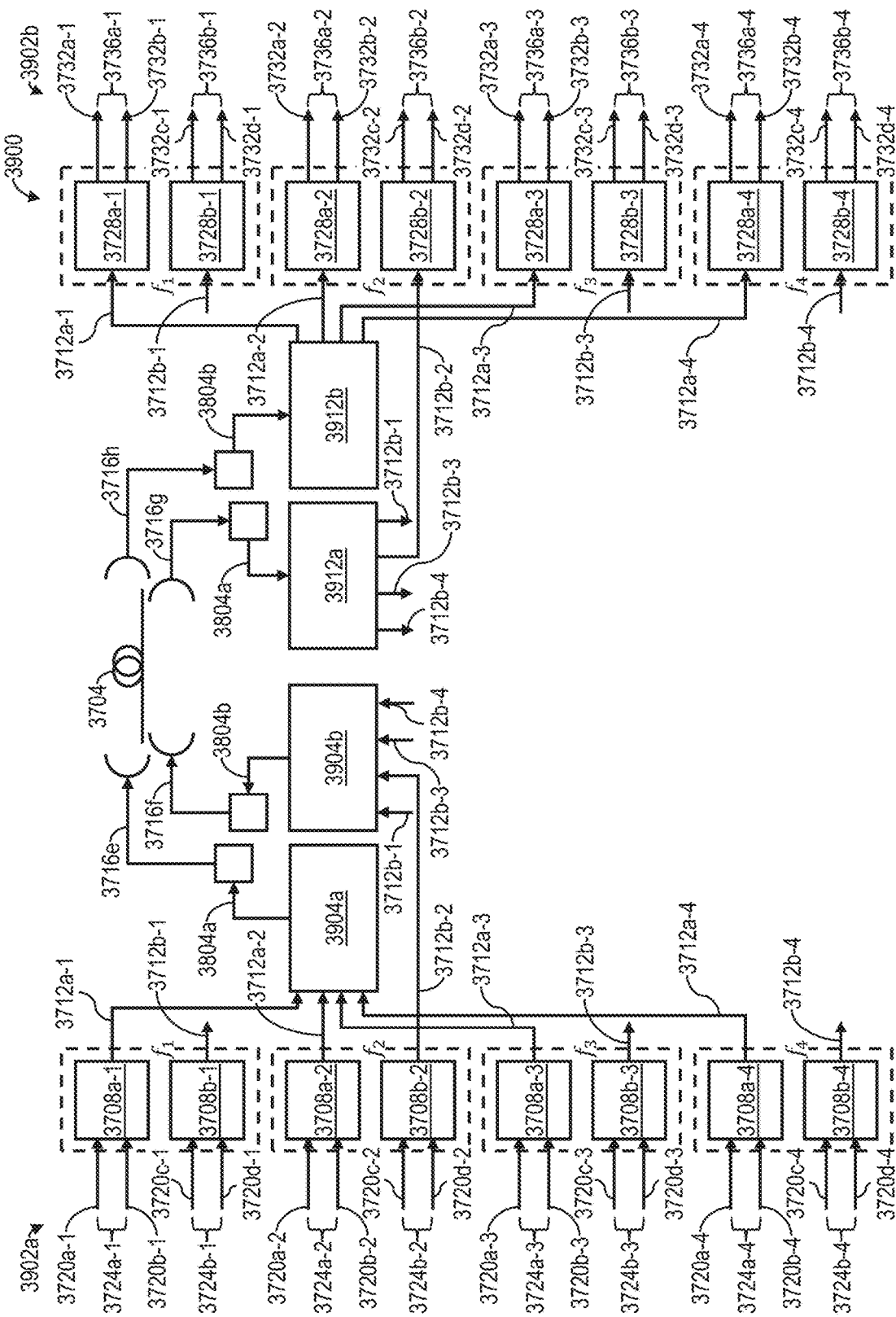
FIG. 40 is a diagrammatic view of another exemplary implementation of a dual-pol transport network constructed in accordance with the present disclosure, wherein the dual-pol transport network comprises a first pair of RF antennas and a second pair of RF antennas.

Referring now to FIG. 40, in some implementations, the transmitter dual-pol network element 3902a may comprise a first antenna 3716e configured to transmit RF signals having the first polarization and a second antenna 3716f configured to transmit RF signals having the second polarization. In such implementations, the receiver dual-pol network element 3902b may comprise a third antenna 3716g configured to receive RF signals having the first polarization and a fourth antenna 3716h configured to receive RF signals having the second polarization. Each of the first antenna 3716e, the second antenna 3716f, the third antenna 3716g, and the fourth antenna 3716h may be single-polarization or dual-polarization antennas.

Figure 41:
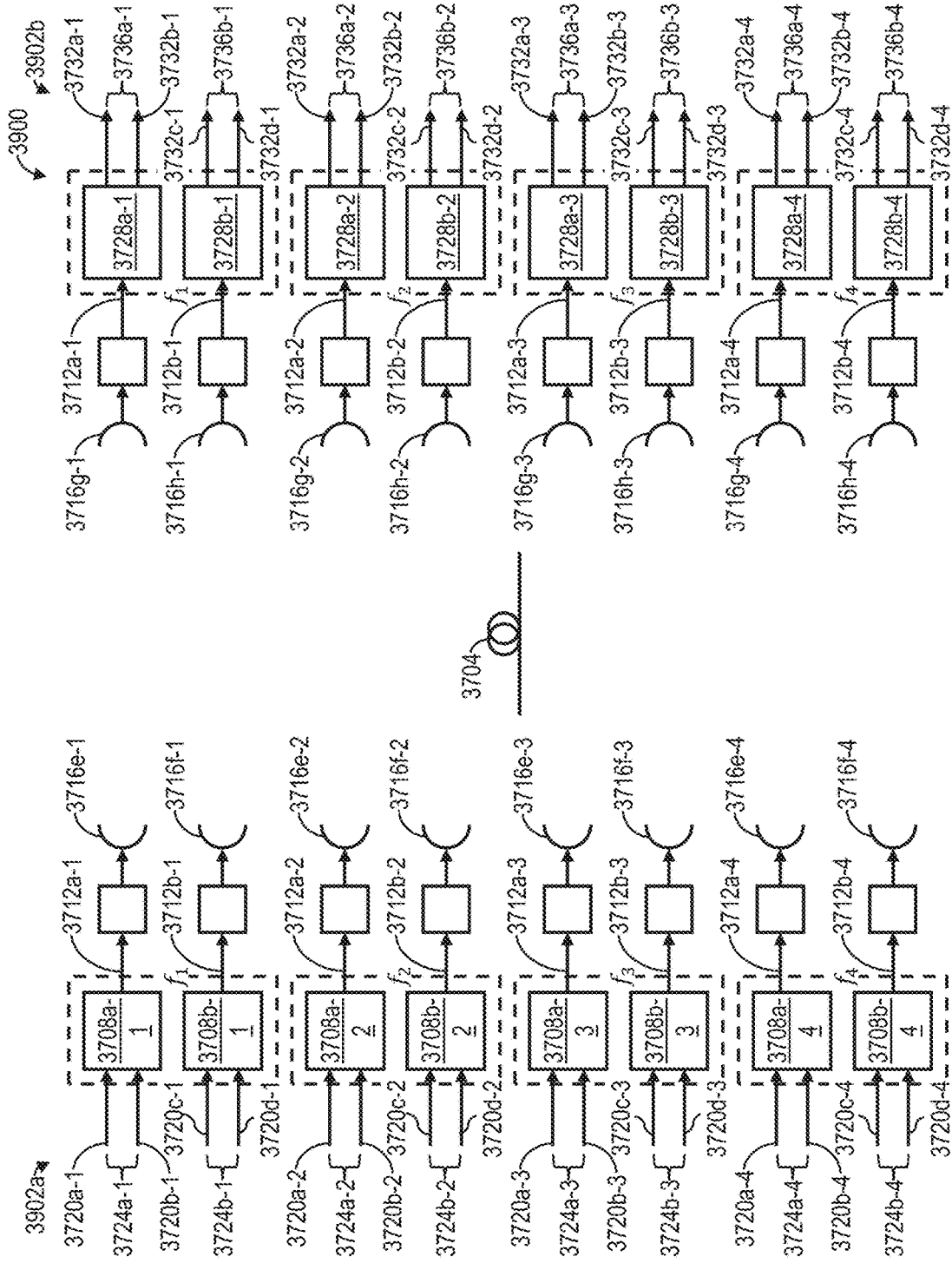
FIG. 41 is a diagrammatic view of another exemplary implementation of a dual-pol transport network constructed in accordance with the present disclosure, wherein the dual-pol transport network comprises a plurality of first RF antennas and a plurality of second RF antennas.

Referring now to FIG. 41, in some implementations, the transmitter dual-pol network element 3902a may comprise a plurality of first antennas 3716e (e.g., a first $f_1$ antenna 3716e-1, a first $f_2$ antenna 3716e-2, a first $f_3$ antenna 3716e-3, and a first $f_4$ antenna 3716e-4) (collectively, the "first antennas 3716e") and a plurality of second antennas 3716f (e.g., a second $f_1$ antenna 3716f-1, a second $f_2$ antenna 3716f-2, a second $f_3$ antenna 3716f-3, and a second $f_4$ antenna 3716f-4) (collectively, the "second antennas 3716f").

Each of the first antennas 3716e may be configured to receive a particular one of the first transmitted channel signals 3712a and apply the first polarization to the particular one of the first transmitted channel signals 3712a as the particular one of the first transmitted channel signals 3712a is coupled into the dual-pol hollow waveguide 3704, and each of the second antennas 3716f may be configured to receive a particular one of the second transmitted channel signals 3712b and apply the second polarization to the particular one of the second transmitted channel signals 3712b as the particular one of the second transmitted channel signals 3712b is coupled into the dual-pol hollow waveguide 3704.

Similarly, in such implementations, the receiver dual-pol network element 3902b may comprise a plurality of third antennas 3716g (e.g., a third $f_1$ antenna 3716g-1, a third $f_2$ antenna 3716g-2, a third $f_3$ antenna 3716g-3, and a third $f_4$ antenna 3716g-4) (collectively, the "third antennas 3716g") and a plurality of fourth antennas 3716h (e.g., a fourth $f_1$ antenna 3716h-1, a fourth $f_2$ antenna 3716h-2, a fourth $f_3$ antenna 3716h-3, and a fourth $f_4$ antenna 3716h-4) (collectively, the "fourth antennas 3716h").

Each of the third antennas 3716g may be configured to receive a particular one of the first received channel signals 3712a having the first polarization from the dual-pol hollow waveguide 3704, and each of the fourth antennas 3716h may be configured to receive a particular one of the second received channel signals 3712b having the second polarization from the dual-pol hollow waveguide 3704.

Figure 42:
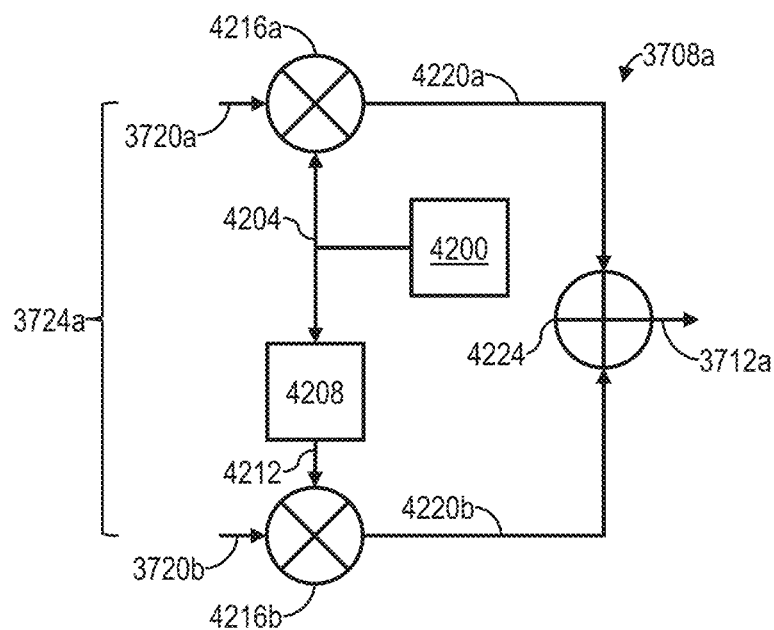
FIG. 42 is a diagrammatic view of an exemplary implementation of a first modulator shown in FIG. 37A.

Referring now to FIG. 42, shown therein is a diagrammatic view of an exemplary implementation of the first modulator 3708a shown in FIG. 37A. However, it should be understood that any of the modulators 3708 described herein may be similar to the first modulator 3708a as shown in FIG. 42. As shown in FIG. 42, the first modulator 3708a may comprise a transmitter local oscillator (LO) 4200 configured to generate a transmitter LO signal 4204, a transmitter phase-shifter 4208 configured to receive the transmitter LO signal 4204 and shift the phase of the transmitter LO signal 4204 by a predetermined amount (e.g., 90°) to produce a quadrature LO signal 4212, a first transmitter mixer 4216a configured to receive the transmitter LO signal 4204 and the first input signal 3720a and mix the transmitter LO signal 4204 with the first input signal 3720a to produce a first transmitter mixer output signal 4220a, a second transmitter mixer 4216b configured to receive the quadrature LO signal 4212 and the second input signal 3720b and mix the quadrature LO signal 4212 with the second input signal 3720b to produce a second transmitter mixer output signal 4220b, and a transmitter adder 4224 configured to receive the first transmitter mixer output signal 4220a and the second transmitter mixer output signal 4220b and combine the first transmitter mixer output signal 4220a and the second transmitter mixer output signal 4220b to produce the first transmitted channel signal 3712a.

As described above, in some implementations, the first modulator 3708a may be configured to generate the first transmitted channel signal 3712a such that the first transmitted channel signal 3712a has a first channel frequency in a range between 300 GHz and 10 THz. However, in other implementations, the first modulator 3708a may be configured to generate the first transmitted channel signal 3712a such that the first transmitted channel signal 3712a has an intermediate frequency less than the first channel frequency. In such implementations, the first modulator 3708a may further comprise one or more up-converter (not shown) configured to receive the first transmitted channel signal 3712a and up-convert the first transmitted channel signal 3712a such that the first transmitted channel signal 3712a has the first channel frequency.

Figure 43:
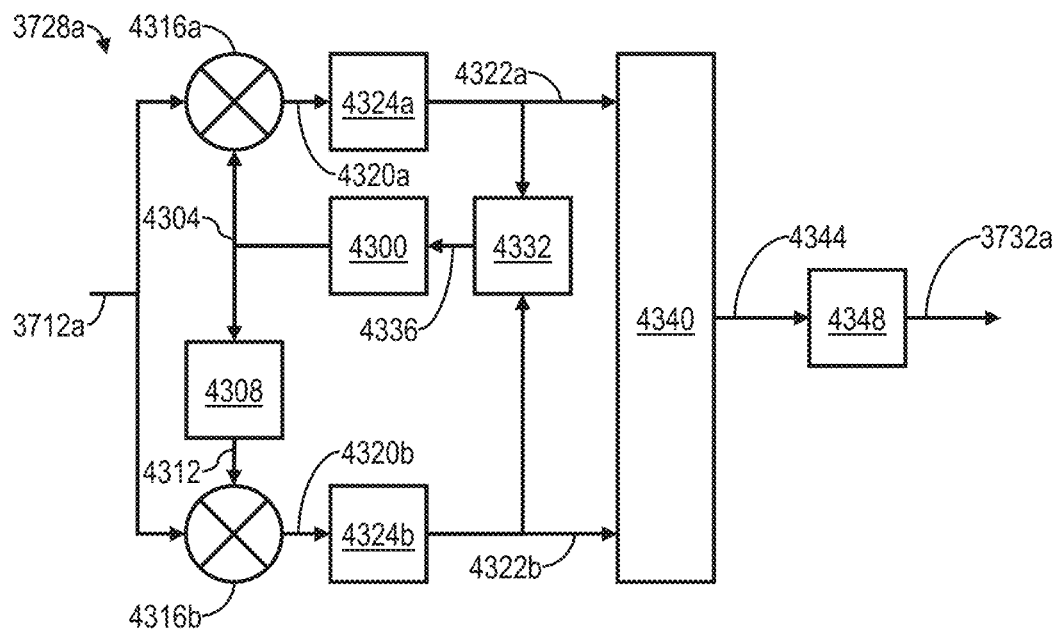
FIG. 43 is a diagrammatic view of an exemplary implementation of a first demodulator shown in FIG. 37B.

Referring now to FIG. 43, shown therein is a diagrammatic view of an exemplary implementation of the first demodulator 3728a shown in FIG. 37B. However, it should be understood that any of the demodulators 3728 described herein may be similar to the first demodulator 3728a shown in FIG. 43. As shown in FIG. 43, the first demodulator 3728a may comprise a receiver LO 4300—which may be a voltage-controlled oscillator (VCO)—configured to generate a receiver LO signal 4304 having an LO frequency within a predetermined range (e.g., within 1 GHz) of the first channel frequency of the RF carrier embedded in the first received channel signal 3712a, a receiver phase-shifter 4308 configured to receive the receiver LO signal 4304 and shift the phase of the receiver LO signal 4304 by a predetermined amount (e.g., 90°) to produce a quadrature LO signal 4312, a first receiver mixer 4316a configured to receive the receiver LO signal 4304 and the first received channel signal 3712a and mix the receiver LO signal 4304 with the first received channel signal 3712a to produce a first receiver mixer output signal 4320a, a second receiver mixer 4316b configured to receive the quadrature LO signal 4312 and the first received channel signal 3712a and mix the quadrature LO signal 4312 with the first received channel signal 3712a to produce a second receiver mixer output signal 4320b, a first lowpass filter (LPF) 4324a configured to receive the first receiver mixer output signal 4320a and attenuate frequencies higher than a predetermined cutoff frequency to produce a first baseband signal 4322a (also referred to herein as "U(t)" or the "in-phase (I) channel"), a second LPF 4324b configured to receive the second receiver mixer output signal 4320b and attenuate frequencies higher than the predetermined cutoff frequency to produce a second baseband signal 4322b (also referred to herein as "V(t)" or the "quadrature (Q) channel"), a carrier recovery module 4332 configured to receive the first baseband signal 4322a and the second baseband signal 4322b and produce a carrier recovery control signal 4336 to cause an LO frequency and an LO phase of the receiver LO signal 4304 to match the first channel frequency and the first channel phase of the RF carrier embedded in the first received channel signal 3712a, a module 4340 having circuitry configured to form a pre-equalized output signal 4344 having a complex signal representation of U(t)+j*V(t), and an equalizer 4348 configured to equalize the pre-equalized output signal 4344 by applying a plurality of complex tap weights having a complex signal presentation of $h_i+j*h_q$ to produce the first output signal 3732a configured for data detection, also in a complex form (i.e., having an I component and a Q component). The complex representation is mathematically convenient. The plurality of complex tap weights may be determined and/or adjusted based on a tap weight control algorithm, such as Least Mean Squares (LMS), Zero Forcing (ZF), and/or the like. The operation of the equalizer 4348 may be described as convolution between the input signal (i.e., the pre-equalized output signal 4344) and the equalizer transfer function—with a delay line finite impulse response (FIR) structure and the plurality of complex tap weights—in the time domain or the multiplication between the input signal (i.e., the pre-equalized output signal 4344) and the equalizer transfer function—with a delay line FIR structure and the plurality of complex tap weights—in the frequency domain. Persons having ordinary skill in the art will understand that the equalizer transfer function may be determined based on the plurality of complex tap weights.

It should be understood that the description above generally refers to implementations in which one or more of the receiver network elements 3700a (shown in FIG. 37B), 3902b (shown in FIG. 39) includes a coherent receiver. In other implementations, such as implementations in which one or more of the first modulation format and the second modulation format is DQPSK, the first demodulator 3728a may lack one or more of the carrier recovery module 4332 and the receiver LO 4300; however, in such implementations, the first demodulator 3728a may further comprise a differential detection circuit.

As described above, in some implementations, the first demodulator 3728a may be configured to demodulate the first received channel signal 3712a to produce the first output signal 3732a such that the first output signal 3732a has the first channel frequency in the range between 300 GHz and 10 THz. However, in other implementations, the first demodulator 3728a may further comprise one or more down-converter (not shown) configured to, prior to demodulating the first received channel signal 3712a to produce the first output signal 3732a, down-convert the first received channel signal 3712a such that the first received channel signal 3712a has an intermediate frequency less than the first channel frequency. In such implementations, the first demodulator 3728a may further comprise one or more down-converter (not shown) configured to receive the first received channel signal 3712a and down-convert the first received channel signal 3712a such that the first received channel signal 3712a has the intermediate frequency less than the first channel frequency.

Figure 44:
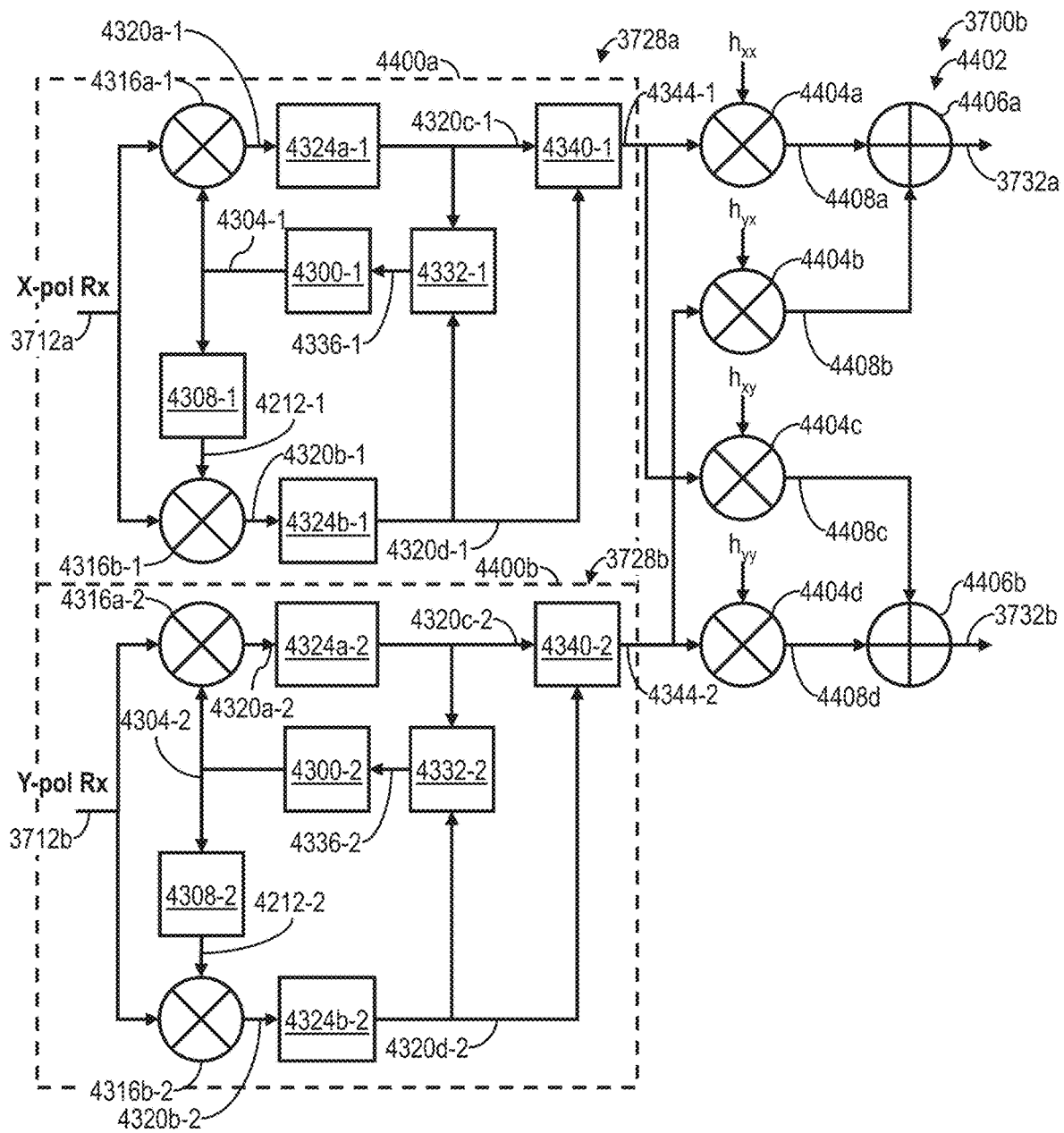
FIG. 44 is a diagrammatic view of another exemplary implementation of a dual-pol network element constructed in accordance with the present disclosure, wherein the dual-pol network element comprises an equalizer.

Referring now to FIG. 44, shown therein is a diagrammatic view of another exemplary implementation of receiver network element 3700b constructed in accordance with the present disclosure. The receiver network element 3700b in the implementation shown in FIG. 44 generally comprises a first portion 4400a and a second portion 4400b. In some implementations, the first portion 4400a is an X-pol portion and the second portion 4400b is a Y-pol portion. In such implementations, the first received channel signal 3712a may be a received X-pol signal and the second received channel signal 3712b may be a received Y-pol signal. As shown in FIG. 44, the receiver network element 3700b may comprise a first demodulator 3728a, a second demodulator 3728b, and an equalizer 4402. As shown in FIG. 44, the equalizer 4402 may comprise a plurality of complex equalizers 4404 (e.g., a first complex equalizer 4404a, a second complex equalizer 4404b, a third complex equalizer 4404c, and a fourth complex equalizer 4404d shown in FIG. 44) and a plurality of adders 4406 (e.g., a first adder 4406a and a second adder 4406b shown in FIG. 44).

It should be understood that, although the first received channel signal 3712a (i.e., the X-pol signal) and the second received channel signal 3712b (i.e., the Y-pol signal) may use the same RF carrier, it may be necessary to include multiple carrier recovery modules (i.e., a first carrier recover module 4332-1 and a second carrier recovery module 4332-2 shown in FIG. 44) in the receiver network element 3700b.

The operation of module 4340-1 and module 4340-2 in FIG. 44 is similar to the module 4340 in FIG. 43. The first complex equalizer 4404a may be configured to receive a first pre-equalized output signal 4344-1 produced by the first demodulator 3728a and a first complex tap weight $h_{xx}$ and multiply the first pre-equalized output signal 4344-1 and the first complex tap weight $h_{xx}$ to produce a first equalizer intermediate signal 4408a.

The second complex equalizer 4404b may be configured to receive a second pre-equalized output signal 4344-2 produced by the second demodulator 3728b and a second complex tap weight $h_{yx}$ and multiply the second pre-equalized output signal 4344-2 and the second complex tap weight $h_{yx}$ to produce a second equalizer intermediate signal 4408b.

The third complex equalizer 4404c may be configured to receive the first pre-equalized output signal 4344-1 produced by the first demodulator 3728a and a third complex tap weight $h_{xy}$ and multiply the first pre-equalized output signal 4344-1 and the third complex tap weight $h_{xy}$ to produce a third equalizer intermediate signal 4408c.

The fourth complex equalizer 4404d may be configured to receive the second pre-equalized output signal 4344-2 produced by the second demodulator 3728b and a fourth complex tap weight $h_{yy}$ and multiply the second pre-equalized output signal 4344-2 and the fourth complex tap weight $h_{yy}$ to produce a fourth equalizer intermediate signal 4408d.

The first adder 4406a may be configured to receive the first equalizer intermediate signal 4408a produced by the first complex equalizer 4404a and the second equalizer intermediate signal 4408b produced by the second complex equalizer 4404b and add the first equalizer intermediate signal 4408a and the second equalizer intermediate signal 4408b to produce the first output signal 3732a. In some implementations, the first output signal 3732a is an equalized X-pol signal.

The second adder 4406b may be configured to receive the third equalizer intermediate signal 4408c produced by the third complex equalizer 4404c and the fourth equalizer intermediate signal 4408d produced by the fourth complex equalizer 4404d and add the third equalizer intermediate signal 4408c and the fourth equalizer intermediate signal 4408d to produce the second output signal 3732b. In some implementations, the second output signal 3732b is an equalized Y-pol signal.

It should be understood that, where the cross-pol discrimination of the system is outside of a predetermined range (e.g., between 16 dB and 25 dB, depending on the modulation format being used and the system link budget), the second complex tap weight $h_{yx}$ and the third complex tap weight $h_{xy}$ may be set to zero, which would cause the first portion 4400a and the second portion 4400b of the receiver network element 3700b in FIG. 44 to operate as two separate single-pol receiver network elements, such as is shown in FIG. 43. In such a case, the receiver network element 3700b may operate more efficiently, thereby requiring less power.

It should be understood that the implementation of the first demodulator 3728a shown in FIG. 43 and the implementation of the receiver network element 3700b shown in FIG. 44 are illustrative implementations provided as examples. It should be further understood that the approach described above may be referred to as an "analog approach". Conversely, a "digital approach" may also be used instead which may include one or more ADC and a digital signal processor (DSP) configured to perform the demodulation and equalization described herein.

In some implementations, the first demodulator 3728a and the second demodulator 3728b may be configured to demodulate the first channel signal 3712a and the second channel signal 3712b, respectively, to produce the first input signal 3720a and the second input signal 3720b such that the first input signal 3720a has the first channel frequency and the second input signal 3720b has the second channel frequency in the range between 300 GHz and 10 THz. However, in other implementations, the first demodulator 3728a may be configured to, prior to demodulating the first channel signal 3712a to produce the first input signal 3720a, down-convert the first channel signal 3712a such that the first channel signal 3712a has an intermediate frequency less than the first channel frequency. In such implementations, the first demodulator 3728a may further comprise one or more down-converter (not shown) configured to receive the first channel signal 3712a and down-convert the first channel signal 3712a such that the first channel signal 3712a has the intermediate frequency less than the first channel frequency. Similarly, in such implementations, the second demodulator 3728b may be configured to, prior to demodulating the second channel signal 3712b to produce the second input signal 3720b, down-convert the second channel signal 3712b such that the second channel signal 3712b has an intermediate frequency less than the second channel frequency. In such implementations, the second demodulator 3728b may further comprise one or more down-converter (not shown) configured to receive the second channel signal 3712b and down-convert the second channel signal 3712b such that the second channel signal 3712b has the intermediate frequency less than the second channel frequency.

Figure 45:
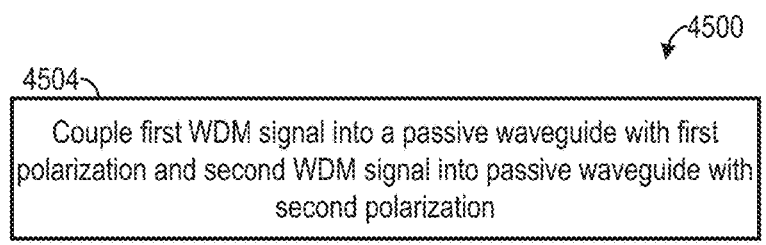
FIG. 45 is a diagrammatic view of a method of use in accordance with the present disclosure.

Referring now to FIG. 45, shown therein is a diagrammatic view of an exemplary implementation of a method 4500 of use in accordance with the present disclosure. As shown in FIG. 45, the method 4500 generally comprises the step of: coupling, by one or more antenna 900, 3716, a first wavelength division multiplexed (WDM) signal 3804a into a hollow waveguide, e.g., the dual-pol hollow waveguide 3704 with a first polarization, and a second WDM signal 3804b into the hollow waveguide, e.g., the dual-pol hollow waveguide 3704 with a second polarization so as to simultaneously propagate RF signals having the first polarization and the second polarization through the dual-pol hollow waveguide 3704, the first WDM signal 3804a having a first channel frequency in a range between 300 Gigahertz (GHz) and 10 Terahertz (THz), and the second WDM signal 3804b having a second channel frequency in a range between 300 GHz and 10 THz (step 4504).

In some implementations, coupling the first WDM signal 3804a and the second WDM signal 3804b into the dual-pol hollow waveguide 3704 (step 4504) includes coupling the first WDM signal 3804a and the second WDM signal 3804b having a modulation format selected from a group consisting of: intensity-modulation (IM)/direct-detection (DD) (IM/DD); non-return-to-zero modulation (NRZ); pulse-amplitude-modulation-n (PAMn); IM-PAMn; m-quadrature-amplitude-modulation (mQAM); quadrature-phase-shift-keying (QPSK); differential-detection QPSK (DQPSK); and single-sideband modulation (SSB).

In some implementations, coupling the first WDM signal 3804a and the second WDM signal 3804b into the dual-pol hollow waveguide 3704 (step 4504) includes coupling the first WDM signal 3804a to a first antenna 3716e configured to apply the first polarization and coupling the second WDM signal 3804b to a second antenna 3716f configured to apply the second polarization, the first antenna 3716e being separate from the second antenna 3716f.

In some implementations, the first polarization is a left-hand circular polarization (LHCP), and the second polarization is a right-hand circular polarization (RHCP). In some implementations, the first polarization is a horizontal linear polarization (HLP), and the second polarization is a vertical linear polarization (VLP).

In some implementations, wherein coupling the first WDM signal 3804a and the second WDM signal 3804b into the dual-pol hollow waveguide 3704 (step 4504) includes coupling the first WDM signal 3804a and the second WDM signal 3804b to a dual-pol antenna (e.g., the first dual-pol antenna 3716c) configured to simultaneously transmit RF signals having the first polarization and the second polarization into the dual-pol hollow waveguide 3704.

In some implementations, the method 4500 further comprises the step of combining a plurality of first channel signals 3712a to form the first WDM signal 3804a, the first channel signals having a plurality of channel frequencies in the range between 300 GHz and 10 THz, and wherein at least some of the first channel signals are encoded with data. In some such implementations, adjacent ones of the first channel signals 3712a are spaced in a range from 50 GHz to 400 GHz.

Figure 46A:
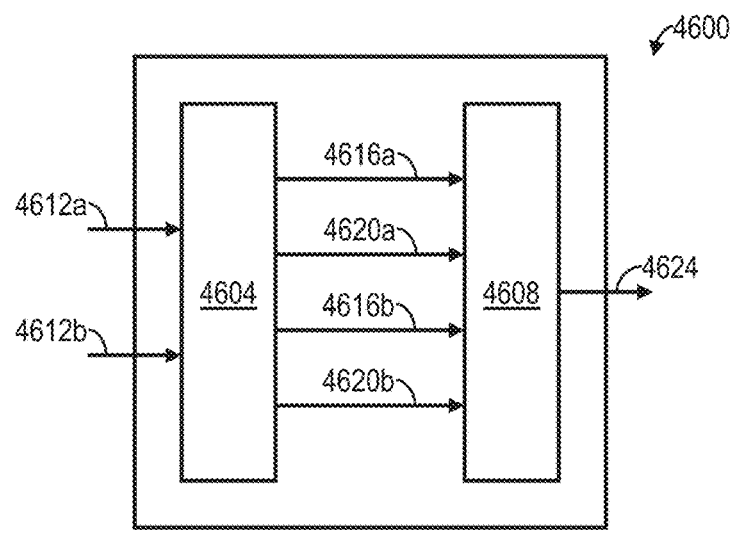
FIG. 46A is a diagrammatic view of another exemplary implementation of a network element constructed in accordance with the present disclosure, wherein the network element is configured to perform direct conversion from a first modulation format in a first electrical signal to a second modulation format in a second electrical signal in the THz frequency band.

Referring now to FIG. 46A, shown therein is a diagrammatic view of another exemplary implementation of a network element 4600 constructed in accordance with the present disclosure. As shown in FIG. 46A, the network element 4600 generally comprises one or more demodulator 4604 (hereinafter, the "demodulator 4604") and one or more modulator 4608 (hereinafter, the "modulator 4608") that are coupled together as shown in FIG. 46A with one or more bus or electrical circuit.

The demodulator 4604 may be configured to receive one or more input signal 4612 (hereinafter, the "input signals 4612"), such as a first input signal 4612a and a second input signal 4612b shown in FIG. 46A, and extract a series of phase signals 4616 (hereinafter, the "phase signals 4616") and a series of amplitude signals 4620 (hereinafter, the "amplitude signals 4620") from the input signals 4612. The demodulator 4604 may be configured to decompose the input signals 4612 into individual bitstreams and produce the phase signals 4616 and the amplitude signals 4620 based on the individual bitstreams. The demodulator 4604 may be thus configured to extract a first phase signal 4616a and a first amplitude signal 4620a from the first input signal 4612a. Similarly, the demodulator 4604 may be configured to extract a second phase signal 4616b and a second amplitude signal 4620b from the second input signal 4612b.

The input signals 4612 may have input data encoded therein. For example, the first input signal 4612a may have first input data encoded therein, and the second input signal 4612b may have second input data encoded therein. As described in more detail below, the first input data and the second input data may be encoded in the first input signal 4612a and the second input signal 4612b, respectively, in a first modulation format which can be a pulse-amplitude modulated (PAMn) format.

The modulator 4608 may be configured to receive the phase signals 4616 and the amplitude signals 4620 and modulate the phase signals 4616 and the amplitude signals 4620 indicative of the first and second input data onto an output signal 4624 such that the output signal 4624 has the first and second input data encoded in a second modulation format. The output signal 4624 may have a carrier frequency in the THz frequency band 104. In some implementations, the carrier frequency is in a range between 500 GHz and 10 THz. As described in more detail below, the modulator 4608 may be further configured to receive or generate a local oscillator (LO) signal 5012 being an electrical signal in the 500 GHz to 10 THz range (shown in FIGS. 50A and 50B), onto which the phase signals 4616 and the amplitude signals 4620 are modulated to produce the output signal 4624. Further, as described in more detail below, the second modulation format may be different from the first modulation format.

In some implementations, the first modulation format is a pulse-amplitude-modulation-n (PAMn) format, and the second modulation format is an m-quadrature-amplitude-modulation (mQAM) format. In some such implementations, the first modulation format is a pulse-amplitude-modulation-4 (PAM4) format and the second modulation format is a 16-quadrature-amplitude-modulation (16QAM) format. However, in other implementations, the first modulation format and the second modulation format may be modulation formats other than PAMn, PAM4, mQAM, or 16QAM.

Figure 46B:
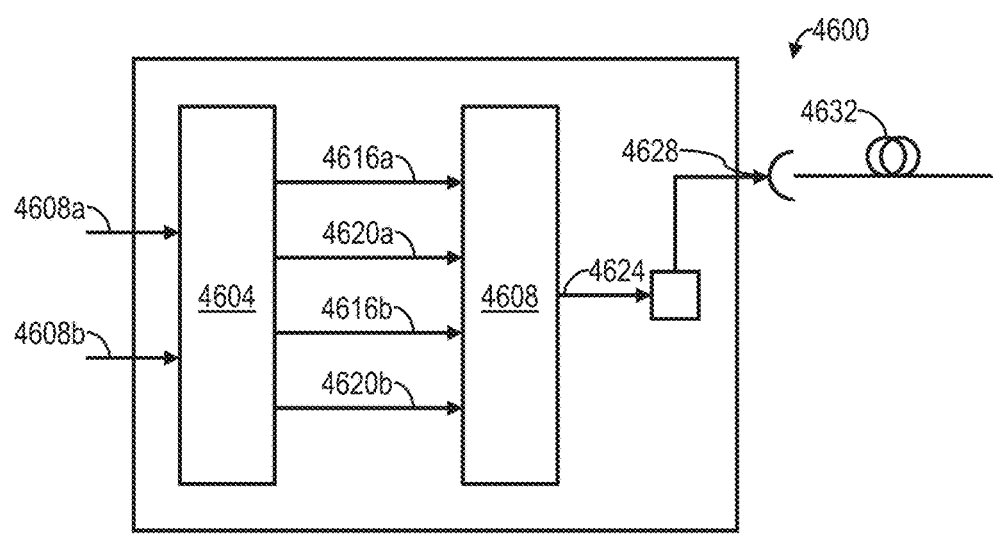
FIG. 46B is a diagrammatic view of another exemplary implementation of a network element constructed in accordance with the present disclosure, wherein the network element is configured to perform direct conversion from the first modulation format to the second modulation format in the THz frequency band and includes an RF antenna.

Referring now to FIG. 46B, shown therein is a diagrammatic view of another exemplary implementation of the network element 4600 constructed in accordance with the present disclosure. As shown in FIG. 46B, in some implementations, the network element 4600 further comprises an antenna 4628 configured to receive the output signal 4624 and couple the output signal 4624 into a hollow waveguide 4632. In some implementations, the hollow waveguide 4632 is a fiber (either hollow or solid) configured to propagate electromagnetic waves in the THz frequency band 104. The antenna 4628 is coupled to the modulator 4608 with one or more signal path, which may be a bus or electrical circuit.

Figure 47A:
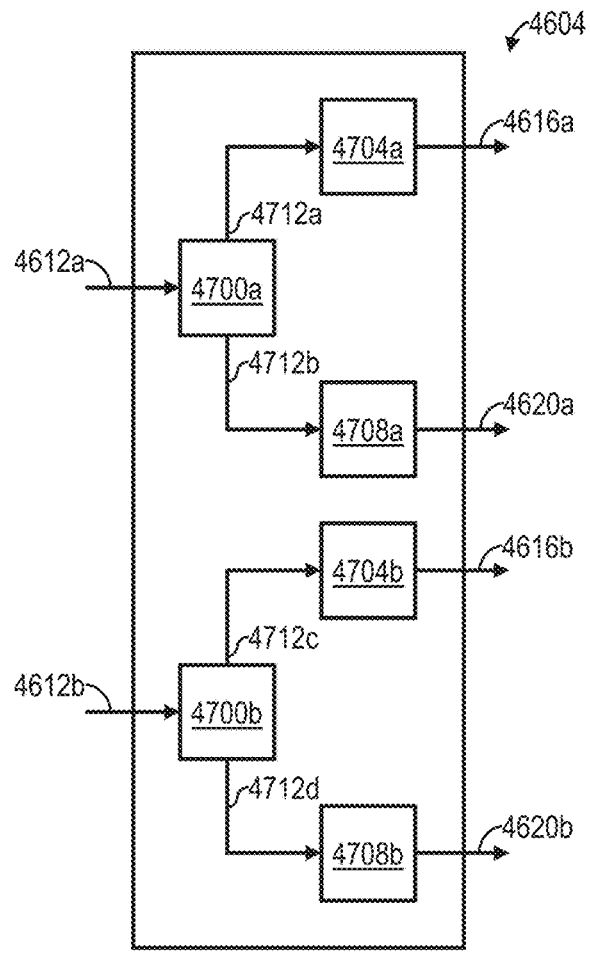
FIG. 47A is a diagrammatic view of an exemplary implementation of a demodulator shown in FIG. 46A.

Referring now to FIG. 47A, shown therein is a diagrammatic view of an exemplary implementation of a demodulator 4604 constructed in accordance with the present disclosure. As shown in FIG. 47A, the demodulator 4604 may comprise a first splitter 4700a and a second splitter 4700b, one or more phase demodulator 4704 (hereinafter, the "phase demodulators 4704"), and one or more amplitude demodulator 4708 (hereinafter, the "amplitude demodulators 4708") that are coupled together as shown in FIG. 47A with one or more bus or electrical circuit.

The first splitter 4700a and the second splitter 4700b may be configured to receive the first input signal 4612a and the second input signal 4612b, respectively, split the first input signal 4612a and the second input signal 4612b, respectively, into at least two pre-demodulation signals 4712 (hereinafter, the "pre-demodulation signals 4712"). For example, the first splitter 4700a may be configured to receive the first input signal 4612a and split the first input signal 4612a into a first pre-demodulation signal 4712a and a second pre-demodulation signal 4712b shown in FIG. 47A, and the second splitter 4700b may be configured to receive the second input signal 4612b and split the second input signal 4612b into a third pre-demodulation signal 4712c and a fourth pre-demodulation signal 4712d shown in FIG. 47A.

The phase demodulators 4704 may include a first phase demodulator 4704a and a second phase demodulator 4704b. The first phase demodulator 4704a may be configured to extract a series of first phase signals 4616a from the first pre-demodulation signal 4712a, and the second phase demodulator 4704b may be configured to extract a series of second phase signals 4616b from the third pre-demodulation signal 4712c such that the first phase signals 4616a are synchronized with the second phase signals 4616b and can be used to represent the input data encoded into the input signals 4612.

The amplitude demodulators 4708 may include a first amplitude demodulator 4708a and a second amplitude demodulator 4708b. The first amplitude demodulator 4708a may be configured to extract the first amplitude signal 4620a from the second pre-demodulation signal 4712b, and the second amplitude demodulator 4708b may be configured to extract the second amplitude signal 4620b from the fourth pre-demodulation signal 4712d.

Figure 47B:
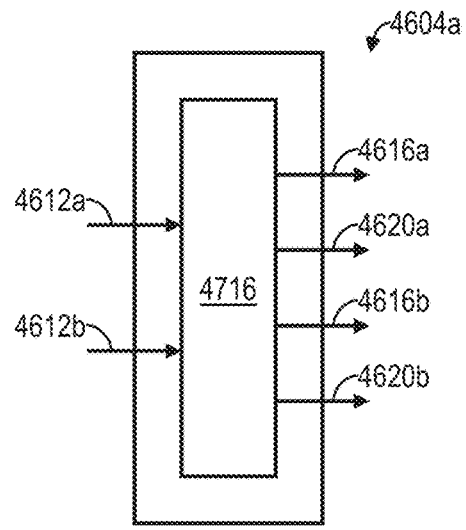
FIG. 47B is a diagrammatic view of another exemplary implementation of a demodulator constructed in accordance with the present disclosure, wherein the demodulator includes a clock-and-data-recovery circuit (CDR)

Referring now to FIG. 47B, shown therein is a diagrammatic view of another exemplary implementation of a demodulator 4604a constructed in accordance with the present disclosure. As shown in FIG. 47B, the demodulator 4604a may comprise a clock-and-data-recovery circuit (CDR) 4716 configured to extract the first phase signal 4616a and the first amplitude signal 4620a from the first input signal 4612a, and the second phase signal 4616b and the second amplitude signal 4620b from the second input signal 4612b. That is, the CDR circuit 4716, like the demodulator 4604 described above, may be configured to decompose the input signals 4612 into individual bitstreams and produce the phase signals 4616 and the amplitude signals 4620 based on the individual bitstreams. As described herein, the CDR circuit 4716 may be similar to a conventional CDR circuit in that the CDR circuit 4716 of the present disclosure receives the input signals 4612 (e.g., PAM4 signals); however, unlike the conventional CDR circuit which may provide signals having the same modulation format (e.g., PAM4 signals) as outputs, the CDR circuit 4716 of the present disclosure may provide the phase signals 4616 and the amplitude signals 4620 as outputs.

Figure 48:
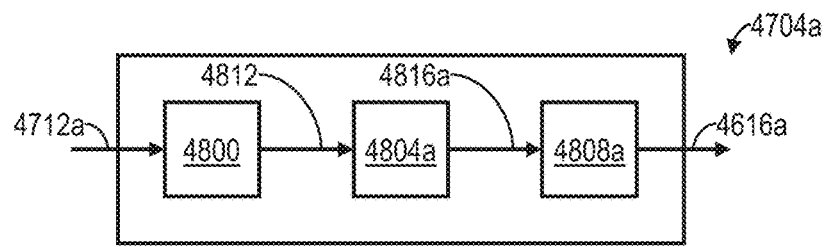
FIG. 48 is a diagrammatic view of an exemplary implementation of a first phase demodulator shown in FIG. 47A.

Referring now to FIG. 48, shown therein is a diagrammatic view of an exemplary implementation of a first phase demodulator 4704a constructed in accordance with the present disclosure. However, it should be understood that any one of the phase demodulators 4704 described herein may be similar in form and function to the first phase demodulator 4704a shown in FIG. 48. As shown in FIG. 48, the first phase demodulator 4704a may comprise an amplifier 4800, a first alternating current (AC) coupler 4804a, and a first comparator 4808a that are coupled together as shown in FIG. 48 with one or more bus or electrical circuit.

The amplifier 4800 may be configured to receive the first pre-demodulation signal 4712a (in electrical form) and limit an amplitude of the first pre-demodulation signal 4712a to produce an amplitude-limited signal 4812 (in electrical form). In some implementations, the amplifier 4800 is a limiting amplifier.

The first AC coupler 4804a may be configured to receive the amplitude-limited signal 4812 and block passage of direct current (DC) signals while allowing passage of AC signals, thereby removing any DC offset from the amplitude-limited signal 4812 to produce a first threshold-centered signal 4816a, wherein the first threshold-centered signal 4816a is centered around a predetermined threshold voltage. In some implementations, the predetermined threshold voltage is zero.

The first comparator 4808a may be configured to receive the first threshold-centered signal 4816a and determine a polarity (i.e., positive or negative) of the first threshold-centered signal 4816a to produce the first phase signal 4616a (in electrical form). In some implementations, the first comparator 4808a is a sign-check comparator.

Figure 49:
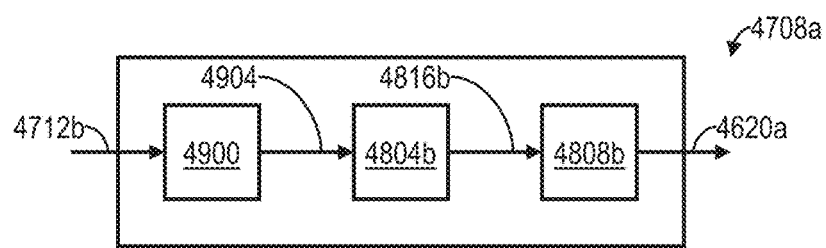
FIG. 49 is a diagrammatic view of an exemplary implementation of a first amplitude demodulator shown in FIG. 47A.

Referring now to FIG. 49, shown therein is a diagrammatic view of an exemplary implementation of a first amplitude demodulator 4708a constructed in accordance with the present disclosure. However, it should be understood that any one of the amplitude demodulators 4708 described herein may be similar in form and function to the first amplitude demodulator 4708a shown in FIG. 49. As shown in FIG. 49, the first amplitude demodulator 4708a may comprise a magnitude extraction circuit 4900, a second AC coupler 4804b, and a second comparator 4808b that are coupled together as shown in FIG. 49 with one or more bus or electrical circuit.

The magnitude extraction circuit 4900 may be configured to receive the second pre-demodulation signal 4712b (in electrical form) and determine an amplitude of the second pre-demodulation signal 4712b to produce a rectified signal 4904 (in electrical form). In some implementations, the magnitude extraction circuit 4900 is a rectifier. In other implementations, the magnitude extraction circuit 4900 may be a squaring circuit, for example.

The second AC coupler 4804b may be configured to receive the rectified signal 4904 (in electrical form) and block passage of DC signals while allowing passage of AC signals, thereby removing any DC offset from the rectified signal 4904 to produce a second threshold-centered signal 4816b (in electrical form), wherein the second threshold-centered signal 4816b is centered around a predetermined threshold voltage. In some implementations, the predetermined threshold voltage is zero.

The second comparator 4808b may be configured to receive the second threshold-centered signal 4816b and determine a polarity (i.e., positive or negative) of the second threshold-centered signal 4816*b* to produce the first amplitude signal 4620*a* (in electrical form). That is, if the polarity of the second threshold-centered signal 4816*b* is positive, the first amplitude signal 4620*a* may have a nonzero value (e.g., 1), and if the polarity of the second threshold-centered signal 4816*b* is negative, the first amplitude signal 4620*a* may have a zero value (i.e., 0). In some implementations, the second comparator 4808*b* is a sign-check comparator.

Figure 50A:
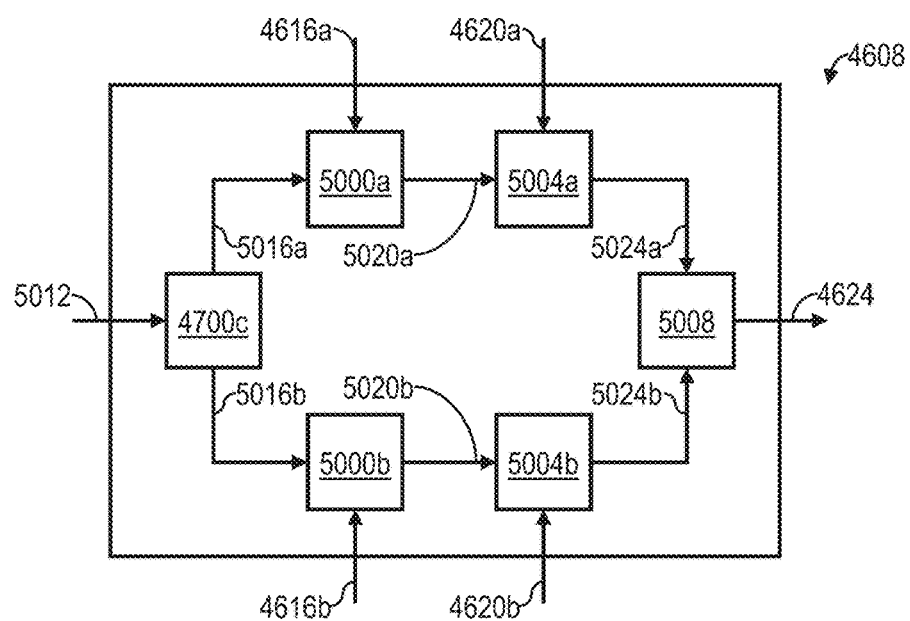
FIG. 50A is a diagrammatic view of an exemplary implementation of a modulator shown in FIGS. 46A and 46B.

Referring now to FIG. 50A, shown therein is a diagrammatic view of an exemplary implementation of a modulator 4608 constructed in accordance with the present disclosure. As shown in FIG. 50A, the modulator 4608 may comprise a third splitter 4700*c*, a first phase modulator 5000*a*, a second phase modulator 5000*b*, a first amplitude modulator 5004*a*, a second amplitude modulator 5004*b*, and a combiner 5008 that are coupled together as shown in FIG. 50 with one or more bus or electrical circuit.

The third splitter 4700*c* may be configured to receive an LO signal 5012 generated by an LO generator (not shown) external to the modulator 4608 and split the LO signal 5012 into one or more unmodulated carrier signal 5016 (in electrical form) (hereinafter, the "unmodulated carrier signals 5016"). That is, the third splitter 4700*c* may be configured to receive the LO signal 5012 and split the LO signal 5012 into a first unmodulated carrier signal 5016*a* (in electrical form) and a second unmodulated carrier signal 5016*b* (in electrical form) shown in FIG. 50A. In some implementations, the first unmodulated carrier signal 5016*a* may represent an I component of the output signal 4624, and the second unmodulated carrier signal 5016*b* may represent a Q component of the output signal 4624.

The first phase modulator 5000*a* may be configured to receive the first unmodulated carrier signal 5016*a* (i.e., the I component of the output signal 4624) and the first phase signal 4616*a* and modulate the first phase signal 4616*a* onto the first unmodulated carrier signal 5016*a* to produce a first phase-modulated carrier signal 5020*a*. The first amplitude modulator 5004*a* may be configured to receive the first phase-modulated carrier signal 5020*a* and the first amplitude signal 4620*a* and modulate the first amplitude signal 4620*a* onto the first phase-modulated carrier signal 5020*a* to produce a first phase-amplitude-modulated carrier signal 5024*a*.

The second phase modulator 5000*b* may be configured to receive the second unmodulated carrier signal 5016*b* (i.e., the Q component of the output signal 4624) and the second phase signal 4616*b* and modulate the second phase signal 4616*b* onto the second unmodulated carrier signal 5016*b* to produce a second phase-modulated carrier signal 5020*b*. The second amplitude modulator 5004*b* may be configured to receive the second phase-modulated carrier signal 5020*b* and the second amplitude signal 4620*b* and modulate the second amplitude signal 4620*b* onto the second phase-modulated carrier signal 5020*b* to produce a second phase-amplitude-modulated carrier signal 5024*b*.

The combiner 5008 may be configured to receive the first phase-amplitude-modulated carrier signal 5024*a* and the second phase-amplitude-modulated carrier signal 5024*b* and combine the first phase-amplitude-modulated carrier signal 5024*a* and the second phase-amplitude-modulated carrier signal 5024*b* to produce the output signal 4624 such that the output signal 4624 is encoded in the second modulation format.

In some implementations, the LO signal 5012 has an LO frequency equal to the carrier frequency (i.e., a frequency in the range between 500 GHz and 10 THz). However, in other implementations, the LO signal 5012 has an LO frequency less than the carrier frequency. In such implementations, the combiner 5008 is configured to receive the first phase-amplitude-modulated carrier signal 5024*a* and the second phase-amplitude-modulated carrier signal 5024*b* and combine the first phase-amplitude-modulated carrier signal 5024*a* and the second phase-amplitude-modulated carrier signal 5024*b* to produce an intermediate signal (not shown) having the LO frequency, and the network element 4600 further comprises an up-converter (not shown) configured to receive the intermediate signal and up-convert the intermediate signal to produce the output signal 4624 (in electrical form) having the carrier frequency. In still other implementations, the LO signal 5012 has an LO frequency greater than the carrier frequency. In such implementations, the combiner 5008 is configured to receive the first phase-amplitude-modulated carrier signal 5024*a* and the second phase-amplitude-modulated carrier signal 5024*b* and combine the first phase-amplitude-modulated carrier signal 5024*a* and the second phase-amplitude-modulated carrier signal 5024*b* to produce an intermediate signal (not shown) having the LO frequency, and the network element 4600 further comprises a downconverter (not shown) configured to receive the intermediate signal and down-convert the intermediate signal to produce the output signal 4624 (in electrical form) having the carrier frequency.

Figure 50B:
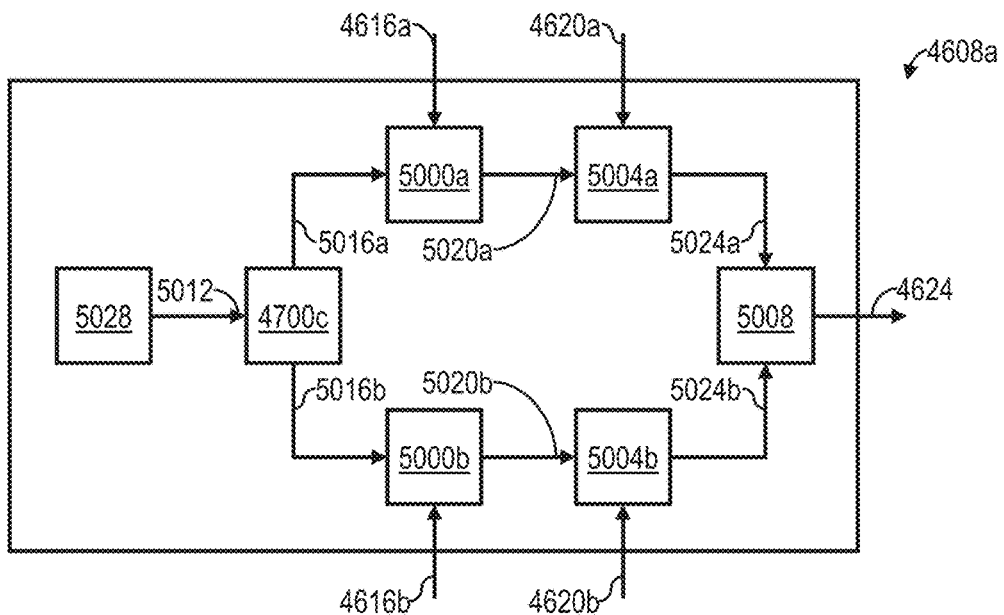
FIG. 50B is a diagrammatic view of another exemplary implementation of the modulator shown in FIGS. 46A and 46B, wherein the modulator includes a local oscillator (LO) generator.

Referring now to FIG. 50B, shown therein is a diagrammatic view of another exemplary implementation of a modulator 4608*a* constructed in accordance with the present disclosure. As shown in FIG. 50B, in some implementations, the third splitter 4700*c* may be electrically coupled to an LO generator 5028 and receive the LO signal 5012 (in electrical form) from the LO generator 5028 that is internal to the modulator 4608*a*.

Figure 52:
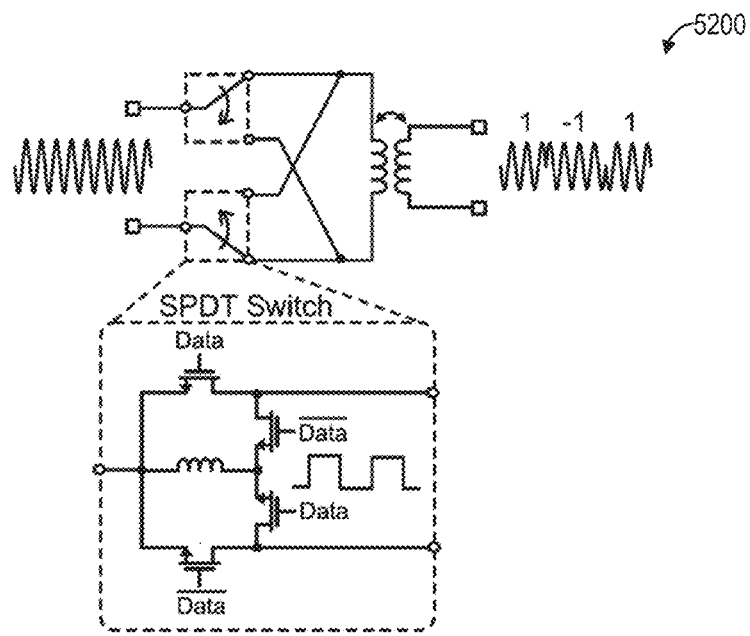
FIG. 52 is a diagrammatic view of an exemplary implementation of a first phase modulator shown in FIGS. 50A and 50B, wherein the first phase modulator comprises a crossbar switch.
Figures 53A, 53B, 53C:
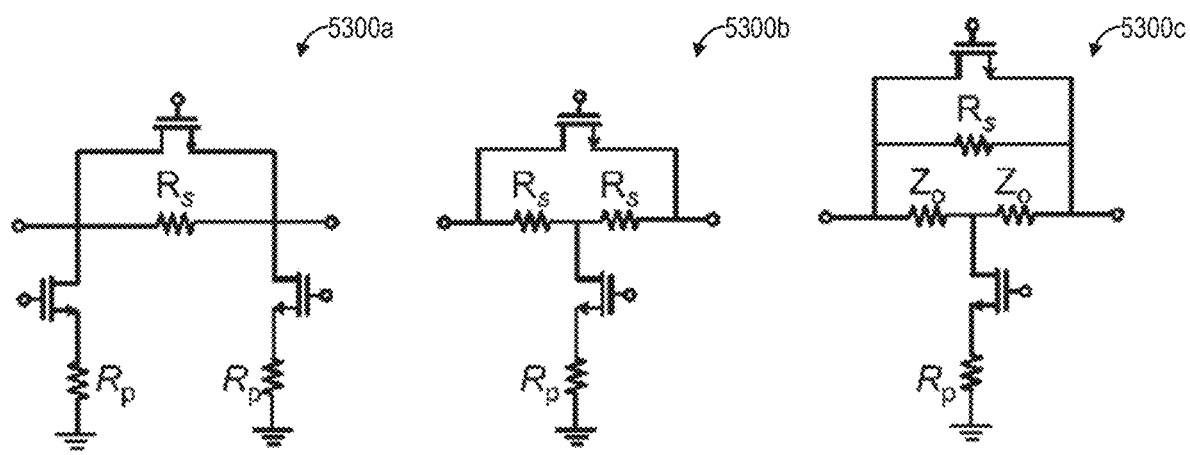
FIG. 53A is a diagrammatic view of an exemplary implementations of a first amplitude modulator shown in FIGS. 50A and 50B, wherein the first amplitude modulator comprises a PI-type switched attenuator.
FIG. 53B is a diagrammatic view of another exemplary implementations of the first amplitude modulator shown in FIGS. 50A and 50B, wherein the first amplitude modulator comprises a T-type switched attenuator.
FIG. 53C is a diagrammatic view of another exemplary implementations of the first amplitude modulator shown in FIGS. 50A and 50B, wherein the first amplitude modulator comprises a bridged T-type switched attenuator.

In some implementations, one or more of the first phase modulator 5000*a* and the second phase modulator 5000*b* comprises a crossbar switch 5200 (shown in FIG. 52) configured to select one of a 0° signal and a 180° signal. In some implementations, one or more of the first amplitude modulator 5004*a* and the second amplitude modulator 5004*b* comprises a switched attenuator (e.g., a PI-type attenuator 5300*a* shown in FIG. 53A, a T-type attenuator 5300*b* shown in FIG. 53B, and a bridged T-type attenuator 5300*c* shown in FIG. 53C) configured to produce signals having one of a first amplitude level and a second amplitude level. In other implementations, one or more of the first amplitude modulator 5004*a* and the second amplitude modulator 5004*b* comprises one of a switched amplifier and a variable gain amplifier.

In some implementations, the first amplitude level is 1 V, and the second amplitude level is 3 V. However, in other implementations, the first amplitude level is a number of volts greater or less than 1, and the second amplitude level is a number of volts greater or less than 3. In such implementations, the first amplitude level may be a fraction (e.g., ¼, ⅓, or ½) of the second amplitude level.

Figure 51:
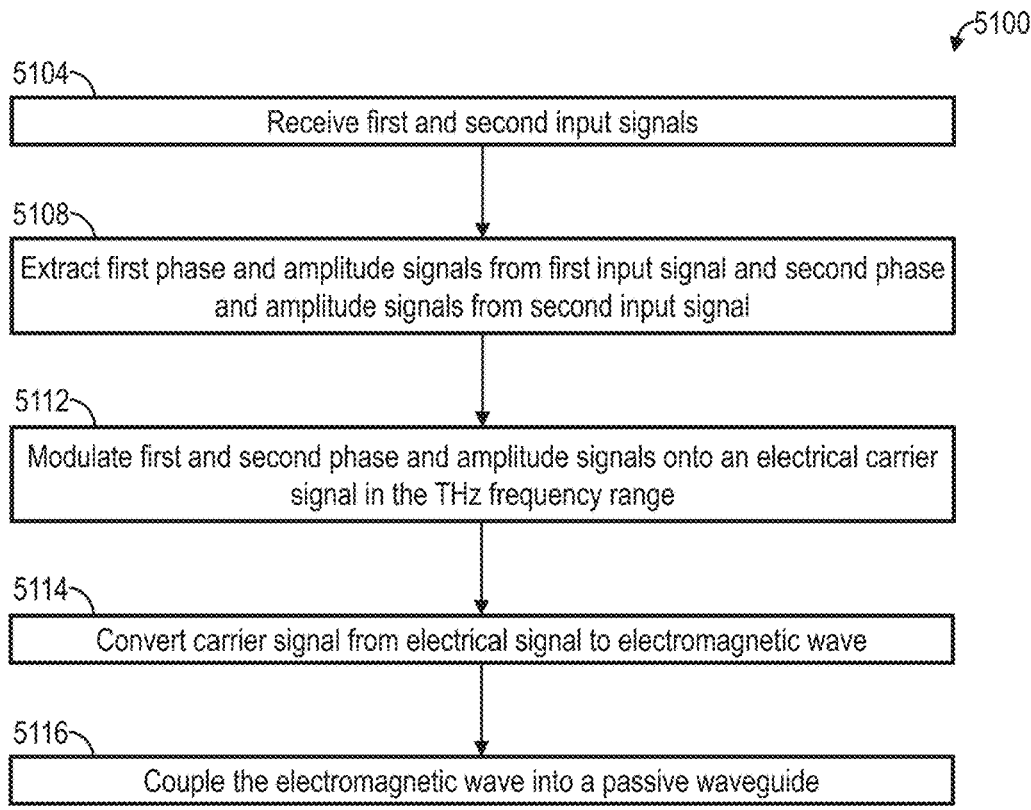
FIG. 51 is a diagrammatic view of an exemplary implementation of a method for performing direct modulation from the first modulation format to the second modulation format in in an electrical signal in the THz frequency band.

Referring now to FIG. 51, shown therein is a diagrammatic view of an exemplary implementation of a method 5100 for performing direct modulation from the first modulation format to the second modulation format in the THz frequency band 104. As shown in FIG. 51, the method 5100 may comprise the steps of: receiving, by the demodulator 4604, the first input signal 4612*a* and the second input signal 4612*b*, the first input signal 4612*a* having the first input data, the second input signal 4612*b* having the second input data, the first input data and the second input data encoded in the first modulation format (step 5104); extracting, by the demodulator 4604, the first phase signal 4616*a* and the first amplitude signal 4620a from the first input signal 4612a and the second phase signal 4616b and the second amplitude signal 4620b from the second input signal 4612b (step 5108); modulating, by the modulator 4608, the first phase signal 4616a, the first amplitude signal 4620a, the second phase signal 4616b, and the second amplitude signal 4620b onto the output signal 4624 such that the output signal 4624 is encoded in the second modulation format, the output signal 4624 having the carrier frequency in the range between 500 GHz and 2 THz (step 5112); converting, by the antenna 4628, the output signal 4624 from an electrical signal to an electromagnetic wave (step 5114); and coupling, by the antenna 4628, the electromagnetic wave into the hollow waveguide 4632 (step 5116).

In some implementations, receiving the first input signal 4612a and the second input signal 4612b (step 5104) is further defined as receiving, by the demodulator 4604, the first input signal 4612a and the second input signal 4612b, the first input signal 4612a having the first input data, the second input signal 4612b having the second input data, the first input data and the second input data encoded in the first modulation format, wherein the first modulation format is the PAMn (e.g., PAM4) format.

In some implementations, extracting the first phase signal 4616a and the first amplitude signal 4620a from the first input signal 4612a and the second phase signal 4616b and the second amplitude signal 4620b from the second input signal 4612b (step 5108) is further defined as extracting, by the demodulator 4604, the first phase signal 4616a and the first amplitude signal 4620a from the first input signal 4612a and the second phase signal 4616b and the second amplitude signal 4620b from the second input signal 4612b, wherein the demodulator 4604 includes the CDR circuit 4716.

In some implementations, extracting the first phase signal 4616a and the first amplitude signal 4620a from the first input signal 4612a and the second phase signal 4616b and the second amplitude signal 4620b from the second input signal 4612b (step 5108) further comprises: splitting, by the first splitter 4700a, the first input signal 4612a into the first pre-demodulation signal 4712a and the second pre-demodulation signal 4712b; splitting, by the second splitter 4700b, the second input signal 4612b into the third pre-demodulation signal 4712c and the fourth pre-demodulation signal 4712d; extracting, by the first phase demodulator 4704a, the first phase signal 4616a from the first pre-demodulation signal 4712a; extracting, by the first amplitude demodulator 4708a, the first amplitude signal 4620a from the second pre-demodulation signal 4712b; extracting, by the second phase demodulator 4704b, the second phase signal 4616b from the third pre-demodulation signal 4712c; extracting, by the second amplitude demodulator 4708b, the second amplitude signal 4620b from the fourth pre-demodulation signal 4712d.

In some implementations, extracting the first phase signal 4616a and the first amplitude signal 4620a from the first input signal 4612a and the second phase signal 4616b and the second amplitude signal 4620b from the second input signal 4612b (step 5108) is further defined as: extracting, by the first phase demodulator 4704a, the first phase signal 4616a from the first pre-demodulation signal 4712a by passing the first pre-demodulation signal 4712a to the amplifier 4800 having an output connected to an input of the first comparator 4808a; extracting, by the first amplitude demodulator 4708a, the first amplitude signal 4620a from the second pre-demodulation signal 4712b by passing the second pre-demodulation signal 4712b to the magnitude extraction circuit 4900 having an output connected to an input of the second comparator 4808b; extracting, by the second phase demodulator 4704b, the second phase signal 4616b from the third pre-demodulation signal 4712c by passing the third pre-demodulation signal 4712c to the amplifier 4800 having an output to an input of the first comparator 4808a; and extracting, by the second amplitude demodulator 4708b, the second amplitude signal 4620b from the fourth pre-demodulation signal 4712d by passing the fourth pre-demodulation signal 4712d to the magnitude extraction circuit 4900 having an output connected to an input of the second comparator 4808b.

In some implementations, modulating the first phase signal 4616a, the first amplitude signal 4620a, the second phase signal 4616b, and the second amplitude signal 4620b onto the output signal 4624 (step 5112) is further defined as modulating, by the modulator 4608, the first phase signal 4616a, the first amplitude signal 4620a, the second phase signal 4616b, and the second amplitude signal 4620b onto the output signal 4624 such that the output signal 4624 is encoded in the second modulation format, the output signal 4624 having the carrier frequency in the range between 500 GHz and 2 THz, wherein the second modulation format is the mQAM (e.g., 16QAM) format.

In some implementations, modulating the first phase signal 4616a, the first amplitude signal 4620a, the second phase signal 4616b, and the second amplitude signal 4620b onto the output signal 4624 (step 5112) further comprises: splitting, by the third splitter 4700c, the LO signal 5012 into the first unmodulated carrier signal 5016a and the second unmodulated carrier signal 5016b; modulating, by the first phase modulator 5000a, the first phase signal 4616a onto the first unmodulated carrier signal 5016a; modulating, by the first amplitude modulator 5004a, the first amplitude signal 4620a onto the first unmodulated carrier signal 5016a (i.e., the first phase-modulated carrier signal 5020a); modulating, by the second phase modulator 5000b, the second phase signal 4616b onto the second unmodulated carrier signal 5016b; modulating, by the second amplitude modulator 5004b, the second amplitude signal 4620b onto the second unmodulated carrier signal 5016b (i.e., the second phase-modulated carrier signal 5020b); and combining, by the combiner 5008, the first unmodulated carrier signal 5016a (i.e., the first phase-amplitude-modulated carrier signal 5024a) and the second unmodulated carrier signal 5016b (i.e., the second phase-amplitude-modulated carrier signal 5024b) into the output signal 4624 such that the output signal 4624 is encoded in the second modulation format.

In some implementations, modulating the first phase signal 4616a, the first amplitude signal 4620a, the second phase signal 4616b, and the second amplitude signal 4620b onto the output signal 4624 (step 5112) further comprises: splitting, by the third splitter 4700c, the LO signal 5012 into the first unmodulated carrier signal 5016a and the second unmodulated carrier signal 5016b; modulating, by the first amplitude modulator 5004a, the first amplitude signal 4620a onto the first unmodulated carrier signal 5016a; modulating, by the first phase modulator 5000a, the first phase signal 4616a onto the first unmodulated carrier signal 5016a; modulating, by the second amplitude modulator 5004b, the second amplitude signal 4620b onto the second unmodulated carrier signal 5016b; modulating, by the second phase modulator 5000b, the second phase signal 4616b onto the second unmodulated carrier signal 5016b; and combining, by the combiner 5008, the first unmodulated carrier signal 5016a and the second unmodulated carrier signal 5016b into the output signal 4624 such that the output signal 4624 is encoded in the second modulation format.

In some implementations, modulating the first phase signal 4616a, the first amplitude signal 4620a, the second phase signal 4616b, and the second amplitude signal 4620b onto the output signal 4624 (step 5112) is further defined as: modulating, by the first phase modulator 5000a, the first phase signal 4616a onto the first unmodulated carrier signal 5016a, wherein the first phase modulator 5000a is a first crossbar switch; modulating, by the first amplitude modulator 5004a, the first amplitude signal 4620a onto the first unmodulated carrier signal 5016a (i.e., the first phase-modulated carrier signal 5020a), wherein the first amplitude modulator 5004a is a first switched attenuator; and modulating, by the second phase modulator 5000b, the second phase signal 4616b onto the second unmodulated carrier signal 5016b, wherein the second phase modulator 5000b is a second crossbar switch; and modulating, by the second amplitude modulator 5004b, the second amplitude signal 4620b onto the second unmodulated carrier signal 5016b (i.e., the second phase-modulated carrier signal 5020b), wherein the second amplitude modulator 5004b is a second switched attenuator.

Figure 54:
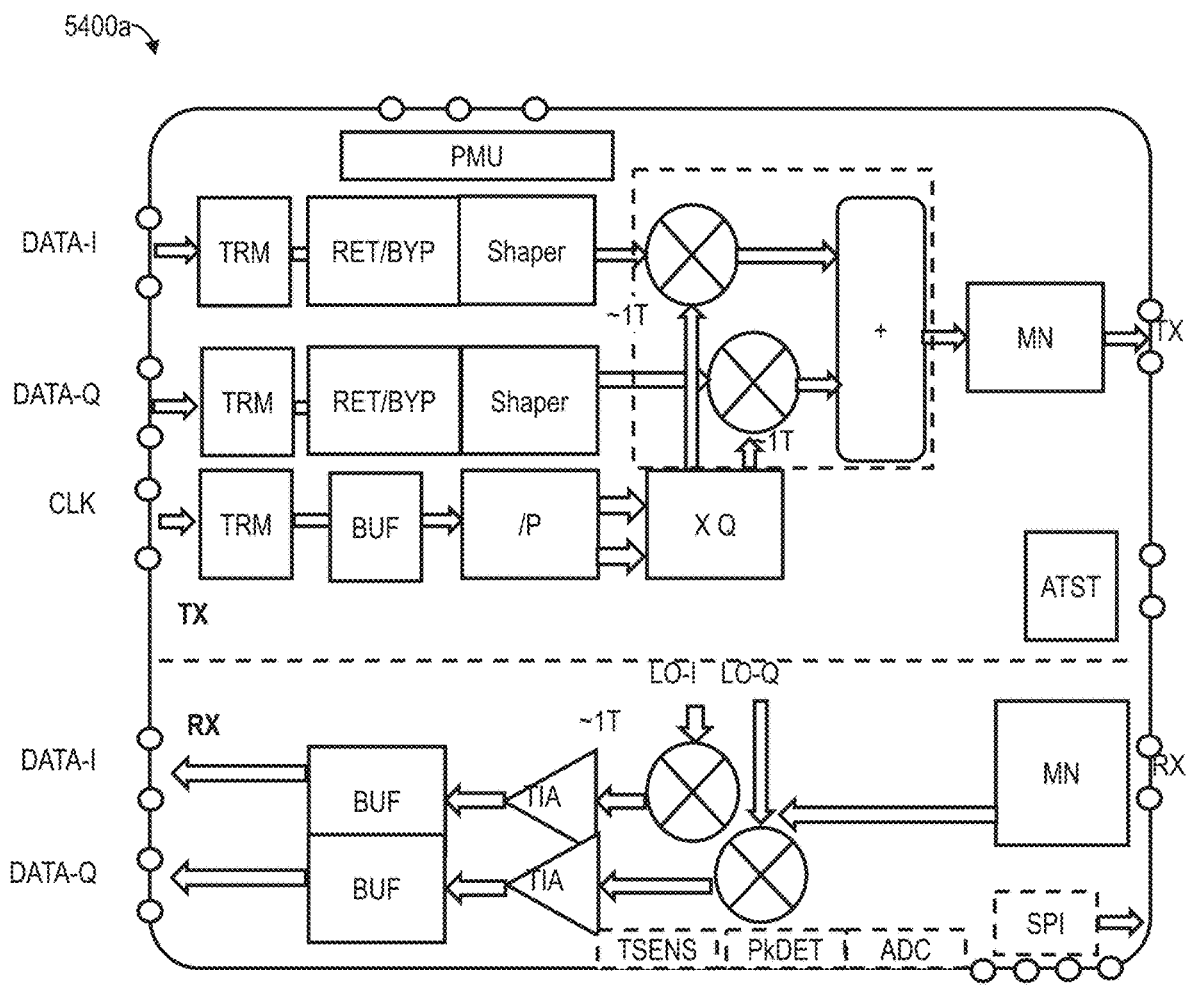
FIG. 54 is a diagrammatic view of another exemplary implementation of a transceiver constructed in accordance with the present disclosure

Referring now to FIG. 54, shown therein is another exemplary implementation of a transceiver 5400a constructed in accordance with the present disclosure.

Figure 55:
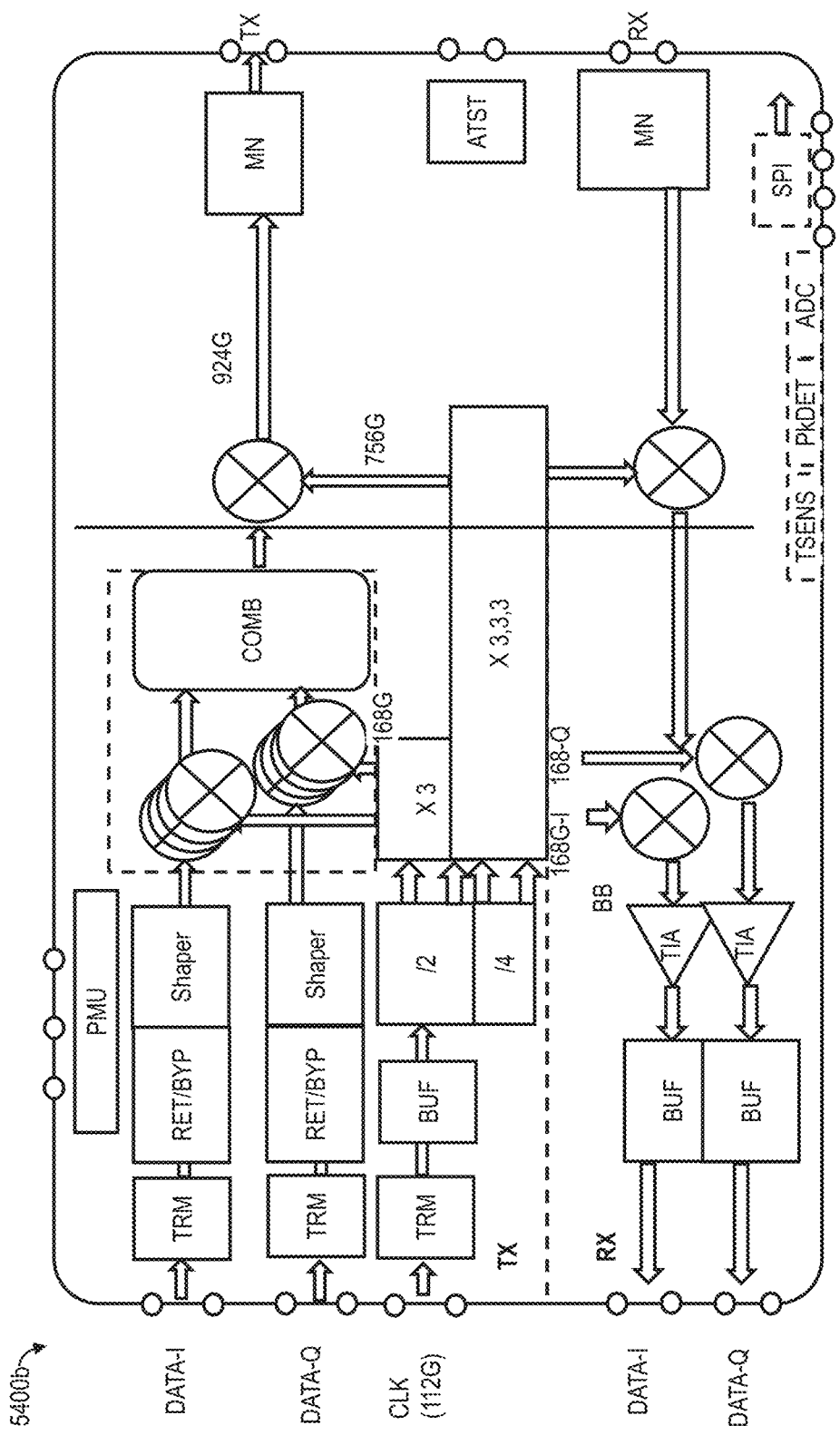
FIG. 55 is a diagrammatic view of another exemplary implementation of a transceiver constructed in accordance with the present disclosure.

Referring now to FIG. 55, shown therein is another exemplary implementation of a transceiver 5400b constructed in accordance with the present disclosure.

Figure 56:
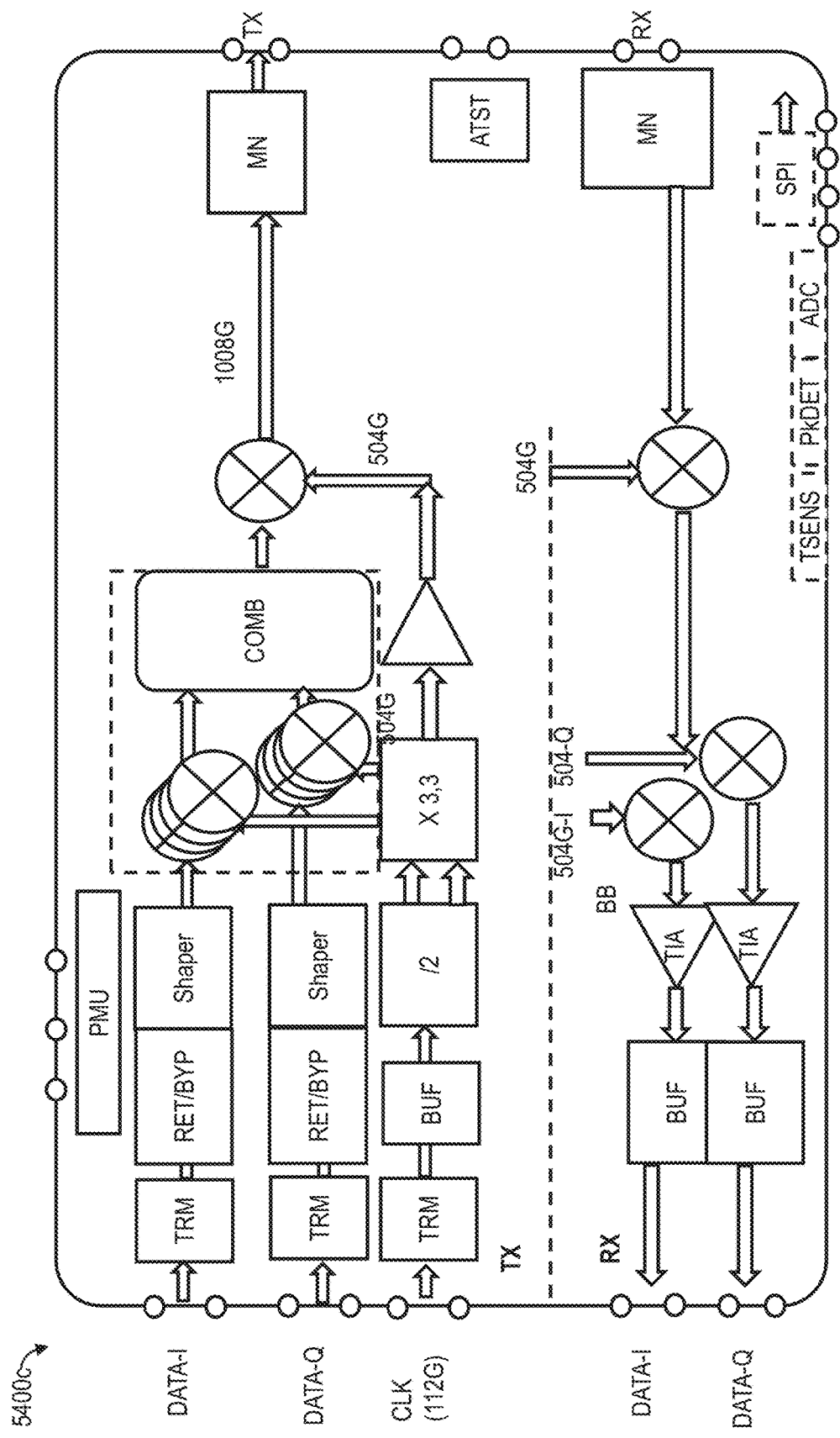
FIG. 56 is a diagrammatic view of another exemplary implementation of a transceiver constructed in accordance with the present disclosure.

Referring now to FIG. 56, shown therein is another exemplary implementation of a transceiver 5400c constructed in accordance with the present disclosure.

Figure 57:
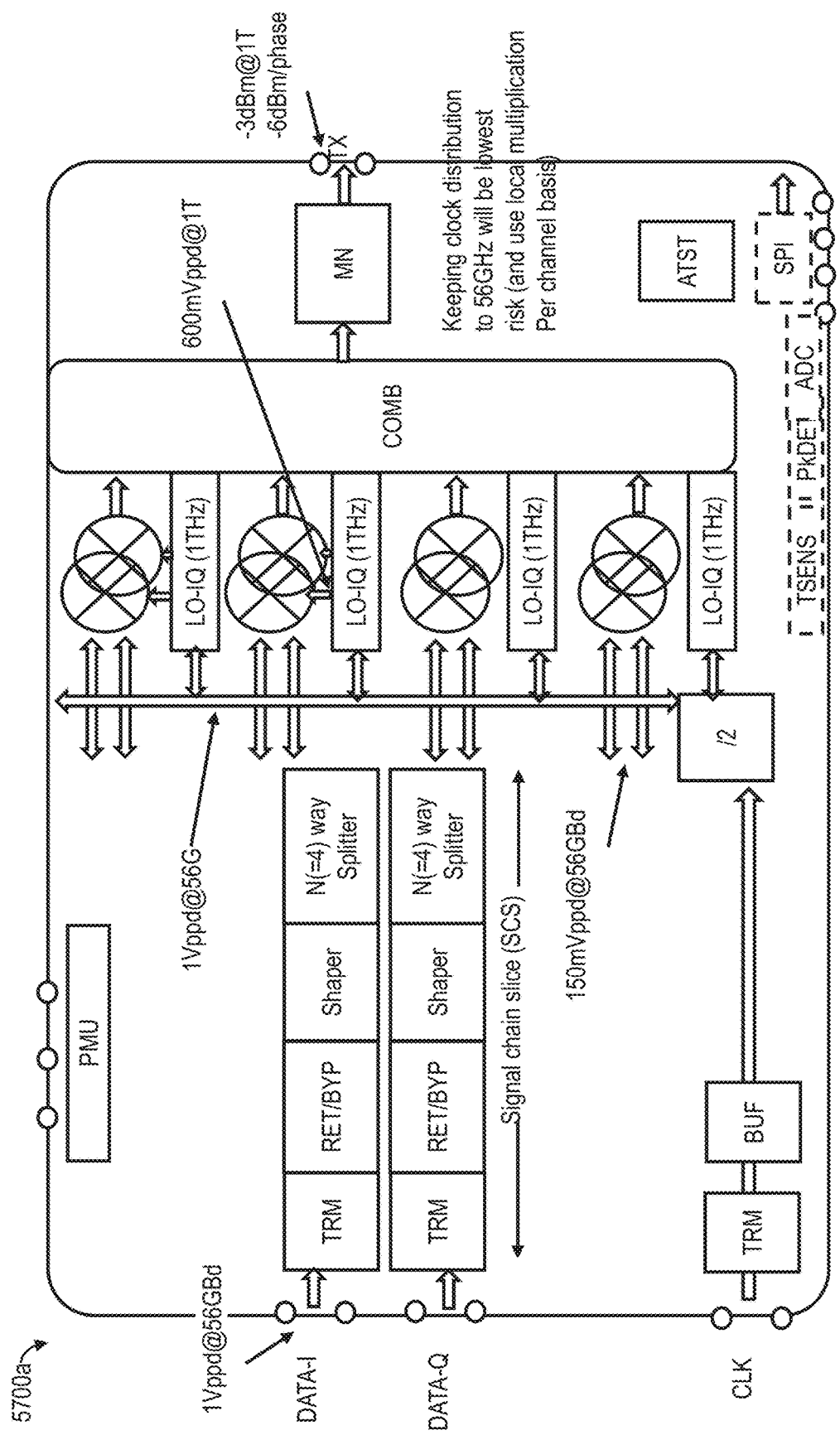
FIG. 57 is a diagrammatic view of another exemplary implementation of a transmitter constructed in accordance with the present disclosure.

Referring now to FIG. 57, shown therein is another exemplary implementation of a transmitter 5700a constructed in accordance with the present disclosure.

Figure 58:
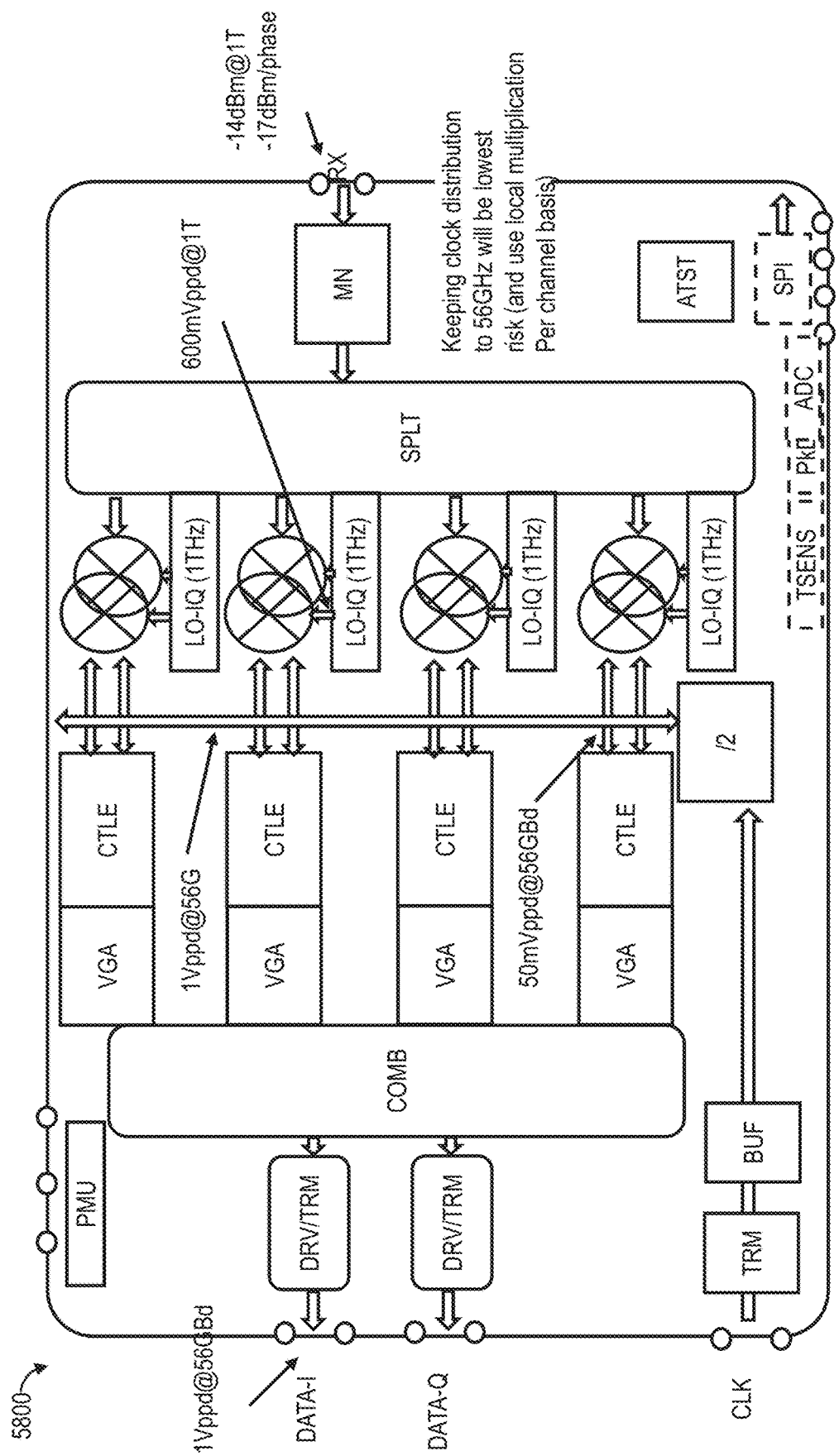
FIG. 58 is a diagrammatic view of another exemplary implementation of a receiver constructed in accordance with the present disclosure.

Referring now to FIG. 58, shown therein is another exemplary implementation of a receiver 5800 constructed in accordance with the present disclosure.

Figure 59:
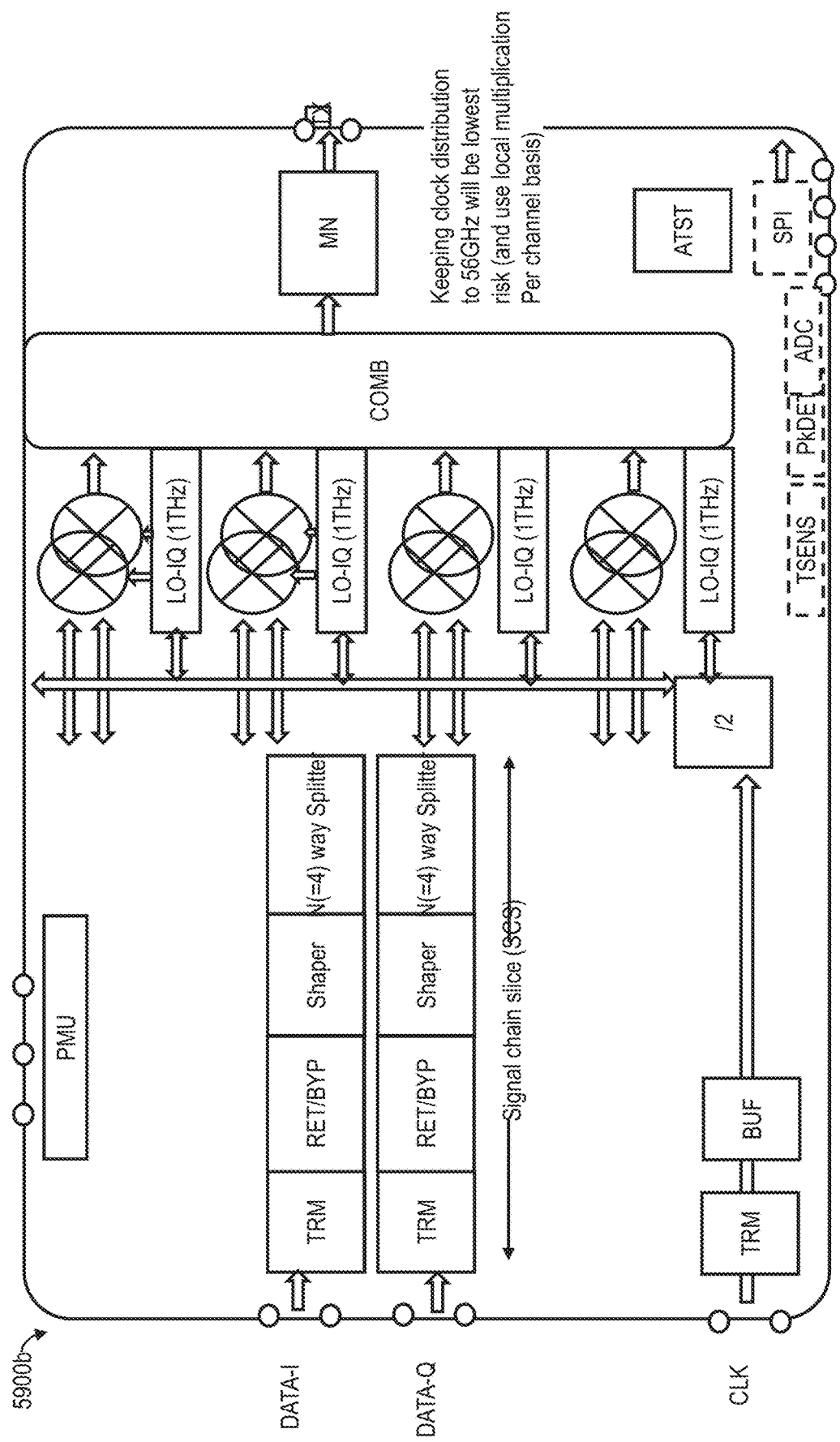
FIG. 59 is a diagrammatic view of another exemplary implementation of a transmitter constructed in accordance with the present disclosure.

Referring now to FIG. 59, shown therein is another exemplary implementation of a transmitter 5700b constructed in accordance with the present disclosure.

Figure 60:
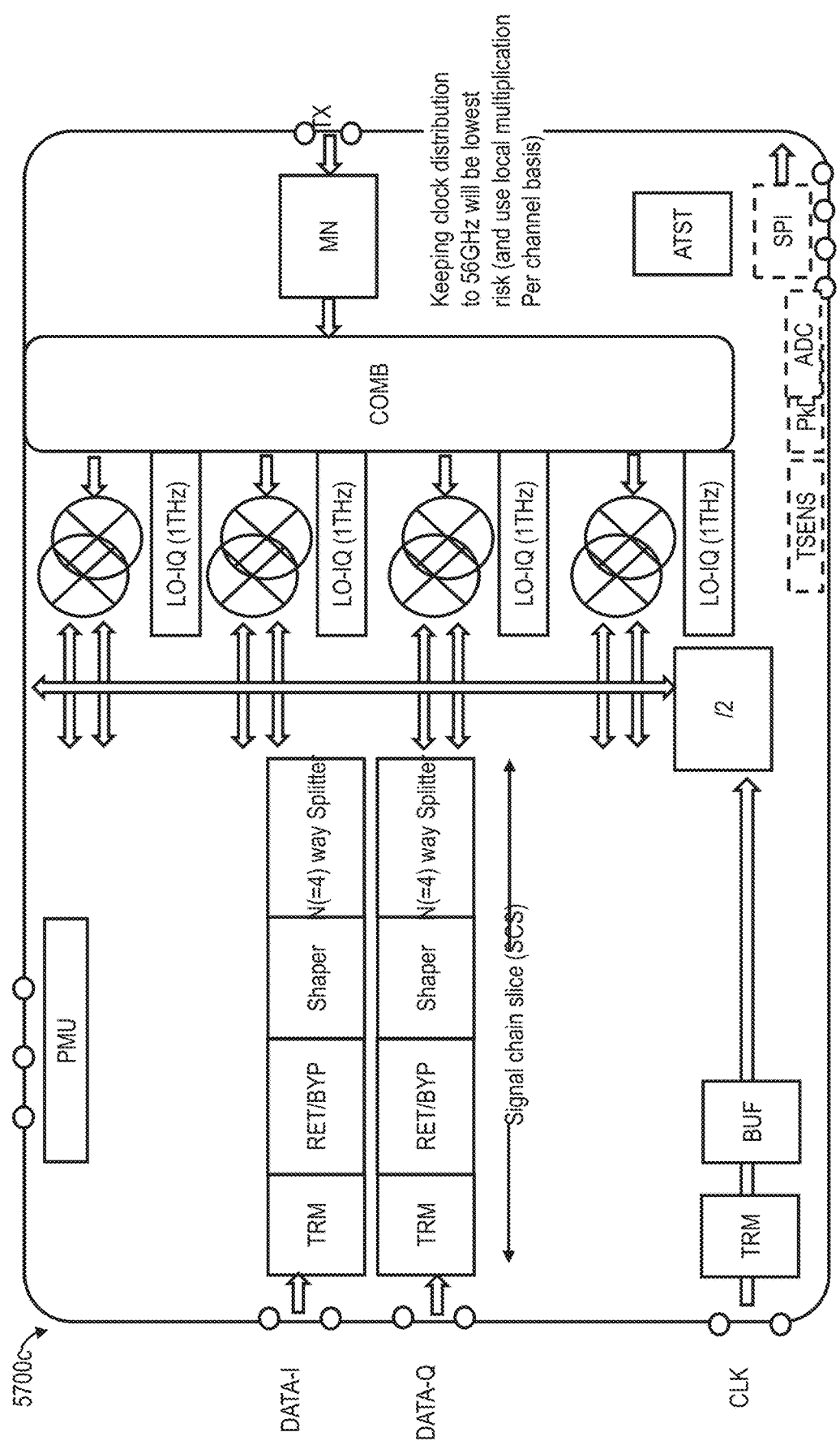
FIG. 60 is a diagrammatic view of another exemplary implementation of a transmitter constructed in accordance with the present disclosure.

Referring now to FIG. 60, shown therein is another exemplary implementation of a transmitter 5700c constructed in accordance with the present disclosure.

Figure 61:
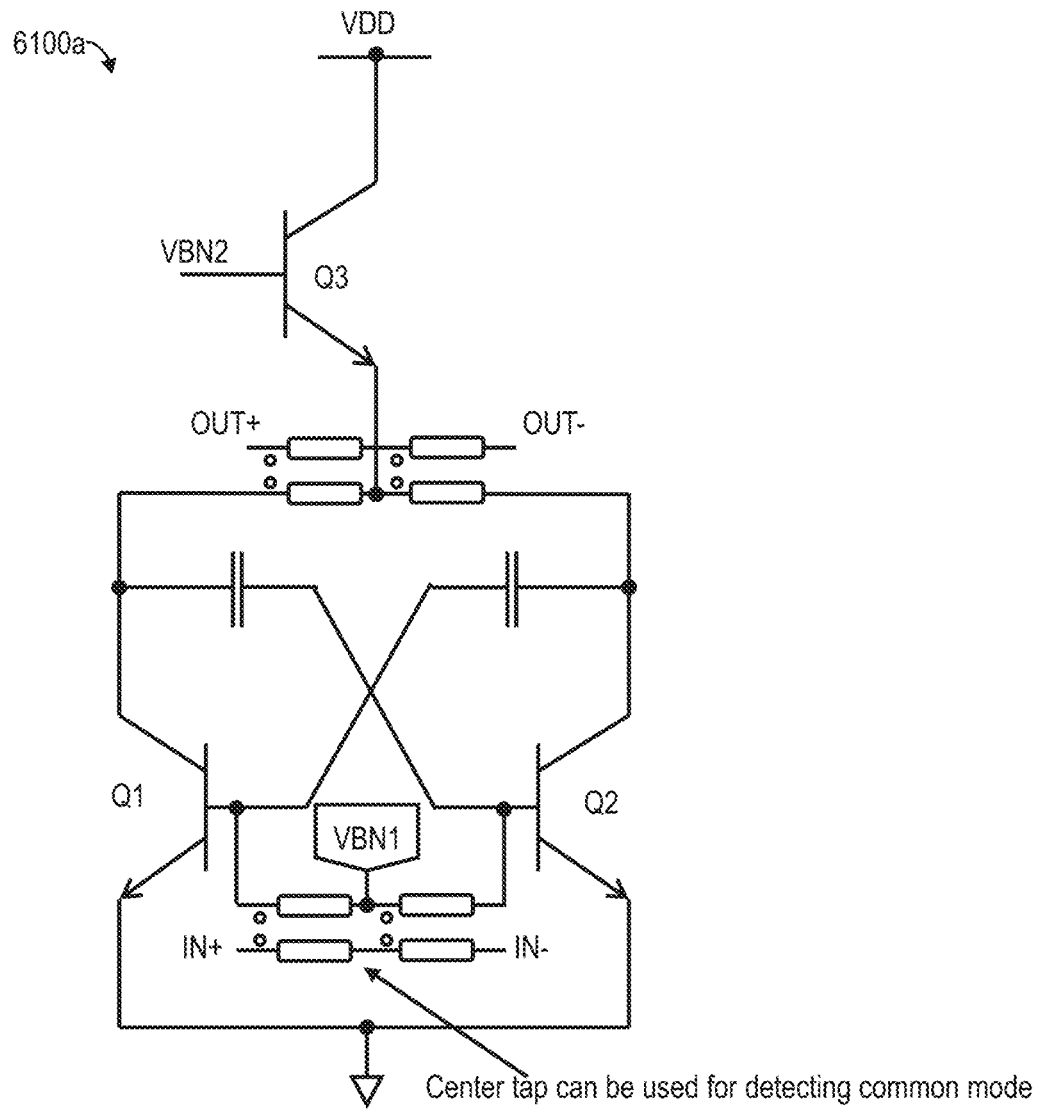
FIG. 61 is a diagrammatic view of an exemplary implementations of a differential circuit constructed in accordance with the present disclosure.
Figure 62:
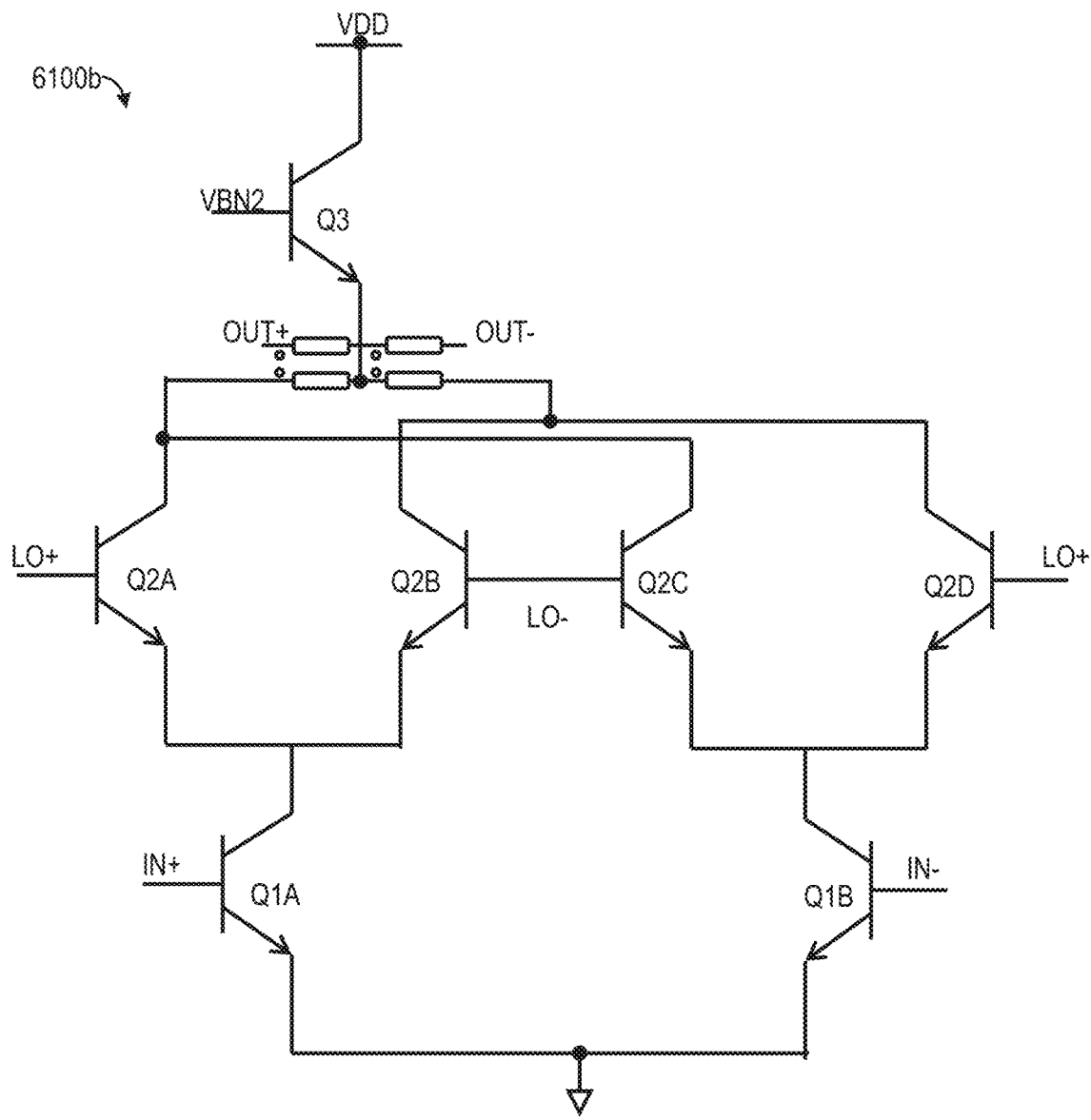
FIG. 62 is a diagrammatic view of another exemplary implementation of the differential circuit shown in FIG. 61.
Figure 63:
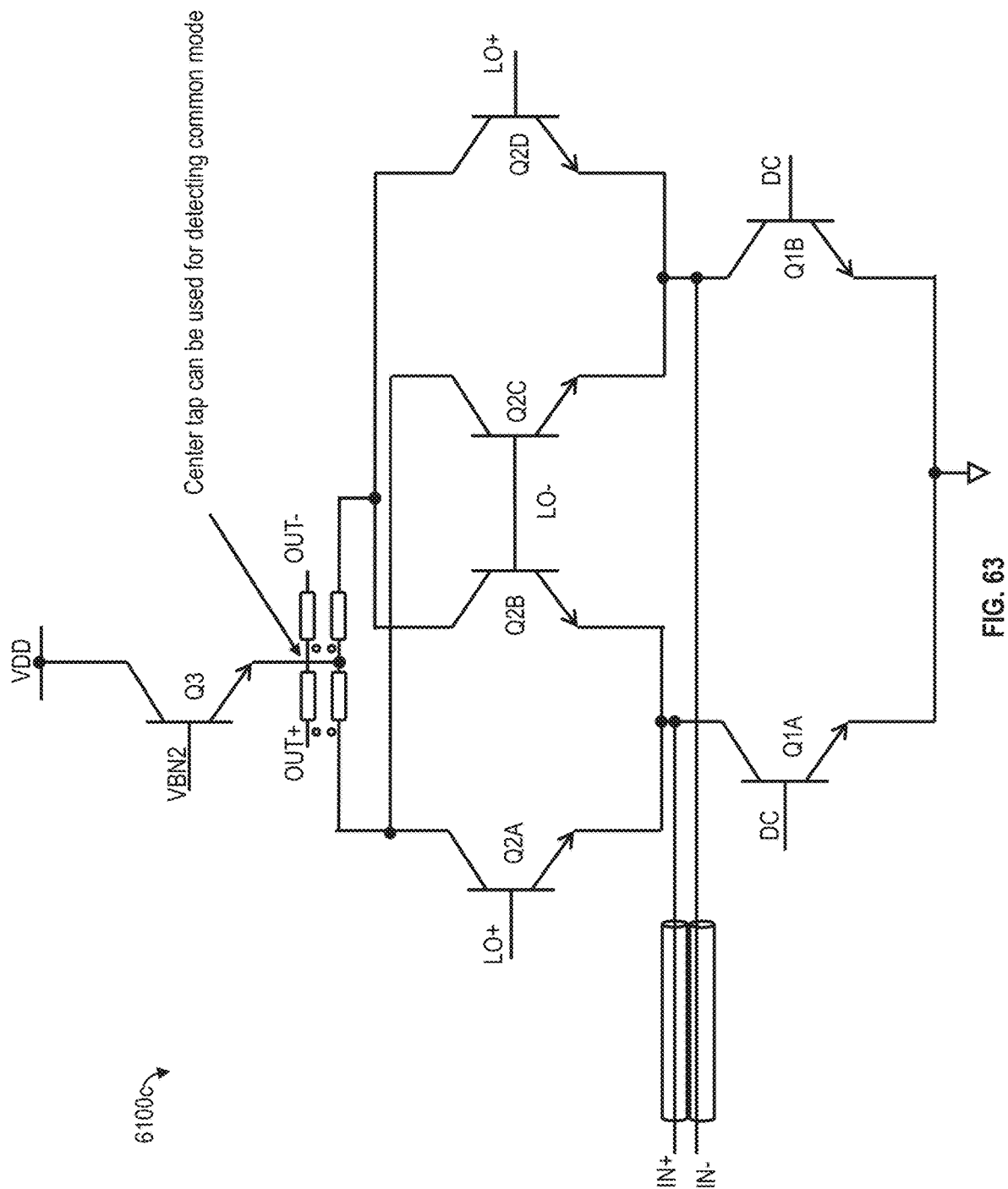
FIG. 63 is a diagrammatic view of another exemplary implementation of the differential circuit shown in FIG. 61.

Referring now to FIGS. 61-63, shown therein are exemplary implementations of a differential circuit constructed in accordance with the present disclosure, including a first differential circuit 6100a (shown in FIG. 61), a second differential circuit 6100b (shown in FIG. 62), and a third differential circuit 6100c (shown in FIG. 63).

Figure 64:
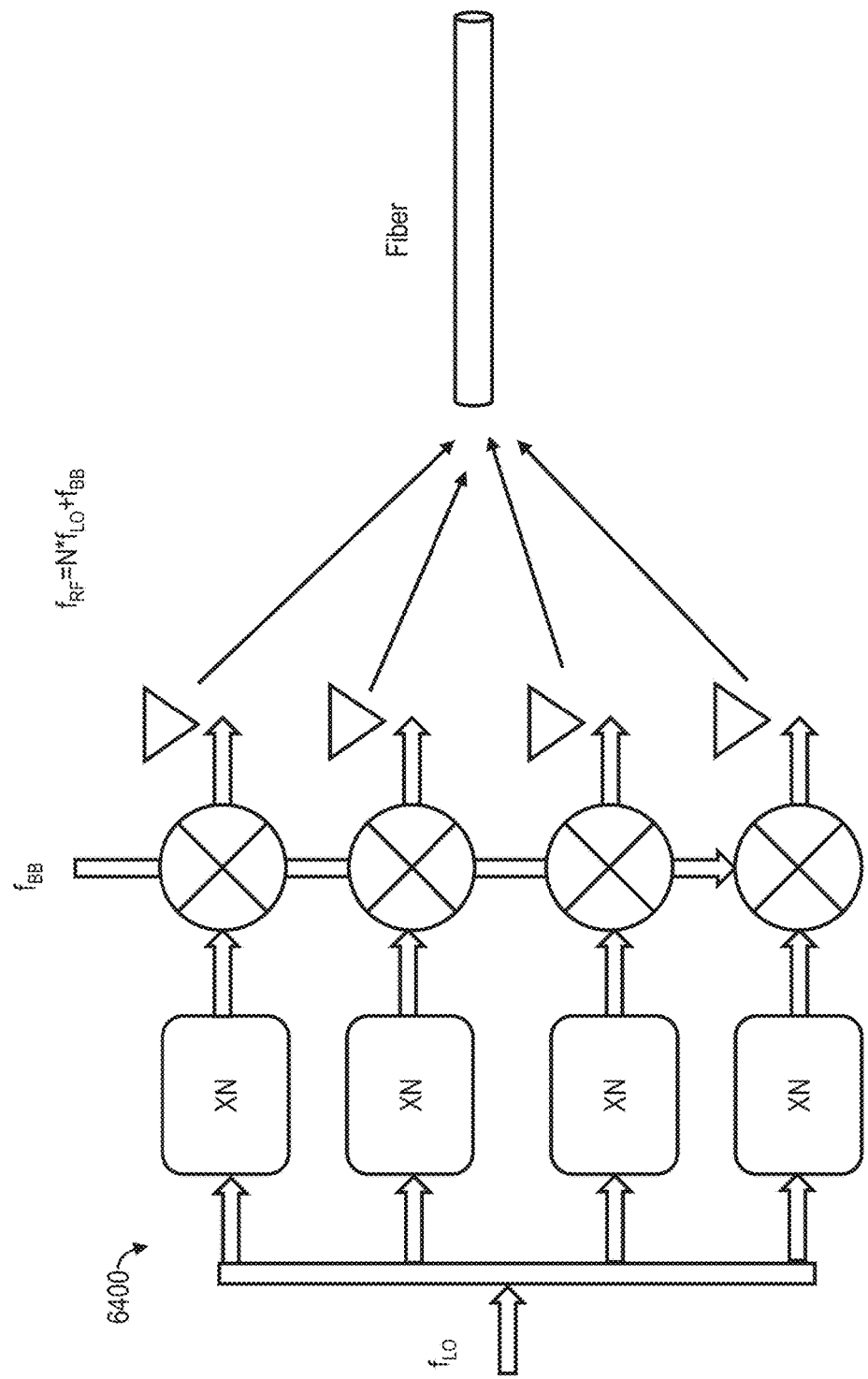
FIG. 64 is a diagrammatic view of another exemplary implementation of an antenna array constructed in accordance with the present disclosure.

Referring now to FIG. 64, shown therein is an exemplary implementation of an antenna array 6400 constructed in accordance with the present disclosure.

Figure 65:
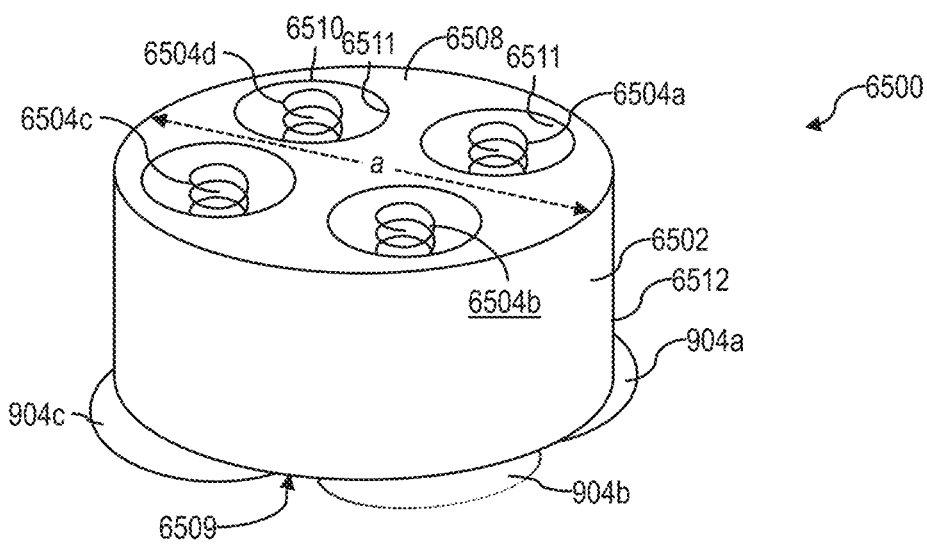
FIG. 65 is a perspective view of an exemplary implementation of an electromagnetic absorber used and constructed in accordance with the present disclosure.

Referring now to FIG. 65, shown therein is a perspective view of an exemplary implementation of an antenna 6500 constructed and used in accordance with the present disclosure. As shown in FIG. 65, the antenna 6500 comprises an electromagnetic absorber 6502 disposed around one or more radiators 6504 (e.g., a first radiator 6504a, a second radiator 6504b, a third radiator 6504c, and a fourth radiator 6504d). The one or more radiators 6504 may be constructed in accordance with the radiator 908, as detailed above. It should be understood that while four radiators 6504 are illustrated in FIG. 65, the antenna 6500 may include greater than, or less than, four radiators 6504, such as one radiator 6504 or eight radiators 6504 (for example).

In one implementation, one or more of the radiators 6504 may be mounted to respective ground planes 904a-d. For example, the first radiator 6504a may be mounted to a first ground plane 904a, the second radiator 6504b may be mounted to a second ground plane 904b, the third radiator 6504c may be mounted to a third ground plane 904c, and the fourth radiator 6504d may be mounted to a fourth ground plane 904d (not shown).

In some implementations, one or more of the radiators 6504 may be disposed within the hollow waveguide 208 (not shown in FIG. 65). In other implementations, one or more of the radiators 6504 may be disposed apart from, and coaxially to the hollow waveguide 208. In some implementations, one or more of the radiators 6504 may be coupled to a fiber-coupled RF transmitter (such as the first transmitter 212a) while others of the radiators 6504 may be coupled to a fiber-coupled RF receiver (such as the first receiver 216a).

In one implementation, the electromagnetic absorber 6502 is not disposed between the radiator 6504 (e.g., first radiator 6504a, the second radiator 6504b, the third radiator 6504c, the fourth radiator 6504d) and the hollow waveguide 208. The electromagnetic absorber 6502, in some implementations, may include a distal surface 6508, an opposed proximal surface 6509, and one or more opening 6510 formed in the distal surface 6508 and extending toward the opposed proximal surface 6509. In the implementation shown in FIG. 11, four openings 6510 are shown by way of example, with one of the radiators 6504 being positioned within each of the four openings 6510.

In some non-limiting implementations, only one of the radiators 6504 is positioned within a particular one of the openings 6510. The electromagnetic absorber 6502 has a plurality of internal surfaces 6511 defining the openings 6510. Each of the internal surfaces 6511 surrounds one of the radiators 6504 that is positioned within the respective opening 6510. In the example shown, the electromagnetic absorber 6502 is devoid of a cover covering any of the openings 6510 so that electromagnetic waves generated by the radiators 6504a-d pass directly into the hollow waveguide 208. In implementations incorporating the cover over one or more of the openings 6510, the cover may be selected from a material that is transparent (or mostly transparent) to the electromagnetic wave. For example, the cover may comprise a plastic material. The cover may cause less than 10% reflected power of the electromagnetic wave. The opposed proximal surface 6509 may be positioned adjacent to the ground planes 90a-d. In some implementations, the opposed proximal surface 6509 contacts the ground planes 90a-d.

In one implementation, each of the openings 6510 may have a cross-sectional shape similar in shape to the radiators 6504. In some implementations, the cross-sectional shape of the openings 6510 may be disposed apart from the radiator 6504 by an opening distance based on a wavelength of the electromagnetic wave and/or a style of the radiator 6504 or antenna 900. For example, the opening distance, e.g., a distance between the radiator 6504 and the interior surface 6511 may be at least % of the wavelength of the electromagnetic wave.

In one implementation, the electromagnetic absorber 6502 may be disposed adjacent to the hollow waveguide 208. For example, the distal surface 6508 of the electromagnetic absorber 6502 may have a diameter, a, defining a cross-section dimension. The distal surface 6508 may be in contact with the hollow waveguide 208. In other implementations, the electromagnetic absorber 6502 may be disposed against, e.g., touching or in-contact with, the hollow waveguide 208. In yet other implementations, the electromagnetic absorber 6502 may have a peripheral surface 6512 disposed within the hollow waveguide 208 and adjacent to, or in contact with, the inner surface 312 of the hollow waveguide 208. The diameter, a, defining a cross-section dimension, may be in a range of at least 4 wavelengths to 50 wavelengths of the electromagnetic wave having data encoded within a carrier frequency in a range of 300 GHz to 10 THz, the electromagnetic wave having a wavelength. In some implementations, the peripheral surface 6512 has a cylindrical shape. However, it should be understood that the peripheral surface 6512 can be provided with another shape, such as series of planar and adjacently disposed sections, so as to provide a rectangular, hexagon, or octagon shaped cross-section, for example. In some implementations, the peripheral surface 6512 may have a non-uniform shape or a fanciful shape.

Figure 67:
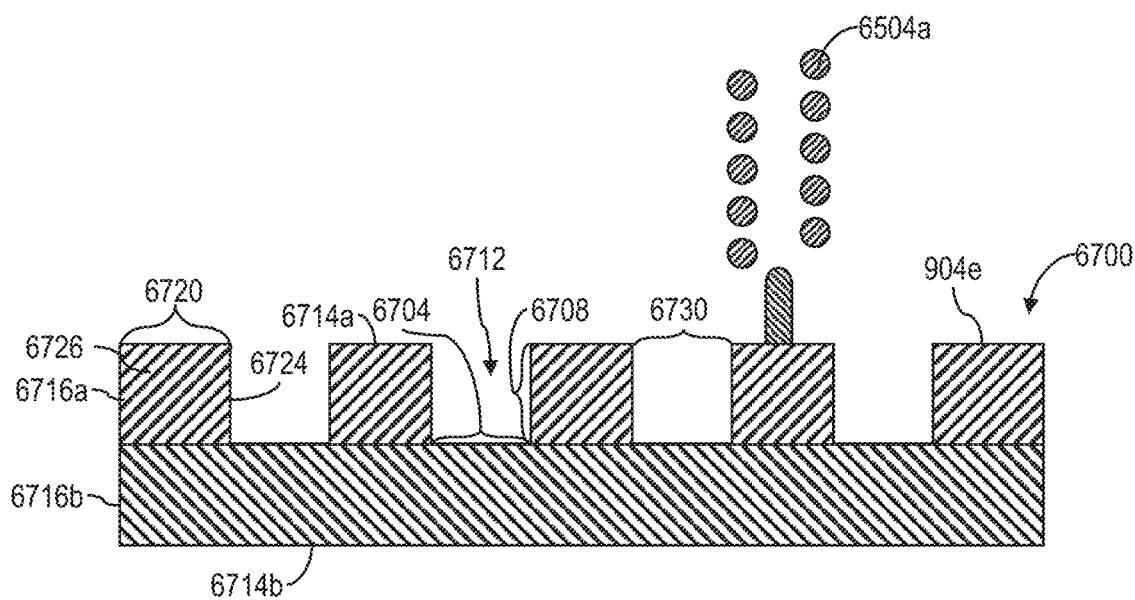

In one implementation, the electromagnetic absorber 6502 may be constructed of an EM-absorbing material selected to absorb, dampen, and/or otherwise limit reflection of an electromagnetic wave (e.g., the electromagnetic wave having the transmission signals). In one implementation, the EM-absorbing material may be constructed of a porous and/or lossy material. In some implementations, the EM-absorbing material is constructed of a semi-porous material having a plurality of randomly positioned and sized openings having a size on the order of a wavelength of the electromagnetic wave, i.e., between $\frac{1}{100}^{th}$ the electromagnetic wave wavelength to about 2 times the electromagnetic wave wavelength, and preferably about $\frac{1}{4}^{th}$ the electromagnetic wave wavelength. In some implementations, the EM-absorbing material has a texture similar to that of steel wool. In some implementations, e.g., as shown in FIG. 67 and discussed in detail below, the EM-absorbing material may be constructed as part of the ground plane 904. In one implementation, the EM-absorbing material may, for example, include a poorly-conducting material (i.e., a material with low electrical conductivity), such as a carbon material or a compound containing carbon. In other implementations, a different poorly-conducting material may be selected other than carbon.

In one implementation, the EM-absorbing material may be constructed of a foam (e.g., a solid, continuous-phase material). The foam may be, for example, open-cell foam, closed-cell foam, or a combination thereof. The foam may be carbon-doped or carbon-loaded, that is, the foam may have carbon absorbed/adsorbed into, and disposed within, the foam. In some implementations, the foam is a polyurethane foam. In one implementation, the EM-absorbing material is a colloidal suspension having carbon particles suspended in a continuous phase material.

Figure 66:
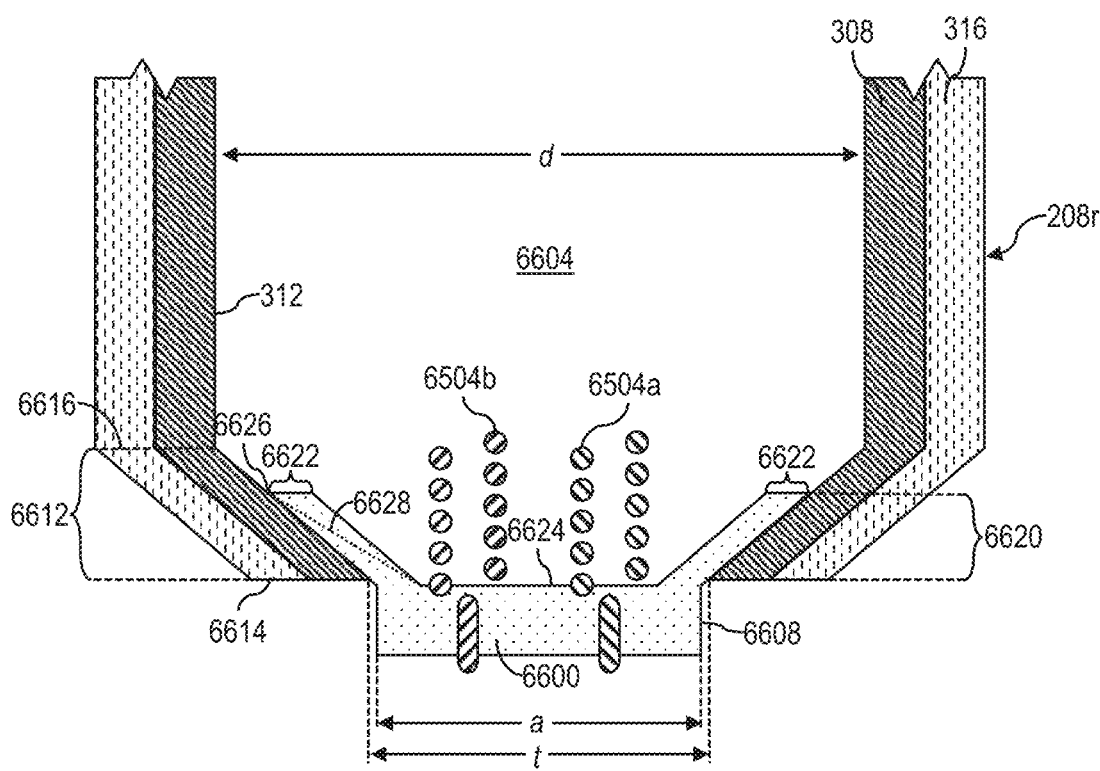
FIG. 66 is a cross-section view of another exemplary implementation of an electromagnetic absorber constructed in accordance with the present disclosure.

Referring now to FIG. 66, shown therein is a cross-section view of another exemplary implementation of an electromagnetic absorber 6600 constructed in accordance with the present disclosure. As shown the electromagnetic absorber 6600 may be disposed around one or more radiators 6504, such as the first radiator 6504a and the second radiator 6504b, and disposed within the hollow waveguide 208 (shown as a sixth hollow waveguide 208f). As detailed above, in some implementations, the first radiator 6504a and the second radiator 6504b may be attached to one or more ground plane 904, as shown in FIG. 65. In one implementation, the electromagnetic absorber 6600 may be constructed in accordance with the electromagnetic absorber 6502 detailed above, e.g., of the EM-absorbing material.

In one implementation, the sixth hollow waveguide 208f may have the inner surface 312 defining a cavity 6604 and having a diameter, d, defining a cross-section dimension. The sixth hollow waveguide 208f may be constructed in accordance with any of the hollow waveguides 208a-n described above in more detail; however, the sixth hollow waveguide 208f, shown in FIG. 66, is illustrated as a hollow-core fiber optic cable having the conductive layer 316 surrounding the dielectric layer 308. In other implementations, the sixth hollow waveguide 208f may be a metallic, non-optic waveguide.

The electromagnetic absorber 6600 may have a peripheral surface 6608 in contact with at least a portion of the inner surface 312 of the sixth hollow waveguide 208f, i.e., the hollow-core fiber optic cable. In some implementations, the electromagnetic absorber 6600 has a diameter, a, defining a cross-section dimension less than or equal to the diameter, d, of the sixth hollow waveguide 208f, such that the electromagnetic absorber 6600 may extend, or fit, into the cavity 6604 of the sixth hollow waveguide 208f so as to not interfere with the radiators 6504 receiving energy from the electromagnetic wave.

In one implementation, the sixth hollow waveguide 208f further includes a tapering section 6612 having a first end 6614 and a second end 6616. The first end 6614 may have an interior diameter, t, and the second end 6616 may have the diameter, d, such that within the tapering section 6612, the diameter of the sixth hollow waveguide 208f changes from the diameter, d, to the interior diameter, t. As shown, the interior diameter, t, may be less than the diameter, d.

In one implementation, the electromagnetic absorber 6600 may extend within the sixth hollow waveguide 208f. In some implementations, the electromagnetic absorber 6600 extends beyond the tapering section 6612 of the sixth hollow waveguide 208f. In other implementations, the electromagnetic absorber 6600 only extends within the tapering section 6612 of the sixth hollow waveguide 208f. In one implementation, as shown in FIG. 66, the electromagnetic absorber 6600 may extend within a first portion 6620 of the tapering section 6612 of the sixth hollow waveguide 208f.

In some implementations, the electromagnetic absorber 6600 within the sixth hollow waveguide 208f may be provided with a thickness 6622. The thickness 6622 may be uniform within the tapering section 6612, such as within the first portion 6620 of the tapering section 6612. In other implementations, the electromagnetic absorber 6600 within the sixth hollow waveguide 208f may be provided with a varying thickness 6622, such that from a distal surface 6624 of the electromagnetic absorber 6600 to an interior end 6626 of the electromagnetic absorber 6600, the thickness 6622 tapers, for example, to a feather-edge, as illustrated by tapering absorber surface 6628 (which is shown in phantom). The tapering absorber surface 6628 may taper at differing rates from the distal surface 6624 to the interior end 6626 of the electromagnetic absorber 6600.

Referring now to FIG. 67, shown therein is a cross-section diagram of an exemplary implementation of an electromagnetic absorber 6700 constructed in accordance with the present disclosure. As shown, the electromagnetic absorber 6700 may be integrated into a fifth ground plane 904e. In this implementation, the electromagnetic absorber 6700 may comprise a plurality of vias 6712 having a via diameter 6704 and a depth 6708. The plurality of vias 6712 may extend from a first surface 6714a towards a second surface 6714b of the fifth ground plane 904e to the depth 6708. In some implementations, the depth 6708 may extend through at least one layer 6716 of the fifth ground plane 904e, such as a first layer 6716a. While the vias 6712 are described as having the via diameter 6704, the vias 6712 may have a cross-section of any suitable shape, such as an oval, square, circle, and the like, or any fanciful shape. In such implementations, the via diameter 6704 may be, for example, a cross-sectional dimension.

In some implementations, one or more via 6712 of the plurality of vias 6712 of the electromagnetic absorber 6700 may extend through the first layer 6716a while others of the plurality of vias 6712 may extend through the first layer 6716a and a second layer 6716b. As will be understood by a skilled artisan some of the vias 6712 may be characterized as blind vias meaning the vias 6712 pass through the first layer 6716a and not the second layer 6716b, or a though via meaning the vias 6712 pass through both the first layer 6716a and the second layer 6716b.

In some implementations, the depth 6708 of the plurality of vias 6712 may be selected based on a wavelength of the electromagnetic wave. For example, the depth 6708 may be about one wavelength. In other implementations, the depth 6708 may be between $1/10^{th}$ of a wavelength and 10 wavelengths. In some implementations, the plurality of vias 6712 may extend through multiples of the layers 6716 to reach the depth 6708 and in some implementations does not extend through all of the layers 6716. In some implementations, a first set of the plurality of vias 6712 may be constructed such that the depth 6708 is a first depth and a second set of the plurality of vias 6712 may be constructed such that the depth 6708 is a second depth different from the first depth, thus forming multiple semi-porous ground planes with an array of vias 6712 extending between one of more of the semi-porous ground planes. In one implementation, the vias 6712 of the first set and the second set may be randomly disposed within the first surface 6714a of the fifth ground plane 904e. In other implementations, the first set and the second set may be disposed in a pattern on the fifth ground plane 904e selected to minimize reflection of the electromagnetic wave. In some implementations, the depth 6708 of one or more via of the plurality of vias 6712 may be randomly selected to have values between about 10% of the wavelength and about 1000% of the wavelength.

In some implementations, the plurality of vias 6712 are separated from each other by a distance 6720. The distance 6720 may be selected based on the wavelength of the electromagnetic wave. For example, the distance 6720 may be about one wavelength. In other implementations, the distance 6720 may be between about $1/10^{th}$ of a wavelength and one wavelength.

In one implementation, each via 6712 of the plurality of vias 6712 may be defined by a via surface 6724 extending from the first surface 6714a to the second surface 6714b, i.e., a through via. In one implementation, the surface 6724 of the vias 6712 may be constructed of a material, e.g., comprising copper, gold, and/or carbon. In some implementations, one or more via 6712 may extend through the first surface 6714a and the second surface 6714b. In some implementations, the surface 6724 of the vias 6712 may be constructed of an electrically conductive material such as copper or gold coated with an electrically lossy material such as carbon to assist in absorbing the electromagnetic wave. In some implementations, the via surface 6724 may be textured so as to assist in absorbing the electromagnetic wave. In some implementations, the material may be an EM-absorbing material (as discussed above).

In some implementations, the plurality of vias 6712 may be constructed by removing material from the fifth ground plane 904e. For example, during manufacturing, material may be removed from the first surface 6714a to the depth 6708 and with the via diameter 6704. In other implementations, the plurality of vias 6712 may be constructed by extending protrusions 6726 from the second surface 6714b such that the protrusions 6726 have the surface 6724, a height equal to the depth 6708, and are spaced from one another by a distance equal to the via diameter 6704.

In some implementations, each via 6712 of the plurality of vias 6712 may have the via diameter 6704 and an opening width 6730. In some implementations, the via diameter 6704 may be a width of the via nearest the second surface 6714b. The via diameter 6704 may be the same as, or different from, the opening width 6730. In some implementations, a first set of the plurality of vias 6712 may be constructed such that the via diameter 6704 and the opening width 6730 are the same, a second set of the plurality of vias 6712 may be constructed such that the via diameter 6704 is smaller than the opening width 6730, and a third set of the plurality of vias 6712 may be constructed such that the via diameter 6704 is greater than the opening width 6730. The vias 6712 of the first set, the second set, and the third set may be randomly disposed within the first surface 6714a of the fifth ground plane 904e. In some implementations, the via diameter 6704 and the opening width 6730 of one or more via of the plurality of vias 6712 may be randomly selected to have values between about 10% of the wavelength and about 110% of the wavelength.

Figure 68:
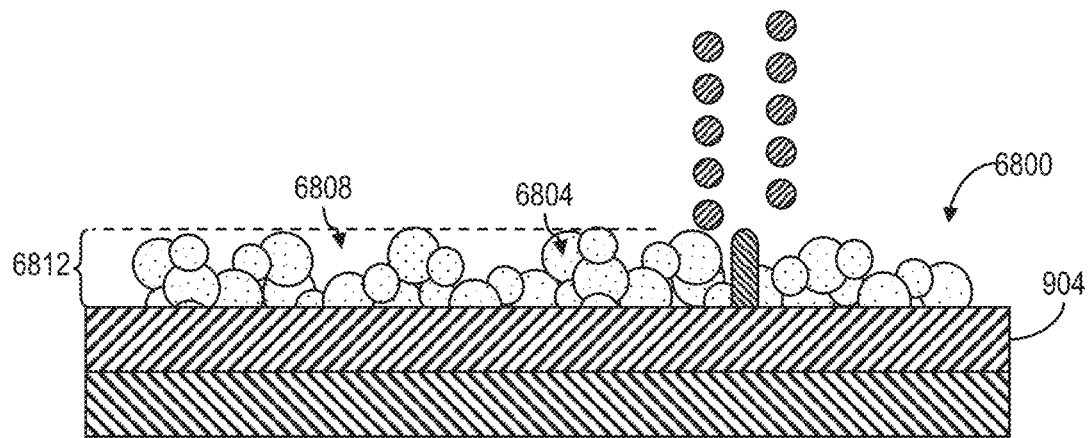

Referring now to FIG. 68, shown therein is a cross-section diagram of an exemplary implementation of an electromagnetic absorber 6800 constructed in accordance with the present disclosure. As shown, the electromagnetic absorber 6800 is a spray-on coating constructed as a low-THz electromagnetic absorber. In one implementation, the electromagnetic absorber 6800 may be constructed of materials in accordance with the electromagnetic absorber 6502 detailed above, e.g., of the EM-absorbing material.

In one implementation, the spray-on coating may be a polyurethane foam loaded with carbon that when sprayed on a substrate, such as the ground plane 904, adheres to the ground plane 904 and forms an uneven, or non-uniform, coating, such as, of carbon. The uneven coating may comprise carbon particles 6804 of varying sizes resulting in a non-uniform coating having voids, or dimples 6808 having a cross-section dimension approximately sized to the wavelength of the electromagnetic wave (e.g., about 300 μm). The uneven coating may have a thickness 6812 of at least % of a wavelength. In some implementations, the uneven coating may have a thickness 6812 of between about one wavelength of the electromagnetic wave and about 10 wavelengths of the electromagnetic wave.

Figure 69:
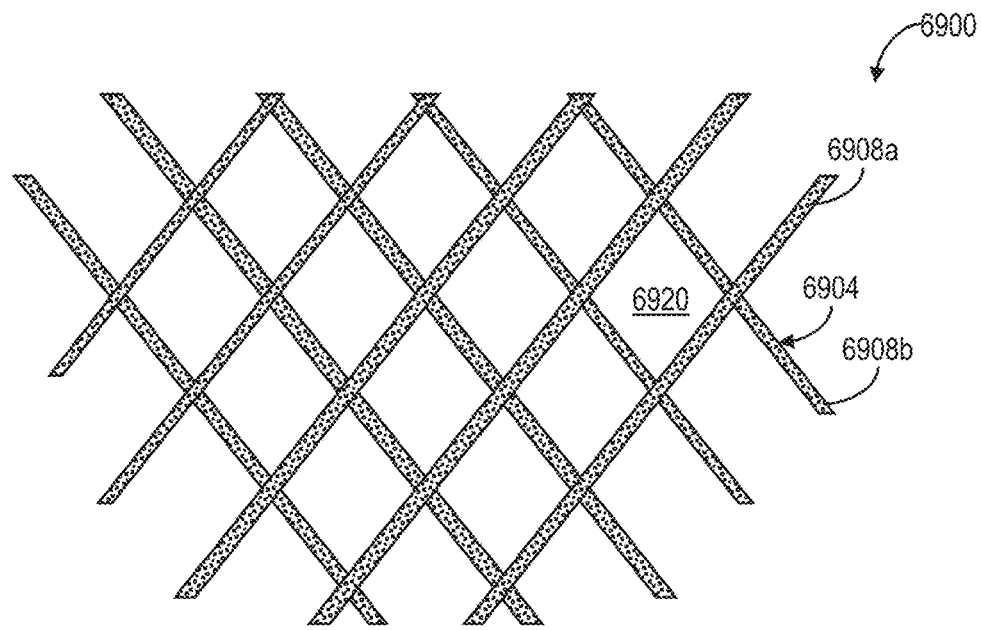

Referring now to FIG. 69, shown therein is a diagram of an exemplary implementation of an electromagnetic absorber 6900 constructed in accordance with the present disclosure. As shown, the electromagnetic absorber 6900 may be a fabric 6904 coated with an EM-absorbing material such as carbon. The fabric 6904 may be coated, for example, by use of a spray-on carbon coating having a binder to cause the carbon to adhere to the fabric 6904. In some implementations, the fabric 6904 may include a fabric doped with carbon.

In one implementation, the fabric 6904 may be formed of a plurality of strands 6908 (e.g., weft 6908a and warp 6908b) coated (or doped) with carbon particles or another poorly-conducting EM-absorbing material. In some implementations, the strands 6908 of the fabric 6904 may be carbon-doped prior to forming the fabric 6904, while in other implementations, the strands 6908 may be doped after the fabric 6904 has been constructed.

In some implementations, the fabric 6904 may be formed of a solid, continuous-phase material doped with carbon and having one or more voids 6920 disposed therethrough and defined by remaining fabric 6904. In some implementations, carbon particles may be sprayed through the voids 6920 of the continuous phase material.

Figure 70:
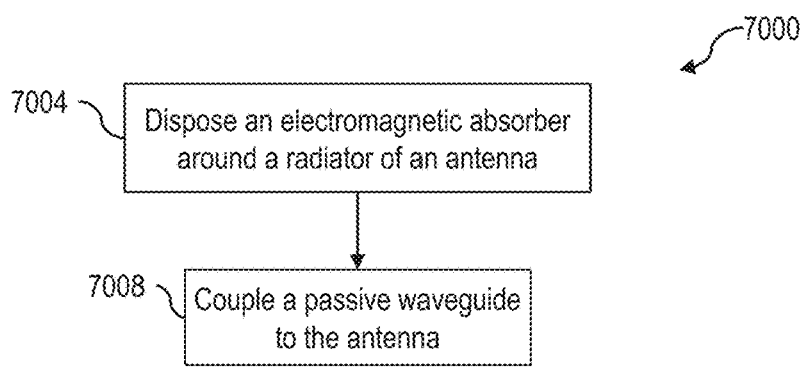

Referring now to FIG. 70, shown therein is a flow diagram of an exemplary implementation of a process 7000 constructed in accordance with the present disclosure. The process 7000 generally comprises the steps of: disposing the electromagnetic absorber around a radiator of an antenna (step 7004); and coupling the hollow waveguide to the antenna (step 7008).

In one implementation, disposing the electromagnetic absorber around a radiator of an antenna (step 7004) includes disposing the electromagnetic absorber (e.g., any of electromagnetic absorber 6502, electromagnetic absorber 6600, electromagnetic absorber 6700, electromagnetic absorber 6800, and electromagnetic absorber 6900) surrounding the radiator. In one implementation, the electromagnetic absorber does not touch the radiator(s).

In one implementation, disposing the electromagnetic absorber around a radiator of an antenna (step 7004) may include disposing more than one electromagnetic absorber around the radiator of the antenna.

In one implementation, disposing the electromagnetic absorber around a radiator of an antenna (step 7004) includes positioning the electromagnetic absorber within the cavity 6604 of the hollow waveguide 208. In some implementations, positioning the electromagnetic absorber within the cavity 6604 includes positioning the electromagnetic absorber so as to not interfere with the radiator 6504 receiving the energy of the electromagnetic wave.

In one implementation, coupling the hollow waveguide to the antenna (step 7008) includes positioning the radiator(s) 6504 within the cavity 6604 of the hollow waveguide 208 (or the sixth hollow waveguide 208*f*). In some implementations, positioning the radiator(s) 6504 within the cavity 6604 of the hollow waveguide 208 further includes positioning the peripheral surface 6512 within the hollow waveguide 208 and adjacent to, or in contact with, the inner surface 312 of the hollow waveguide 208. In one implementation, coupling the hollow waveguide to the antenna (step 7008) includes positioning the radiator(s) 6504 at least partially within the cavity 6604 of the hollow waveguide 208 (or the sixth hollow waveguide 208*f*).

In one implementation, coupling the hollow waveguide to the antenna (step 7008) includes positioning the radiator(s) 6504 within the tapering section 6612 of the sixth hollow waveguide 208*f*. In some implementations, positioning the radiator(s) 6504 within the tapering section 6612 includes disposing the peripheral surface 6608 of the electromagnetic absorber 6600 against at least the first portion 6620 of the tapering section 6612 of the sixth hollow waveguide 208*f*.

In one implementation, coupling the hollow waveguide to the antenna (step 7008) includes positioning the hollow waveguide 208 in contact with the electromagnetic absorber, e.g., against the distal surface 6508 of the electromagnetic absorber 6502 (or other ones of the electromagnetic absorbers).

Figure 71:
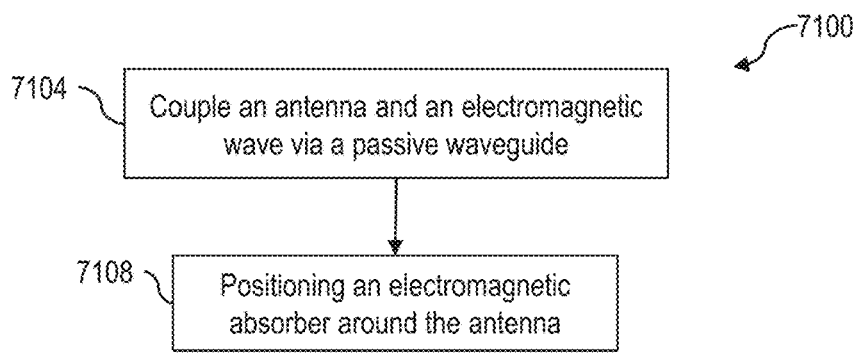

Referring now to FIG. 71, shown therein is a process flow diagram of an exemplary implementation of a method 7100 constructed in accordance with the present disclosure. The method 7100 generally comprises the steps of: coupling an antenna and an electromagnetic wave via a hollow waveguide (step 7104); and positioning an electromagnetic absorber around the antenna (step 7108). In one implementation, coupling an antenna and an electromagnetic wave via a hollow waveguide (step 7104) includes coupling a first antenna and a second antenna with the electromagnetic wave.

In one implementation, coupling an antenna and an electromagnetic wave via a hollow waveguide (step 7104) includes coupling the antenna and the electromagnetic wave via the hollow waveguide being at least one of: a solid-core optical fiber, a hollow-core fiber, and a metallic, non-optic waveguide. Coupling the antenna and the solid-core waveguide may include disposing the electromagnetic absorber surrounding the radiators of the antenna against the solid-core fiber. Coupling the antenna and the hollow-core fiber may include positioning a radiator of the antenna within the cavity 6604 of the hollow-core fiber (e.g., the sixth hollow waveguide 208*f*).

In one implementation, positioning an electromagnetic absorber around the antenna (step 7108) includes disposing the electromagnetic absorber around the radiators of the antenna. In some implementations, disposing the electromagnetic absorber around the radiators of the antenna further includes disposing the electromagnetic absorber against, or in contact with, the inner surface 312 defining the cavity 6604 of the sixth hollow waveguide 208*f*.

In some implementations, disposing the electromagnetic absorber around the radiators of the antenna further includes disposing the electromagnetic absorber against, or in contact with, (at least the first portion 6620 of) the inner surface 312 of the tapering section 6612 of the sixth hollow waveguide 208*f*.

In one implementation, positioning an electromagnetic absorber around the antenna (step 7108) includes positioning the electromagnetic absorber (constructed of an EM-absorbing material) adjacent to the ground plane 904. The electromagnetic absorber may be, for example, an absorbing carbon-material sprayed-on the ground plane 904 to form a non-uniform layer of carbon disposed on the ground plane (as described above in reference to FIG. 68).

In one implementation, positioning an electromagnetic absorber around the antenna (step 7108) includes providing the plurality of vias 6712 within the ground plane 904. The plurality of vias 6712 may be disposed a distance 6720 of at least one wavelength of the carrier frequency of the electromagnetic wave from one another. In some implementations, the plurality of vias 6712 have via diameter 6704 of at least one wavelength of the carrier frequency. The vias 6712 may be provided with any suitable cross-section geometry, such as a circle, square, oval, and the like, or with any fanciful shape. In some implementations, one or more of the plurality of vias 6712 may be constructed as through-vias within the ground plane, e.g., vias 6712 extending from the first surface 6714*a* through the second surface 6714*b*. When the ground plane 904 comprises more than one layer 6716, one or more via 6712 of the plurality of vias 6712 may extend through one or more layer 6716 of the ground plane 904.

Figure 72:
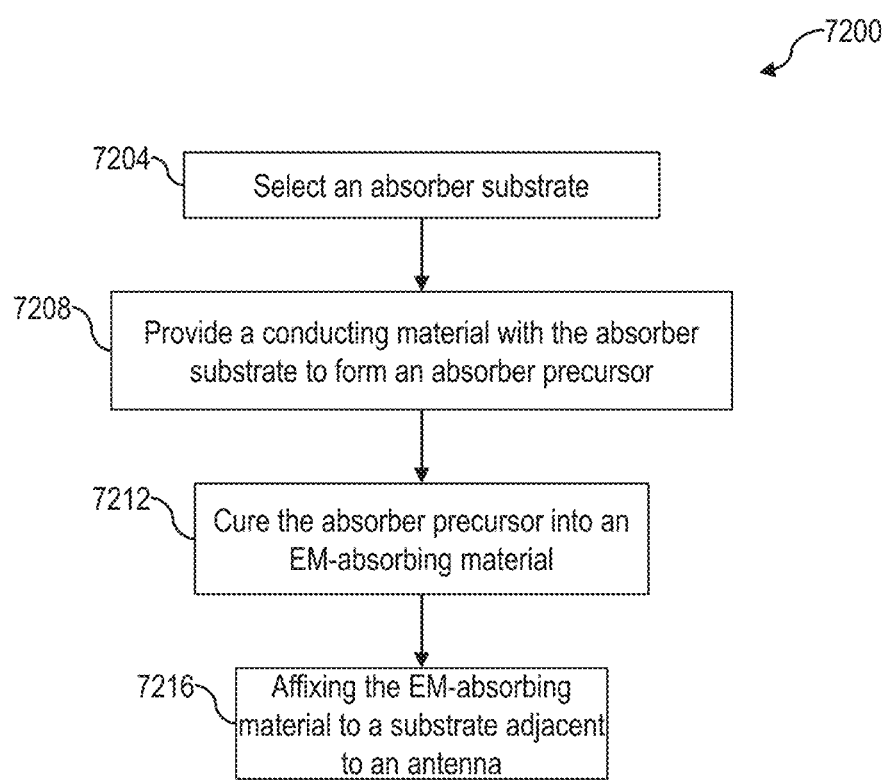

Referring now to FIG. 72, shown therein is a process flow diagram of an exemplary implementation of a construction process 7200 constructed in accordance with the present disclosure. The construction process 7200 generally comprises the steps of: selecting an absorber substrate (step 7204); providing a conducting material within the absorber substrate to create an absorber precursor (step 7208); curing the absorber precursor into an EM-absorbing material (step 7212); and affixing the EM-absorbing material to an antenna (step 7216).

In one implementation, selecting an absorber substrate (step 7204) includes selecting one or more of: a foam (e.g., a solid, continuous-phase material), a fabric (e.g., a woven fabric or a non-woven fabric), and a spray coating. In some implementations, the absorber substrate selected may be selected as component parts. For example, selection of the foam may include selection of at least two component parts of a foam (for example, an isocyanate and a polyol) that, when combined, cause a foam to form. Similarly, selection of the fabric may include selection of component parts of the fabric such as the weft and warp for a woven fabric, or chemical compound precursors for the non-woven fabric, and selection of the spray coating may include selection of an accelerant, a binder, and a solvent.

In one implementation, providing a conducting material with the absorber substrate to create an absorber precursor (step 7208) may include absorbing, adsorbing, mixing, dissolving, suspending, coating, attaching, incorporating, doping, and/or otherwise including the conducting material within the absorber substrate to create an absorber precursor. For example, providing the conducting material with the absorber substrate may include spraying or coating the foam with the conducting material, spraying, or coating the fabric with the conducting material such that the conducting material is disposed within voids between the waft and warp for woven fabric(s) or within the one or more voids formed in non-woven fabric(s), and incorporating the conducting material within the spray coating.

In one implementation, providing the conducting material with the absorber substrate to create the absorber precursor (step 7208) may include absorbing, adsorbing, mixing, dissolving, suspending, coating, attaching, incorporating, and/or otherwise including the conducting material being one or more of: carbon, fullerenes, carbon nano-particles, a carbon compound, a semi-metal, a metalloid, and/or the like, or combinations thereof. In one implementation, providing the conducting material with the absorber substrate to create the absorber precursor (step 7208) may include disposing such conducting materials with the absorber substrate in randomized position and/or orientation.

In one implementation, providing the conducting material with the absorber substrate to create the absorber precursor (step 7208) may include absorbing, adsorbing, mixing, dissolving, suspending, coating, attaching, incorporating, and/or otherwise including the conducting material within one or more component part of the absorber substrate. For example, the conducting material may be incorporated into one or more of the component parts of the foam, the component parts of the spray coating, and/or the component parts of the fabric to form the absorber precursor. In this way, when the absorber precursors (e.g., the component parts of the absorber substrate having the conducting material) are combined or assembled to form the absorber substrate, the conducting materials are integrated/incorporated into the absorber substrate.

In one implementation, curing the absorber precursor into an EM-absorbing material (step 7212) may include allowing the absorber precursor to cure or set as the component parts of the absorber substrate are bonded to form the EM-absorbing material. In some implementations, curing the absorber precursor may be optional. In other implementations, curing the absorber precursor into the EM-absorbing material (step 7212) may be performed after affixing the EM-absorbing material to a substrate, such as the fifth ground plane 904e, adjacent to and preferably surrounding the antenna (step 7216). For example, when providing the conducting material as part of the spray coating, the spray coating may not be allowed to cure until after the spray coating has been affixed, or otherwise applied, to the fifth ground plane 904e, for example, which is adjacent to the antenna (e.g., in step 7216). Additionally, in some implementations, curing the absorber precursor into the EM-absorbing material (step 7212) may be performed after affixing the EM-absorbing material to the fifth ground plane 904e, for example, which is adjacent to the antenna (step 7216) in order to further form a bond between the antenna and the EM-absorbing material.

In one implementation, affixing the EM-absorbing material to an antenna (step 7216) may include disposing the EM-absorbing material around one or more radiator 6504 of the antenna (e.g., the antenna 6500). In some implementations, prior to affixing the EM-absorbing material to the antenna (step 7216), the one or more radiator of the antenna may be (at least, temporarily) shielded to limit un-intended application of the EM-absorbing material directly to the radiator.

In one implementation, affixing the EM-absorbing material to the antenna (step 7216) may include applying the absorber precursor to the antenna. For example, when the absorber precursor is the spray coating doped with the conducting material, the absorber precursor may be disposed between the radiator and the ground plane by spraying the absorber precursor onto the ground plane 904.

In one implementation, affixing the EM-absorbing material to the antenna (step 7216) may include applying the absorber precursor being fabric adjacent to the antenna. In some implementations, affixing the EM-absorbing material adjacent to the antenna (step 7216) may include weaving the fabric around the one or more radiators 6504. In other implementations, affixing the EM-absorbing material adjacent to the antenna (step 7216) may include providing a slit in the fabric such that the one or more radiators 6504 may be positioned through the slit. In yet other implementations, affixing the EM-absorbing material adjacent to the antenna (step 7216) may include providing a first fabric on a first side of the radiator 6504 of the antenna and a second fabric on a second side of the radiator 6504 of the antenna. The first fabric and the second fabric may overlap each other at a seam formed therebetween. The first fabric and the second fabric may be formed to include the same conducting materials or different conducting materials. In some implementations, the first fabric may be a woven fabric, while the second fabric may be a non-woven fabric. In some implementations, affixing the EM-absorbing material adjacent to the antenna (step 7216) may include disposing the fabric adjacent to the antenna prior to curing the absorber precursor such that the absorber precursor cures while in contact a substrate adjacent to the antenna to bond the EM-absorbing material to the substrate (such as to the fifth ground plane 904e).

In one implementation, affixing the EM-absorbing material adjacent to the antenna (step 7216) may include applying the absorber precursor being a foam to a substrate adjacent to the antenna, such as the fifth ground plane 904e. In some implementations, the foam may be cured prior to affixing the foam to the fifth ground plane 904e. For example, the foam may be cured and the one or more openings 6510 formed in the foam prior to disposing the foam around the radiators 6504 of the antenna (e.g., as shown and described in reference to FIG. 65). In other implementations, affixing the EM-absorbing material adjacent to the antenna (step 7216) may include spraying a mixture of the foam component parts onto the fifth ground plane 904e and allowing the foam component parts to polymerize to form a foam formed in place on the fifth ground plane 904e. In some implementations, excess foam formed in place on the fifth ground plane 904e may be removed, such as by cutting the foam.

In some implementations, affixing the EM-absorbing material adjacent to the antenna (step 7216) may include dipping one or more of the fifth ground plane 904e and the hollow waveguide 208 into absorber precursor such that the absorber precursor coats particular areas of the fifth ground plane 904e and the hollow waveguide (e.g., as shown and described in reference to FIG. 66). In some implementations, affixing the EM-absorbing material to the fifth ground plane 904e (step 7216) may include dipping the one or more of the fifth ground plane 904e and the hollow waveguide more than one time into absorber precursor until the EM-absorbing material disposed on the fifth ground plane 904e and/or the hollow waveguide reaches a desired thickness. In some implementations, the absorber precursor is allowed to cure between each dipping iteration.

In one implementation, positioning an electromagnetic absorber around the antenna (step 7108) does not include positioning the electromagnetic absorber between the radiator 6504 of the antenna and the hollow waveguide 208.

ILLUSTRATIVE CLAUSES

The following are illustrative clauses demonstrating non-limiting implementations of the present disclosure:

Illustrative clause 1. A transmitter, comprising: a client-side input configured to receive one or more baseband signals having client data encoded therein; transmitter circuitry configured to receive the one or more baseband signals from the client-side input and generate one or more antenna feed signals based on the one or more baseband signals; and one or more antennas configured to receive the one or more antenna feed signals from the transmitter circuitry, generate one or more radiated signals based on the one or more antenna feed signals, and couple the one or more radiated signals into a hollow waveguide, each of the one or more radiated signals being radiated electromagnetic waves configured for coherent detection and having a frequency in a range between 300 Gigahertz (GHz) and 10 Terahertz (THz).

Illustrative clause 2. The transmitter of illustrative clause 1, wherein the hollow waveguide has a hollow waveguide core having a refractive index in a range between 1.0 and 1.4.

Illustrative clause 3. The transmitter of illustrative clause 1, wherein the hollow waveguide has a hollow waveguide core and a tubular sidewall surrounding the hollow waveguide core, the hollow waveguide core being filled with one of a gas, a vacuum, and a porous material having a porosity in a range between 25% and 99%.

Illustrative clause 4. The transmitter of illustrative clause 3, wherein the tubular sidewall comprises a conductive layer.

Illustrative clause 5. The transmitter of illustrative clause 4, wherein the tubular sidewall further comprises a support layer surrounding the conductive layer.

Illustrative clause 6. The transmitter of illustrative clause 4, wherein the tubular sidewall further comprises a dielectric layer between the hollow waveguide core and the conductive layer.

Illustrative clause 7. The transmitter of illustrative clause 3, wherein the tubular sidewall has one or more conductive layers and one or more dielectric layers, the one or more conductive layers interleaved with the one or more dielectric layers.

Illustrative clause 8. The transmitter of illustrative clause 1, wherein each particular one of the one or more radiated signals has a bandwidth in a range between 10% and 40% of the frequency of the particular one of the one or more radiated signals.

Illustrative clause 9. The transmitter of illustrative clause 1, wherein the hollow waveguide is configured to support propagation of a single mode of the one or more radiated signals.

Illustrative clause 10. The transmitter of illustrative clause 1, wherein the hollow waveguide is configured to support propagation of a plurality of modes of the one or more radiated signals.

Illustrative clause 11. The transmitter of illustrative clause 1, the one or more antenna feed signals are provided to the one or more antennas on one or more transmission lines, each of the one or more transmission lines having two or more conductors.

Illustrative clause 12. The transmitter of illustrative clause 11, wherein each of the one or more transmission lines have a first transmission loss and the hollow waveguide has a second transmission loss less than the first transmission loss, the second transmission loss being in a range between 0.001 and 20.00 decibels (dB) per meter (m) per Terabit (Tb) per second (s).

Illustrative clause 13. The transmitter of illustrative clause 1, wherein two or more of the client-side input, the transmitter circuitry, and one or more antennas are disposed on a single substrate.

Illustrative clause 14. The transmitter of illustrative clause 13, wherein at least two of the client-side input, the transmitter circuitry, and the one or more antennas are disposed on a multi-layer substrate having a plurality of layers, at least one of the client-side input, the transmitter circuitry, and the one or more antennas being disposed on a first layer of the plurality of layers, at least one of the client-side input, the transmitter circuitry, and the one or more antennas being disposed on a second layer of the plurality of layers.

Illustrative clause 15. The transmitter of illustrative clause 13, wherein at least two of the client-side input, the transmitter circuitry, and the one or more antennas are integrated into a single monolithic semiconductor die.

Illustrative clause 16. The transmitter of illustrative clause 1, wherein at least two of the client-side input, the transmitter circuitry, and the one or more antennas are disposed on a plurality of substrates, at least one of the client-side input, the transmitter circuitry, and the one or more antennas being disposed on a first substrate of the plurality of substrates, at least one of the client-side input, the transmitter circuitry, and the one or more antennas being disposed on a second substrate of the plurality of substrates.

Illustrative clause 17. The transmitter of illustrative clause 16, wherein at least two of the plurality of substrates are in a stacked arrangement.

Illustrative clause 18. The transmitter of illustrative clause 13, wherein at least one of the client-side input, the transmitter circuitry, and the one or more antennas are not disposed on the single substrate.

Illustrative clause 19. The transmitter of illustrative clause 1, wherein each of the client-side input, the transmitter circuitry, and the one or more antennas are implemented using one or more of complementary metal-oxide semiconductor (CMOS) technology, silicon-germanium (SiGe) semiconductor technology, and Ill-V compound semiconductor technology.

Illustrative clause 20. The transmitter of illustrative clause 1, wherein the client data is encoded in the one or more baseband signals using an encoding protocol conforming to requirements of one or more of return-to-zero (RZ) code, non-return-to-zero (NRZ) code, pulse-amplitude modulation (PAM), and quadrature-amplitude modulation (QAM).

Illustrative clause 21. The transmitter of illustrative clause 1, wherein the client data is encoded in the one or more radiated signals using an encoding protocol conforming to requirements of one or more of return-to-zero (RZ) code, non-return-to-zero (NRZ) code, quadrature phase-shift keying (QPSK), quadrature-amplitude modulation (QAM), trellis coded modulation (TCM), and Bose-Chaudhuri-Hocquenghem (BCH) code.

Illustrative clause 22. The transmitter of illustrative clause 1, wherein the one or more radiated signals are a plurality of radiated signals including a first complementary radiated signal having a first polarization and a second complementary radiated signal having a second polarization different from the first polarization, the one or more antennas being further configured to generate the first complementary radiated signal and the second complementary radiated signal based on the one or more antenna feed signals.

Illustrative clause 23. The transmitter of illustrative clause 22, wherein the first polarization is orthogonal to the second polarization.

Illustrative clause 24. The transmitter of illustrative clause 23, wherein each of the first polarization and the second polarization is a linear polarization.

Illustrative clause 25. The transmitter of illustrative clause 24, wherein each of the one or more antennas is one of a differential waveguide probe antenna, a differential tapered antenna, and a differential patch antenna.

Illustrative clause 26. The transmitter of illustrative clause 23, wherein each of the first polarization and the second polarization is a circular polarization.

Illustrative clause 27. The transmitter of illustrative clause 26, wherein each of the one or more antennas is one of a helix antenna and a spiral antenna.

Illustrative clause 28. The transmitter of illustrative clause 1, wherein the one or more radiated signals are a plurality of radiated signals including a first complementary radiated signal having a first polarization, a second complementary radiated signal having a second polarization different from the first polarization, and a combined radiated signal, the one or more antennas being further configured to couple the first complementary radiated signal having the first polarization and the second complementary radiated signal having the second polarization in the hollow waveguide such that the first complementary radiated signal and the second complementary radiated signal interact in the hollow waveguide to form the combined radiated signal having a third polarization different from the first polarization and the second polarization.

Illustrative clause 29. The transmitter of illustrative clause 28, wherein the one or more antennas are an antenna array comprising a plurality of antennas.

Illustrative clause 30. The transmitter of illustrative clause 1, wherein the one or more baseband signals include a plurality of parallel baseband signals and a serial baseband signal, the transmitter further comprising a serializer configured to receive the plurality of parallel baseband signals and combine the plurality of parallel baseband signals into the serial baseband signal, the client-side input being configured to receive the serial baseband signal, the transmitter circuitry being configured to receive the serial baseband signal from the client-side input and generate the one or more antenna feed signals based on the serial baseband signal.

Illustrative clause 31. The transmitter of illustrative clause 30, wherein combining the plurality of parallel baseband signals into the serial baseband signal utilizes at least one of polarization division multiplexing (PDM), time division multiplexing (TDM), and wavelength division multiplexing (WDM).

Illustrative clause 32. The transmitter of illustrative clause 1, wherein the one or more baseband signals include a plurality of parallel baseband signals and a serial baseband signal, the transmitter further comprising a deserializer configured to receive the serial baseband signal and split the serial baseband signal into the plurality of parallel baseband signals, the client-side input being configured to receive the plurality of parallel baseband signals, the transmitter circuitry configured to receive the plurality of parallel baseband signals from the client-side input and generate the one or more antenna feed signals based on the plurality of parallel baseband signals.

Illustrative clause 33. The transmitter of illustrative clause 32, wherein splitting the serial baseband signal into the plurality of parallel baseband signals utilizes at least one of polarization division multiplexing (PDM), time division multiplexing (TDM), and wavelength division multiplexing (WDM).

Illustrative clause 34. The transmitter of illustrative clause 1, wherein the hollow waveguide core has a cross-section configured to support propagation of a plurality of polarizations.

Illustrative clause 35. The transmitter of illustrative clause 34, wherein the cross-section of the hollow waveguide core has an elliptical or circular shape.

Illustrative clause 36. The transmitter of illustrative clause 34, wherein the cross-section of the hollow waveguide core has a rectangular or square shape.

Illustrative clause 37. The transmitter of illustrative clause 34, wherein the cross-section of the hollow waveguide core has a cross shape.

Illustrative clause 38. The transmitter of illustrative clause 1, wherein the frequency of the one or more radiated signals is a transmission frequency, the transmitter circuitry comprising: one or more local oscillators configured to generate one or more carrier signals, each of the one or more carrier signals having a baseband frequency less than the transmission frequency; one or more modulation circuits configured to receive the one or more baseband signals from the client-side input and the one or more carrier signals from the one or more local oscillators and modulate the one or more baseband signals onto the one or more carrier signals to generate one or more modulated signals; and one or more up-conversion circuits configured to receive the one or more modulated signals from the one or more modulation circuits and up-convert the one or more modulated signals to generate the one or more antenna feed signals, each of the one or more antenna feed signals having the transmission frequency.

Illustrative clause 39. The transmitter of illustrative clause 1, wherein the one or more baseband signals are a plurality of baseband signals, the one or more antenna feed signals being a plurality of antenna feed signals including a combined antenna feed signal, the one or more radiated signals including a combined radiated signal, the frequency of the one or more radiated signals being a transmission frequency, the transmitter circuitry comprising: a plurality of local oscillators configured to generate a plurality of carrier signals, each of the plurality of carrier signals having a baseband frequency less than the transmission frequency; a plurality of modulation circuits configured to receive the plurality of baseband signals from the client-side input and the plurality of carrier signals from the plurality of local oscillators and modulate the plurality of baseband signals onto the plurality of carrier signals to generate a plurality of modulated signals; a plurality of up-conversion circuits configured to receive the plurality of modulated signals from the plurality of modulation circuits and up-convert the plurality of modulated signals to generate a plurality of up-converted signals; and a combiner configured to receive the plurality of up-converted signals from the plurality of up-conversion circuits and combine the plurality of up-converted signals into the combined antenna feed signal; wherein the one or more antennas are configured to receive the combined antenna feed signal from the combiner, generate the combined radiated signal based on the combined antenna feed signal, and couple the combined radiated signal into the hollow waveguide.

Illustrative clause 40. The transmitter of illustrative clause 39, wherein combining the plurality of up-converted signals into the combined antenna feed signal utilizes at least one of time division multiplexing (TDM) and wavelength division multiplexing (WDM).

Illustrative clause 41. The transmitter of illustrative clause 1, wherein the one or more baseband signals are a plurality of baseband signals, the one or more antenna feed signals being a plurality of antenna feed signals, the one or more radiated signals being a plurality of radiated signals including a combined radiated signal, the frequency of the one or more radiated signals being a transmission frequency, the one or more antennas being an antenna array comprising a plurality of antennas, the transmitter circuitry comprising: a plurality of local oscillators configured to generate a plurality of carrier signals, each of the plurality of carrier signals having a baseband frequency less than the transmission frequency; a plurality of modulation circuits configured to receive the plurality of baseband signals from the client-side input and the plurality of carrier signals from the plurality of local oscillators and modulate the plurality of baseband signals onto the plurality of carrier signals to generate a plurality of modulated signals; and a plurality of up-conversion circuits configured to receive the plurality of modulated signals from the plurality of modulation circuits and up-convert the plurality of modulated signals to generate the plurality of antenna feed signals; wherein the plurality of antennas are configured to receive the plurality of antenna feed signals from the plurality of up-conversion circuits, generate the plurality of radiated signals based on the plurality of antenna feed signals, and couple the plurality of radiated signals into the hollow waveguide such that the plurality of radiated signals interact in the hollow waveguide to form the combined radiated signal.

Illustrative clause 42. The transmitter of illustrative clause 41, wherein coupling the plurality of radiated signals into the hollow waveguide such that the plurality of radiated signals interact in the hollow waveguide to form the combined radiated signal utilizes at least one of polarization division multiplexing (PDM), time division multiplexing (TDM) and wavelength division multiplexing (WDM).

Illustrative clause 43. A receiver, comprising: one or more antennas configured to detect one or more radiated signals received from a hollow waveguide and generate one or more antenna output signals based on the one or more radiated signals, each of the one or more radiated signals being radiated electromagnetic waves configured for coherent detection, having a frequency in a range between 300 Gigahertz (GHz) and 10 Terahertz (THz), and having client data encoded therein; receiver circuitry configured to receive the one or more antenna output signals from the one or more antennas and generate one or more baseband signals based on the one or more antenna output signals; and a client-side output configured to receive the one or more baseband signals from the receiver circuitry and transmit the one or more baseband signals.

Illustrative clause 44. The receiver of illustrative clause 43, wherein the hollow waveguide has a hollow waveguide core having a refractive index in a range between 1.0 and 1.4.

Illustrative clause 45. The receiver of illustrative clause 43, wherein the hollow waveguide has a hollow waveguide core and a tubular sidewall surrounding the hollow waveguide core, the hollow waveguide core being filled with one of a gas, a vacuum, and a porous material having a porosity in a range between 25% and 99%.

Illustrative clause 46. The receiver of illustrative clause 45, wherein the tubular sidewall comprises a conductive layer.

Illustrative clause 47. The receiver of illustrative clause 46, wherein the tubular sidewall further comprises a support layer surrounding the conductive layer.

Illustrative clause 48. The receiver of illustrative clause 46, wherein the tubular sidewall further comprises a dielectric layer between the hollow waveguide core and the conductive layer.

Illustrative clause 49. The receiver of illustrative clause 45, wherein the tubular sidewall has one or more conductive layers and one or more dielectric layers, the one or more conductive layers interleaved with the one or more dielectric layers.

Illustrative clause 50. The receiver of illustrative clause 43, wherein each particular one of the one or more radiated signals has a bandwidth in a range between 10% and 40% of the frequency of the particular one of the one or more radiated signals.

Illustrative clause 51. The receiver of illustrative clause 43, wherein the hollow waveguide is configured to support propagation of a single mode of the one or more radiated signals.

Illustrative clause 52. The receiver of illustrative clause 43, wherein the hollow waveguide is configured to support propagation of a plurality of modes of the one or more radiated signals.

Illustrative clause 53. The receiver of illustrative clause 43, the one or more antenna output signals are received from the one or more antennas on one or more transmission lines, each of the one or more transmission lines having two or more conductors.

Illustrative clause 54. The receiver of illustrative clause 53, wherein each of the one or more transmission lines have a first transmission loss and the hollow waveguide has a second transmission loss less than the first transmission loss, the second transmission loss being in a range between 0.001 and 20.00 decibels (dB) per meter (m) per Terabit (Tb) per second (s).

Illustrative clause 55. The receiver of illustrative clause 43, wherein two or more of the client-side output, the receiver circuitry, and the one or more antennas are disposed on a single substrate.

Illustrative clause 56. The receiver of illustrative clause 55, wherein at least two of the client-side output, the receiver circuitry, and the one or more antennas are disposed on a multi-layer substrate having a plurality of layers, at least one of the client-side output, the receiver circuitry, and the one or more antennas being disposed on a first layer of the plurality of layers, at least one of the client-side output, the receiver circuitry, and the one or more antennas being disposed on a second layer of the plurality of layers.

Illustrative clause 57. The receiver of illustrative clause 55, wherein at least two of the client-side output, the receiver circuitry, and the one or more antennas are integrated into a single monolithic semiconductor die.

Illustrative clause 58. The receiver of illustrative clause 43, wherein at least two of the client-side output, the receiver circuitry, and the one or more antennas are disposed on a plurality of substrates, at least one of the client-side output, the receiver circuitry, and the one or more antennas being disposed on a first substrate of the plurality of substrates, at least one of the client-side output, the receiver circuitry, and the one or more antennas being disposed on a second substrate of the plurality of substrates.

Illustrative clause 59. The receiver of illustrative clause 58, wherein at least two of the plurality of substrates are in a stacked arrangement.

Illustrative clause 60. The receiver of illustrative clause 55, wherein at least one of the client-side output, the receiver circuitry, and the one or more antennas are not disposed on the single substrate.

Illustrative clause 61. The receiver of illustrative clause 43, wherein each of the client-side output, the receiver circuitry, and the one or more antennas are implemented using one or more of complementary metal-oxide semiconductor (CMOS) technology, silicon-germanium (SiGe) semiconductor technology, and Ill-V compound semiconductor technology.

Illustrative clause 62. The receiver of illustrative clause 43, wherein the client data is encoded in the one or more baseband signals using an encoding conforming to one or more of return-to-zero (RZ) code, non-return-to-zero (NRZ) code, pulse-amplitude modulation (PAM), and quadrature-amplitude modulation (QAM).

Illustrative clause 63. The receiver of illustrative clause 43, wherein the client data is encoded in the one or more radiated signals using an encoding conforming to one or more of return-to-zero (RZ) code, non-return-to-zero (NRZ) code, quadrature phase-shift keying (QPSK), quadrature-amplitude modulation (QAM), trellis coded modulation (TCM), and Bose-Chaudhuri-Hocquenghem (BCH) code.

Illustrative clause 64. The receiver of illustrative clause 43, wherein the one or more radiated signals are a plurality of radiated signals including a first complementary radiated signal having a first polarization and a second complementary radiated signal having a second polarization different from the first polarization, the one or more antennas being further configured to generate the one or more antenna output signals based on the first complementary radiated signal and the second complementary radiated signal.

Illustrative clause 65. The receiver of illustrative clause 64, wherein the first polarization is orthogonal to the second polarization.

Illustrative clause 66. The receiver of illustrative clause 65, wherein each of the first polarization and the second polarization is a linear polarization.

Illustrative clause 67. The receiver of illustrative clause 66, wherein each of the one or more antennas is one of a differential waveguide probe antenna, a differential tapered antenna, and a differential patch antenna.

Illustrative clause 68. The receiver of illustrative clause 65, wherein each of the first polarization and the second polarization is a circular polarization.

Illustrative clause 69. The receiver of illustrative clause 68, wherein each of the one or more antennas is one of a helix antenna and a spiral antenna.

Illustrative clause 70. The receiver of illustrative clause 43, wherein the one or more radiated signals includes a first complementary radiated signal having a first polarization, a second complementary radiated signal having a second polarization different from the first polarization, and a combined radiated signal having a third polarization different from the first polarization and the second polarization, the combined radiated signal being formed by the first complementary radiated signal and the second complementary radiated signal interacting in the hollow waveguide, the one or more antennas being further configured to detect the combined radiated signal received from the hollow waveguide and generate the one or more antenna output signals based on the combined radiated signal.

Illustrative clause 71. The receiver of illustrative clause 70, wherein the one or more antennas are an antenna array comprising a plurality of antennas.

Illustrative clause 72. The receiver of illustrative clause 43, wherein the one or more baseband signals include a plurality of parallel baseband signals and a serial baseband signal, the receiver circuitry being configured to generate the serial baseband signal based on the one or more antenna output signals, the client-side output being configured to receive the serial baseband signal from the receiver circuitry and transmit the serial baseband signal, the receiver further comprising a deserializer configured to receive the serial baseband signal from the client-side output and split the serial baseband signal into the plurality of parallel baseband signals.

Illustrative clause 73. The receiver of illustrative clause 72, wherein splitting the serial baseband signal into the plurality of parallel baseband signals utilizes at least one of polarization division multiplexing (PDM), time division multiplexing (TDM), and wavelength division multiplexing (WDM).

Illustrative clause 74. The receiver of illustrative clause 43, wherein the one or more baseband signals include a plurality of parallel baseband signals and a serial baseband signal, the receiver circuitry being configured to generate the plurality of parallel baseband signals based on the one or more antenna output signals, the client-side output being configured to receive the plurality of parallel baseband signals from the receiver circuitry and transmit the plurality of parallel baseband signals, the receiver further comprising a serializer configured to receive the plurality of parallel baseband signals and combine the plurality of parallel baseband signals into the serial baseband signal.

Illustrative clause 75. The receiver of illustrative clause 74, wherein combining the plurality of parallel baseband signals into the serial baseband signal utilizes at least one of polarization division multiplexing (PDM), time division multiplexing (TDM), and wavelength division multiplexing (WDM).

Illustrative clause 76. The receiver of illustrative clause 43, wherein the hollow waveguide core has a cross-section configured to support propagation of a plurality of polarizations.

Illustrative clause 77. The receiver of illustrative clause 76, wherein the cross-section of the hollow waveguide core has an elliptical or circular shape.

Illustrative clause 78. The receiver of illustrative clause 76, wherein the cross-section of the hollow waveguide core has a rectangular or square shape.

Illustrative clause 79. The receiver of illustrative clause 76, wherein the cross-section of the hollow waveguide core has a cross shape.

Illustrative clause 80. The receiver of illustrative clause 43, wherein the frequency of the one or more radiated signals is a transmission frequency, the receiver circuitry comprising: one or more local oscillators configured to generate one or more reference signals, each of the one or more reference signals having a baseband frequency less than the transmission frequency; one or more down-conversion circuits configured to receive the one or more antenna output signals from the one or more antennas and the one or more reference signals from the one or more local oscillators and down-convert the one or more antenna output signals using the one or more reference signals to generate one or more modulated signals, each of the one or more modulated signals having the baseband frequency; and one or more demodulation circuits configured to receive the one or more modulated signals from the one or more down-conversion circuits and demodulate the one or more modulated signals to generate the one or more baseband signals.

Illustrative clause 81. The receiver of illustrative clause 43, wherein the one or more baseband signals are a plurality of baseband signals, the one or more antenna output signals being a plurality of antenna output signals including a combined antenna output signal, the one or more radiated signals including a combined radiated signal, the frequency of the one or more radiated signals being a transmission frequency, the one or more antennas being configured to detect the combined radiated signal received from the hollow waveguide and generate the combined antenna output signal based on the combined radiated signal, the receiver circuitry comprising: a splitter configured to receive the combined antenna output signal from the one or more antennas and split the combined antenna output signal into the plurality of antenna output signals; a plurality of local oscillators configured to generate a plurality of reference signals, each of the plurality of reference signals having a baseband frequency less than the transmission frequency; a plurality of down-conversion circuits configured to receive the plurality of antenna output signals from the splitter and the plurality of reference signals from the plurality of local oscillators and down-convert the plurality of antenna output signals using the plurality of reference signals to generate a plurality of modulated signals, each of the plurality of modulated signals having the baseband frequency; and a plurality of demodulation circuits configured to receive the plurality of modulated signals from the plurality of down-conversion circuits and demodulate the plurality of modulated signals to generate the plurality of baseband signals.

Illustrative clause 82. The receiver of illustrative clause 81, wherein splitting the combined antenna output signal into the plurality of antenna output signals utilizes at least one of time division multiplexing (TDM) and wavelength division multiplexing (WDM).

Illustrative clause 83. The receiver of illustrative clause 43, wherein the one or more baseband signals are a plurality of baseband signals, the one or more antenna output signals being a plurality of antenna output signals, the one or more radiated signals being a plurality of radiated signals including a first complementary radiated signal having a first polarization, a second complementary radiated signal having a second polarization different from the first polarization, and a combined radiated signal having a third polarization different from the first polarization and the second polarization, the combined radiated signal being formed by the first complementary radiated signal and the second complementary radiated signal interacting in the hollow waveguide, the frequency of the one or more radiated signals being a transmission frequency, the one or more antennas being an antenna array comprising a plurality of antennas, the plurality of antennas being configured to detect the first complementary radiated signal and the second complementary radiated signal based on the combined radiated signal received from the hollow waveguide and generate the plurality of antenna output signals based on the first complementary radiated signal and the second complementary radiated signal, the receiver circuitry comprising: a plurality of local oscillators configured to generate a plurality of reference signals, each of the plurality of reference signals having a baseband frequency less than the transmission frequency; a plurality of down-conversion circuits configured to receive the plurality of antenna output signals from the plurality of antennas and the plurality of reference signals from the plurality of local oscillators and down-convert the plurality of antenna output signals using the plurality of reference signals to generate a plurality of modulated signals, each of the plurality of modulated signals having the baseband frequency; and a plurality of demodulation circuits configured to receive the plurality of modulated signals from the plurality of down-conversion circuits and demodulate the plurality of modulated signals to generate the plurality of baseband signals.

Illustrative clause 84. The receiver of illustrative clause 83, wherein detecting the first complementary radiated signal and the second complementary radiated signal based on the combined radiated signal received from the hollow waveguide utilizes at least one of polarization division multiplexing (PDM), time division multiplexing (TDM) and wavelength division multiplexing (WDM).

Illustrative clause 85. A transport network, comprising: one or more hollow waveguides; a transmitter, comprising: a client-side input configured to receive one or more first baseband signals having client data encoded therein; transmitter circuitry configured to receive the one or more first baseband signals from the client-side input and generate one or more antenna feed signals based on the one or more first baseband signals; and one or more first antennas configured to receive the one or more antenna feed signals from the transmitter circuitry, generate one or more radiated signals based on the one or more antenna feed signals, and couple the one or more radiated signals into at least one of the one or more hollow waveguides, each of the one or more radiated signals being radiated electromagnetic waves configured for coherent detection and having a frequency in a range between 300 Gigahertz (GHz) and 10 Terahertz (THz); and a receiver, comprising: one or more second antennas configured to detect the one or more radiated signals received from the at least one of the one or more hollow waveguides and generate one or more antenna output signals based on the one or more radiated signals; receiver circuitry configured to receive the one or more antenna output signals from the one or more second antennas and generate one or more second baseband signals based on the one or more antenna output signals, the one or more second baseband signals having the client data; and a client-side output configured to receive the one or more second baseband signals from the receiver circuitry and transmit the one or more second baseband signals.

Illustrative clause 86. The transport network of illustrative clause 85, wherein the at least one of the one or more hollow waveguides has a hollow waveguide core having a refractive index in a range between 1.0 and 1.4.

Illustrative clause 87. The transport network of illustrative clause 85, wherein the at least one of the one or more hollow waveguides has a hollow waveguide core and a tubular sidewall surrounding the hollow waveguide core, the hollow waveguide core being filled with one of a gas, a vacuum, and a porous material having a porosity in a range between 25% and 99%.

Illustrative clause 88. The transport network of illustrative clause 87, wherein the tubular sidewall of the at least one of the one or more hollow waveguides comprises a conductive layer.

Illustrative clause 89. The transport network of illustrative clause 88, wherein the tubular sidewall of the at least one of the one or more hollow waveguides further comprises a support layer surrounding the conductive layer.

Illustrative clause 90. The transport network of illustrative clause 88, wherein the tubular sidewall of the at least one of the one or more hollow waveguides further comprises a dielectric layer between the hollow waveguide core and the conductive layer.

Illustrative clause 91. The transport network of illustrative clause 87, wherein the tubular sidewall of the at least one of the one or more hollow waveguides has one or more conductive layers and one or more dielectric layers, the one or more conductive layers interleaved with the one or more dielectric layers.

Illustrative clause 92. The transport network of illustrative clause 85, wherein each particular one of the one or more radiated signals has a bandwidth in a range between 10% and 40% of the frequency of the particular one of the one or more radiated signals.

Illustrative clause 93. The transport network of illustrative clause 85, wherein the at least one of the one or more hollow waveguides is configured to support propagation of a single mode of the one or more radiated signals.

Illustrative clause 94. The transport network of illustrative clause 85, wherein the at least one of the one or more hollow waveguides is configured to support propagation of a plurality of modes of the one or more radiated signals.

Illustrative clause 95. The transport network of illustrative clause 85, the one or more antenna feed signals are provided to the one or more first antennas on one or more first transmission lines, each of the one or more first transmission lines having two or more conductors.

Illustrative clause 96. The transport network of illustrative clause 95, wherein each of the one or more first transmission lines have a first transmission loss and the at least one of the one or more hollow waveguides has a second transmission loss less than the first transmission loss, the second transmission loss being in a range between 0.001 and 20.00 decibels (dB) per meter (m) per Terabit (Tb) per second (s).

Illustrative clause 97. The transport network of illustrative clause 85, the one or more antenna output signals are received from the one or more second antennas on one or more second transmission lines, each of the one or more second transmission lines having two or more conductors.

Illustrative clause 98. The transport network of illustrative clause 97, wherein each of the one or more second transmission lines have a first transmission loss and the at least one of the one or more hollow waveguides has a second transmission loss less than the first transmission loss, the second transmission loss being in a range between 0.001 and 20.00 decibels (dB) per meter (m) per Terabit (Tb) per second (s).

Illustrative clause 99. The transport network of illustrative clause 85, wherein two or more of the client-side input, the transmitter circuitry, the one or more first antennas, the client-side output, the receiver circuitry, and the one or more second antennas are disposed on a single substrate.

Illustrative clause 100. The transport network of illustrative clause 99, wherein at least two of the client-side input, the transmitter circuitry, the one or more first antennas, the client-side output, the receiver circuitry, and the one or more second antennas are disposed on a multi-layer substrate having a plurality of layers, at least one of the client-side input, the transmitter circuitry, the one or more first antennas, the client-side output, the receiver circuitry, and the one or more second antennas being disposed on a first layer of the plurality of layers, at least one of the client-side input, the transmitter circuitry, the one or more first antennas, the client-side output, the receiver circuitry, and the one or more second antennas being disposed on a second layer of the plurality of layers.

Illustrative clause 101. The transport network of illustrative clause 99, wherein at least two of the client-side input, the transmitter circuitry, the one or more first antennas, the client-side output, the receiver circuitry, and the one or more second antennas are integrated into a single monolithic semiconductor die.

Illustrative clause 102. The transport network of illustrative clause 85, wherein at least two of the client-side input, the transmitter circuitry, the one or more first antennas, the client-side output, the receiver circuitry, and the one or more second antennas are disposed on a plurality of substrates, at least one of the client-side input, the transmitter circuitry, the one or more first antennas, the client-side output, the receiver circuitry, and the one or more second antennas being disposed on a first substrate of the plurality of substrates, at least one of the client-side input, the transmitter circuitry, the one or more first antennas, the client-side output, the receiver circuitry, and the one or more second antennas being disposed on a second substrate of the plurality of substrates.

Illustrative clause 103. The transport network of illustrative clause 102, wherein at least two of the plurality of substrates are in a stacked arrangement.

Illustrative clause 104. The transport network of illustrative clause 99, wherein at least one of the client-side input, the transmitter circuitry, the one or more first antennas, the client-side output, the receiver circuitry, and the one or more second antennas are not disposed on the single substrate.

Illustrative clause 105. The transport network of illustrative clause 85, wherein each of the client-side input, the transmitter circuitry, the one or more first antennas, the client-side output, the receiver circuitry, and the one or more second antennas are implemented using one or more of complementary metal-oxide semiconductor (CMOS) technology, silicon-germanium (SiGe) semiconductor technology, and III-V compound semiconductor technology.

Illustrative clause 106. The transport network of illustrative clause 85, wherein the client data is encoded in the one or more first baseband signals and the one or more second baseband signals using an encoding protocol conforming to requirements of one or more of return-to-zero (RZ) code, non-return-to-zero (NRZ) code, pulse-amplitude modulation (PAM), and quadrature-amplitude modulation (QAM).

Illustrative clause 107. The transport network of illustrative clause 85, wherein the client data is encoded in the one or more radiated signals using an encoding protocol conforming to requirements of one or more of return-to-zero (RZ) code, non-return-to-zero (NRZ) code, quadrature phase-shift keying (QPSK), quadrature-amplitude modulation (QAM), trellis coded modulation (TCM), and Bose-Chaudhuri-Hocquenghem (BCH) code.

Illustrative clause 108. The transport network of illustrative clause 85, wherein the one or more radiated signals are a plurality of radiated signals including a first complementary radiated signal having a first polarization and a second complementary radiated signal having a second polarization different from the first polarization, the one or more first antennas being further configured to generate the first complementary radiated signal and the second complementary radiated signal based on the one or more antenna feed signals, the one or more second antennas being further configured to generate the one or more antenna output signals based on the first complementary radiated signal and the second complementary radiated signal.

Illustrative clause 109. The transport network of illustrative clause 108, wherein the first polarization is orthogonal to the second polarization.

Illustrative clause 110. The transport network of illustrative clause 109, wherein each of the first polarization and the second polarization is a linear polarization.

Illustrative clause 111. The transport network of illustrative clause 110, wherein each of the one or more first antennas and the one or more second antennas is one of a differential waveguide probe antenna, a differential tapered antennas, and a differential patch antenna.

Illustrative clause 112. The transport network of illustrative clause 109, wherein each of the first polarization and the second polarization is a circular polarization.

Illustrative clause 113. The transport network of illustrative clause 112, wherein each the one or more first antennas and the one or more second antennas is one of a helix antenna and a spiral antenna.

Illustrative clause 114. The transport network of illustrative clause 85, wherein the one or more radiated signals are a plurality of radiated signals including a first complementary radiated signal having a first polarization, a second complementary radiated signal having a second polarization different from the first polarization, and a combined radiated signal, the one or more first antennas being further configured to couple the first complementary radiated signal having the first polarization and the second complementary radiated signal having the second polarization in the at least one of the one or more hollow waveguides such that the first complementary radiated signal and the second complementary radiated signal interact in the at least one of the one or more hollow waveguides to form the combined radiated signal having a third polarization different from the first polarization and the second polarization, the one or more second antennas being further configured to detect the combined radiated signal received from the at least one of the one or more hollow waveguides and generate the one or more antenna output signals based on the combined radiated signal.

Illustrative clause 115. The transport network of illustrative clause 114, wherein the one or more first antennas are a first antenna array comprising a first plurality of antennas and the one or more second antennas are a second antenna array comprising a second plurality of antennas.

Illustrative clause 116. The transport network of illustrative clause 85, wherein the one or more first baseband signals include a plurality of first parallel baseband signals and a first serial baseband signal and the one or more second baseband signals include a plurality of second parallel baseband signals and a second serial baseband signal, the transmitter further comprising a serializer configured to receive the plurality of first parallel baseband signals and combine the plurality of first parallel baseband signals into the first serial baseband signal, the client-side input being configured to receive the first serial baseband signal, the transmitter circuitry being configured to receive the first serial baseband signal from the client-side input and generate the one or more antenna feed signals based on the first serial baseband signal, the receiver circuitry being configured to generate the second serial baseband signal based on the one or more antenna output signals, the client-side output being configured to receive the second serial baseband signal from the receiver circuitry and transmit the second serial baseband signal, the receiver further comprising a deserializer configured to receive the second serial baseband signal from the client-side output and split the second serial baseband signal into the plurality of second parallel baseband signals.

Illustrative clause 117. The transport network of illustrative clause 116, wherein combining the plurality of first parallel baseband signals into the first serial baseband signal and splitting the second serial baseband signal into the plurality of second parallel baseband signals utilizes at least one of polarization division multiplexing (PDM), time division multiplexing (TDM), and wavelength division multiplexing (WDM).

Illustrative clause 118. The transport network of illustrative clause 85, wherein the one or more first baseband signals include a plurality of first parallel baseband signals and a first serial baseband signal and the one or more second baseband signals include a plurality of second parallel baseband signals and a second serial baseband signal, the transmitter further comprising a deserializer configured to receive the first serial baseband signal and split the first serial baseband signal into the plurality of first parallel baseband signals, the client-side input being configured to receive the plurality of first parallel baseband signals, the transmitter circuitry configured to receive the plurality of first parallel baseband signals from the client-side input and generate the one or more antenna feed signals based on the plurality of first parallel baseband signals, the receiver circuitry being configured to generate the plurality of second parallel baseband signals based on the one or more antenna output signals, the client-side output being configured to receive the plurality of second parallel baseband signals from the receiver circuitry and transmit the plurality of second parallel baseband signals, the receiver further comprising a serializer configured to receive the plurality of second parallel baseband signals and combine the plurality of second parallel baseband signals into the second serial baseband signal.

Illustrative clause 119. The transport network of illustrative clause 118, wherein splitting the first serial baseband signal into the plurality of first parallel baseband signals and combining the plurality of second parallel baseband signals into the second serial baseband signal utilizes at least one of polarization division multiplexing (PDM), time division multiplexing (TDM), and wavelength division multiplexing (WDM).

Illustrative clause 120. The transport network of illustrative clause 85, wherein the hollow waveguide core of the at least one of the one or more hollow waveguides has a cross-section configured to support propagation of a plurality of polarizations.

Illustrative clause 121. The transport network of illustrative clause 120, wherein the cross-section of the hollow waveguide core of the at least one of the one or more hollow waveguides has an elliptical or circular shape.

Illustrative clause 122. The transport network of illustrative clause 120, wherein the cross-section of the hollow waveguide core of the at least one of the one or more hollow waveguides has a rectangular or square shape.

Illustrative clause 123. The transport network of illustrative clause 120, wherein the cross-section of the hollow waveguide core of the at least one of the one or more hollow waveguides has a cross shape.

Illustrative clause 124. The transport network of illustrative clause 85, wherein the frequency of the one or more radiated signals is a transmission frequency, the transmitter circuitry comprising: one or more local oscillators configured to generate one or more carrier signals, each of the one or more carrier signals having a first baseband frequency less than the transmission frequency; one or more modulation circuits configured to receive the one or more first baseband signals from the client-side input and the one or more carrier signals from the one or more local oscillators and modulate the one or more first baseband signals onto the one or more carrier signals to generate one or more modulated signals; and one or more up-conversion circuits configured to receive the one or more modulated signals from the one or more modulation circuits and up-convert the one or more modulated signals to generate the one or more antenna feed signals, each of the one or more antenna feed signals having the transmission frequency.

Illustrative clause 125. The transport network of illustrative clause 85, wherein the frequency of the one or more radiated signals is a transmission frequency, the receiver circuitry comprising: one or more local oscillators configured to generate one or more reference signals, each of the one or more reference signals having a baseband frequency less than the transmission frequency; one or more down-conversion circuits configured to receive the one or more antenna output signals from the one or more second antennas and the one or more reference signals from the one or more local oscillators and down-convert the one or more antenna output signals using the one or more reference signals to generate one or more modulated signals, each of the one or more modulated signals having the baseband frequency; and one or more demodulation circuits configured to receive the one or more modulated signals from the one or more down-conversion circuits and demodulate the one or more modulated signals to generate the one or more second baseband signals.

Illustrative clause 126. The transport network of illustrative clause 85, wherein the one or more first baseband signals are a plurality of first baseband signals, the one or more antenna feed signals being a plurality of antenna feed signals including a combined antenna feed signal, the one or more radiated signals including a combined radiated signal, the frequency of the one or more radiated signals being a transmission frequency, the transmitter circuitry comprising: a plurality of local oscillators configured to generate a plurality of carrier signals, each of the plurality of carrier signals having a baseband frequency less than the transmission frequency; a plurality of modulation circuits configured to receive the plurality of first baseband signals from the client-side input and the plurality of carrier signals from the plurality of local oscillators and modulate the plurality of first baseband signals onto the plurality of carrier signals to generate a plurality of modulated signals; a plurality of up-conversion circuits configured to receive the plurality of modulated signals from the plurality of modulation circuits and up-convert the plurality of modulated signals to generate a plurality of up-converted signals; and a combiner configured to receive the plurality of up-converted signals from the plurality of up-conversion circuits and combine the plurality of up-converted signals into the combined antenna feed signal; wherein the one or more first antennas are configured to receive the combined antenna feed signal from the combiner, generate the combined radiated signal based on the combined antenna feed signal, and couple the combined radiated signal into the at least one of the one or more hollow waveguides.

Illustrative clause 127. The transport network of illustrative clause 126, wherein combining the plurality of up-converted signals into the combined antenna feed signal utilizes at least one of time division multiplexing (TDM) and wavelength division multiplexing (WDM).

Illustrative clause 128. The transport network of illustrative clause 85, wherein the one or more second baseband signals are a plurality of second baseband signals, the one or more antenna output signals being a plurality of antenna output signals including a combined antenna output signal, the one or more radiated signals including a combined radiated signal, the frequency of the one or more radiated signals being a transmission frequency, the one or more second antennas being configured to detect the combined radiated signal received from the one or more hollow waveguides and generate the combined antenna output signal based on the combined radiated signal, the receiver circuitry comprising: a splitter configured to receive the combined antenna output signal from the one or more second antennas and split the combined antenna output signal into the plurality of antenna output signals; a plurality of local oscillators configured to generate a plurality of reference signals, each of the plurality of reference signals having a baseband frequency less than the transmission frequency; a plurality of down-conversion circuits configured to receive the plurality of antenna output signals from the splitter and the plurality of reference signals from the plurality of local oscillators and down-convert the plurality of antenna output signals using the plurality of reference signals to generate a plurality of modulated signals, each of the plurality of modulated signals having the baseband frequency; and a plurality of demodulation circuits configured to receive the plurality of modulated signals from the plurality of down-conversion circuits and demodulate the plurality of modulated signals to generate the plurality of second baseband signals.

Illustrative clause 129. The transport network of illustrative clause 128, wherein splitting the combined antenna output signal into the plurality of antenna output signals utilizes at least one of time division multiplexing (TDM) and wavelength division multiplexing (WDM).

Illustrative clause 130. The transport network of illustrative clause 85, wherein the one or more first baseband signals are a plurality of first baseband signals, the one or more antenna feed signals being a plurality of antenna feed signals, the one or more radiated signals being a plurality of radiated signals including a combined radiated signal, the frequency of the one or more radiated signals being a transmission frequency, the one or more first antennas being a first antenna array comprising a plurality of first antennas, the transmitter circuitry comprising: a plurality of local oscillators configured to generate a plurality of carrier signals, each of the plurality of carrier signals having a baseband frequency less than the transmission frequency; a plurality of modulation circuits configured to receive the plurality of first baseband signals from the client-side input and the plurality of carrier signals from the plurality of local oscillators and modulate the plurality of first baseband signals onto the plurality of carrier signals to generate a plurality of modulated signals; and a plurality of up-conversion circuits configured to receive the plurality of modulated signals from the plurality of modulation circuits and up-convert the plurality of modulated signals to generate the plurality of antenna feed signals; wherein the plurality of first antennas are configured to receive the plurality of antenna feed signals from the plurality of up-conversion circuits, generate the plurality of radiated signals based on the plurality of antenna feed signals, and couple the plurality of radiated signals into the at least one of the one or more hollow waveguides such that the plurality of radiated signals interact in the at least one of the one or more hollow waveguides to form the combined radiated signal.

Illustrative clause 131. The transport network of illustrative clause 130, wherein coupling the plurality of radiated signals into the at least one of the one or more hollow waveguides such that the plurality of radiated signals interact in the at least one of the one or more hollow waveguides to form the combined radiated signal utilizes at least one of polarization division multiplexing (PDM), time division multiplexing (TDM) and wavelength division multiplexing (WDM).

Illustrative clause 132. The transport network of illustrative clause 85, wherein the one or more second baseband signals are a plurality of second baseband signals, the one or more antenna output signals being a plurality of antenna output signals, the one or more radiated signals being a plurality of radiated signals including a first complementary radiated signal, a second complementary radiated signal, and a combined radiated signal formed by the first complementary radiated signal and the second complementary radiated signal interacting in the at least one of the one or more hollow waveguides, the frequency of the one or more radiated signals being a transmission frequency, the one or more second antennas being an antenna array comprising a plurality of antennas, the plurality of antennas being configured to detect the first complementary radiated signal and the second complementary radiated signal based on the combined radiated signal received from the at least one of the one or more hollow waveguides and generate the plurality of antenna output signals based on the first complementary radiated signal and the second complementary radiated signal, the receiver circuitry comprising: a plurality of local oscillators configured to generate a plurality of reference signals, each of the plurality of reference signals having a baseband frequency less than the transmission frequency; a plurality of down-conversion circuits configured to receive the plurality of antenna output signals from the plurality of antennas and the plurality of reference signals from the plurality of local oscillators and down-convert the plurality of antenna output signals using the plurality of reference signals to generate a plurality of modulated signals, each of the plurality of modulated signals having the baseband frequency; and a plurality of demodulation circuits configured to receive the plurality of modulated signals from the plurality of down-conversion circuits and demodulate the plurality of modulated signals to generate the plurality of second baseband signals.

Illustrative clause 133. The transport network of illustrative clause 132, wherein detecting the first complementary radiated signal and the second complementary radiated signal based on the combined radiated signal received from the at least one of the one or more hollow waveguides utilizes at least one of polarization division multiplexing (PDM), time division multiplexing (TDM) and wavelength division multiplexing (WDM).

Illustrative clause 134. A transceiver, comprising: a transmitter, comprising: a client-side input configured to receive one or more first baseband signals having first client data; transmitter circuitry configured to receive the one or more first baseband signals from the client-side input and generate one or more antenna feed signals based on the one or more first baseband signals; and one or more first antennas configured to receive the one or more antenna feed signals from the transmitter circuitry, generate one or more first radiated signals based on the one or more antenna feed signals, and couple the one or more first radiated signals into a first hollow waveguide, each of the one or more first radiated signals being radiated electromagnetic waves configured for coherent detection and having a first frequency in a range between 300 Gigahertz (GHz) and 10 Terahertz (THz); and a receiver, comprising: one or more second antennas configured to detect one or more second radiated signals received from one of the first hollow waveguide and a second hollow waveguide and generate one or more antenna output signals based on the one or more second radiated signals, each of the one or more second radiated signals being radiated electromagnetic waves configured for coherent detection, having a second frequency in a range between 300 GHz and 10 THz, and having second client data; receiver circuitry configured to receive the one or more antenna output signals from the one or more second antennas and generate one or more second baseband signals based on the one or more antenna output signals; and a client-side output configured to receive the one or more second baseband signals from the receiver circuitry and transmit the one or more second baseband signals.

Illustrative clause 135. The transceiver of illustrative clause 134, wherein each of the first hollow waveguide and the second hollow waveguide has a hollow waveguide core having a refractive index in a range between 1.0 and 1.4.

Illustrative clause 136. The transceiver of illustrative clause 134, wherein each of the first hollow waveguide and the second hollow waveguide has a hollow waveguide core and a tubular sidewall surrounding the hollow waveguide core, the hollow waveguide core being filled with one of a gas, a vacuum, and a porous material having a porosity in a range between 25% and 99%.

Illustrative clause 137. The transceiver of illustrative clause 136, wherein the tubular sidewall of each of the first hollow waveguide and the second hollow waveguide comprises a conductive layer.

Illustrative clause 138. The transceiver of illustrative clause 137, wherein the tubular sidewall of each of the first hollow waveguide and the second hollow waveguide further comprises a support layer surrounding the conductive layer.

Illustrative clause 139. The transceiver of illustrative clause 137, wherein the tubular sidewall of each of the first hollow waveguide and the second hollow waveguide further comprises a dielectric layer between the hollow waveguide core and the conductive layer.

Illustrative clause 140. The transceiver of illustrative clause 136, wherein the tubular sidewall of each of the first hollow waveguide and the second hollow waveguide has one or more conductive layers and one or more dielectric layers, the one or more conductive layers interleaved with the one or more dielectric layers.

Illustrative clause 141. The transceiver of illustrative clause 134, wherein each particular one of the one or more first radiated signals and has a first bandwidth in a range between 10% and 40% of the first frequency of the particular one of the one or more first radiated signals and each particular one of the one or more second radiated signals and has a second bandwidth in a range between 10% and 40% of the second frequency of the particular one of the one or more second radiated signals.

Illustrative clause 142. The transceiver of illustrative clause 134, wherein each of the first hollow waveguide is configured to support propagation of a single mode of the one or more first radiated signals and the second hollow waveguide is configured to support propagation of a single more of the one or more second radiated signals.

Illustrative clause 143. The transceiver of illustrative clause 134, wherein the first hollow waveguide is configured to support propagation of a plurality of first modes of the one or more first radiated signals and the second hollow waveguide is configured to support propagation of a plurality of second modes of the one or more second radiated signals.

Illustrative clause 144. The transceiver of illustrative clause 134, the one or more antenna feed signals are provided to the one or more first antennas on one or more first transmission lines and the one or more antenna output signals are received from the one or more second antennas on one or more second transmission lines, each of the one or more first transmission lines and the one or more second transmission lines having two or more conductors.

Illustrative clause 145. The transceiver of illustrative clause 144, wherein each of the one or more first transmission lines and the one or more second transmission lines have a first transmission loss and each of the first hollow waveguide and the second hollow waveguide has a second transmission loss less than the first transmission loss, the second transmission loss being in a range between 0.001 and 20.00 decibels (dB) per meter (m) per Terabit (Tb) per second (s).

Illustrative clause 146. The transceiver of illustrative clause 134, wherein two or more of the client-side input, the transmitter circuitry, the one or more first antennas, the client-side output, the receiver circuitry, and the one or more second antennas are disposed on a single substrate.

Illustrative clause 147. The transceiver of illustrative clause 146, wherein at least two of the client-side input, the transmitter circuitry, the one or more first antennas, the client-side output, the receiver circuitry, and the one or more second antennas are disposed on a multi-layer substrate having a plurality of layers, at least one of the client-side input, the transmitter circuitry, the one or more first antennas, the client-side output, the receiver circuitry, and the one or more second antennas being disposed on a first layer of the plurality of layers, at least one of the client-side input, the transmitter circuitry, the one or more first antennas, the client-side output, the receiver circuitry, and the one or more second antennas being disposed on a second layer of the plurality of layers.

Illustrative clause 148. The transceiver of illustrative clause 146, wherein at least two of the client-side input, the transmitter circuitry, the one or more first antennas, the client-side output, the receiver circuitry, and the one or more second antennas are integrated into a single monolithic semiconductor die.

Illustrative clause 149. The transceiver of illustrative clause 134, wherein at least two of the client-side input, the transmitter circuitry, the one or more first antennas, the client-side output, the receiver circuitry, and the one or more second antennas are disposed on a plurality of substrates, at least one of the client-side input, the transmitter circuitry, the one or more first antennas, the client-side output, the receiver circuitry, and the one or more second antennas being disposed on a first substrate of the plurality of substrates, at least one of the client-side input, the transmitter circuitry, the one or more first antennas, the client-side output, the receiver circuitry, and the one or more second antennas being disposed on a second substrate of the plurality of substrates.

Illustrative clause 150. The transceiver of illustrative clause 149, wherein at least two of the plurality of substrates are in a stacked arrangement.

Illustrative clause 151. The transceiver of illustrative clause 146, wherein at least one of the client-side input, the transmitter circuitry, the one or more first antennas, the client-side output, the receiver circuitry, and the one or more second antennas are not disposed on the single substrate.

Illustrative clause 152. The transceiver of illustrative clause 134, wherein each of the client-side input, the transmitter circuitry, the one or more first antennas, the client-side output, the receiver circuitry, and the one or more second antennas are implemented using one or more of complementary metal-oxide semiconductor (CMOS) technology, silicon-germanium (SiGe) semiconductor technology, and Ill-V compound semiconductor technology.

Illustrative clause 153. The transceiver of illustrative clause 134, wherein the first client data is encoded in the one or more first baseband signals and the second client data is encoded in the one or more second baseband signals using an encoding protocol conforming to requirements of one or more of return-to-zero (RZ) code, non-return-to-zero (NRZ) code, pulse-amplitude modulation (PAM), and quadrature-amplitude modulation (QAM).

Illustrative clause 154. The transceiver of illustrative clause 134, wherein the first client data is encoded in the one or more first radiated signals and the second client data is encoded in the one or more second radiated signals using an encoding protocol conforming to requirements of one or more of return-to-zero (RZ) code, non-return-to-zero (NRZ) code, quadrature phase-shift keying (QPSK), quadrature-amplitude modulation (QAM), trellis coded modulation (TCM), and Bose-Chaudhuri-Hocquenghem (BCH) code.

Illustrative clause 155. The transceiver of illustrative clause 134, wherein the one or more first radiated signals are a plurality of first radiated signals including a first complementary radiated signal having a first polarization and a second complementary radiated signal having a second polarization different from the first polarization and the one or more second radiated signals are a plurality of second radiated signals including a third complementary radiated signal having a third polarization and a fourth complementary radiated signal having a fourth polarization different from the third polarization, the one or more first antennas being further configured to generate the first complementary radiated signal and the second complementary radiated signal based on the one or more antenna feed signals, the one or more second antennas being further configured to generate the one or more antenna output signals based on the third complementary radiated signal and the fourth complementary radiated signal.

Illustrative clause 156. The transceiver of illustrative clause 155, wherein the first polarization is orthogonal to the second polarization and the third polarization is orthogonal to the fourth polarization.

Illustrative clause 157. The transceiver of illustrative clause 156, wherein each of the first polarization, the second polarization, the third polarization, and the fourth polarization is a linear polarization.

Illustrative clause 158. The transceiver of illustrative clause 157, wherein each of the one or more first antennas and the one or more second antennas is one of a differential waveguide probe antenna, a differential tapered antenna, and a differential patch antenna.

Illustrative clause 159. The transceiver of illustrative clause 156, wherein each of the first polarization, the second polarization, the third polarization, and the fourth polarization is a circular polarization.

Illustrative clause 160. The transceiver of illustrative clause 159, wherein each of the one or more first antennas and the one or more second antennas is one of a helix antenna and a spiral antenna.

Illustrative clause 161. The transceiver of illustrative clause 134, wherein the one or more first radiated signals are a plurality of first radiated signals including a first complementary radiated signal having a first polarization, a second complementary radiated signal having a second polarization different from the first polarization, and a first combined radiated signal and the one or more second radiated signals are a plurality of second radiated signals including a third complementary radiated signal having a third polarization, a fourth complementary radiated signal having a fourth polarization different from the third polarization, and a second combined radiated signal having a fifth polarization different from the third polarization and the fourth polarization, the second combined radiated signal being formed by the third complementary radiated signal and the fourth complementary radiated signal interacting in the second hollow waveguide, the one or more first antennas being further configured to couple the first complementary radiated signal having the first polarization and the second complementary radiated signal having the second polarization in the first hollow waveguide such that the first complementary radiated signal and the second complementary radiated signal interact in the first hollow waveguide to form the first combined radiated signal having a sixth polarization different from the first polarization and the second polarization, the one or more second antennas being further configured to detect the second combined radiated signal received from the one of the first hollow waveguide and the second hollow waveguide and generate the one or more antenna output signals based on the second combined radiated signal.

Illustrative clause 162. The transceiver of illustrative clause 161, wherein the one or more first antennas are a first antenna array comprising a plurality of first antennas, and the one or more second antennas are a second antenna array comprising a plurality of second antennas.

Illustrative clause 163. The transceiver of illustrative clause 134, wherein the one or more first baseband signals include a plurality of first parallel baseband signals and a first serial baseband signal and the one or more second baseband signals include a plurality of second parallel baseband signals and a second serial baseband signal, the transmitter further comprising a serializer configured to receive the plurality of first parallel baseband signals and combine the plurality of first parallel baseband signals into the first serial baseband signal, the client-side input being configured to receive the first serial baseband signal, the transmitter circuitry being configured to receive the first serial baseband signal from the client-side input and generate the one or more antenna feed signals based on the first serial baseband signal, the receiver circuitry being configured to generate the second serial baseband signal based on the one or more antenna output signals, the client-side output being configured to receive the second serial baseband signal from the receiver circuitry and transmit the second serial baseband signal, the receiver further comprising a deserializer configured to receive the second serial baseband signal from the client-side output and split the second serial baseband signal into the plurality of second parallel baseband signals.

Illustrative clause 164. The transceiver of illustrative clause 163, wherein combining the plurality of first parallel baseband signals into the first serial baseband signal and splitting the second serial baseband signal into the plurality of second parallel baseband signals utilizes at least one of polarization division multiplexing (PDM), time division multiplexing (TDM), and wavelength division multiplexing (WDM).

Illustrative clause 165. The transceiver of illustrative clause 134, wherein the one or more first baseband signals include a plurality of first parallel baseband signals and a first serial baseband signal and the one or more second baseband signals include a plurality of second parallel baseband signals and a second serial baseband signal, the transmitter further comprising a deserializer configured to receive the first serial baseband signal and split the first serial baseband signal into the plurality of first parallel baseband signals, the client-side input being configured to receive the plurality of first parallel baseband signals, the transmitter circuitry configured to receive the plurality of first parallel baseband signals from the client-side input and generate the one or more antenna feed signals based on the plurality of first parallel baseband signals, the receiver circuitry being configured to generate the plurality of second parallel baseband signals based on the one or more antenna output signals, the client-side output being configured to receive the plurality of second parallel baseband signals from the receiver circuitry and transmit the plurality of second parallel baseband signals, the receiver further comprising a serializer configured to receive the plurality of second parallel baseband signals and combine the plurality of second parallel baseband signals into the second serial baseband signal.

Illustrative clause 166. The transceiver of illustrative clause 165, wherein splitting the first serial baseband signal into the plurality of first parallel baseband signals and combining the plurality of second parallel baseband signals into the second serial baseband signal utilizes at least one of polarization division multiplexing (PDM), time division multiplexing (TDM), and wavelength division multiplexing (WDM).

Illustrative clause 167. The transceiver of illustrative clause 134, wherein the hollow waveguide core of each of the first hollow waveguide and the second hollow waveguide has a cross-section configured to support propagation of a plurality of polarizations.

Illustrative clause 168. The transceiver of illustrative clause 167, wherein the cross-section of the hollow waveguide core of each of the first hollow waveguide and the second hollow waveguide has an elliptical or circular shape.

Illustrative clause 169. The transceiver of illustrative clause 167, wherein the cross-section of the hollow waveguide core of each of the first hollow waveguide and the second hollow waveguide has a rectangular or square shape.

Illustrative clause 170. The transceiver of illustrative clause 167, wherein the cross-section of the hollow waveguide core of each of the first hollow waveguide and the second hollow waveguide has a cross shape.

Illustrative clause 171. The transceiver of illustrative clause 134, wherein the first frequency of the one or more first radiated signals is a transmission frequency, the transmitter circuitry comprising: one or more local oscillators configured to generate one or more carrier signals, each of the one or more carrier signals having a baseband frequency less than the transmission frequency; one or more modulation circuits configured to receive the one or more first baseband signals from the client-side input and the one or more carrier signals from the one or more local oscillators and modulate the one or more first baseband signals onto the one or more carrier signals to generate one or more modulated signals; and one or more up-conversion circuits configured to receive the one or more modulated signals from the one or more modulation circuits and up-convert the one or more modulated signals to generate the one or more antenna feed signals, each of the one or more antenna feed signals having the transmission frequency.

Illustrative clause 172. The transceiver of illustrative clause 134, wherein the second frequency of the one or more second radiated signals is a transmission frequency, the receiver circuitry comprising: one or more local oscillators configured to generate one or more reference signals, each of the one or more reference signals having a baseband frequency less than the transmission frequency; one or more down-conversion circuits configured to receive the one or more antenna output signals from the one or more second antennas and the one or more reference signals from the one or more local oscillators and down-convert the one or more antenna output signals using the one or more reference signals to generate one or more modulated signals, each of the one or more modulated signals having the baseband frequency; and one or more demodulation circuits configured to receive the one or more modulated signals from the one or more down-conversion circuits and demodulate the one or more modulated signals to generate the one or more second baseband signals.

Illustrative clause 173. The transceiver of illustrative clause 134, wherein the one or more first baseband signals are a plurality of first baseband signals, the one or more antenna feed signals being a plurality of antenna feed signals including a combined antenna feed signal, the one or more first radiated signals including a first combined radiated signal, the first frequency of the one or more first radiated signals being a transmission frequency, the transmitter circuitry comprising: a plurality of local oscillators configured to generate a plurality of carrier signals, each of the plurality of carrier signals having a baseband frequency less than the transmission frequency; a plurality of modulation circuits configured to receive the plurality of first baseband signals from the client-side input and the plurality of carrier signals from the plurality of local oscillators and modulate the plurality of first baseband signals onto the plurality of carrier signals to generate a plurality of modulated signals; a plurality of up-conversion circuits configured to receive the plurality of modulated signals from the plurality of modulation circuits and up-convert the plurality of modulated signals to generate a plurality of up-converted signals; and a combiner configured to receive the plurality of up-converted signals from the plurality of up-conversion circuits and combine the plurality of up-converted signals into the combined antenna feed signal; wherein the one or more first antennas are configured to receive the combined antenna feed signal from the combiner, generate the first combined radiated signal based on the combined antenna feed signal, and couple the first combined radiated signal into the first hollow waveguide.

Illustrative clause 174. The transceiver of illustrative clause 173, wherein combining the plurality of up-converted signals into the combined antenna feed signal utilizes at least one of time division multiplexing (TDM) and wavelength division multiplexing (WDM).

Illustrative clause 175. The transceiver of illustrative clause 134, wherein the one or more second baseband signals are a plurality of second baseband signals, the one or more antenna output signals being a plurality of antenna output signals including a combined antenna output signal, the one or more second radiated signals including a second combined radiated signal, the second frequency of the one or more second radiated signals being a transmission frequency, the one or more second antennas being configured to detect the second combined radiated signal received from the one of the first hollow waveguide and the second hollow waveguide and generate the combined antenna output signal based on the second combined radiated signal, the receiver circuitry comprising: a splitter configured to receive the combined antenna output signal from the one or more second antennas and split the combined antenna output signal into the plurality of antenna output signals; a plurality of local oscillators configured to generate a plurality of reference signals, each of the plurality of reference signals having a baseband frequency less than the transmission frequency; a plurality of down-conversion circuits configured to receive the plurality of antenna output signals from the splitter and the plurality of reference signals from the plurality of local oscillators and down-convert the plurality of antenna output signals using the plurality of reference signals to generate a plurality of modulated signals, each of the plurality of modulated signals having the baseband frequency; and a plurality of demodulation circuits configured to receive the plurality of modulated signals from the plurality of down-conversion circuits and demodulate the plurality of modulated signals to generate the plurality of second baseband signals.

Illustrative clause 176. The transceiver of illustrative clause 175, wherein splitting the combined antenna output signal into the plurality of antenna output signals utilizes at least one of time division multiplexing (TDM) and wavelength division multiplexing (WDM).

Illustrative clause 177. The transceiver of illustrative clause 134, wherein the one or more first baseband signals are a plurality of first baseband signals, the one or more antenna feed signals being a plurality of antenna feed signals, the one or more first radiated signals being a plurality of first radiated signals including a first combined radiated signal, the first frequency of the first radiated signals being a transmission frequency, the one or more first antennas being a first antenna array comprising a plurality of first antennas, the transmitter circuitry comprising: a plurality of local oscillators configured to generate a plurality of carrier signals, each of the plurality of carrier signals having a baseband frequency less than the transmission frequency; a plurality of modulation circuits configured to receive the plurality of first baseband signals from the client-side input and the plurality of carrier signals from the plurality of local oscillators and modulate the plurality of first baseband signals onto the plurality of carrier signals to generate a plurality of modulated signals; and a plurality of up-conversion circuits configured to receive the plurality of modulated signals from the plurality of modulation circuits and up-convert the plurality of modulated signals to generate the plurality of antenna feed signals; wherein the plurality of first antennas are configured to receive the plurality of antenna feed signals from the plurality of up-conversion circuits, generate the plurality of first radiated signals based on the plurality of antenna feed signals, and couple the plurality of first radiated signals into the first hollow waveguide such that the plurality of first radiated signals interact in the first hollow waveguide to form the first combined radiated signal.

Illustrative clause 178. The transceiver of illustrative clause 177, wherein coupling the plurality of first radiated signals into the first hollow waveguide such that the plurality of first radiated signals interact in the first hollow waveguide to form the first combined radiated signal utilizes at least one of polarization division multiplexing (PDM), time division multiplexing (TDM) and wavelength division multiplexing (WDM).

Illustrative clause 179. The transceiver of illustrative clause 134, wherein the one or more second baseband signals are a plurality of second baseband signals, the one or more antenna output signals being a plurality of antenna output signals, the one or more second radiated signals being a plurality of second radiated signals including a first complementary radiated signal, a second complementary radiated signal, and a second combined radiated signal formed by the first complementary radiated signal and the second complementary radiated signal interacting in the second hollow waveguide, the second frequency of the one or more second radiated signals being a transmission frequency, the one or more second antennas being a second antenna array comprising a plurality of second antennas, the plurality of second antennas being configured to detect the first complementary radiated signal and the second complementary radiated signal based on the second combined radiated signal received from the one of the first hollow waveguide and the second hollow waveguide and generate the plurality of antenna output signals based on the first complementary radiated signal and the second complementary radiated signal, the receiver circuitry comprising: a plurality of local oscillators configured to generate a plurality of reference signals, each of the plurality of reference signals having a baseband frequency less than the transmission frequency; a plurality of down-conversion circuits configured to receive the plurality of antenna output signals from the plurality of second antennas and the plurality of reference signals from the plurality of local oscillators and down-convert the plurality of antenna output signals using the plurality of reference signals to generate a plurality of modulated signals, each of the plurality of modulated signals having the baseband frequency; and a plurality of demodulation circuits configured to receive the plurality of modulated signals from the plurality of down-conversion circuits and demodulate the plurality of modulated signals to generate the plurality of second baseband signals.

Illustrative clause 180. The transceiver of illustrative clause 179, wherein detecting the first complementary radiated signal and the second complementary radiated signal based on the second combined radiated signal received from the one of the first hollow waveguide and the second hollow waveguide utilizes at least one of polarization division multiplexing (PDM), time division multiplexing (TDM) and wavelength division multiplexing (WDM).

CONCLUSION

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred implementation. Further, the phrase "based on" is intended to mean "based, at least in part, on" unless explicitly stated otherwise.

What is claimed is:

1. A transport network, comprising:
one or more hollow waveguides;
a transmitter, comprising:
a client-side input configured to receive one or more first baseband signals having client data encoded therein;
transmitter circuitry configured to receive the one or more first baseband signals from the client-side input and generate one or more antenna feed signals based on the one or more first baseband signals; and
one or more first antennas configured to receive the one or more antenna feed signals from the transmitter circuitry, generate one or more radiated signals based on the one or more antenna feed signals, and couple the one or more radiated signals into at least one of the one or more hollow waveguides, each of the one or more radiated signals being radiated electromagnetic waves configured for coherent detection and having a frequency in a range between 300 Gigahertz (GHz) and 10 Terahertz (THz); and
a receiver, comprising:
one or more second antennas configured to detect the one or more radiated signals received from the at least one of the one or more hollow waveguides and generate one or more antenna output signals based on the one or more radiated signals;
receiver circuitry configured to receive the one or more antenna output signals from the one or more second antennas and generate one or more second baseband signals based on the one or more antenna output signals, the one or more second baseband signals having the client data; and
a client-side output configured to receive the one or more second baseband signals from the receiver circuitry and transmit the one or more second baseband signals.

2. The transport network of claim 1, wherein the at least one of the one or more hollow waveguides has a hollow waveguide core having a refractive index in a range between 1.0 and 1.4.

3. The transport network of claim 1, wherein the at least one of the one or more hollow waveguides has a hollow waveguide core and a tubular sidewall surrounding the hollow waveguide core, the hollow waveguide core being filled with one of a gas, a vacuum, and a porous material having a porosity in a range between 25% and 99%.

4. The transport network of claim 3, wherein the tubular sidewall of the at least one of the one or more hollow waveguides further comprises a conductive layer.

5. The transport network of claim 4, wherein the tubular sidewall of the at least one of the one or more hollow waveguides further comprises a support layer surrounding the conductive layer.

6. The transport network of claim 4, wherein the tubular sidewall of the at least one of the one or more hollow waveguides further comprises a dielectric layer between the hollow waveguide core and the conductive layer.

7. The transport network of claim 3, wherein the tubular sidewall of the at least one of the one or more hollow waveguides has one or more conductive layers and one or more dielectric layers, the one or more conductive layers interleaved with the one or more dielectric layers.

8. The transport network of claim 1, wherein the at least one of the one or more hollow waveguides is configured to support propagation of a single mode of the one or more radiated signals.

9. The transport network of claim 1, wherein the at least one of the one or more hollow waveguides is configured to support propagation of a plurality of modes of the one or more radiated signals.

10. The transport network of claim 1, wherein the one or more antenna feed signals are provided to the one or more first antennas on one or more first transmission lines, each of the one or more first transmission lines having two or more conductors.

11. The transport network of claim 10, wherein each of the one or more first transmission lines have a first transmission loss and the at least one of the one or more hollow waveguides has a second transmission loss less than the first transmission loss, the second transmission loss being in a range between 0.001 and 20.00 decibels (dB) per meter (m) per Terabit (Tb) per second(s).

12. The transport network of claim 1, wherein the one or more antenna output signals are received from the one or more second antennas on one or more second transmission lines, each of the one or more second transmission lines having two or more conductors.

13. The transport network of claim 12, wherein each of the one or more second transmission lines have a first transmission loss and the at least one of the one or more hollow waveguides has a second transmission loss less than the first transmission loss, the second transmission loss being in a range between 0.001 and 20.00 decibels (dB) per meter (m) per Terabit (Tb) per second(s).

14. The transport network of claim 1, wherein two or more of the client-side input, the transmitter circuitry, the one or more first antennas, the client-side output, the receiver circuitry, and the one or more second antennas are disposed on a single substrate.

15. The transport network of claim 12, wherein at least two of the client-side input, the transmitter circuitry, the one or more first antennas, the client-side output, the receiver circuitry, and the one or more second antennas are disposed on a multi-layer substrate having a plurality of layers, at least one of the client-side input, the transmitter circuitry, the one or more first antennas, the client-side output, the receiver circuitry, and the one or more second antennas being disposed on a first layer of the plurality of layers, at least one of the client-side input, the transmitter circuitry, the one or more first antennas, the client-side output, the receiver circuitry, and the one or more second antennas being disposed on a second layer of the plurality of layers.

16. The transport network of claim 14, wherein at least two of the client-side input, the transmitter circuitry, the one or more first antennas, the client-side output, the receiver circuitry, and the one or more second antennas are integrated into a single monolithic semiconductor die.

17. The transport network of claim 14, wherein at least one of the client-side input, the transmitter circuitry, the one or more first antennas, the client-side output, the receiver circuitry, and the one or more second antennas are not disposed on the single substrate.

18. The transport network of claim 1, wherein at least two of the client-side input, the transmitter circuitry, the one or more first antennas, the client-side output, the receiver circuitry, and the one or more second antennas are disposed on a plurality of substrates, at least one of the client-side input, the transmitter circuitry, the one or more first antennas, the client-side output, the receiver circuitry, and the one or more second antennas being disposed on a first substrate of the plurality of substrates, at least one of the client-side input, the transmitter circuitry, the one or more first antennas, the client-side output, the receiver circuitry, and the one or more second antennas being disposed on a second substrate of the plurality of substrates.

19. The transport network of claim 18, wherein at least two of the plurality of substrates are in a stacked arrangement.

20. The transport network of claim 1, wherein each of the client-side input, the transmitter circuitry, the one or more first antennas, the client-side output, the receiver circuitry, and the one or more second antennas are implemented using one or more of complementary metal-oxide semiconductor (CMOS) technology, silicon-germanium (SiGe) semiconductor technology, and Ill-V compound semiconductor technology.

21. The transport network of claim 1, wherein the client data is encoded in the one or more radiated signals using an encoding protocol conforming to requirements of one or more of return-to-zero (RZ) code, non-return-to-zero (NRZ) code, quadrature phase-shift keying (QPSK), quadrature-amplitude modulation (QAM), trellis coded modulation (TCM), and Bose-Chaudhuri-Hocquenghem (BCH) code.

22. The transport network of claim 1, wherein the one or more radiated signals are a plurality of radiated signals including a first complementary radiated signal having a first polarization and a second complementary radiated signal having a second polarization different from the first polarization, the one or more first antennas being further configured to generate the first complementary radiated signal and the second complementary radiated signal based on the one or more antenna feed signals, the one or more second antennas being further configured to generate the one or more antenna output signals based on the first complementary radiated signal and the second complementary radiated signal.

23. The transport network of claim 22, wherein the first polarization is orthogonal to the second polarization.

24. The transport network of claim 23, wherein each of the first polarization and the second polarization is a linear polarization.

25. The transport network of claim 24, wherein each of the one or more first antennas and the one or more second antennas is one of a differential waveguide probe antenna, a differential tapered antenna, and a differential patch antenna.

26. The transport network of claim 23, wherein each of the first polarization and the second polarization is a circular polarization.

27. The transport network of claim 26, wherein each the one or more first antennas and the one or more second antennas is one of a helix antenna and a spiral antenna.

28. The transport network of claim 1, wherein the one or more first baseband signals include a plurality of first parallel baseband signals and a first serial baseband signal and the one or more second baseband signals include a plurality of second parallel baseband signals and a second serial baseband signal, the transmitter further comprising a serializer configured to receive the plurality of first parallel baseband signals and combine the plurality of first parallel baseband signals into the first serial baseband signal, the client-side input being configured to receive the first serial baseband signal, the transmitter circuitry being configured to receive the first serial baseband signal from the client-side input and generate the one or more antenna feed signals based on the first serial baseband signal, the receiver circuitry being configured to generate the second serial baseband signal based on the one or more antenna output signals, the client-side output being configured to receive the second serial baseband signal from the receiver circuitry and transmit the second serial baseband signal, the receiver further comprising a deserializer configured to receive the second serial baseband signal from the client-side output and split the second serial baseband signal into the plurality of second parallel baseband signals.

29. The transport network of claim 28, wherein combining the plurality of first parallel baseband signals into the first serial baseband signal and splitting the second serial baseband signal into the plurality of second parallel baseband signals utilizes at least one of polarization division multiplexing (PDM), time division multiplexing (TDM), and wavelength division multiplexing (WDM).

30. The transport network of claim 1, wherein the one or more first baseband signals include a plurality of first parallel baseband signals and a first serial baseband signal and the one or more second baseband signals include a plurality of second parallel baseband signals and a second serial baseband signal, the transmitter further comprising a deserializer configured to receive the first serial baseband signal and split the first serial baseband signal into the plurality of first parallel baseband signals, the client-side input being configured to receive the plurality of first parallel baseband signals, the transmitter circuitry configured to receive the plurality of first parallel baseband signals from the client-side input and generate the one or more antenna feed signals based on the plurality of first parallel baseband signals, the receiver circuitry being configured to generate the plurality of second parallel baseband signals based on the one or more antenna output signals, the client-side output being configured to receive the plurality of second parallel baseband signals from the receiver circuitry and transmit the plurality of second parallel baseband signals, the receiver further comprising a serializer configured to receive the plurality of second parallel baseband signals and combine the plurality of second parallel baseband signals into the second serial baseband signal.

31. The transport network of claim 30, wherein splitting the first serial baseband signal into the plurality of first parallel baseband signals and combining the plurality of second parallel baseband signals into the second serial baseband signal utilizes at least one of polarization division multiplexing (PDM), time division multiplexing (TDM), and wavelength division multiplexing (WDM).

32. The transport network of claim 1, wherein at least one of the one or more hollow waveguides has a hollow waveguide core having a cross-section configured to support propagation of a plurality of polarizations.

33. The transport network of claim 32, wherein the cross-section of the hollow waveguide core of the at least one of the one or more hollow waveguides has a rectangular or square shape.

34. The transport network of claim 32, wherein the cross-section of the hollow waveguide core of the at least one of the one or more hollow waveguides has a cross shape.

35. The transport network of claim 32, wherein the cross-section of the hollow waveguide core of the at least one of the one or more hollow waveguides has an elliptical or circular shape.

36. The transport network of claim 35, wherein at least one of the one or more hollow waveguides is a multi-mode waveguide.

37. The transport network of claim 36, wherein the at least one of the one or more hollow waveguides has a hollow waveguide core having a refractive index in a range between 1.0 and 1.4.

38. The transport network of claim 36, wherein the at least one of the one or more hollow waveguides has a hollow waveguide core and a tubular sidewall surrounding the hollow waveguide core, the hollow waveguide core being filled with one of a gas, a vacuum, and a porous material having a porosity in a range between 25% and 99%.

39. The transport network of claim 1, wherein the frequency of the one or more radiated signals is a transmission frequency, the transmitter circuitry comprising:
one or more local oscillators configured to generate one or more carrier signals, each of the one or more carrier signals having a first baseband frequency less than the transmission frequency;
one or more modulation circuits configured to receive the one or more first baseband signals from the client-side input and the one or more carrier signals from the one or more local oscillators and modulate the one or more first baseband signals onto the one or more carrier signals to generate one or more modulated signals; and
one or more up-conversion circuits configured to receive the one or more modulated signals from the one or more modulation circuits and up-convert the one or more modulated signals to generate the one or more antenna feed signals, each of the one or more antenna feed signals having the transmission frequency.

40. The transport network of claim 1, wherein the frequency of the one or more radiated signals is a transmission frequency, the receiver circuitry comprising:
one or more local oscillators configured to generate one or more reference signals, each of the one or more reference signals having a baseband frequency less than the transmission frequency;
one or more down-conversion circuits configured to receive the one or more antenna output signals from the one or more second antennas and the one or more reference signals from the one or more local oscillators and down-convert the one or more antenna output signals using the one or more reference signals to generate one or more modulated signals, each of the one or more modulated signals having the baseband frequency; and
one or more demodulation circuits configured to receive the one or more modulated signals from the one or more down-conversion circuits and demodulate the one or more modulated signals to generate the one or more second baseband signals.

41. The transport network of claim 1, wherein the one or more first baseband signals are a plurality of first baseband signals, the one or more antenna feed signals being a plurality of antenna feed signals including a combined antenna feed signal, the one or more radiated signals including a combined radiated signal, the frequency of the one or more radiated signals being a transmission frequency, the transmitter circuitry comprising:
a plurality of local oscillators configured to generate a plurality of carrier signals, each of the plurality of carrier signals having a baseband frequency less than the transmission frequency;
a plurality of modulation circuits configured to receive the plurality of first baseband signals from the client-side input and the plurality of carrier signals from the plurality of local oscillators and modulate the plurality of first baseband signals onto the plurality of carrier signals to generate a plurality of modulated signals;

a plurality of up-conversion circuits configured to receive the plurality of modulated signals from the plurality of modulation circuits and up-convert the plurality of modulated signals to generate a plurality of up-converted signals; and a combiner configured to receive the plurality of up-converted signals from the plurality of up-conversion circuits and combine the plurality of up-converted signals into the combined antenna feed signal; and wherein the one or more first antennas are configured to receive the combined antenna feed signal from the combiner, generate the combined radiated signal based on the combined antenna feed signal, and couple the combined radiated signal into the at least one of the one or more hollow waveguides.

42. The transport network of claim 41, wherein combining the plurality of up-converted signals into the combined antenna feed signal utilizes at least one of time division multiplexing (TDM) and wavelength division multiplexing (WDM).

43. The transport network of claim 1, wherein the one or more second baseband signals are a plurality of second baseband signals, the one or more antenna output signals being a plurality of antenna output signals including a combined antenna output signal, the one or more radiated signals including a combined radiated signal, the frequency of the one or more radiated signals being a transmission frequency, the one or more second antennas being configured to detect the combined radiated signal received from the one or more hollow waveguides and generate the combined antenna output signal based on the combined radiated signal, the receiver circuitry comprising:

a splitter configured to receive the combined antenna output signal from the one or more second antennas and split the combined antenna output signal into the plurality of antenna output signals;

a plurality of local oscillators configured to generate a plurality of reference signals, each of the plurality of reference signals having a baseband frequency less than the transmission frequency;

a plurality of down-conversion circuits configured to receive the plurality of antenna output signals from the splitter and the plurality of reference signals from the plurality of local oscillators and down-convert the plurality of antenna output signals using the plurality of reference signals to generate a plurality of modulated signals, each of the plurality of modulated signals having the baseband frequency; and a plurality of demodulation circuits configured to receive the plurality of modulated signals from the plurality of down-conversion circuits and demodulate the plurality of modulated signals to generate the plurality of second baseband signals.

44. The transport network of claim 43, wherein splitting the combined antenna output signal into the plurality of antenna output signals utilizes at least one of time division multiplexing (TDM) and wavelength division multiplexing (WDM).

45. The transport network of claim 1, wherein the one or more first baseband signals are a plurality of first baseband signals, the one or more antenna feed signals being a plurality of antenna feed signals, the one or more radiated signals being a plurality of radiated signals including a combined radiated signal, the frequency of the one or more radiated signals being a transmission frequency, the one or more first antennas being a first antenna array comprising a plurality of first antennas, the transmitter circuitry comprising:

a plurality of local oscillators configured to generate a plurality of carrier signals, each of the plurality of carrier signals having a baseband frequency less than the transmission frequency;

a plurality of modulation circuits configured to receive the plurality of first baseband signals from the client-side input and the plurality of carrier signals from the plurality of local oscillators and modulate the plurality of first baseband signals onto the plurality of carrier signals to generate a plurality of modulated signals;

a plurality of up-conversion circuits configured to receive the plurality of modulated signals from the plurality of modulation circuits and up-convert the plurality of modulated signals to generate the plurality of antenna feed signals; and wherein the plurality of first antennas are configured to receive the plurality of antenna feed signals from the plurality of up-conversion circuits, generate the plurality of radiated signals based on the plurality of antenna feed signals, and couple the plurality of radiated signals into the at least one of the one or more hollow waveguides such that the plurality of radiated signals interact in the at least one of the one or more hollow waveguides to form the combined radiated signal.

46. The transport network of claim 45, wherein coupling the plurality of radiated signals into the at least one of the one or more hollow waveguides such that the plurality of radiated signals interact in the at least one of the one or more hollow waveguides to form the combined radiated signal utilizes at least one of polarization division multiplexing (PDM), time division multiplexing (TDM) and wavelength division multiplexing (WDM).

47. The transport network of claim 1, wherein the one or more second baseband signals are a plurality of second baseband signals, the one or more antenna output signals being a plurality of antenna output signals, the one or more radiated signals being a plurality of radiated signals including a first complementary radiated signal, a second complementary radiated signal, and a combined radiated signal formed by the first complementary radiated signal and the second complementary radiated signal interacting in the at least one of the one or more hollow waveguides, the frequency of the one or more radiated signals being a transmission frequency, the one or more second antennas being an antenna array comprising a plurality of antennas, the plurality of antennas being configured to detect the first complementary radiated signal and the second complementary radiated signal based on the combined radiated signal received from the at least one of the one or more hollow waveguides and generate the plurality of antenna output signals based on the first complementary radiated signal and the second complementary radiated signal, the receiver circuitry comprising:

a plurality of local oscillators configured to generate a plurality of reference signals, each of the plurality of reference signals having a baseband frequency less than the transmission frequency;

a plurality of down-conversion circuits configured to receive the plurality of antenna output signals from the plurality of antennas and the plurality of reference signals from the plurality of local oscillators and down-convert the plurality of antenna output signals using the plurality of reference signals to generate a plurality of modulated signals, each of the plurality of modulated signals having the baseband frequency; and a plurality of demodulation circuits configured to receive the plurality of modulated signals from the plurality of down-conversion circuits and demodulate the plurality of modulated signals to generate the plurality of second baseband signals.

48. The transport network of claim 47, wherein detecting the first complementary radiated signal and the second complementary radiated signal based on the combined radiated signal received from the at least one of the one or more hollow waveguides utilizes at least one of polarization division multiplexing (PDM), time division multiplexing (TDM) and wavelength division multiplexing (WDM).

49. The transport network claim 1, wherein the client data is provided by a client in connection with a data communication service between two or more servers.

50. The transport network of claim 1, wherein each particular one of the one or more radiated signals has a bandwidth in a range between 10% and 40% of the frequency of the particular one of the one or more radiated signals.

51. The transport network of claim 1, wherein the client data is encoded in the one or more first baseband signals and the one or more second baseband signals using an encoding protocol conforming to requirements of one or more of return-to-zero (RZ) code, non-return-to- zero (NRZ) code, pulse-amplitude modulation (PAM), and quadrature-amplitude modulation (QAM).

52. The transport network of claim 1, wherein the one or more radiated signals are a plurality of radiated signals including a first complementary radiated signal having a first polarization and a second complementary radiated signal having a second polarization different from the first polarization, the one or more first antennas being further configured to couple the first complementary radiated signal having the first polarization and the second complementary radiated signal having the second polarization in the at least one of the one or more hollow waveguides such that the first complementary radiated signal and the second complementary radiated signal interact in the at least one of the one or more hollow waveguides to form a combined radiated signal having a third polarization different from the first polarization and the second polarization, the one or more second antennas being further configured to detect the combined radiated signal received from the at least one of the one or more hollow waveguides and generate the one or more antenna output signals based on the combined radiated signal.

53. The transport network of claim 52, wherein the one or more first antennas are a first antenna array comprising a first plurality of antennas and the one or more second antennas are a second antenna array comprising a second plurality of antennas.

54. The transport network of claim 1, wherein the client-side input is configured to carry the first baseband signals in a differential format.

55. The transport network of claim 1, wherein the frequency of the one or more radiated signals is a transmission frequency, the transmitter circuitry comprising:

one or more local oscillators configured to generate one or more carrier signals, each of the one or more carrier signals having a baseband frequency less than the transmission frequency;

one or more modulation circuits configured to receive the one or more first baseband signals from the client-side input and the one or more carrier signals from the one or more local oscillators and modulate the one or more first baseband signals onto the one or more carrier signals to generate one or more modulated signals; and an RF interface configured to receive the one or more modulated signals and generate the one or more antenna feed signals.

56. The transport network of claim 1, wherein the transmitter circuitry is configured to generate one or more in-phase (I) antenna feed signals and one or more quadrature (Q) antenna feed signals; and wherein the transmitter circuitry includes a power combiner configured to receive the one or more I antenna feed signals and the one or more Q antenna feed signals and combine the one or more I antenna feed signals and the one or more Q antenna feed signals to produce the one or more antenna feed signals having an I component and a Q component.

57. The transport network of claim 1, wherein the one or more first baseband signals are a plurality of first baseband signals, and wherein the transmitter circuitry includes a plurality of modulators encoding the plurality of first baseband signals to form a plurality of different channel signals, and a combiner to combine the plurality of different channel signals to produce the one or more antenna feed signals.

58. The transport network of claim 57, wherein the plurality of modulators includes a first modulator configured to modulate one or more first baseband signals into a first carrier frequency with a first modulation format to generate a first channel signal and a second modulator configured to modulate one or more first baseband signals into a second carrier frequency with a second modulation format to generate a second channel signal.

59. The transport network of claim 58, wherein the first carrier frequency and the second carrier frequency are different and the one or more antenna feed signals are in a wavelength division multiplexed (WDM) format.

60. The transport network of claim 58, wherein the first modulation format is different that the second modulation format.

61. The transport network of claim 58, wherein at least one of the one or more hollow waveguides is a multi-mode waveguide.

62. The transport network of claim 58, wherein the first carrier frequency and the second carrier frequency are the same and the one or more antenna feed signals are in a polarization division multiplexed (PDM) format.

63. The transport network of claim 1, wherein the one or more first antennas include a slot antenna.

64. The transport network of claim 63, wherein the slot antenna includes a ground plane having a slot and a back reflector adjacent to the ground plane.

65. The transport network of claim 64, wherein the ground plane is between the back reflector and at least one of the one or more hollow waveguides.

66. The transport network of claim 64, wherein the slot antenna is a double slot antenna having a pair of slots.

67. The transport network of claim 1, further comprising an intermediary waveguide positioned between the one or more first antennas and at least one of the one or more hollow waveguides, the intermediary waveguide configured to propagate the one or more radiated signals to the at least one of the one or more hollow waveguides.

68. The transport network of claim 67, wherein the intermediary waveguide has one or more first intended waveguide modes and the at least one of the one or more hollow waveguides has one or more second intended waveguide modes, and wherein the one or more first intended waveguide modes of the intermediary waveguide sufficiently matches the one or more second intended waveguide modes of the at least one of the one or more hollow waveguides such that a coupling loss between the intermediary waveguide and the at least one of the one or more hollow waveguides is in a range between 0.1 dB and 5.0 dB.

69. The transport network of claim 67, wherein the intermediary waveguide has a flared end coupled to the at least one of the one or more hollow waveguides and configured to facilitate a mode transition between the intermediary waveguide and the at least one of the one or more hollow waveguides.

70. The transport network of claim 69, wherein the flared end comprises a horn separate from the intermediary waveguide.

71. The transport network of claim 70, wherein the horn has a first end abutting the intermediary waveguide, a second end opposite the first end, and a curved surface extending between the first end and the second end.

72. The transport network of claim 71, wherein at least one of the one or more hollow waveguides has a hollow waveguide core and a tubular sidewall surrounding the hollow waveguide core, the hollow waveguide core being filled with one of a gas, a vacuum, and a porous material having a porosity in a range between 25% and 99%.

73. The transport network of claim 1, wherein the radiated electromagnetic waves configured for coherent detection have a frequency in a range between 700 Gigahertz (GHz) and 5 Terahertz (THz).

74. The transport network of claim 1, wherein the client data is provided by a client in connection with a telecommunication service.

75. The transport network of claim 1, wherein the client data is provided by a client in connection with a storage service.

76. The transport network of claim 1, wherein the transmitter and receiver operate entirely in the electrical domain.

77. The transport network of claim 1, wherein at least one of the one or more hollow waveguides is a solid rod fiber.

78. The transport network of claim 1, wherein at least one of the one or more hollow waveguides has a hollow waveguide core comprising silicon.

79. The transport network of claim 78, wherein the hollow waveguide core comprises silica glass (SiO2).

80. The transport network of claim 1, wherein at least one of the one or more hollow waveguides has a hollow waveguide core composed of a polymer.

\* \* \* \* \*

UNITED STATES PATENT AND TRADEMARK OFFICE
CERTIFICATE OF CORRECTION

| | | |
|---|---|---|
| PATENT NO. | : 12,401,424 B2 | Page 1 of 1 |
| APPLICATION NO. | : 18/952796 | |
| DATED | : August 26, 2025 | |
| INVENTOR(S) | : David F. Welch et al. | |

It is certified that error appears in the above-identified patent and that said Letters Patent is hereby corrected as shown below:

In the Specification

Column 29, Line 18: Delete "5841" and replace with -- 584I --

Column 29, Line 19: Delete "5841" and replace with -- 584I --

Signed and Sealed this
Twenty-eighth Day of October, 2025

John A. Squires
*Director of the United States Patent and Trademark Office*